(12) United States Patent
Scholand et al.

(10) Patent No.: US 11,516,749 B2
(45) Date of Patent: Nov. 29, 2022

(54) METHOD AND APPARATUS FOR V2X COMMUNICATIONS

(71) Applicant: Apple Inc., Cupertino, CA (US)

(72) Inventors: Tobias Scholand, Essen (DE); Francois Deparis, Bayern (DE); Yanzhong Dai, Shaanxi (CN); Dun Liu, Beijing (CN); Jun Zhou, Shaanxi (CN); Qingyun Guo, Beijing (CN); Weijie Sun, Beijing (CN); Donghui Guo, Beijing (CN); Jun Wang, Beijing (CN); Wei Jiang, Shaanxi (CN); Daguo Li, Beijing (CN); Yubao Li, Beijing (CN); Baoyu Sun, Shaanxi (CN); Huiqiang Zhou, Beijing (CN); Xuanbing Liu, Beijing (CN); Zhibin Yu, Unterhaching (DE); Ningbo Gao, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/041,881

(22) PCT Filed: Jul. 20, 2018

(86) PCT No.: PCT/CN2018/096506
§ 371 (c)(1),
(2) Date: Sep. 25, 2020

(87) PCT Pub. No.: WO2020/014979
PCT Pub. Date: Jan. 23, 2020

(65) Prior Publication Data
US 2021/0136699 A1 May 6, 2021

(51) Int. Cl.
*H04W 52/24* (2009.01)
*H04W 52/22* (2009.01)
(Continued)

(52) U.S. Cl.
CPC ........... *H04W 52/242* (2013.01); *H04W 4/40* (2018.02); *H04W 52/225* (2013.01); *H04W 52/245* (2013.01); *H04W 52/34* (2013.01)

(58) Field of Classification Search
CPC .... H04W 4/40; H04W 52/242; H04W 52/225
(Continued)

(56) References Cited

U.S. PATENT DOCUMENTS

2016/0249307 A1\* 8/2016 Thangarasa ......... H04W 56/001
2018/0041969 A1\* 2/2018 Kwak ................. H04W 52/242
(Continued)

FOREIGN PATENT DOCUMENTS

EP          3099120          11/2016
EP          3099120  A1 \*   11/2016   .......... H04W 52/243
(Continued)

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 15)," 3GPP TS 36.321 V 15.1.0, Apr. 2, 2018, 109 pages.
(Continued)

*Primary Examiner* — John J Lee
(74) *Attorney, Agent, or Firm* — Fish & Richardson P.C.

(57) ABSTRACT

Embodiments disclosed herein provide various aspects that would allow for Vehicle to Everything (V2X) or peer-to-peer (P2P) or sidelink (SL) communications. In an embodiment, a communication device may include: a memory for storing computer-readable instructions; and processing circuitry, configured to process the instructions stored in the memory to: obtain a first path loss between the communication device and a base station, wherein the communication device is coupled to the base station; calculate a second path
(Continued)

loss based on one or more sidelink reference signal received power (S-RSRP) indicators received by the communication device, wherein the S-RSRP indicators are received from one or more communication devices within a communication range of the communication device; and determine a transmit (Tx) power of the communication device based on the first path loss and the second path loss.

17 Claims, 53 Drawing Sheets

(51) Int. Cl.
   *H04W 4/40* (2018.01)
   *H04W 52/34* (2009.01)

(58) Field of Classification Search
   USPC ... 455/522, 69, 41.2, 41.3, 3.01, 569.2, 41.1
   See application file for complete search history.

(56) References Cited

U.S. PATENT DOCUMENTS

| | | | |
|---|---|---|---|
| 2018/0249429 A1* | 8/2018 | Zhang | H04W 52/40 |
| 2020/0351833 A1* | 11/2020 | Chae | H04W 52/383 |

FOREIGN PATENT DOCUMENTS

| | | |
|---|---|---|
| WO | WO 2014126435 | 8/2014 |
| WO | WO 2015019179 | 2/2015 |
| WO | WO 2017084692 | 5/2017 |
| WO | WO 2017171895 | 10/2017 |

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 15)," TS 36.212 V 15.1.0, Apr. 2, 2018, 234 pages.

3GPP, "3rd Generation Partnership Project; Technical Specification Group Radio Access Network; Evolved Universal Terrestrial Radio Access (EUTRA); Physical layer procedures (Release 15)," TS 36.213 V 15.1.0, Apr. 3, 2018, 499 pages.

3GPP, "3rd Generation Partnership Project; Technical Specification Group Radio Access Network; Evolved Universal Terrestrial Radio Access (E-UTRA); Physical layer; Measurements (Release 15)," TS 36.214 V 15. 1.0, Apr. 2, 2018, 24 pages.

PCT International Preliminary Report in International Appln. No. PCT/CN2018/096506, dated Feb. 3, 2021, 10 pages.

PCT International Search Report and Written Opinion in International Appln. No. PCT/CN2018/096506, dated Apr. 19, 2019, 7 pages.

EP Extended European Search Report in European Appln. No. 18927150.5, dated May 28, 2021, 9 pages.

Nokia, "Discussion on physical layer enhancements for sidelink communication and UE-to-Network relaying," 3GPP TSG WG1 Meeting #88bis, Spokane, USA Apr. 3-7, 2017, R1-1705828, 4 pages.

\* cited by examiner

4201

4202

METHOD AND APPARATUS FOR V2X COMMUNICATIONS

PRIORITY CLAIM

This application claims priority under 35 U.S.C. § 371 to International Application No. PCT/CN2018/096506, filed Jul. 20, 2018, entitled "METHOD AND APPARATUS FOR V2X COMMUNICATIONS", the contents of which are incorporated herein in their entirety.

TECHNICAL FIELD

Embodiments of the present disclosure generally relate to wireless communications, and more particularly to various aspects of Vehicle to Everything (V2X) communications, or other peer-to-peer (P2P) or sidelink (SL) communications.

BACKGROUND

V2X (or more generally, P2P or SL) communications is an important application for upcoming fifth generation (5G) wireless communication systems. V2X communications may include vehicle-to-vehicle (V2V), vehicle-to-person/pedestrian (V2P), or vehicle-to-infrastructure (V2I) communications (including roadside units, radio heads, basestations or eNodeBs), each of which may include communication devices (CDs) that autonomously communicate with one another. In V2X communication, a CD may communicate with another CD or CDs via a P2P, an SL and/or a PC5 interface. The third Generation Partnership Project (3GPP) has proposed general principles to meet requirements for V2X or other P2P communications such as low latency, high reliability and high transmission rates, however, there are still a lot of implementation issues that need to be addressed to allow for efficient V2X or other P2P communications.

BRIEF DESCRIPTION OF THE DRAWINGS

Embodiments of the disclosure will be illustrated, by way of example and not limitation, in the figures of the accompanying drawings in which like reference numerals refer to similar elements.

DETAILED DESCRIPTION OF EMBODIMENTS

Various aspects of the illustrative embodiments will be described using terms commonly employed by those skilled in the art to convey the substance of their work to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in an embodiment" is used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

Figure 1:
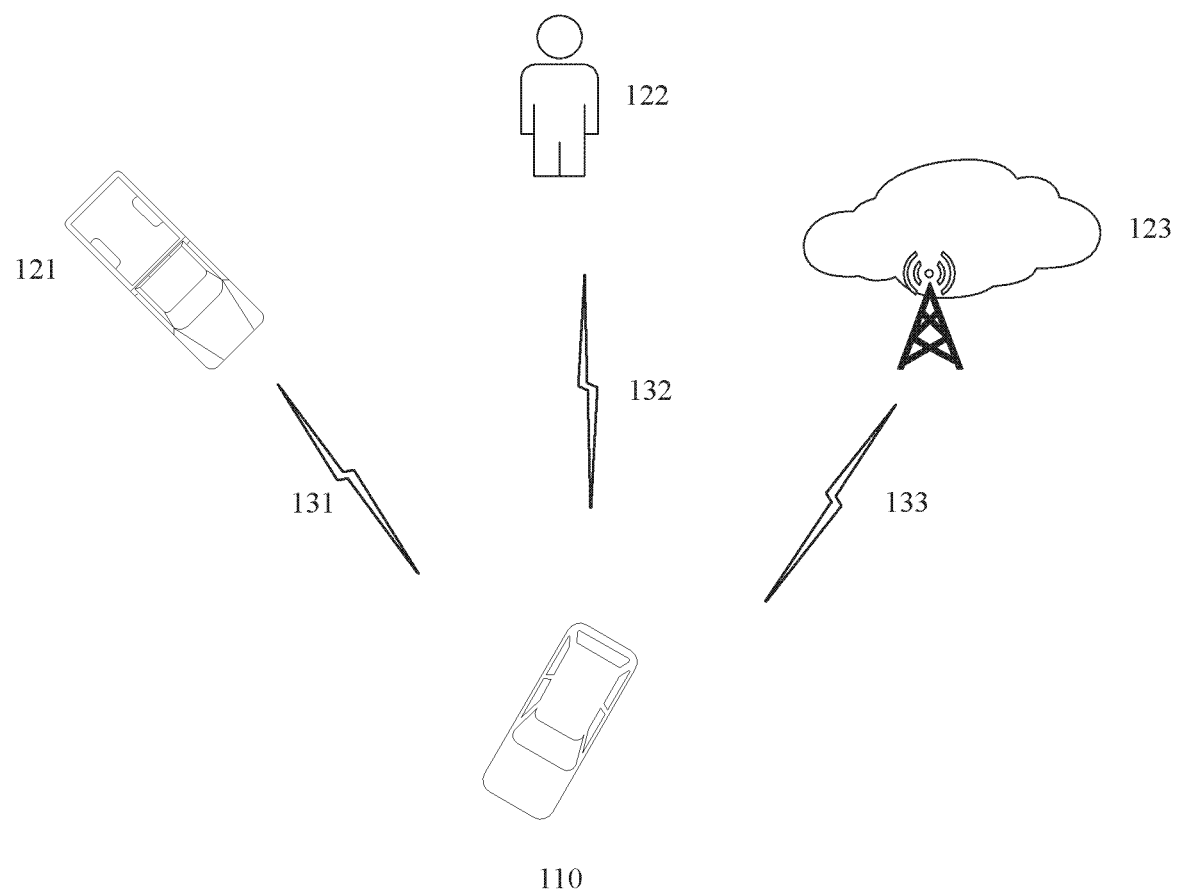
FIG. 1 shows an example of a V2X communication system in accordance with some embodiments of the disclosure.

FIG. 1 shows an example of a V2X communication system 100 in accordance with some embodiments of the disclosure. In some embodiments, V2X communication may include vehicle-to-vehicle (V2V), vehicle-to-person/pedestrian (V2P), and/or vehicle-to-infrastructure (V2I) communication, each of which may include communication devices (CDs) that autonomously communicate with one another. In the context, the term "pedestrian" used herein includes a pedestrian standing, walking, jogging, or a person utilizing a non-automobile form of transportation (e.g., bicycle) that is positioned in the road or in close proximity to the road. Though "V2X" is used throughout the present disclosure, it is not intended to be limited only to vehicle-related communications; rather, it should be understood that V2X communications as used herein also covers other P2P or sidelink communications setting.

In V2X communication, a communication device (CD) may communicate with other CDs via a sidelink or PC5 interface. As shown in FIG. 1, CD 110 may communicate with CD 121, CD 122 and CD 123 via sidelinks 131, 132 and 133 respectively.

CDs or components involved in V2X communications may be any mobile or non-mobile terminal devices (e.g., user equipments (UEs), mobile phones, tablets, laptops, desktop or server computers, personal data assistants (PDAs), pagers, wireless handsets, Internet of Things (IoT) devices, wearables, implantable devices, machine-type communication devices, etc.) and/or vehicles (e.g., cars, trucks, buses, bicycles, robots, motorbikes, trains, ships, submarines, drones, airplanes, balloons, satellites, spacecraft, machine-type communication devices, etc.).

In some embodiments, CD 110 may communicate with an access node via an uplink (UL) and a downlink (DL) for both signaling and data, which is omitted in the FIG. 1 for simplicity. Access node as used herein may also be referred to as a base station (BS), a NodeB, an evolved NodeB (eNB), a next Generation NodeB (gNB), or the like, and may include a ground station (e.g., a terrestrial access point) or a satellite station providing coverage within a geographic area (e.g., a cell).

In some embodiments, CD 110 may be configured to connect, e.g., communicatively couple, with a radio access network (RAN), which may be, for example, an Evolved Universal Mobile Telecommunications System (UMTS) Terrestrial Radio Access Network (E-UTRAN), a NextGen RAN (NG RAN), or some other type of RAN. CD 110 may operate in consistent with cellular communications protocols, such as a Global System for Mobile Communications (GSM) protocol, a Code-Division Multiple Access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol or future generations of cellular protocol, a New Radio (NR) protocol, and other wireless communication protocols currently available or developed in the future.

In some embodiments, CD 110 may be a communication terminal mounted on or carried by a vehicle, a pedestrian, an infrastructure, and the like. For example, as shown in FIG. 1, CD 110 is mounted on or carried by a vehicle. In some embodiments, CD 110 may provide transmissions to and receive transmissions from the access node via an uplink or a downlink. In some embodiments, CD 110 may directly communicate with CDs 121, 122 and 123 which are detectable by CD 110 via a sidelink, without via the access node.

In some embodiment, CDs 121, 122 and 123 may be communication terminals mounted on or carried by a vehicle, a pedestrian, an infrastructure, and the like. As shown in FIG. 1, for example, CD 121 may be mounted or carried on a vehicle, CD 122 may be carried on a pedestrian, and CD 123 may be mounted or carried on an infrastructure.

The quantity of devices and/or networks illustrated in FIG. 1 is provided for explanatory purposes only. In practice, there may be additional devices and/or networks, fewer devices and/or networks, different devices and/or networks, or differently arranged devices and/or networks than illustrated in FIG. 1. Alternatively or additionally, one or more of the devices of system 100 may perform one or more functions described as being performed by another one or more of the devices of system 100. In the following, proposals in various aspects of V2X communications will be discussed. In addition, the description below may involve one or more 3GPP technical specifications. For the sake of simplicity, such technical specifications may not be reproduced, or reproduced only in part; however the entire contents of these technical specifications are incorporated herein by reference, as if they have been reproduced herein in their entirety.

Dynamical Determination of Transmit (Tx) Power of CD

In a V2X system, Tx power of CD is usually determined based on semi-static network configurations and Tx resource allocations for the CD by higher layers, and a path loss estimation result between the CD and a base station (e.g., an evolved node B (eNodeB or eNB)) to which the CD is coupled. For example, as described in "$3^{rd}$ Generation Partnership Project; Technical Specification Group Radio Access Network; Evolved Universal Terrestrial Radio Access (E-UTRA); Physical layer procedures (Release 15)" (3GPP TS 36.213 V15.1.0 (2018 March)), for sidelink transmission mode 3, the UE Tx power PPSSCH for physical sidelink share channel (PSSCH) transmission is given by:

$$P_{PSSCH} = 10\log_{10}\left(\frac{M_{PSSCH}}{M_{PSSCH} + 10^{\frac{3}{10}} \times M_{PSCCH}}\right) + \quad (1)$$

$$\min\left\{P_{CMAX}, 10\log_{10}\left(M_{PSSCH} + 10^{\frac{3}{10}} \times M_{PSCCH}\right) + P_{O\_PSSCH,3} + \alpha_{PSSCH,3} \cdot PL\right\}[dBm],$$

where $P_{CMAX}$ is the maximal Tx power (MaxTxpower) allowed for a UE in the V2X system, and $M_{PSSCH}$ is the bandwidth of PSSCH resource assignment expressed in number of resource blocks and PL represents a path loss estimation result between the UE and a base station to which it is coupled. $P_{O\_PSSCH,3}$ and $\alpha_{PSSCH,3}$ are provided by higher layer parameters p0SL-V2V and alphaSL-V2V, respectively and that are associated with the corresponding PSSCH resource configuration.

However, in a real V2X system, a CD may only need to communicate with users (such as, other CDs or transportation infrastructures, for example, traffic lights, which are collectively referred to as "CD" herein for simplicity and brevity) surrounding it. Normally, distances between the CD and the users surrounding it are much smaller than the distance between the CD and the base station to which it is coupled. By using the PL in Equation (1), for communications between the CD and the other users, the CD Tx power may be larger than needed, which will result in a waste of power consumption and interferences to the V2X system.

An approach for determining the CD Tx power in the V2X system is to use a sidelink reference signal received power (S-RSRP) based path loss between the CD and other CDs surrounding it, instead of the path loss between the CD and the base station. However, the approach would cause other problems, such as, in case that the calculated S-RSRP based path loss between the CD and the other CDs is smaller than a real path loss between the CD and another CD, the received power for the other CD may be lower than needed, and thus receive quality for the other CD cannot be guaranteed.

As described in related 3GPP technical specifications (such as 3GPP TS 36.213), Tx power of CD is generally determined based on semi-static network configurations and Tx resource allocations for the CD by higher layers, and a path loss estimation result between the CD and a base station to which the CD is coupled.

In a V2X system, a CD may communicate with a base station via UL and DL for both signaling and data, and communicate with other users, such as vehicles, infrastructures, and vulnerable road users (VRA) who have UE in hand, via a sidelink or PC5 interface.

Embodiments of the section provide apparatuses and methods for dynamically determining CD Tx power based at least on a S-RSRP based path loss between a CD and other CDs surrounding it in the V2X system. For example, the CD Tx power may be determined utilizing both the path loss between the CD and the base station and a sidelink reference signal received power (S-RSRP) based path loss between the CD and one or more other CDs surrounding it. In an embodiment, an adjustment value for adjusting the CD Tx power may be calculated according to the base station (e.g., eNodeB) based path loss and the S-RSRP based path loss.

In accordance with "$3^{rd}$ Generation Partnership Project; Technical Specification Group Radio Access Network; Evolved Universal Terrestrial Radio Access (E-UTRA);

Physical layer; Measurements (Release 15)" (3GPP TS 36.214 V15.1.0 (2018 March)), S-RSRP is defined as shown in the table below.

| | |
|---|---|
| Definition | Sidelink Reference Signal Received Power (S-RSRP) is defined as the linear average over the power contributions (in [W]) of the resource elements that carry demodulation reference signals associated with PSBCH, within the central 6 PRBs of the applicable subframes.<br>The reference point for the S-RSRP shall be the antenna connector of the UE.<br>If receiver diversity is in use by the UE, the reported value shall not be lower than the corresponding S-RSRP of any of the individual diversity branches. |
| Applicable for | RRC_IDLE intra-frequency,<br>RRC_IDLE inter-frequency,<br>RRC_CONNECTED inter-frequency |

Figure 2:
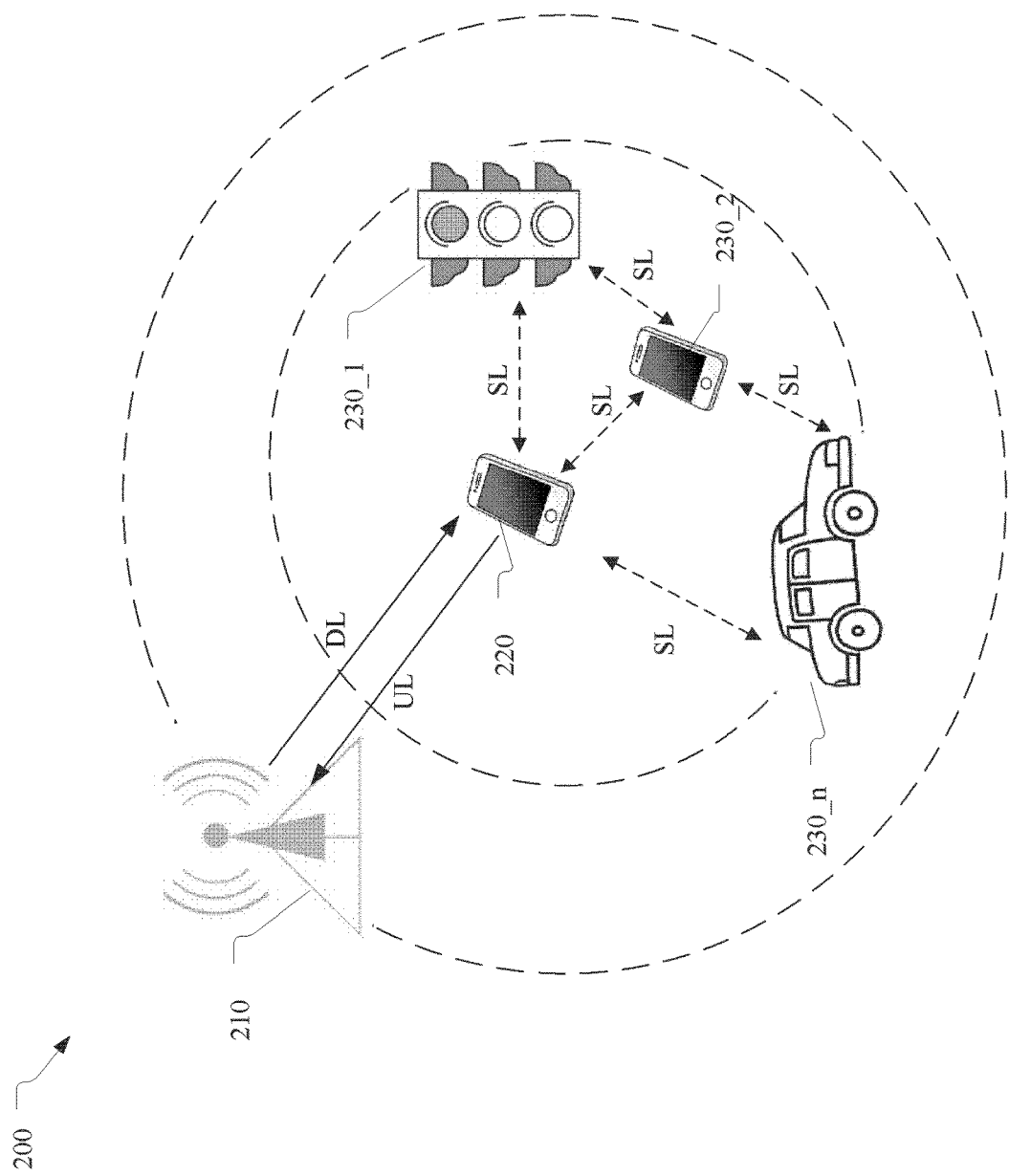
FIG. 2 illustrates a simplified communication environment in which embodiments of the disclosure can be implemented.

FIG. 2 illustrates a simplified communication environment 200 in which embodiments of the disclosure can be implemented. In an embodiment, the communication environment 200 may be a V2X system which mainly concerns road-safety.

In an embodiment, the communication environment 200 may include at least a base station 210, a CD 220 which may be wirelessly coupled to the base station 210, and several communication terminals 230_1, 230_2, ..., 230_n. These communication terminals are regarded as CDs. The base station 210 may be operable over a coverage area, e.g. a cell. The CD 220 may communicate with the base station 210 within the coverage area. Each of the communication terminals 230_1, 230_2, ..., 230n (here n is a positive integer) may be coupled to the base station 210 or not, but may directly communicate with the CD 220, i.e. they are within a communication range of the CD 220. In other embodiments, the wireless communication system 200 may include more base stations.

The CD 220 may provide transmissions to and receive transmissions from the base station 210 via UL or DL. The CD 220 may directly communicate with the communication terminals 230_1, 230_2, ..., 230_n which are detectable by the CD 220, via a sidelink (SL) corresponding to a PC5 interface.

The communication terminals 230_1, 230_2, ..., 230n may also be, such as, communication terminals mounted or carried on vehicles, mobile phones, laptop computers or panels carried by road users, or transport infrastructures which have communication capabilities. In an embodiment, some of the communication terminals 230_1, 230_2, ..., 230_n may be wirelessly coupled to the base station 210. In another embodiment, some of the communication terminals 230_1, 230_2, ..., 230_n may be coupled to one or more other base stations. In yet another embodiment, some of the communication terminals 230_1, 230_2, ..., 230_n may not be coupled with any base station. In each case, the communication terminals 230_1, 230_2, ..., 230_n in the communication range of the CD 220 may transmit or receive signals or data to or from the CD 220. It is to be noted that in other context, each of the communication terminals 230_1, 230_2, ..., 230_n may function as the CD 220, while the CD 220 may act as one of the communication terminals 230_1, 230_2, ..., 230_n.

In traditional approaches, Tx power of CD 220 is generally determined based on semi-static network configurations and Tx resource allocations for the CD by higher layers (such as, by the base station 210), and a path loss estimation result between the CD 220 and the base station 210. In some cases, for example, where distances between the CD 220 and the communication terminals 230_1, 230_2, ..., 230_n are much smaller than that from the CD 220 to the base station 210, the Tx power of CD 220 as determined by traditional approaches is larger than needed for transmission between the CD 220 and the communication terminals 230_1, 230_2, ..., 230_n, since the path loss between the CD 220 and the base station 210 is larger than that between the CD 220 and the communication terminals 230_1, 230_2, ..., 230_n. The larger Tx power will lead to, for example, a waste of power consumption and interference to the communication environment 200.

A novel proposal is to determine the Tx power according to both the path loss between the CD 220 and the base station 210 and a calculated path loss between the CD 220 and the communication terminals 230_1, 230_2, ..., 230_n. For example, the path loss between the CD 220 and the communication terminals 230_1, 230_2, ..., 230_n may be calculated based on sidelink reference signal received power (S-RSRP) of a signal transmitted by each of the communication terminals 230_1, 230_2, ..., 230_n and received by the CD 220. In an embodiment, an adjustment value for adjusting the Tx power of the CD 220 may be obtained based on the path loss between the CD 220 and the base station 210 and the path loss between the CD 220 and the communication terminals 230_1, 230_2, ..., 230_n, and may be applied to the original Tx power (for example, basic Tx power as specified in 3GPP TS 36.213) of the CD 220. The proposal will be discussed in details below with reference to FIGS. 3-4.

Figure 3:
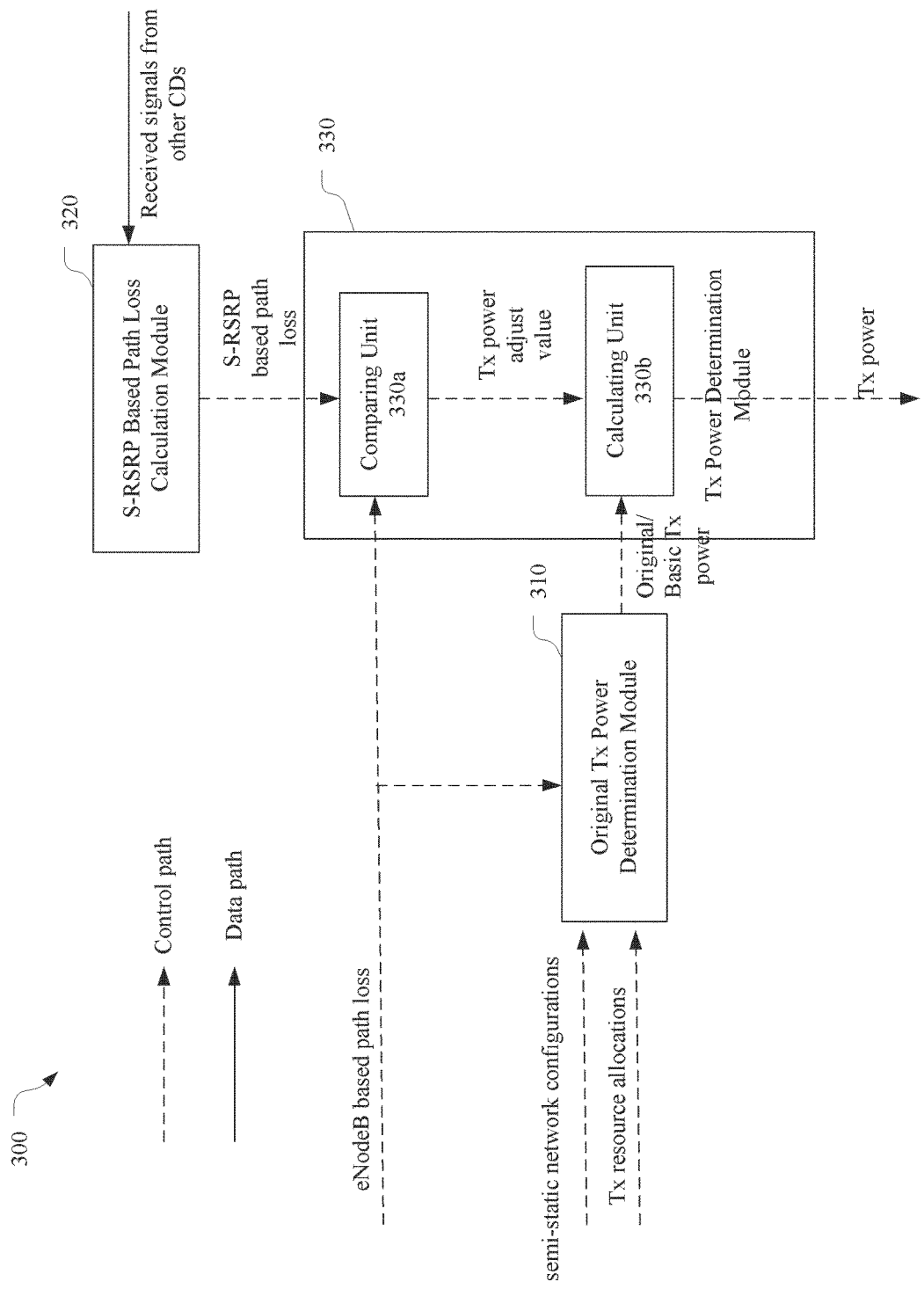
FIG. 3 shows a simplified block diagram of an apparatus for determining transmit (Tx) power of CD in a V2X system in accordance with embodiments of the disclosure.

FIG. 3 shows a simplified block diagram of an apparatus 300 for determining Tx power of CD in a V2X system in accordance with embodiments of the disclosure. The apparatus 300 may be applied in the CD 220 of FIG. 2 or any communication terminal that may be in communication with a base station and/or other communication terminals.

In an embodiment, the apparatus 300 may include, for example, an original Tx power determination module 310, a S-RSRP based path loss calculation module 320, and a Tx power determination module 330. The modules may be implemented in hardware, software, firmware or any combination thereof. In an embodiment, the apparatus may include a memory for storing computer-readable instructions, and processing circuitry configured to process the instructions stored in the memory to implement the operations described in the following for the modules.

The original Tx power determination module 310 may determine original Tx power of CD, for example, the CD 220 of FIG. 2. The original Tx power of the CD may be basic CD Tx power in the V2X system. In an embodiment, the original Tx power determination module 310 may determine the basic CD Tx power based on semi-static network configurations and Tx resource allocations for the CD by higher layers, and a path loss estimation result between the CD and the eNodeB. In other embodiments, the original Tx power determination module 310 may determine the original Tx power of the CD by other ways, such as, calculating the Tx power based on other parameters, which is not limited in the context.

The S-RSRP based path loss calculation module 320 may be coupled to a receiver or transceiver of the CD to which the apparatus 300 is applied. For example, the receiver or transceiver may be a radio frequency (RF) receiver or transceiver, which may include or be coupled with one or more RF antennas to receive RF signals transmitted from other devices, such as, a base station and/or other CDs. In an embodiment, the receiver receives signals transmitted from other communication terminals, such as, the communication terminals 230_1, 230_2, . . . , 230_n of FIG. 2, and the S-RSRP based path loss calculation module 320 estimates S-RSRP of the signals from each of the other communication terminals. The S-RSRP based path loss calculation module 320 calculates the S-RSRP based path loss based on the estimated S-RSRP of the signals from each of the other communication terminals. For example, the S-RSRP based path loss calculation module 320 may calculate the S-RSRP based path loss based on a minimum of the estimated S-RSRP (MinS-RSRP) and a maximal Tx power (MaxTxpower) allowed for a CD in the V2X system (which may be 23 dBm, for example). For example, the S-RSRP based path loss may be calculated by the S-RSRP based path loss calculation module 320 according to the following equation:

S-RSRP based path loss=MaxTxpower−MinS-RSRP (2)

Both the original Tx power determination module 310 and the S-RSRP based path loss calculation module 320 are coupled to the Tx power determination module 330. The Tx power determination module 330 is used to adjust Tx power of the CD to which the apparatus 300 is applied. Thus, the Tx power determination module 330 is also coupled to a transmitter or transceiver of the CD. For example, the transmitter or transceiver may be a RF transmitter or transceiver, which include or are coupled with one or more RF antennas to transmit RF signals. In an embodiment, the Tx power determination module 330 may determine the Tx power of the CD by adding a power adjustment value to the original/basic CD Tx power determined by the original Tx power determination module 310. The Tx power determination module 330 may obtain the power adjustment value according to, for example, the path loss between the CD and the eNodeB to which the CD is coupled (which may be referred to as an "eNodeB based path loss", "base station based path loss", or "first path loss") and a path loss based on the S-RSRP estimated by the S-RSRP based path loss calculation module 320 (which may be referred to as a "S-RSRP based path loss", or "second path loss").

In an embodiment, the Tx power determination module 330 may include a comparing unit 330a and a calculating unit 330b. For example, the comparing unit 330a may receive the eNodeB based path loss and the S-RSRP based path loss, and compare the S-RSRP based path loss to the eNodeB based path loss. In the embodiment, if the eNodeB based path loss is larger than the S-RSRP based path loss, the comparing unit 330a will output the power adjustment value as a value equal to −(eNodeB based path loss−S-RSRP based path loss); or otherwise, the comparing unit 330a will output the power adjustment value as zero. That is to say, the comparing unit 330a may obtain the power adjustment value according to the following equation:

adjustment value=min(−(eNodeB based path loss−S-RSRP based path loss),0) (3)

After obtained the power adjustment value by the comparing unit 330a, the calculating unit 330b may use the power adjustment value to calculate an expected Tx power for the CD. For example, the calculating unit 330b may add the power adjustment value to the original Tx power (for example, basic Tx power) of CD as determined by the original Tx power determination module 310, to obtain the Tx power of the CD.

After obtained the Tx power of the CD by the Tx power determination module 330, the CD may apply the determined Tx power to its transmitter or transceiver, for subsequent transmissions to communication terminals surrounding it.

Figure 4:
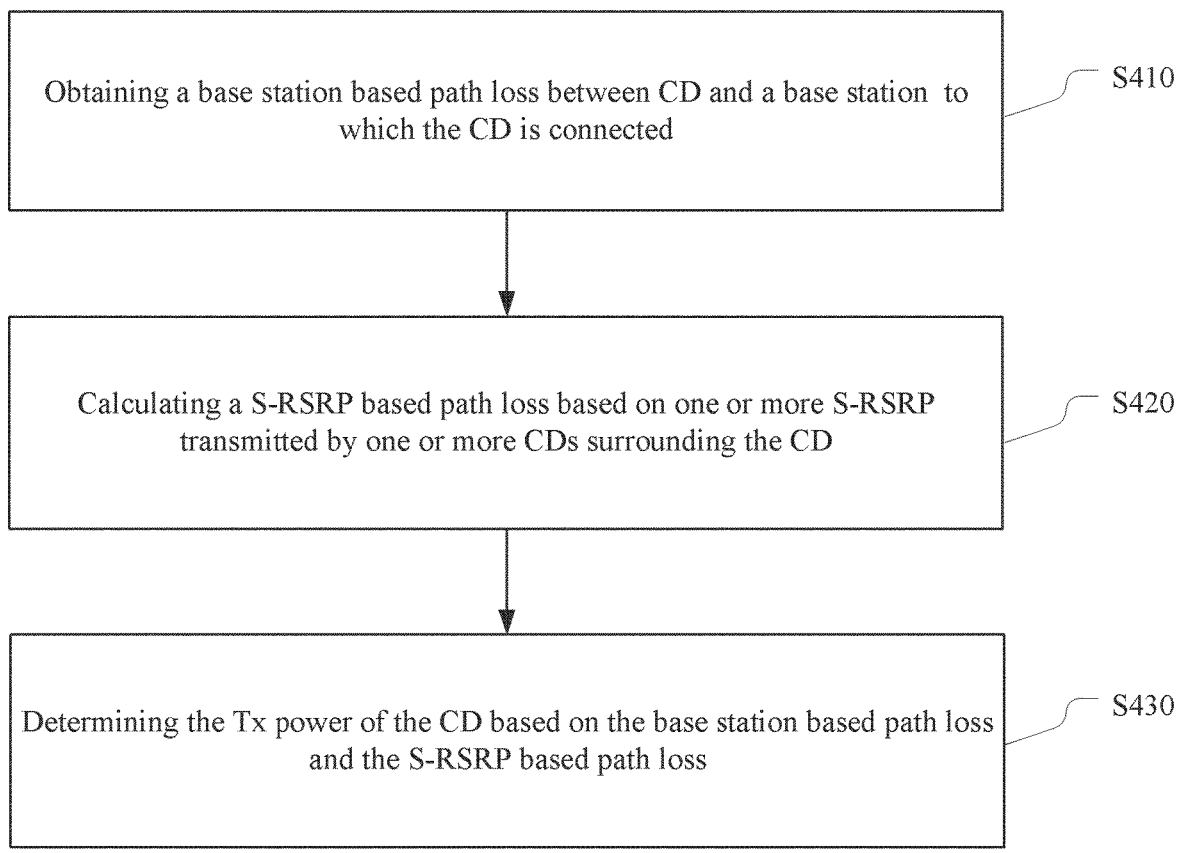
FIG. 4 illustrates a flow chart of a method for determining Tx power of CD in a V2X system in accordance with various embodiments of the disclosure.

FIG. 4 shows a flow chart of a method 400 for determining Tx power of CD in a V2X system in accordance with various embodiments of the disclosure. The method 400 may be applied to or be performed by a CD, for example, the CD 220 of FIG. 2.

The method 400 may include, at S410, obtaining a base station (e.g., eNodeB) based path loss between the CD (for example, the CD 220 of FIG. 2) and a base station (for example, the base station 210 of FIG. 2) to which the CD is coupled. In an embodiment, the base station based path loss may be estimated or calculated by the CD 220 based on reference signal received power transmitted by the base station 210.

The method 400 may further include, at S420, calculating a sidelink reference signal received power (S-RSRP) based path loss based on one or more S-RSRP indicators transmitted by one or more CDs (for example, the communication terminals 230_1, 230_2, . . . , 230_n of FIG. 2) surrounding the CD (for example, the CD 220 of FIG. 2), which are within a communication range of the CD. For example, the one or more S-RSRP transmitted by one or more other CDs may be estimated by the S-RSRP based path loss calculation module 320 of FIG. 3, which may be applied in the CD 220 of FIG. 2. In an embodiment, the S-RSRP based path loss may be calculated based on a minimum of the one or more S-RSRP (MinS-RSRP) and a maximal Tx power (MaxTxpower) allowed for a CD in the V2X system (e.g., 23 dBm). In the embodiment, the S-RSRP based path loss may be calculated, for example, by subtracting the MinS-RSRP from the MaxTxpower, i.e., S-RSRP based path loss=MaxTxpower−MinS-RSRP.

The method 400 may further include, at S430, determining the Tx power of the CD (for example, the CD 220 of FIG. 2) based on the base station based path loss and the S-RSRP based path loss obtained at 410 and 420. In an embodiment, the method 400 may determining the Tx power of the CD by calculating a basic Tx power of the CD based on a semi-static network configuration and a Tx resource allocation for the CD by higher layers, and the eNodeB based path loss, obtaining an adjustment value for adjusting the basic Tx power of the CD based on the eNodeB based path loss and the S-RSRP based path loss, and determining the Tx power of the CD based on the adjustment value and the basic Tx power of the CD. For example, the adjustment value may be obtained by the comparing unit 330a of the Tx power determination module 330 of FIG. 3. In an embodiment, the adjustment value may be obtained by comparing the base station based path loss with the S-RSRP based path loss. For example, if the base station based path loss is larger than the S-RSRP based path loss, the adjustment value may be −(base station based path loss−S-RSRP based path loss); or otherwise, the adjustment value may be zero. For example, the Tx calculating unit 330b of FIG. 3 may use the adjustment value to calculate the Tx power of the CD. In an embodiment, the adjustment value may be added directly to the current Tx power of the CD (which may be basic Tx power for the CD as specified in related 3GPP specifications) to obtain the expected Tx power. The Tx power is to be applied to a transmitter or transceiver of the CD, for subsequent transmissions.

Sensing Candidate Channels Available to V2X Transmission

V2X system allows communication between CDs such as vehicles on a sidelink or PC5 interface. In general, there are two transmission modes for V2X communication. In one transmission mode, resources are allocated to a CD by an access node when the CD is connected to the access node, while in the other transmission mode, a CD may autonomously select resources based on sensing available candidate channels.

In accordance with related 3GPP Technical Specifications, V2X sensing and resource-selection may include receiving Sidelink Control Information (SCI) from other CDs to know their reserved resources, measuring Reference Signal Received Power (RSRP) of received channels and measuring an average Received Signal Strength Indicator (RSSI) value on candidate channels. Target of resource selection is to minimize possibility of collision with other CDs. 3GPP defines an initial RSRP threshold to decide whether a candidate channel is occupied by other CDs. If the RSRP in a candidate channel exceeds the predefined threshold, it means the candidate channel is being used by other CDs and should be excluded. But if remaining resources after excluding reserved and occupied resource are less than a predefined percentage of total candidate resources (e.g., less than 20% of the total candidate resources), the CD will increase the RSRP threshold till there are enough remaining resources for random selection.

However, the transmission of the CD on a candidate channel selected by increasing the RSRP threshold may bring extreme interference for other CDs. Also, it may take a long time to find a proper channel when it is necessary to increase the RSRP threshold for several times.

In accordance with 3GPP TS 36.213, two transmission modes, Mode 3 and Mode 4, are defined. In Mode 3, resources for transmission are allocated to the CDs by an access node. In Mode 4, the CDs may autonomously select resources for transmission based on sensing available resources that are not be reserved or occupied by other CDs.

When CD is attached to an access node supporting V2X communication, the access node can configures the CD to operate in either Mode 3 or Mode 4; when the CD is attached to an access node not supporting the V2X communication or CD is out of coverage of the access node, the CD can only operate in Mode 4 to communicate with other CDs. For Mode 4, the CD autonomously selects resources (including subframes and subcarriers) in TX resource pool(s) which are configured by the access node or pre-configured for the CD.

In 3GPP TS 36.213, a UE procedure for determining the subset of resources to be reported to higher layers in PSSCH resource selection in sidelink transmission mode 4 has been described in detail. In order to avoid too much detail obscuring essential problems related to the disclosure, the procedure will be simplified and described below with reference to FIG. 5.

Figure 5:
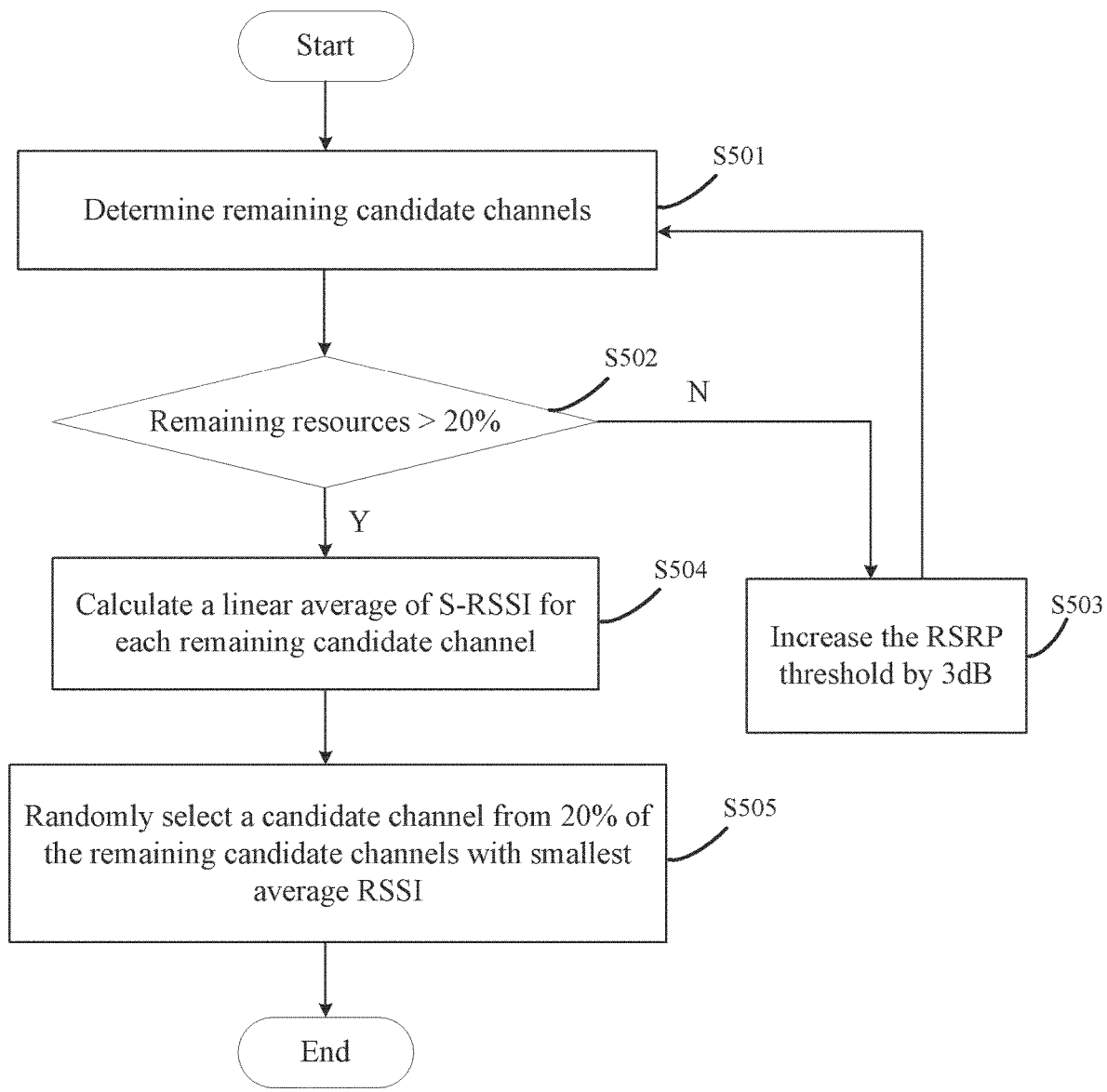
FIG. 5 shows a simplified procedure performed at CD for resource selection for V2X transmission based on sensing candidate channels in accordance with 3GPP Technical Specification (TS) 36.213.

FIG. 5 shows a simplified procedure performed at CD for resource selection for V2X transmission based on sensing candidate channels in accordance with the 3GPP Technical Specification. When requested by higher layers in a subframe, the CD shall determine the set of resources to be reported to higher layers for PSSCH transmission according to the procedure in FIG. 5, which includes operations S501 to S505.

At S501, the CD may determine remaining candidate channels for V2X transmission by excluding reserved or occupied candidate channels.

The principle of resource selection is to avoid conflict with re-occurrence of self-transmission and other CD transmission. Specifically, a candidate single-subframe resource (also referred to as a candidate channel hereinafter) for PSSCH transmission is defined as a set of L contiguous sub-channels (also referred to as subcarriers hereinafter). The CD shall assume that any set of contiguous sub-channels included in a corresponding PSSCH resource pool within the time interval [$n+T_1$, $n+T_2$] corresponds to one candidate single-subframe resource, where selections of $T_1$ and $T_2$ are up to CD implementations under $T_1 \leq 4$ and $20 \leq T_2 \leq 100$. CD selection of $T_2$ shall fulfil the latency requirement. The total number of all the candidate channels is denoted by $M_{total}$.

A set $S_A$ is initialized to the union of all the candidate channels. The CD shall exclude any candidate channel reserved or occupied by other CDs or the CD itself from the set $S_A$. For example, the CD may decode Sidelink Control Information (SCI) received from the other CDs to determine the candidate channels that have been reserved by the other CDs and exclude the reserved candidate channels from the set $S_A$. In addition, the CD may measure a Reference Signal Received Power (RSRP) on a candidate channel and exclude the candidate channel from the set $S_A$ if the measured RSRP is higher than a RSRP threshold. In accordance with 3GPP TS 36.213, the value of the RSRP threshold is selected from a higher layer configured table according to prio_RX in the received SCI and prio_TX from higher layer. The resources to be excluded may also include resources occupied by the CD itself, which may be determined according to a subframe number and a resource reservation interval of the CD.

At S502, the CD may determine whether the number of the remaining candidate channels is less than a predefined percentage (e.g., 20%) of the total number $M_{total}$ of the candidate channels. If the number of the remaining candidate channels is less than 20% of the total number $M_{total}$ of the candidate channels, the CD will increase the RSRP threshold by a predefined ratio (e.g., 3 dB) at S503 and repeat the operation S501 to determine the remaining candidate channels under the increased RSRP threshold.

If the number of the remaining candidate channels is greater than or equal to 20% of the total number $M_{total}$ of the candidate channels, at S504, the CD may calculate a power metric for each remaining candidate channel as a linear average of S-RSSI measured on the L sub-channels.

Finally, at S505, the CD may select 20% of the remaining candidate channels with smallest average RSSI as a final set of candidate channels available to the CD and then randomly select a candidate channel for V2X transmission from the final set of candidate channels.

In the above described procedure according to 3GPP TS 36.213, when determining the remaining candidate channels, the CD excludes any candidate channel having any subcarriers overlapping with the reserved or occupied candidate channels. In other words, even if only several subcarriers in a candidate channel overlap with the reserved or occupied candidate channels, the CD still treats the candidate channel as an improper channel and excludes the candidate channel.

On the other hand, when the number of the remaining candidate channels is less than 20% of the total number $M_{total}$ of the candidate channels, the CD will increase the RSRP threshold in order to exclude less occupied channels and get more remaining candidate channels. Actually, when the RSRP threshold is increased, although the remaining candidate channels may become more than 20% of the total number $M_{total}$ of the candidate channels and the CD can select a candidate channel by performing the subsequent operations S504 and S505, the transmission of the CD on the selected candidate channel may bring extreme interference for other CDs. The interference caused by increasing the RSRP may be even larger than the interference caused by using a candidate channel including several overlapping subcarriers. Also, it may take a long time to find a proper candidate channel when it is necessary to increase the RSRP threshold for several times. In the environment of V2X communication, the CD may often need to transmit emergency services such as notifying a sudden braking or a sharp turn, which makes it desirable to quickly find a candidate channel to transmit such emergency services.

In accordance with embodiments of the present disclosure, when the CD attempts to select a candidate channel including L continuous subcarriers, a candidate channel including a predefined number L1 of overlapping subcarriers may be also treated as a potential candidate channel, where L1 is an integer ranging from 1 to a predefined integer M larger than 1.

Figure 6:
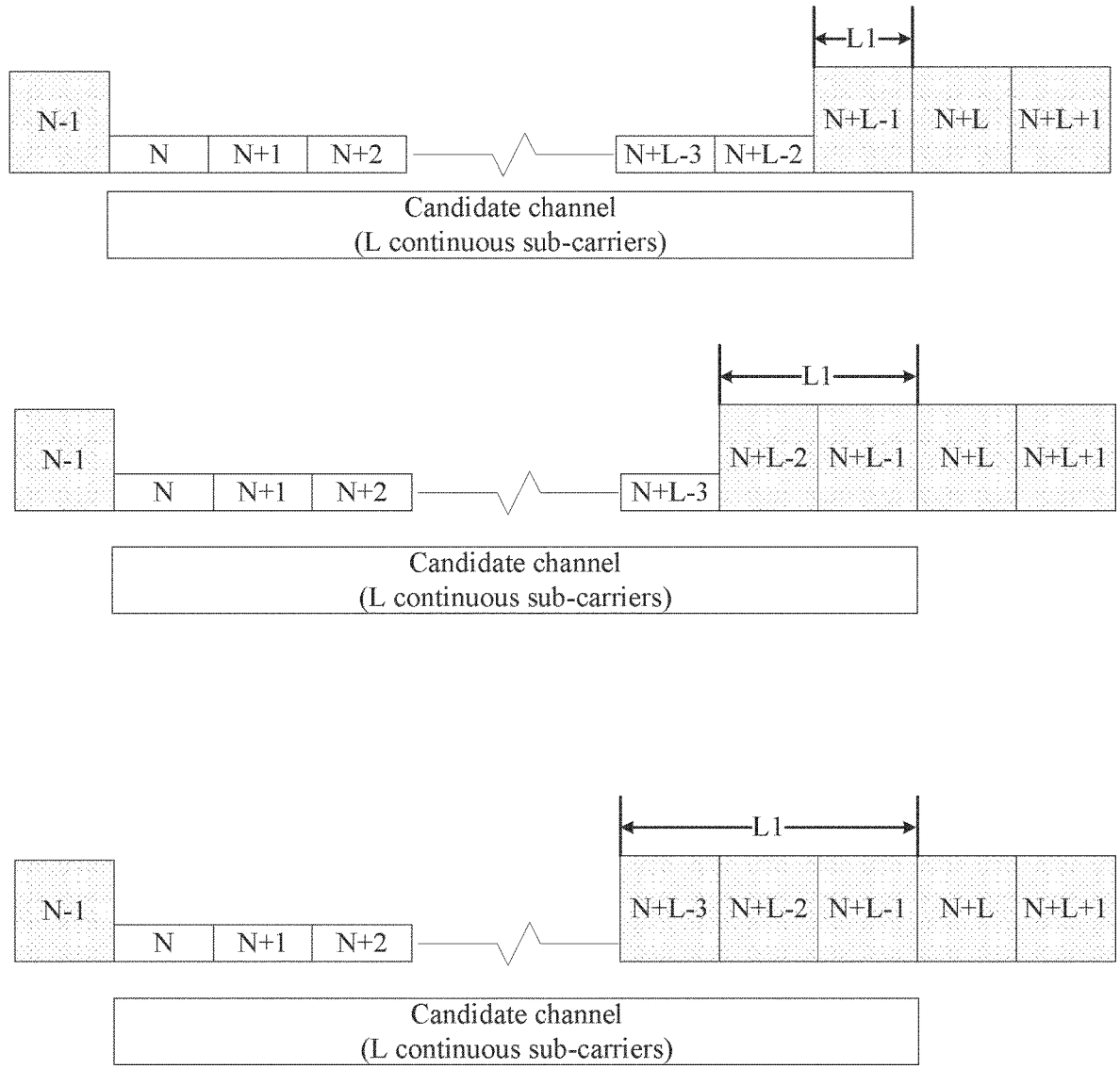
FIG. 6 shows exemplary candidate channels to be possibly selected for V2X transmission in accordance with embodiments of the present disclosure.

FIG. 6 shows exemplary candidate channels to be possibly selected for V2X transmission in accordance with embodiments of the present disclosure.

As shown in FIG. 6, a potential candidate channel may include one overlapping subcarrier, two overlapping subcarriers, or M overlapping subcarriers. The integer M is a threshold predefined to make sure that the system performance when using the candidate channel having the M overlapping subcarriers is not impacted a lot. For example, the integer M may be predefined depending on a Modulation and Coding Scheme (MCS) or an available bandwidth associated with the CD.

In order to evaluate the performance impact caused by using the candidate channel only having no more than M overlapping subcarriers versus the performance impact caused by increasing the RSRP threshold, a ratio of RSRP1 to SINR1 on the candidate channel having L1 overlapping subcarriers may be calculated and compared with a ratio of RSRP2 to SINR2 on a reference candidate channel that may be selected as the candidate channel by the CD via increasing the RSRP threshold.

Figure 7A:
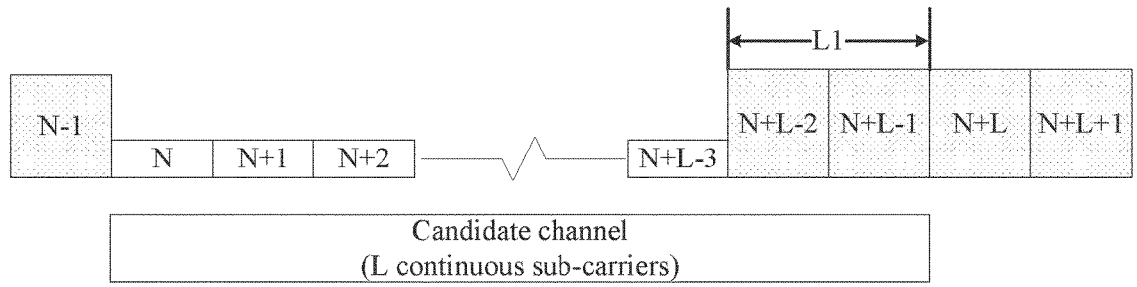
FIGS. 7a and 7b respectively illustrate a potential candidate channel including a predefined number of overlapping subcarriers and a reference candidate channel to be selected.
Figure 7B:
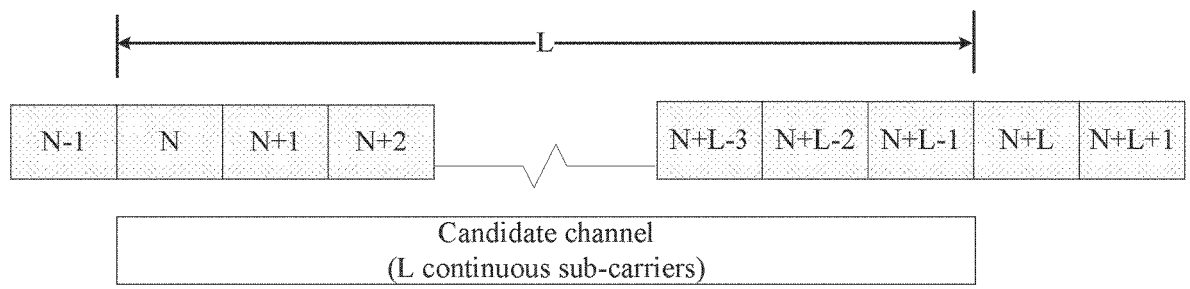

FIGS. 7a and 7b respectively illustrate a potential candidate channel including a predefined number of overlapping subcarriers and a reference candidate channel to be selected after increasing the RSRP threshold.

With reference to FIG. 7a, a candidate channel including two overlapping subcarriers is taken as an example to calculate the ratio of RSRP1 to SINR1. The SINR1 on the candidate channel may be calculated according to the following formula (4).

$$SINR1 = \frac{\sum_{i=1}^{Lsignal} \text{abs}(X(i))}{\sum_{j=1}^{L1} \text{abs}(X(j))} \quad (4)$$

Here, a signal power on the candidate channel is calculated as the total power of a signal to be transmitted on the candidate channel by the CD, and an interference power on the candidate channel is calculated as the total power of the interference on each overlapping subcarrier.

On the other hand, according to the conventional procedure of FIG. 5, when the number of the remaining candidate channels is less than 20% of the total number $M_{total}$ of the candidate channels, the CD will increase the RSRP threshold by 3 dB to obtain more remaining candidate channels and then randomly select a candidate channel or preferably select a candidate channel having least interference to other CDs. However, when the RSRP threshold is increased, although it may be possible for the CD to select a candidate channel, the transmission of the CD on the selected candidate channel may bring extreme interference for other CDs. With reference to FIG. 7b, which shows a candidate channel to be selected by the CD after increasing the RSRP threshold, most of the subcarriers included in the selected candidate channel may be overlapped. In other words, most of the subcarriers included in the selected candidate channel may contain interference from other CDs, and also the transmission by the CD on these overlapping subcarriers may cause interference to other CDs. The SINR2 on the selected candidate channel may be calculated according to the following formula (5).

$$SINR2 = \frac{\sum_{i=1}^{Lsignal} \text{abs}(X(i))}{\sum_{j=1}^{L1} \text{abs}(X(j))} \quad (5)$$

Here, similar to the formula (4) for calculating the SINR1, in the formula (5), a signal power on the candidate channel is calculated as the total power of a signal to be transmitted on the candidate channel by the CD, and an interference power on the candidate channel is calculated as the total power of the interference on each overlapping subcarrier. In comparison to the candidate channel in FIG. 7a, the candidate channel in FIG. 7b may contain more overlapping subcarriers, but the interference power on each overlapping subcarrier may be lower.

Then a ratio of RSRP1 to SINR1 on the candidate channel having the two overlapping subcarriers can be compared with a ratio of RSRP2 to SINR2 on the selected candidate channel after increasing the RSRP threshold. If the ratio of RSRP1 to SINR1 is larger than the ratio of RSRP2 to SINR2, it means that the transmission by the CD on the candidate channel having the two overlapping subcarriers may cause less performance impact than the transmission by the CD on the selected candidate channel after increasing the RSRP threshold by 3 dB. So it may be better for the CD to directly select the candidate channel having the two overlapping subcarriers to transmit signals without further increasing the RSRP threshold. In this way, the CD may take less time to find a proper channel for transmission.

Figure 8:
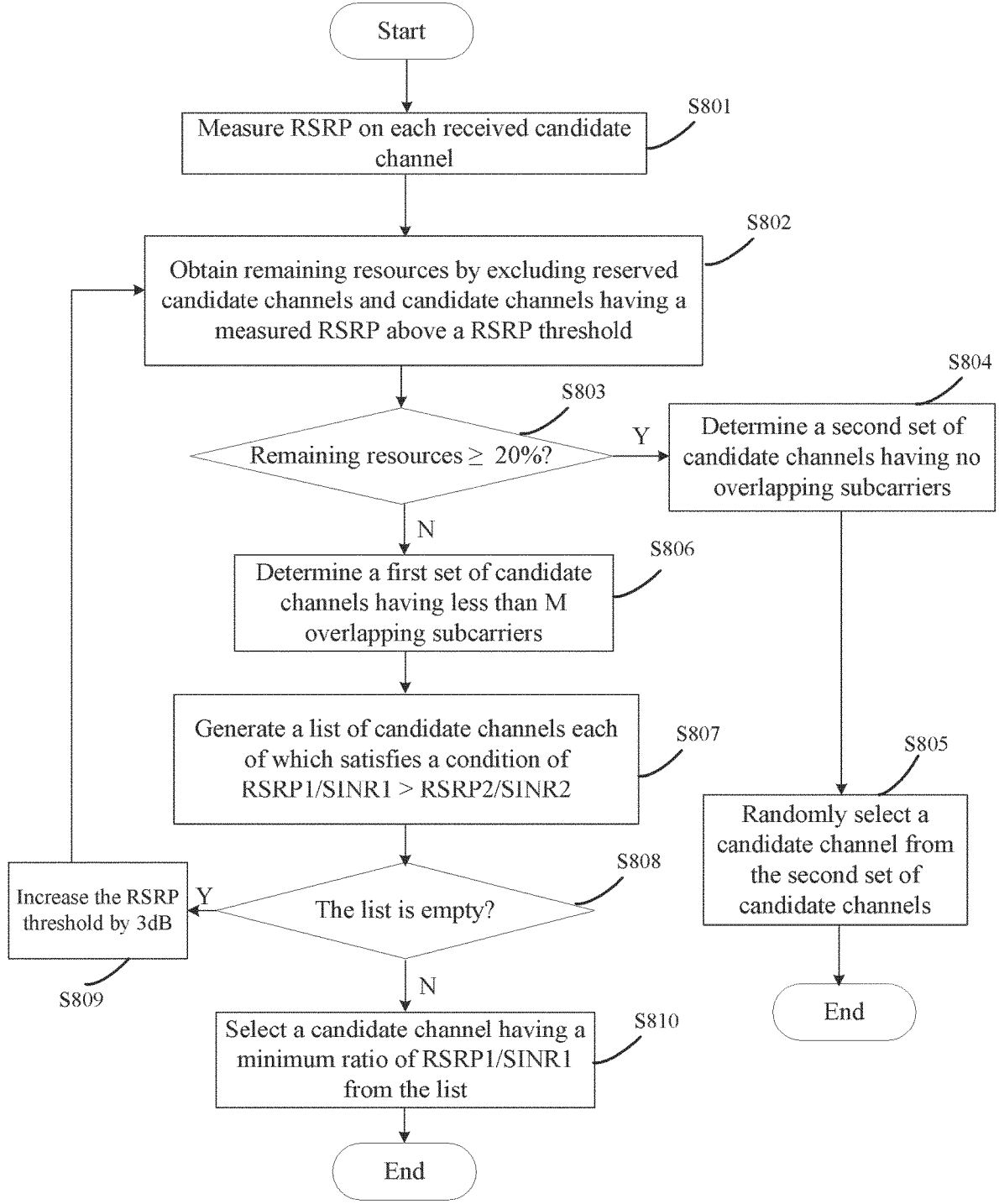
FIG. 8 shows a flow chart of the procedure performed at CD to select a candidate channel for V2X transmission based on sensing potential candidate channels, in accordance with an embodiment of the present disclosure.

Based on the above observations, a novel procedure for selecting available resources for V2X transmission based on sensing potential candidate channels is proposed in the present disclosure. FIG. 8 shows a flow chart of the procedure performed at CD to select a candidate channel for V2X transmission based on sensing potential candidate channels, in accordance with an embodiment of the present disclosure.

The procedure as shown in FIG. 8 may include operations S801 to S810, in which the operations S801 to S805 may be the same as the corresponding operations defined in 3GPP TS 36.213, so the detailed description about these operations will not be repeated again.

In accordance with 3GPP TS 36.213, if it is determined at S803 that the number of the remaining candidate channels available to the CD is not less than 20% of the total number of the candidate channels, a second set of candidate channels having no overlapping subcarriers can be determined at S804 and a candidate channel can be randomly selected from the second set of candidate channels based on a measured power metric such as a linear average of S-RSSI at S805. Then the procedure for resource selection may be finished.

However, if it is determined at S803 that the number of the remaining candidate channels available to the CD is less than 20% of the total number of the candidate channels, according to the embodiments of the present disclosure, the operations S806 to S810 may be performed rather than simply increasing the RSRP threshold.

Specifically, at S806, the CD may determine a set of candidate channels each of which contains a predetermined number L of continuous subcarriers including no more than M overlapping subcarriers. Here, the number L is determined by the number of resource blocks as needed to transmit a service. For example, if it is required to allocate six resource blocks for a candidate channel to transmit the service, then the candidate channel contains 6*12 continuous subcarriers, and the number L is 72. In addition, the integer M is a threshold predefined to make sure that the performance when using the candidate channel having the M overlapping subcarriers is not impacted a lot, as previously described. For example, the integer M may be predefined depending on a Modulation and Coding Scheme (MCS) or an available bandwidth associated with the CD. As a specific example, the CD needs to find a proper candidate channel containing 72 continuous subcarriers for transmission, and the candidate channels having no more than 3 overlapping subcarriers among the 72 continuous subcarriers are allowed. In this case, the CD may determine all of the candidate channels having no overlapping subcarriers, the candidate channels having one overlapping subcarriers, the candidate channels having two overlapping subcarriers, and the candidate channels having three overlapping subcarriers.

At S807, the CD may generate a list of candidate channels each of which satisfies a condition of RSRP1/SINR1>RSRP2/SINR2. Specifically, the CD may measure the RSRP2 and the SINR2 on a selected candidate channel (also referred to as a reference candidate channel herein) assuming the RSRP threshold is increased by 3 dB. As previously described, the SINR2 can be calculated by using the formula (5). Then for each of the set of candidate channels including no more than M overlapping subcarriers as determined at S806, the CD may measure the RSRP1 and the SINR1 on the candidate channel, determine whether a ratio of the RSRP1 to the SINR1 on the candidate channel is larger than a ratio of the RSRP2 to the SINR2 on the reference candidate channel; and add the candidate channel into the list of candidate channels initially set as an empty list, when it is determined that the ratio of the RSRP1 to the SINR1 on the candidate channel is larger than the ratio of the RSRP2 to the SINR2 on the reference candidate channel. As explained above, when the ratio of RSRP1 to SINR1 on the candidate channel having overlapping subcarriers is larger than the ratio of RSRP2 to SINR2, it means that the transmission by the CD on the candidate channel having overlapping subcarriers may cause less performance impact than the transmission by the CD on the selected candidate channel after increasing the RSRP threshold by 3 dB. So in this way, the list of candidate channels can be generated for the CD to select a proper channel to transmit the service.

At S808, the CD may determine whether the generated list of candidate channels is an empty list. If the list of candidate channels is not an empty list, it means that it is possible for the CD to have a better performance by transmitting the service on a candidate channel having overlapping subcarriers. Thus in this case, the CD may directly select a candidate channel from the list of candidate channels without increasing the RSRP threshold. The CD may randomly select a candidate channel from the list of candidate channels to transmit the service. But preferably, the CD may select a candidate channel having a minimum ratio of RSRP1/SINR1 from the list of candidate channels to transmit the service, as indicated by S810. On the other hand, if the generated list of candidate channels is an empty list, it means that the CD may have a worse performance by transmitting the service on a candidate channel having overlapping subcarriers and thus need to increase the RSRP threshold at S809 to find a proper channel according to the conventional procedure for resource selection.

With the proposed procedure in the embodiments of the present disclosure, when performing the resource selection, the candidate channels having several overlapping subcarriers are also considered by the CD. Before deciding to increase the RSRP threshold, the CD may first determine whether increasing the RSRP threshold will cause a worse performance compared with using a candidate channel having several overlapping subcarriers. In comparison to simply increasing the RSRP threshold to obtain more remaining candidate channels, the CD may take less time to find a proper channel for transmission, and meanwhile may have a better performance, i.e. there may be less interference between the CD and other CDs.

In the procedure described with reference to FIG. 8, the CD may measure the ratio of RSRP1 to SINR1 for each candidate channel in the first set of candidate channels and compare the ratio of RSRP1 to SINR1 with the ratio of RSRP1 to SINR1 when generating the list of candidate channels satisfying the condition of RSRP1/SINR1>RSRP2/SINR2. However, it may be preferable for the CD to first measure the candidate channels having the least number of overlapping carriers, since the transmission by using these candidate channels generally has a better performance. For example, the CD may first measure a subset of candidate channels having only one overlapping carriers to generate the list of candidate channels from the subset of candidate channels. If the generated list is not empty, the CD may just select a candidate channel from the list without further measuring other candidate channels having more overlapping carriers. Thus the CD may find a proper channel more quickly.

Figure 9:
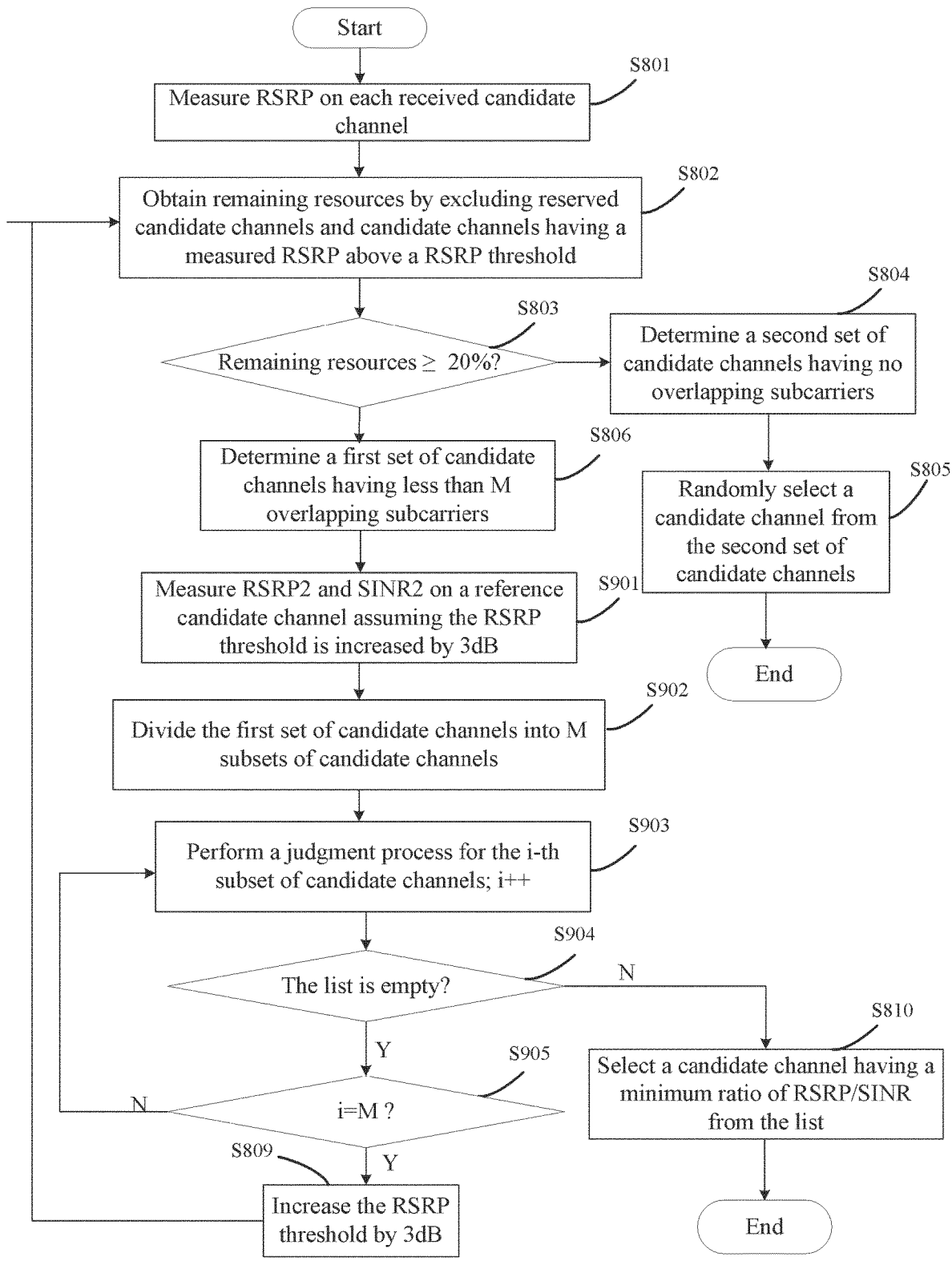
FIG. 9 shows a flow chart of the procedure performed at CD to select a candidate channel for V2X transmission based on sensing potential candidate channels, in accordance with another embodiment of the present disclosure.

FIG. 9 shows a flow chart of the procedure performed at CD to select a candidate channel for V2X transmission based on sensing potential candidate channels, in accordance with another embodiment of the present disclosure. As illustrated in FIG. 9, the operations S801 to S806, S809 and S810 are the same as those in FIG. 8 and the operations S901 to S905 are proposed to replace the operations S807 and S808 in FIG. 8. So only the detailed description about the operations S901 to S905 will be provided below.

At S901, the CD may measure the RSRP2 and the SINR2 on a selected candidate channel (also referred to as a reference candidate channel herein) assuming the RSRP threshold is increased by 3 dB.

At S902, the CD may divide the first set of candidate channels into M subsets of candidate channels based on a number of overlapping subcarriers included in each candidate channel. For example, each of a first subset of candidate channels includes one overlapping subcarrier and each of an M-th subset of candidate channels includes M overlapping subcarriers.

At S903, the CD may perform a judgment process for each subset of candidate channels in sequence. For each of a subset of candidate channels, the judgment process may include measuring the RSRP1 and the SINR1 on the candidate channel; determining whether a ratio of the RSRP1 to the SINR1 on the candidate channel is larger than a ratio of the RSRP2 to the SINR2 on the reference candidate channel; adding the candidate channel into a list of candidate channels initially set as an empty list, when it is determined that the ratio of the RSRP to the SINR on the candidate channel is larger than the ratio of the RSRP to the SINR on the reference candidate channel.

At S904, the CD may determine whether the list of candidate channels is an empty list. If it is determined that the list is not an empty list, the CD may directly perform the operation S810 to select a candidate channel having a minimum ratio of RSRP/SINR from the list. Otherwise, the CD needs to continue to perform the judgment process for a next subset of candidate channels, until it is determined that the list of candidate channels is not the empty list or the judgment process has been performed for all the M subsets of candidate channels. If it is determined that the list of candidate channels is still the empty list after the judgment process has been performed for all the M subsets of candidate channels, the CD will increase the RSRP threshold at S809 to find a proper channel according to the conventional procedure for resource selection.

V2X PSCCH Candidate Detection with S-RSSI Measurement at Blank Symbols

V2X system allows communication between CDs such as vehicles on a sidelink or PC5 interface. In most situations, a CD may need to autonomously detect resources based on sensing available candidate channels. A V2X capable CD has to monitor V2X data from other CDs to acquire surrounding traffic information. In order to support reception of V2X data on a V2X sidelink, the CD needs to blindly detect PSCCH and then decode associated Physical Sidelink Share Channel (PSSCH) from surrounding CDs or infrastructures if the detected PSCCH indicates the associated PSSCH exists.

Generally, the PSCCH detection is realized by measuring S-RSSI on PSCCH candidates and selecting certain PSCCH candidates corresponding to highest measured S-RSSI. In accordance with related 3GPP Technical Specifications, S-RSSI is defined as a linear average of the total received power per SC-FDMA symbol observed by the CD only in the configured (detected) sub-channel in a measurement window containing 12 SC-FDMA symbols i.e. in SC-FDMA symbols 1, 2, . . . 6 of the first slot and SC-FDMA symbols 0, 1, . . . , 5 of the second slot of a subframe, (SC-FDMA symbols 1 to 12 of the subframe). The first symbol (symbol 0) of the subframe is usually used for Automatic Gain Control and the last symbol (symbol 13) of the subframe is a blank symbol reserved for configuring the switch of transmission mode of the CD.

Figure 10:
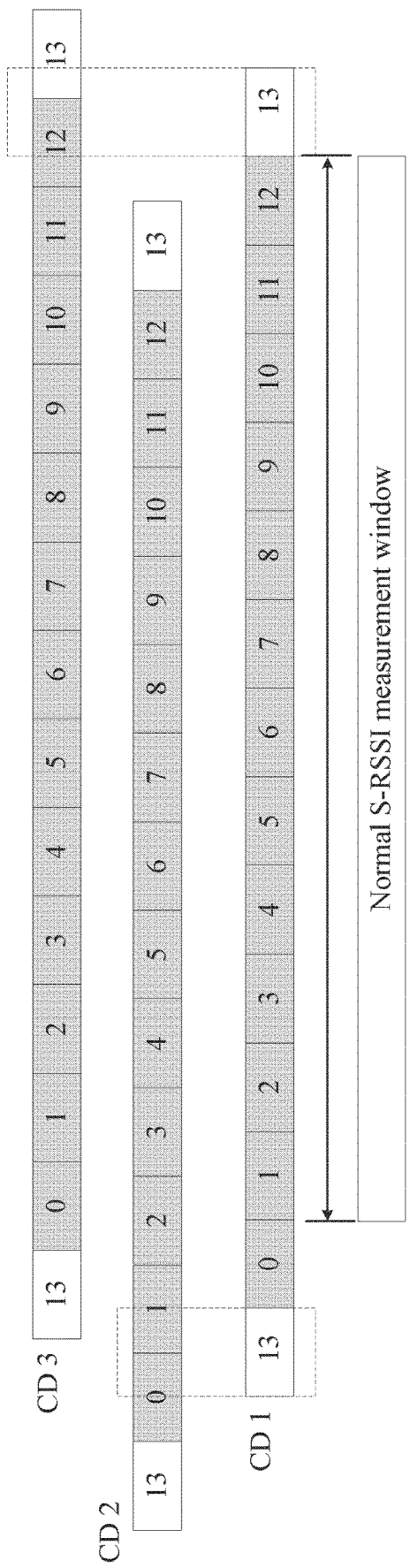
FIG. 10 shows an example of three CDs having different timings.

In case that all the CDs are synchronized, the measurement of S-RSSI over the measurement window containing the defined 12 SC-FDMA symbols may be able to detect real transmission information on the detected PSCCH. However, in many situations, the CDs may be not perfectly synchronized. For example, FIG. 10 shows an example of three CDs having different timings. Particularly, CD 1 is a V2X capable CD that is blindly detecting PSCCH candidates received from surrounding CDs, which is referred to as a connected CD for ease of description. CD 2 and CD 3 are CDs surrounding CD 1 and under detection by CD 1. As shown in FIG. 2, CD 2 has a timing ahead of the timing of CD 1, and CD 3 has a timing behind the timing of CD 1. In this case, when CD 1 measures the S-RSSI on a PSCCH candidate received from CD 2 according to the definition of the S-RSSI by 3GPP, i.e., CD 1 measures the S-RSSI over the measurement window containing the symbols 1 to 12 of a current subframe on CD 1, some information at the beginning of a subframe received on a PSCCH candidate from CD 2 may be ignored during the measurement. Likewise, when CD 1 measures the S-RSSI on a PSCCH candidate received from CD 3 according to the definition of the S-RSSI by 3GPP, some information at the end of a subframe received on a PSCCH candidate from CD 3 may be ignored during the measurement.

With respect to the CDs having different timings, a measurement of power on a window including a blank symbol 13 of a subframe on the connected CD (e.g. CD 1) can be able to capture the ignored information either at the beginning of a subframe from a CD (e.g. CD 2) having a timing ahead of the timing of the connected CD or at the end of a subframe from a CD (e.g. CD 3) having a timing behind the timing of the connected CD.

Figure 11:
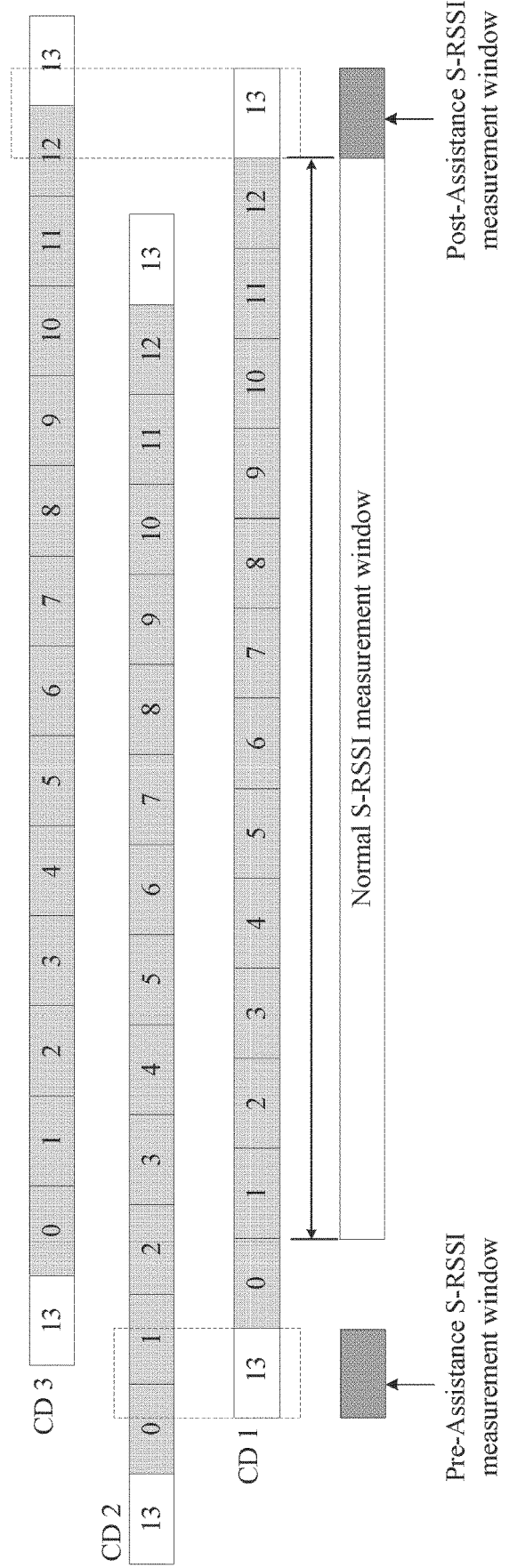
FIG. 11 shows a setting of a normal measurement window and an assistance measurement window for measurement of S-RSSI on a PSCCH candidate in accordance with embodiments of the present disclosure.

In the present disclosure, it is proposed to measure the S-RSSI of a PSCCH candidate on an assistance measurement window in addition to the measurement window (referred to as a normal measurement window hereinafter) defined by 3GPP FIG. 11 shows a setting of a normal measurement window and an assistance measurement window for measurement of S-RSSI on a PSCCH candidate in accordance with embodiments of the present disclosure. As illustrated, two assistance measurement windows can be configured to assist the measurement of the S-RSSI. The first assistance measurement window may include a blank symbol preceding a current subframe under measurement, i.e., an ending symbol of a preceding subframe adjacent to the current subframe, and may be also referred to as a pre-assistance measurement window. The second assistance measurement window may include an ending symbol of the current subframe, and may be also referred to as a post-assistance measurement window. As such, the measurement of the S-RSSI on the pre-assistance measurement window can indicate a received signal strength at the beginning of the subframe received from CD 2 which timing is ahead of the timing of CD 1, while the measurement of the S-RSSI on the post-assistance measurement window can indicate a received signal strength at the end of the subframe received from CD 3 which timing is behind the timing of CD 1. In this way, even the CDs are not synchronized, the information carried in the symbols out of the normal measurement window can be captured by the measurement on the assistance measurement windows, which may increase accuracy of the PSCCH candidate detection.

Figure 12:
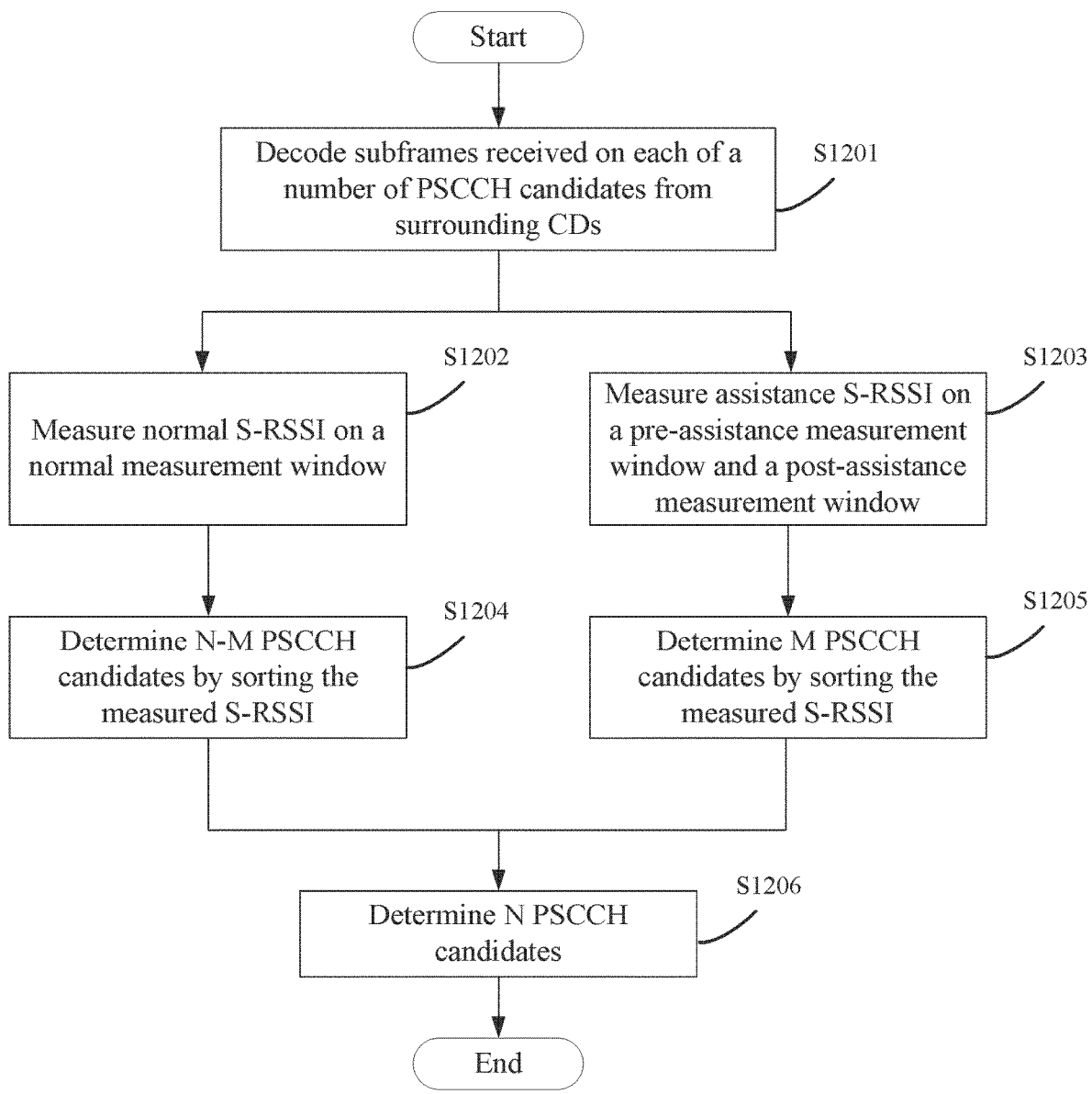
FIG. 12 shows a flow chart of a procedure for detecting a predefined number, N, of PSCCH candidates based on S-RSSI measurement on both a normal measurement window and an assistance measurement window in accordance with an embodiment of the present disclosure.

FIG. 12 shows a flow chart of a procedure for detecting a predefined number N of PSCCH candidates based on S-RSSI measurement on both a normal measurement window and an assistance measurement window in accordance with an embodiment of the present disclosure.

At S1201, a CD may decode one or more subframes received on each of a number of PSCCH candidates from other CDs surrounding the CD. The number of PSCCH candidates correspond to a number of resource blocks to be detected depending on the available bandwidth of the CD. For example, when the CD has an available bandwidth of 20 MHz, it may be required to detect PSCCH candidates from totally 100 resource blocks including RB0 to RB99.

At S1202, the CD may measure a normal S-RSSI value for each of the number of PSCCH candidates on the normal measurement window including normal symbols (e.g. the symbols 1 to 12) of a current subframe on the CD, according to the related 3GPP technical specifications.

As described above, due to possibly different timings between the CD and surrounding CDs, some effective information from the surrounding CDs may be carried in symbols out of the normal measurement window and thus may be ignored when just measuring the S-RSSI value on the normal measurement window. The measurement on a window including a blank symbol 13 of a subframe on the connected CD can be able to capture the ignored information either at the beginning of a subframe from a CD having a timing ahead of the timing of the connected CD or at the end of a subframe from a CD having a timing behind the timing of the connected CD.

Thus at S1203, the CD may measure an assistance S-RSSI value on an assistance measurement window containing at least a blank symbol. According to embodiments of the present disclosure, the assistance measurement window may include a pre-assistance measurement window including at least the blank symbol of a preceding subframe adjacent to the current subframe and a post-assistance measurement window including at least the blank symbol of the current subframe. The measurement on the pre-assistance measurement window may be able to capture the information carried in the beginning symbols of a subframe from a CD having a timing ahead of the timing of the connected CD. In contrast, the measurement on the post-assistance measurement window may be able to capture the information carried in the ending symbols of a subframe from a CD having a timing behind the timing of the connected CD.

Assuming that it is desired to detect a predefined number, N, of PSCCH candidates from all the PSCCH candidates, the N PSCCH candidates may be determined by sorting the measured normal S-RSSI values and assistance S-RSSI values. For example, the CD may determine the N PSCCH candidates corresponding to N highest S-RSSI values among the measured normal S-RSSI values and assistance S-RSSI values. Alternatively, at S1204, the CD may determine N−M PSCCH candidates by sorting the measured normal S-RSSI values, i.e., N−M PSCCH candidates corresponding to N−M highest measured normal S-RSSI values; and at S1205, the CD may determine remaining M PSCCH candidates by sorting the measured assistance S-RSSI values, i.e. M PSCCH candidates corresponding to M highest measured assistance S-RSSI values. Here, the number M may be a predetermined number that may be optimized by considering particular communication environments. At S1206, the totally N PSCCH candidates are determined accordingly.

Figure 13:
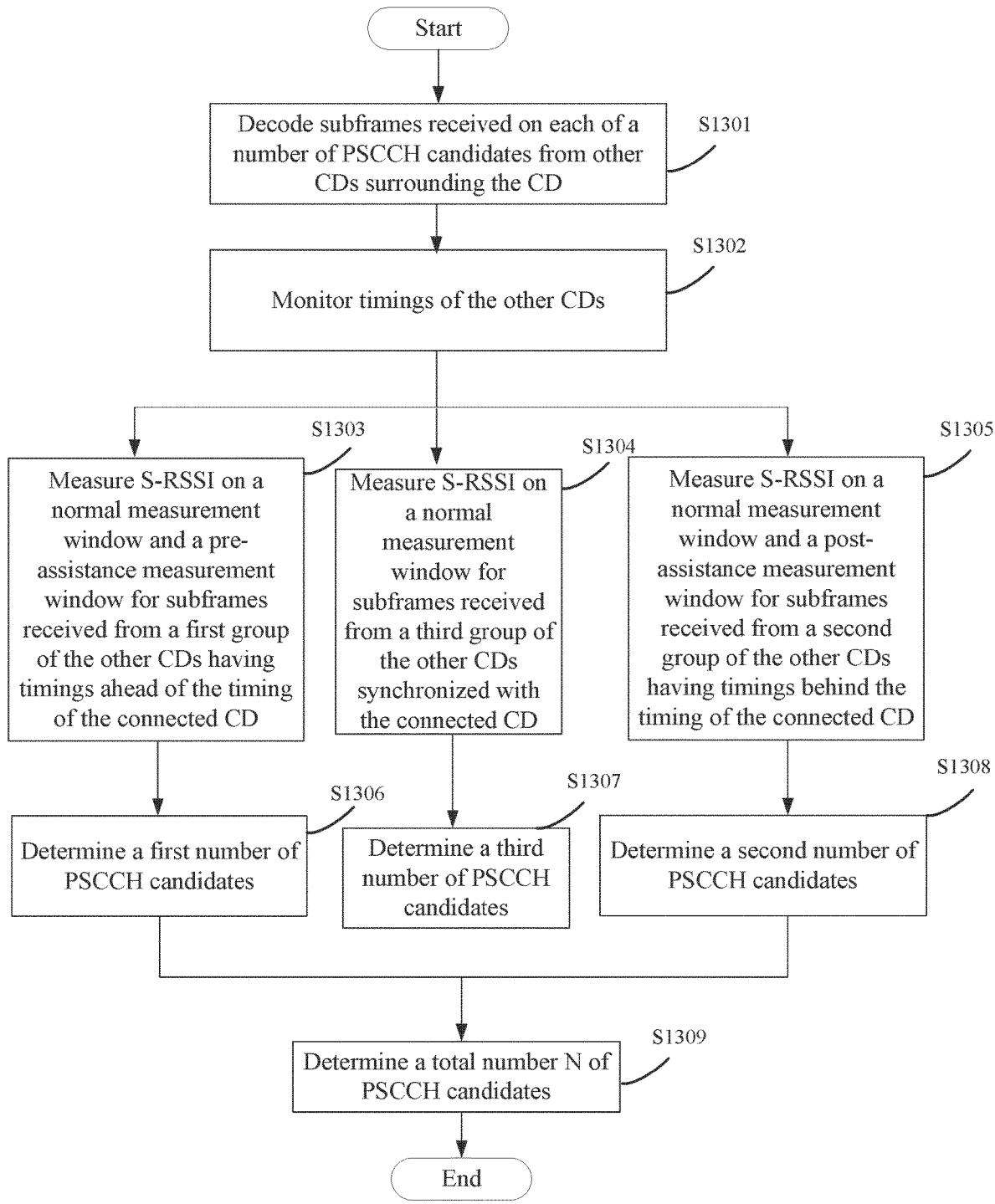
FIG. 13 shows a flow chart of a procedure for detecting a PSCCH candidate in accordance with the embodiment of the present disclosure.

Since the selection of the assistance measurement windows may depend on a comparison between the timings of surrounding CDs and the timing of the connected CD, a procedure for detecting a PSCCH candidate based on S-RSSI measurement on a normal measurement window and a selected assistance measurement window depending on timing differences between CDs is provided in another embodiment of the present disclosure. FIG. 13 shows a flow chart of such a procedure in accordance with the embodiment of the present disclosure.

According to the embodiment, when a CD blindly detects PSCCH candidates received from other CDs surrounding the CD, it may monitor timings of the other CDs at S1302 while decoding one or more subframes received from the other CDs at S1301. Based on a comparison between the timing of the CD and the timings of the other CDs, the other CDs may be divided into a first group of the other CDs having the timings ahead of the timing of the CD, a second group of the other CDs having the timings behind the timing of the CD and a third group of the other CDs having the timings same as the timing of the CD.

For different groups of the other CDs, the measurement of S-RSSI may be different. Specifically, at S1303, with respect to the subframes received from the first group of the other CDs, the CD may measure normal S-RSSI values on a normal measurement window and assistance S-RSSI values on a pre-assistance measurement window for a number of PSCCH candidates. Accordingly, at S1306, the CD may determine a first number of PSCCH candidates by sorting the measured normal S-RSSI values and assistance S-RSSI values. At S1305, with respect to the subframes received from the second group of the other CDs, the CD may measure normal S-RSSI values on a normal measurement window and assistance S-RSSI values on a post-assistance measurement window for the number of PSCCH candidates. Accordingly, at S1308, the CD may determine a second number of PSCCH candidates by sorting the measured normal S-RSSI values and assistance S-RSSI values. In addition, with respect to the subframes received from the third group of the other CDs, the CD may just measure normal S-RSSI values on a normal measurement window for the number of PSCCH candidates at S1304, and determine a third number of PSCCH candidates by sorting the measured normal S-RSSI values at S1307. Finally, by combining the PSCCH candidates determined respectively at S1306, S1307 and S1308, a total number N of PSCCH candidates can be determined at S1309.

According to the embodiment, depending on particular timing differences, the assistance measurement window may be selectively configured to increase the accuracy of the S-RSSI measurement and the PSCCH candidate detection without adding too much burden to the entire detection procedure.

Optimizing V2X Demodulation Based on Symbol Detection

Figure 14:
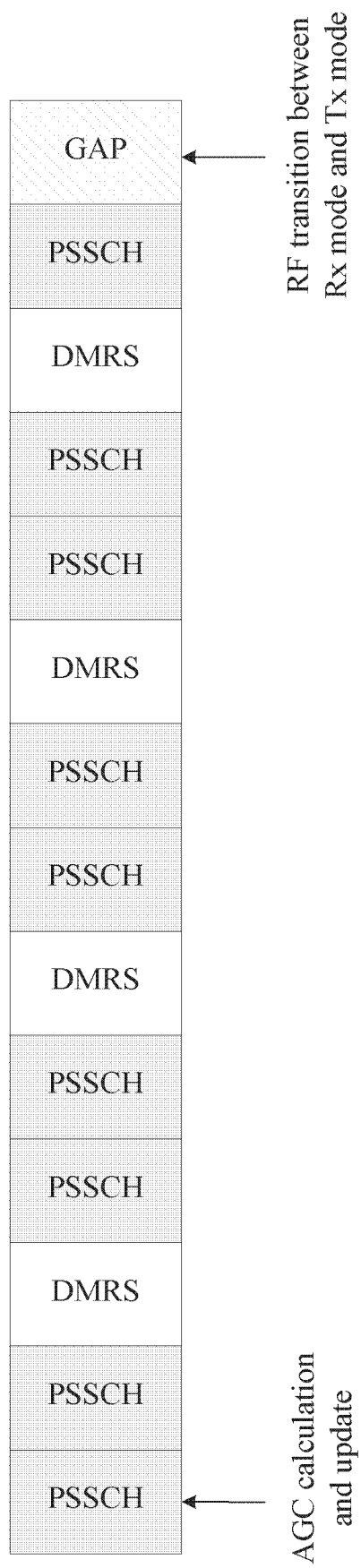
FIG. 14 shows an example PSSCH subframe received on a communication device (CD) in accordance with related 3GPP technical specifications.

FIG. 14 shows an example PSSCH subframe received on a CD in accordance with related 3GPP technical specifications. As described above, according to related 3GPP technical specifications, during V2X communication, a first symbol of a subframe is used for Automatic Gain Control (AGC) calculation and update, and a last symbol of the subframe is always a blank symbol reserved for the CD to make configurations for transition between a receiving (RX) mode and a transmitting (TX) mode. So the first symbol and the last symbol are always not used for demodulation. Actually, it may be a waste of resource and the demodulation performance may be not optimized.

Specifically, the first symbol is usually abandoned from demodulation because an initial gain of the first symbol may be not accurate and receiving quality of the first symbol is not good enough for demodulation. But abandoning the first symbol will increase the code rate of Turbo code, which may cause critical performance requirement. According to embodiments of the present disclosure, it is proposed to dynamically abandoning or using the first symbol by making some judgments about whether the first symbol can be used, instead of directly abandoning the first symbol, so as to fully utilize the information carried in the first symbol to obtain better demodulation performance.

Figure 15:
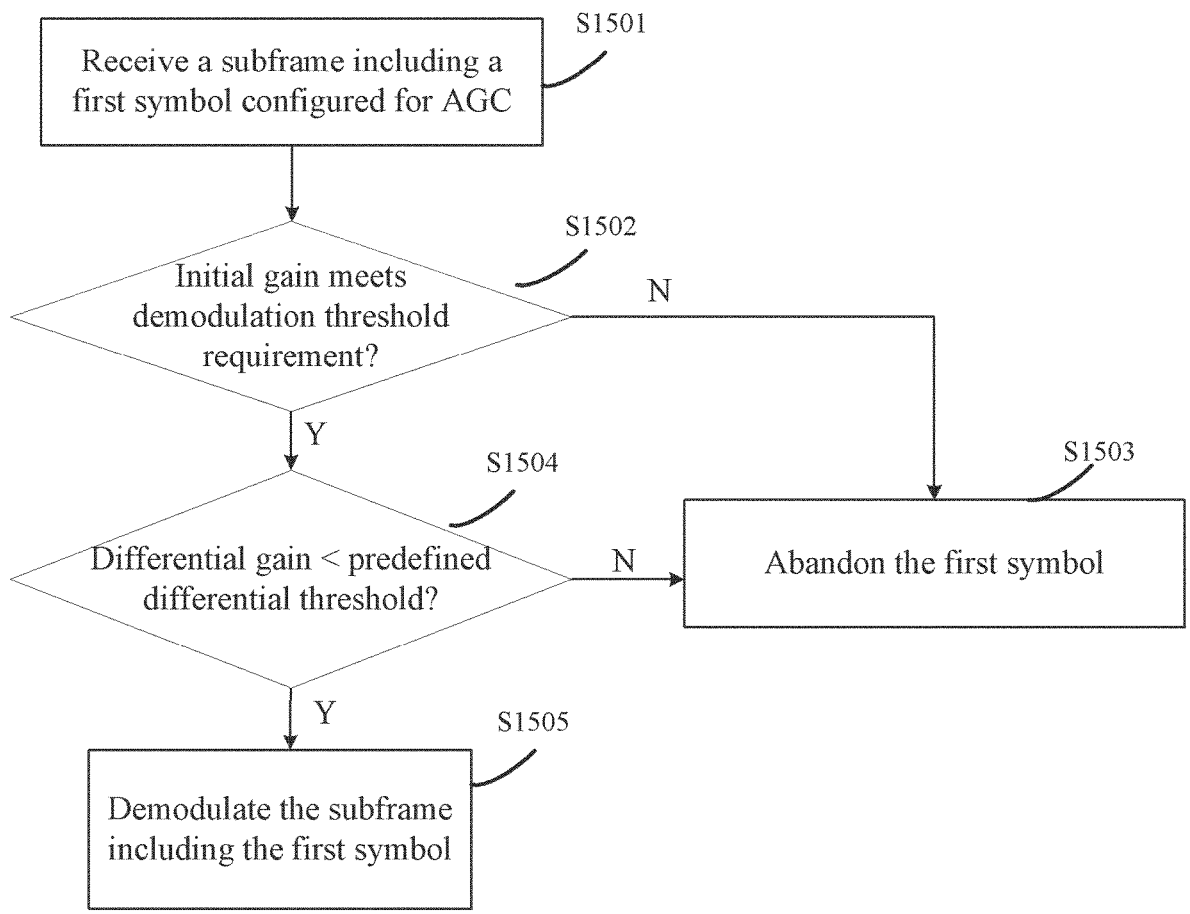
FIG. 15 shows a flow chart of a procedure for optimizing V2X demodulation in accordance with embodiments of the present disclosure.

FIG. 15 shows a flow chart of a procedure for optimizing V2X demodulation by dynamically switching between abandoning a first symbol of a subframe and using the first symbol for demodulation in accordance with embodiments of the present disclosure.

At S1501, a CD receives a subframe including the first symbol configured for AGC calculation and update.

At S1502, the CD may determine whether an initial gain for the first symbol meets a demodulation threshold requirement. Here, the demodulation threshold may be understood as a Signal Noise Ratio (SNR) threshold for demodulation. Generally, a received symbol may be properly demodulated when the SNR of the received symbol is larger than the SNR threshold for demodulation. The SNR of the first symbol is determined by the initial gain for the first symbol. When the initial gain for the first symbol leads to a proper SNR of the first symbol for demodulation, the CD may determine that the initial gain for the first symbol meets the demodulation threshold requirement.

If the CD determines that the initial gain for the first symbol does not meet the demodulation threshold requirement, the first symbol may be abandoned directly at S1503. If the CD determines the initial gain for the first symbol meets the demodulation threshold requirement, the CD may make further judgments to determine whether the first symbol is good to be used for demodulation. At S1504, the CD may determine whether a differential gain between the initial gain for the first symbol and an updated gain for following symbols is less than a predefined differential threshold. If the differential gain is less than the predefined differential threshold, it means that the receiving quality of the first symbol with the initial gain may be already good for demodulation and the updating of the AGC gain for the following symbols may only result in limited improvement for the receiving quality of the following symbols. In this case, the first symbol may be used for demodulation. Thus at S1505, the CD may demodulate the subframe including the first symbol. Otherwise, if the differential gain is not less than the predefined differential threshold, it means that the receiving quality of the first symbol with the initial gain may be not good enough for demodulation, so the CD may abandon the first symbol at S1503.

With the above procedure as illustrated in FIG. 15, the CD may dynamically switch between abandoning and using the first symbol for demodulation based on some judgments to guarantee a balance between the receiving quality of the first symbol and the total code rate. In this way, the information carried in the first symbol can also be fully utilized to obtain better demodulation performance.

In addition to the first symbol, the last symbol of the subframe may also be dynamically configured to optimize the demodulation performance. As defined by 3GPP, the last symbol is always a blank symbol reserved for the CD to make configurations when switching between a TX mode and a RX mode. It is a waste of resource if the TX/RX switching does not happen.

According to embodiments of the present disclosure, a TX CD can dynamically configure the last symbol as a blank symbol only when it needs to apply the TX/RX switching. Accordingly, a RX CD can blindly detect the existence of the last symbol and include the last symbol into demodulation when it is detected.

Figure 16:
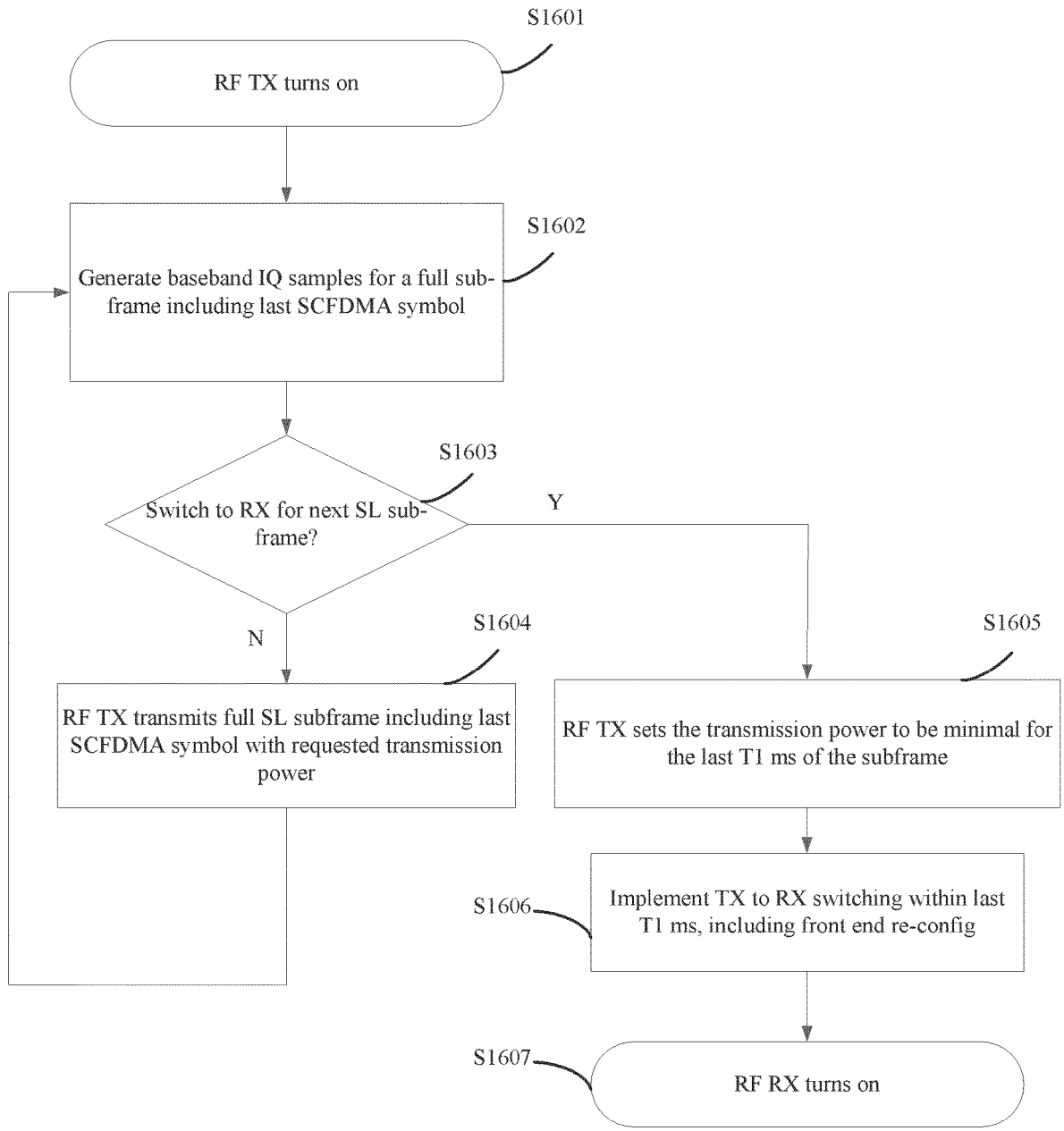
FIG. 16 shows a flow chart of an exemplary procedure for dynamically configuring a last symbol of a subframe at CD as a TX side in accordance with embodiments of the present disclosure.

FIG. 16 shows a flow chart of an exemplary procedure for dynamically configuring a last symbol of a subframe at CD as a TX side in accordance with embodiments of the present disclosure.

The CD as a TX side is referred to as a TX CD hereinafter for sake of conciseness. As illustrated in FIG. 16, a Radio Frequency (RF) transmitter (RF TX) at the TX CD turns on at S1601 and generates baseband IQ samples for a full sidelink subframe including a last symbol at S1602. At S1603, the TX CD may determine if it is scheduled to switch to the RX mode for a next sidelink subframe. If the TX CD will not switch to the RX mode for the next sidelink subframe, the RF TX may transmit the full subframe including the last symbol with a requested transmission power at S1604. Otherwise, if the TX CD is scheduled to switch to the RX mode for the next sidelink subframe, the RF TX may set the transmission power for a symbol duration (e.g. the last T1 ms) corresponding to the last symbol in the subframe to a minimized transmission power at S1605. Then at S1606, the TX CD may implement the TX/RX switching within the last T1 ms by making configurations such as front end reconfiguration and the like. After the configurations for the TX/RX switching, a RF receiver (RF RX) turns on to process the next sidelink subframe at S1607.

Figure 17:
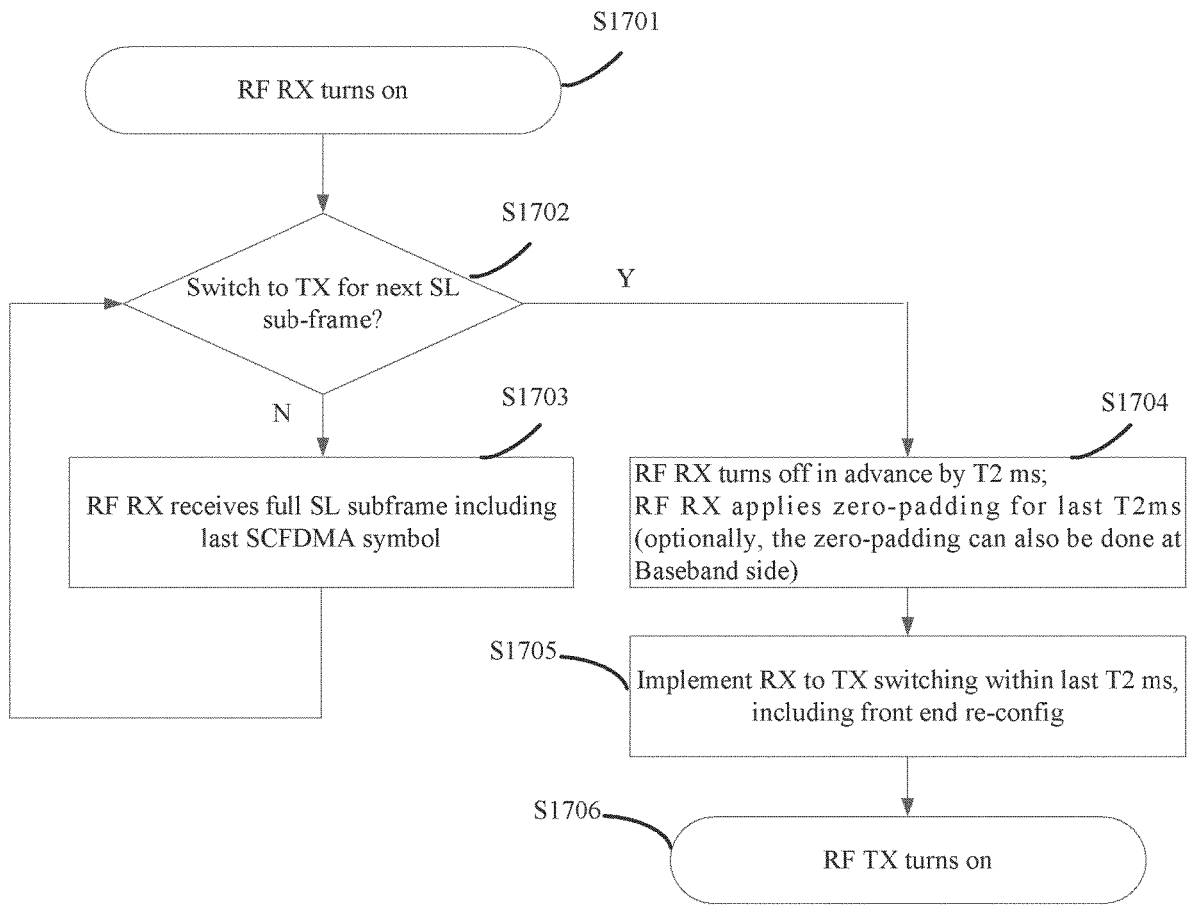
FIG. 17 shows a flow chart of an exemplary procedure for dynamically configuring a last symbol of a subframe at CD as a RX side in accordance with embodiments of the present disclosure.

Corresponding to the flow chart of the procedure at the TX CD, FIG. 17 shows a flow chart of an exemplary procedure for dynamically configuring a last symbol of a subframe at CD as a RX side in accordance with embodiments of the present disclosure.

Likewise, the CD as a RX side is referred to as a RX CD hereinafter for sake of conciseness. As illustrated in FIG. 17, a RF RX at the RX CD turns on at S1701. At S1702, the RX CD may determine if it is scheduled to switch to the TX mode for a next sidelink subframe. If the RX CD will not switch to the TX mode for the next sidelink subframe, the RF RX may receive and decode the full subframe including the last symbol at S1703. Otherwise, if the RX CD is scheduled to switch to the TX mode for the next sidelink subframe, the RF RX may terminate receiving the subframe in advance by a symbol duration (e.g. T2 ms) corresponding to the last symbol of the subframe at S504. Further, the RF RX may apply zero-padding for the last T2 ms at S1704. Or alternatively, the zero-padding can be done at a Baseband side. Then at S1705, the RX CD may implement the RX/TX switching within the last T2 ms by making configurations such as front end reconfiguration and the like. After the configurations for the RX/TX switching, a RF TX turns on to process the next sidelink subframe at S1706.

It is noted that, in the foregoing procedure as shown in FIG. 16, the TX CD may set the transmission power for a part of the symbol duration corresponding to the last symbol in the subframe to a minimized transmission power at S1605, instead of setting the transmission power for a full symbol duration corresponding to the last symbol in the subframe to a minimized transmission power. Accordingly, the TX CD will make configurations for the TX/RX switching within the part of the symbol duration at S1606. Likewise, in the foregoing procedure as shown in FIG. 17, the RX CD may terminate receiving the subframe in advance by a part of the symbol duration corresponding to the last symbol of the subframe at S1704, and make configurations for the RX/TX switching within the part of the symbol duration at S1705.

As described above, the last symbol of the subframe can be dynamically configured to optimize the demodulation performance according to embodiments of the present disclosure. If the last symbol of the subframe is not a blank symbol, the RX CD may demodulate the subframe including the last symbol. Since the V2X system is a multi-user broadcasting system, even if the TX CD transmits the last symbol, it cannot notify the RX CD about it. Thus the RX CD needs to blindly detects the existence of the last symbol and include it into demodulation when it is detected.

Figure 18:
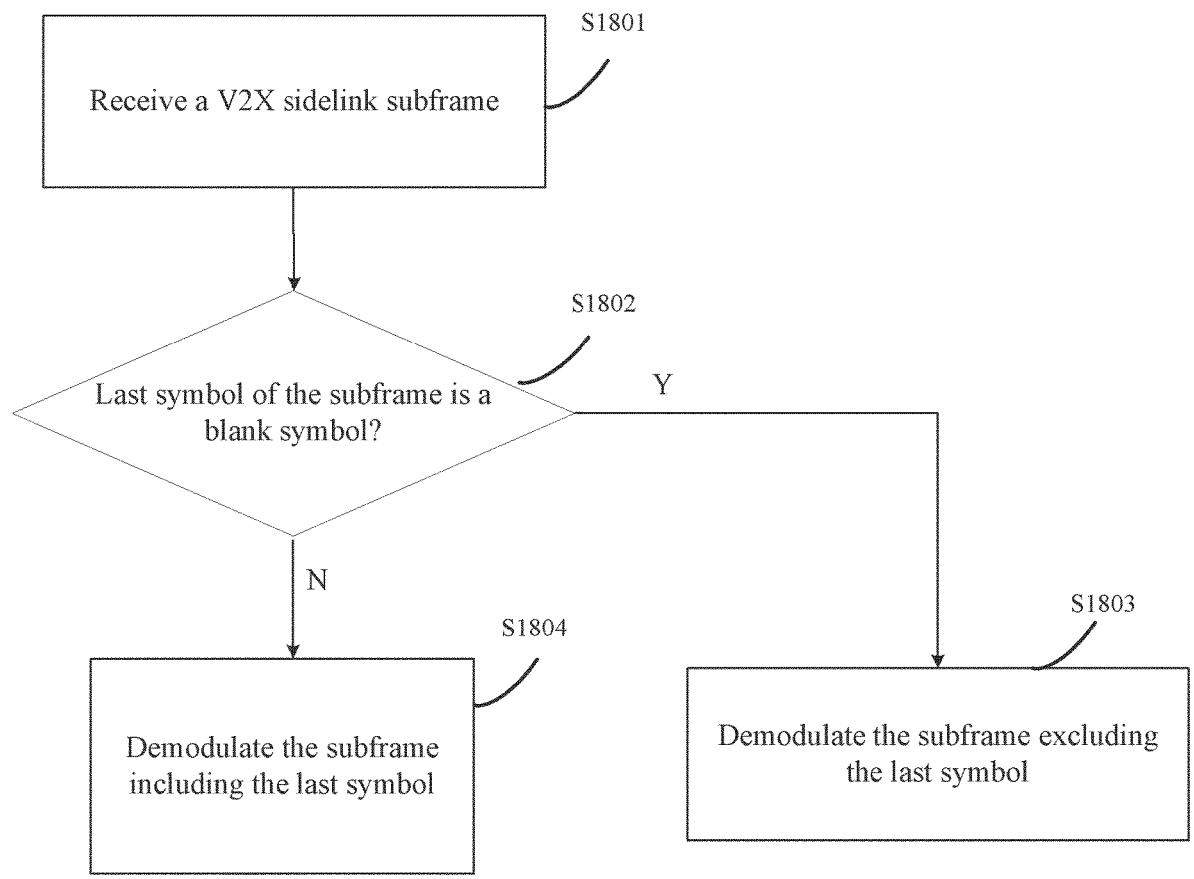
FIG. 18 shows a flow chart of an exemplary procedure performed at an RX CD for dynamically selecting a last symbol of a received subframe for demodulation in accordance with embodiments of the present disclosure.

FIG. 18 shows a flow chart of an exemplary procedure performed at an RX CD for dynamically selecting a last symbol of a received subframe for demodulation in accordance with embodiments of the present disclosure.

The RX CD receives a V2X sidelink subframe at S1801 and blindly detects whether a last symbol of the subframe is a blank symbol at S1802. If it is detected that the last symbol is not a blank symbol, the RX CD may demodulate the subframe including the last symbol at S1804. Otherwise, if it is detected that the last symbol is a blank symbol, the RX CD may demodulate the subframe excluding the last symbol at S1803.

Regarding the last symbol blind detection, any algorithm can be used standalone or combined to get better detection accuracy. Specific algorithms for the last symbol blind detection are not limited in the present disclosure.

For example, the last symbol blind detection may be implemented by energy measurement based on extracted resource blocks from the last symbol of the subframe. Particularly, the RX CD may measure a received power on resource blocks allocated to it during the last symbol and determine that the last symbol is not a blank symbol if the received power as measured is greater than a predetermined power threshold.

Alternatively, when the last symbol is configured with a cyclic prefix, the last symbol blind detection may be implemented by exploring the cyclic prefix correlation redundancy. The RX CD may obtain an autocorrelation strength by calculating an autocorrelation function between the cyclic prefix and the last symbol and determine that the last symbol is not a blank symbol if the autocorrelation strength is greater than a predetermined autocorrelation threshold.

Figure 19:
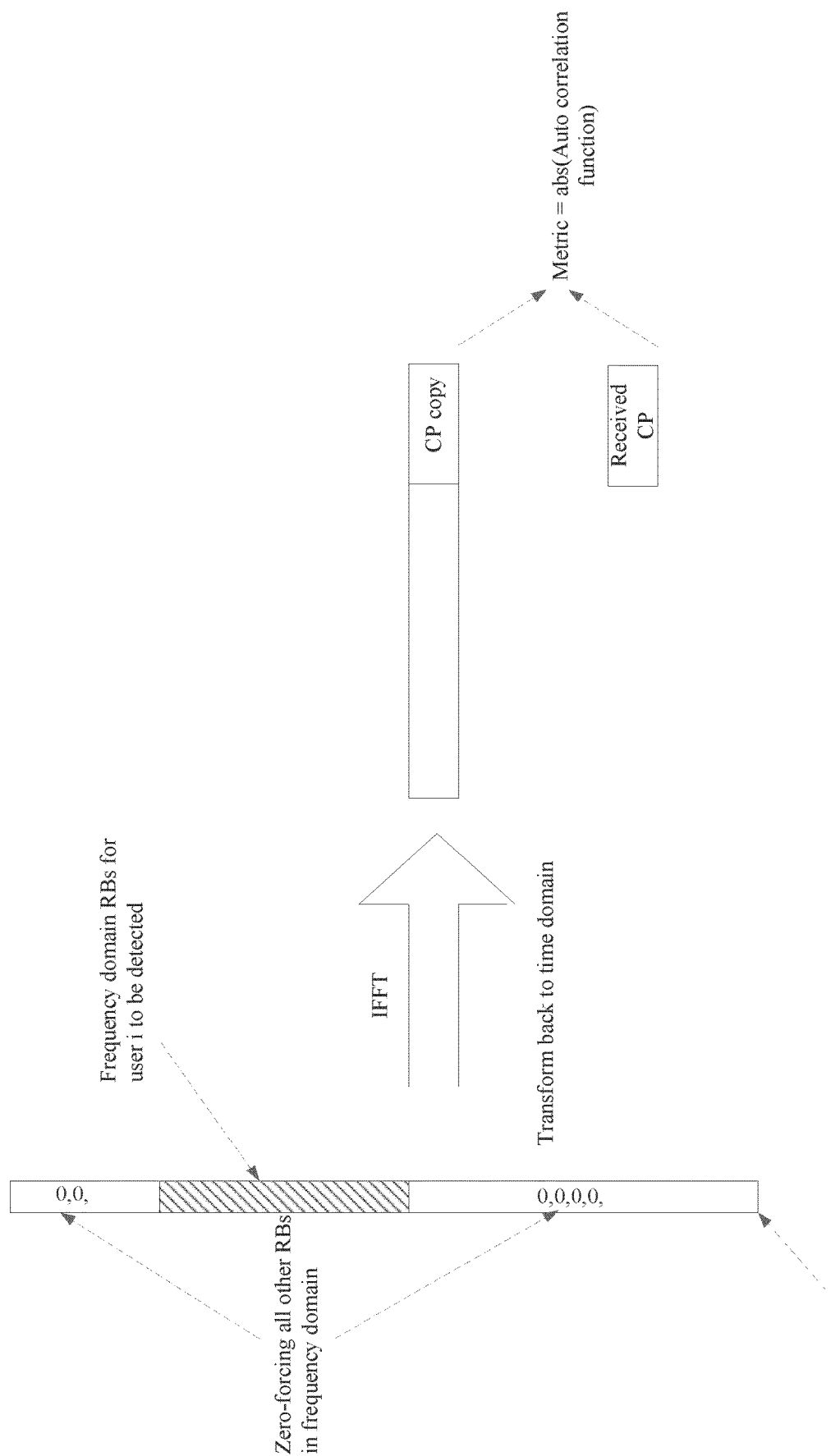
FIG. 19 illustrates an exemplary procedure for last symbol detection by using cyclic prefix correlation in accordance with embodiments of the present disclosure.

FIG. 19 illustrates an exemplary procedure for last symbol detection by using cyclic prefix correlation in accordance with embodiments of the present disclosure.

In particular, the RX CD may firstly zero-force strength of signals on all received frequency resources other than the frequency resources allocated to the RX CD during the last symbol to get a processed last symbol in a frequency domain. Then the RX CD may transform the processed last symbol back to a time domain and obtain an autocorrelation strength by calculating an autocorrelation function between the cyclic prefix and the transformed last symbol in the time domain. The autocorrelation strength may actually indicate the confidence of existence of a non-blank last symbol. So the RX CD may determine that the last symbol is not the blank symbol if the autocorrelation strength is greater than a predetermined autocorrelation threshold.

In the procedure for last symbol detection by using cyclic prefix correlation, the contributions from the resource blocks of other CDs can be excluded by zero-forcing other resource blocks in the frequency domain. As a result, the obtained autocorrelation strength may purely depend on the existence of the non-blank last symbol and thus accurately indicate the confidence of existence of the non-blank last symbol.

In the foregoing description, the first symbol detection and the last symbol detection are both implemented based on a hard decision, i.e. a "Yes" or "No" decision based on a predefined threshold. Alternatively, a soft decision may be applied instead of the hard decision. Specifically, a demodulator may demodulate a received full subframe including a first symbol and a last symbol and generate soft-bits for the first symbol and the last symbol. Then the strength of the soft-bits associated with the first symbol and the last symbol can be scaled by multiplying a respective scaling factor, so as to generate scaled soft-bits to be fed into a channel decoder. The scaling factor for the first symbol may be determined based on an acceptability index of the first symbol, and the scaling factor for the last symbol may be determined based on a detection confidence index of the last symbol.

Figure 20:
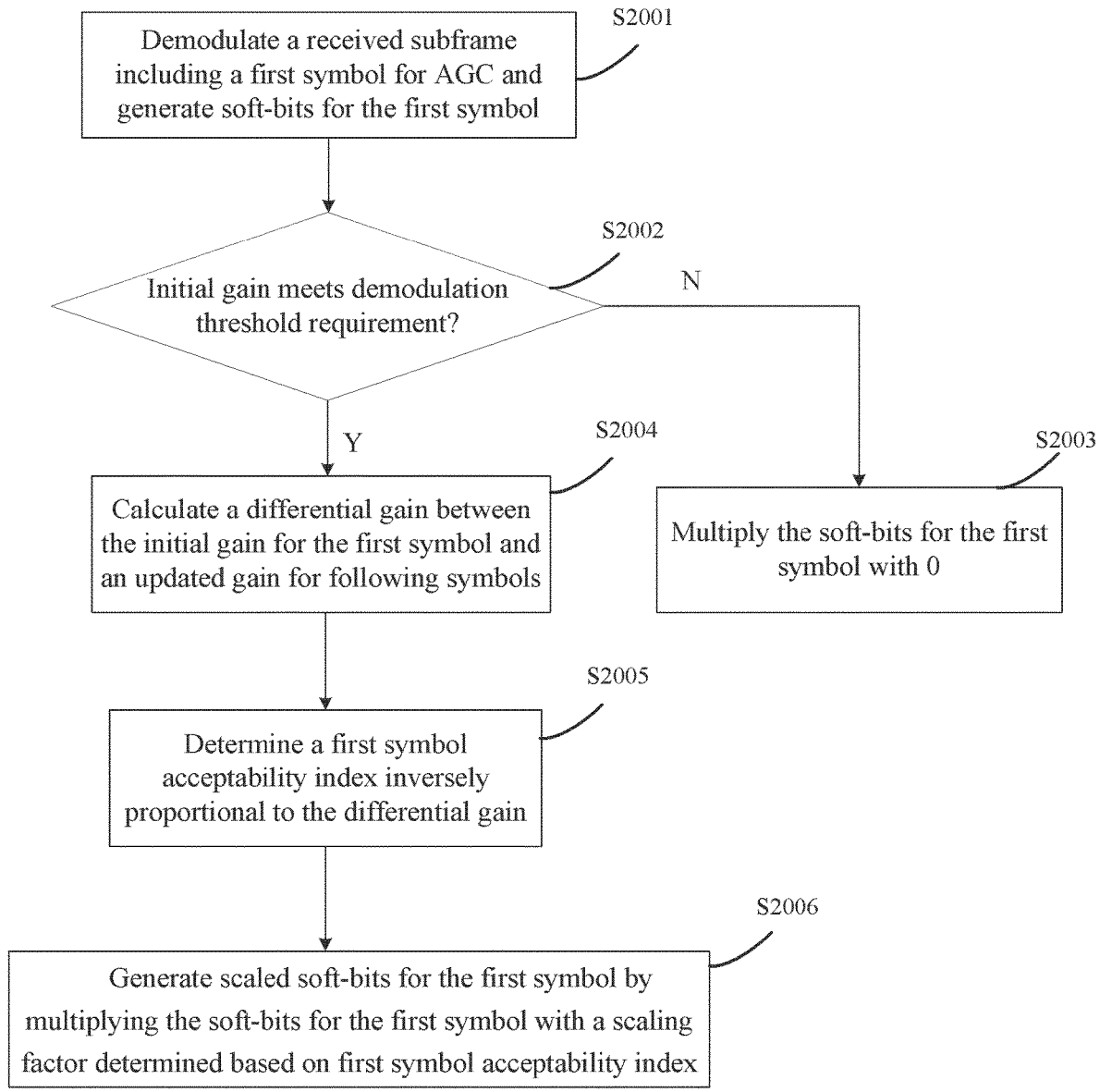
FIG. 20 shows a flow chart of a procedure for optimizing V2X demodulation performed at a RX CD with first symbol detection based on a soft decision in accordance with embodiments of the present disclosure.

FIG. 20 shows a flow chart of a procedure for optimizing V2X demodulation performed at a RX CD with first symbol detection based on a soft decision in accordance with embodiments of the present disclosure.

At S2001, the RX CD may perform normal demodulation for a received subframe including a first symbol configured for AGC and generate soft-bits for the first symbol.

At S2002, the RX CD may determine whether an initial gain for the first symbol meets a demodulation threshold requirement. If the RX CD determines the initial gain for the first symbol does not meet the demodulation threshold requirement, the first symbol should be abandoned, and thus the RX CD may multiply the soft-bits for the first symbol by 0 at S2003.

Otherwise, if the RX CD determines the initial gain for the first symbol meets the demodulation threshold requirement, the RX CD may calculate a differential gain between the initial gain for the first symbol and an updated gain for following symbols at S2004 and determine a first symbol acceptability index inversely proportional to the differential gain at S2005. Then, the RX CD may generate scaled soft-bits for the first symbol by multiplying the soft-bits for the first symbol with a scaling factor determined based on the first symbol acceptability index at S2006. The scaled soft-bits may be fed into a channel decoder. In this way, the information carried in the first symbol of the received subframe can be fully implemented for demodulation and decoding.

Figure 21:
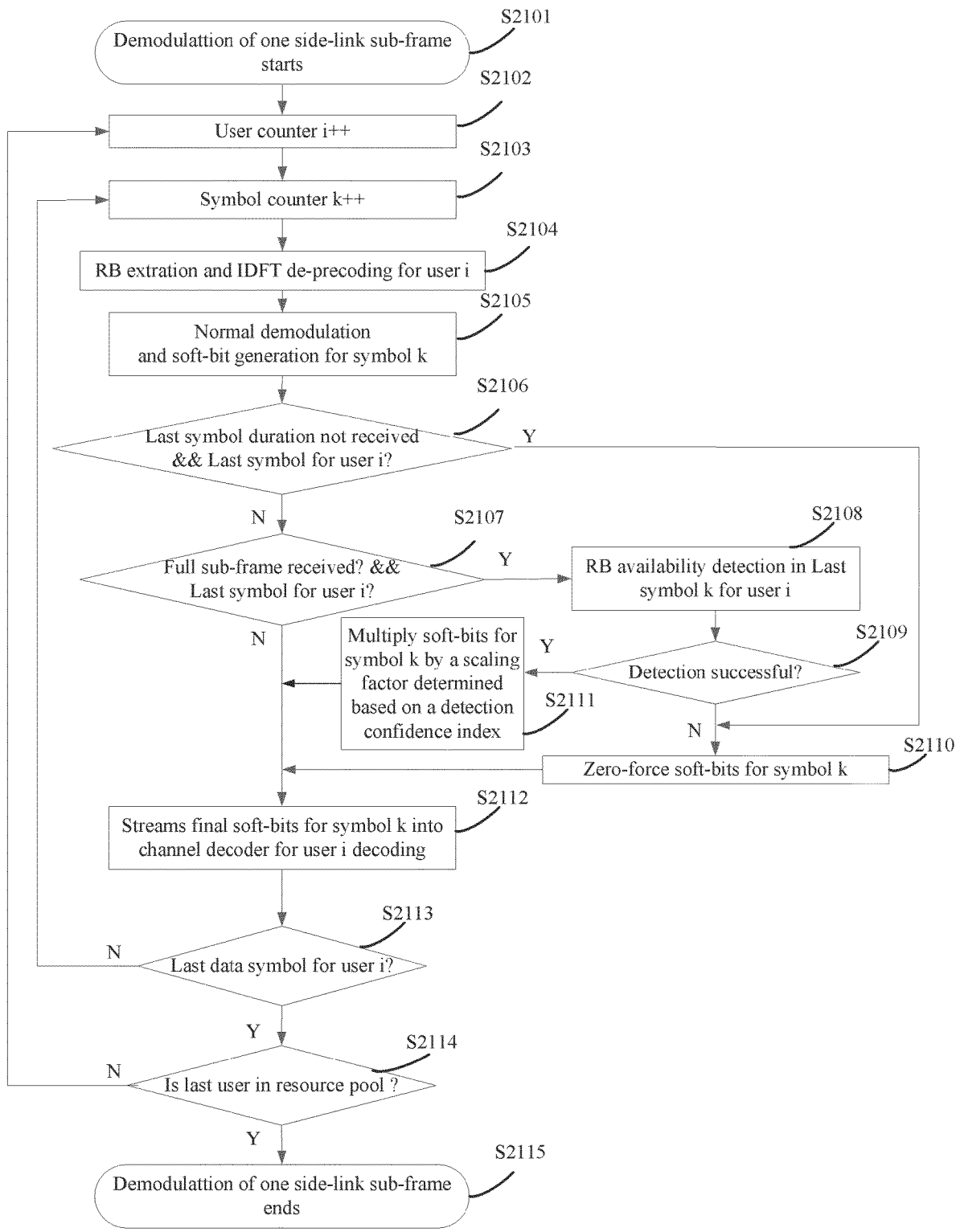
FIG. 21 shows a flow chart of an exemplary procedure for multi-user demodulation performed at a RX CD with last symbol detection based on a soft decision in accordance with embodiments of the present disclosure.

Similar to the first symbol detection, a soft decision may also applied during the last symbol detection. FIG. 21 shows a flow chart of an exemplary procedure for multi-user demodulation performed at a RX CD with last symbol detection based on a soft decision in accordance with embodiments of the present disclosure.

For simplicity, normal demodulation operations e.g. DMRS based channel estimation, parameter estimation, noise whitening, MMSE detection, etc. are not included in FIG. 21, in order to avoid obscuring essentials of the present disclosure. Also, operations S2101 to S2104 and S2113 to S2115 are known to those skilled in the art and will not be described in detail.

As illustrated in the flow chart, the RX CD may perform normal demodulation and generate soft-bits for each symbol at S2105. When it is determined that a current symbol is the last symbol for a current user and a last symbol duration is not received at S2106, the RX CD may zero-force soft-bits for the last symbol at S2110. Otherwise, the RX CD may determine whether a full subframe is received and the current symbol is the last symbol for the current user at S2107. If it is determined that the current symbol is the last symbol for the current user, the RX CD may perform the last symbol detection. First, the RX CD may detect if there is any resource block available in the last symbol for the current user at S2108. If no available resource block is detected in the last symbol for the current user, it means that the last symbol is a blank symbol and thus the RX CD may zero-force soft-bits for the last symbol at S2110. Otherwise, if any available resource block is detected in the last symbol for the current user, a soft decision for the last symbol detection may be made. Specifically, a detection metric associated with the last symbol may be measured. As described above, the detection metric may be a received power on frequency resources allocated to the RX CD during the last symbol, or an autocorrelation strength obtained by calculating an autocorrelation function between the cyclic prefix and the last symbol. Accordingly, a last symbol detection confidence index may be determined as proportional to the measured detection metric. As a result, the RX CD may multiply the soft-bits for the last symbol by a scaling factor determined based on the detection confidence index at S2111. Then, the RX CD may feed finally generated soft-bits for the last symbol into a channel decoder for decoding at 2112.

It is apparent that the procedure of FIG. 20 for the first symbol detection based on the soft decision for the first symbol may be easily combined with the procedure of FIG. 21 for the last symbol detection based on the soft decision for the last symbol to get a complete procedure of optimized multi-user demodulation based on both the first symbol detection and the last symbol detection. With the proposed procedure, the demodulation performance can be optimized by fully implementing the information carried in all the symbols of a received subframe.

Furthermore, the V2X CD which implements the proposed demodulation procedures can be fully compliant with another CD which does not implement the proposed procedures.

For example, suppose that CD1 implements the proposed procedures while CD2 does not support the implementation of the proposed procedures.

For a receiver at CD1 which receives signals from a transmitter at CD2, the receiver at CD1 receives and demodulates the last symbol based on blind detection. If the blind detection shows no last symbol existing, the CD1 may achieve a 3GPP baseline performance.

For a receiver at CD1 which receives signals from a transmitter at CD1, the receiver at CD1 can explore last symbol redundancy for demodulation based on blind detection, so the CD1 may achieve better performance than a 3GPP baseline performance.

For a receiver at CD2 which receives signals from a transmitter at CD1, the receiver at CD2 always receives and demodulates a subframe without a last symbol of the subframe, although the last symbol is transmitted by the transmitter at CD1. In this case, the CD2 may achieve a 3GPP baseline performance.

As a result, in all situations, both CD1 and CD2 can fulfill the 3GPP performance requirement, while the CD1 may have better performance than the CD2.

Managing V2X Sidelink Processes for Sensing-Based Transmission of Periodic Services According to related 3GPP technical specifications, a V2X service is defined by a service ID and a priority, and is also characterized by traffic periodicity, latency requirement and traffic size. A CD (e.g. UE) uses these information to select and reserve resources for a particular V2X service based on sensing wireless resources over a sensing period. The purpose of resource selection is to reduce collision with self-transmission or other CD transmission.

After sensing and resource selection, the CD transmits a Physical Sidelink Control Channel (PSCCH) with Sidelink Control Information (SCI) format 1 together with a Physical Sidelink Share Channel (PSSCH). Other CDs can use information contained in the SCI format 1 from the CD to predict the transmission reoccurrence of the CD so as to assist their own resource selection.

There could be multiple periodic V2X services, but 3GPP defines the maximum number of processes for transmitting periodic services based on sensing is 2. So the CD needs to efficiently manage the processes for transmission of multiple periodic services such as Protocol Data Units in a MAC layer (MAC PDUs), to better serve streams from application layers and also reduce the impact on other CDs as much as possible.

In addition, when the reserved resource is changed due to resource reselection or service stopping, there is no dedicated mechanism to broadcast information about the change of resource reservation. Therefore other CDs are not aware of the change of the reserved resource until receiving a new SCI format 1 from the CD, and before that they may exclude resources that actually will not be used by the CD and choose conflicting resources.

As described above, 3GPP TS 36.213 defines two transmission modes, Mode 3 and Mode 4, for V2X sidelink communication. In Mode 3, resources for transmission are allocated to the CDs by an access node. In Mode 4, the CDs may autonomously select resources for transmission based on sensing available resources that are not be reserved or occupied by other CDs.

When CD is attached to an access node supporting V2X communication, the access node can configures the CD to operate in either Mode 3 or Mode 4; when the CD is attached to an access node not supporting the V2X communication or CD is out of coverage of the access node, the CD can only operate in Mode 4 to communicate with other CDs. For Mode 4, the CD autonomously selects resources (including subframes and subcarriers) in TX resource pool(s) which are configured by the access node or pre-configured for the CD.

In accordance with 3GPP TS 36.213, when operating in Mode 4, the CD does background sensing contiguously in a sensing window (SW) up to 1000 ms to track information about transmitting and receiving resources of the CD itself and other surrounding CDs. For example, the information may include a subframe number and a resource reservation interval corresponding to a transmitting channel of the CD itself; a priority, a resource reservation interval, a sub-channel range, and PSSCH Reference Signal Received Power (PSSCH-RSRP) corresponding to a channel received from other surrounding CDs; and also Received Signal Strength Indicator (RSSI) measurements on all sub-channels.

Figure 22:
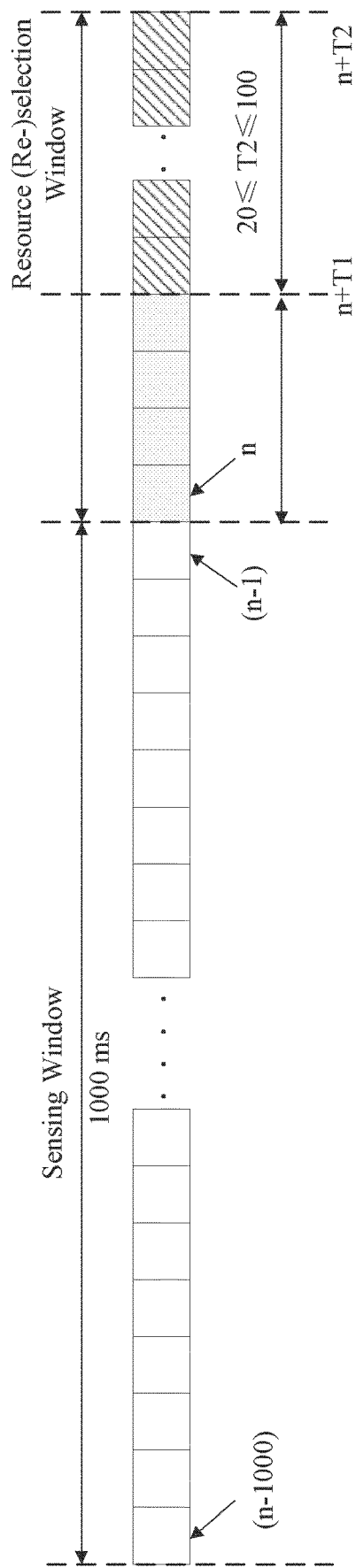
FIG. 22 shows an example of a sensing window and a resource selection window in accordance with embodiments of the present disclosure.

When a new V2X service arrives at the CD from an application layer in a subframe n, a CD modem in a physical layer may select resources in a resource selection window (RSW) [n+T1, n+T2] based on sensing results, where $0 \leq T1 \leq 4$, $20 \leq T2 \leq 100$, and T2 should meet latency requirement. A sensing window and a resource selection window are shown in FIG. 22 as an example.

According to related 3GPP technical specifications, a V2X service from the application layer can be defined by a service ID and a priority, and is also characterized by traffic periodicity, latency requirement and traffic size. When the new V2X service arrives at the CD from the application layer, the CD modem in the physical layer needs to select resources based on sensing results and the attributes of the new V2X service.

The principle of resource selection is to avoid conflict with re-occurrence of self-transmission and other CD transmission, then choose the freest resources. In 3GPP TS 36.213, a UE procedure for determining the subset of resources to be reported to higher layers (e.g. the MAC layer) in PSSCH resource selection in sidelink transmission mode 4 has been described in detail. In order to avoid too much detail obscuring essential problems related to the disclosure, the procedure will be simplified and described below with reference to FIG. 23.

Figure 23:
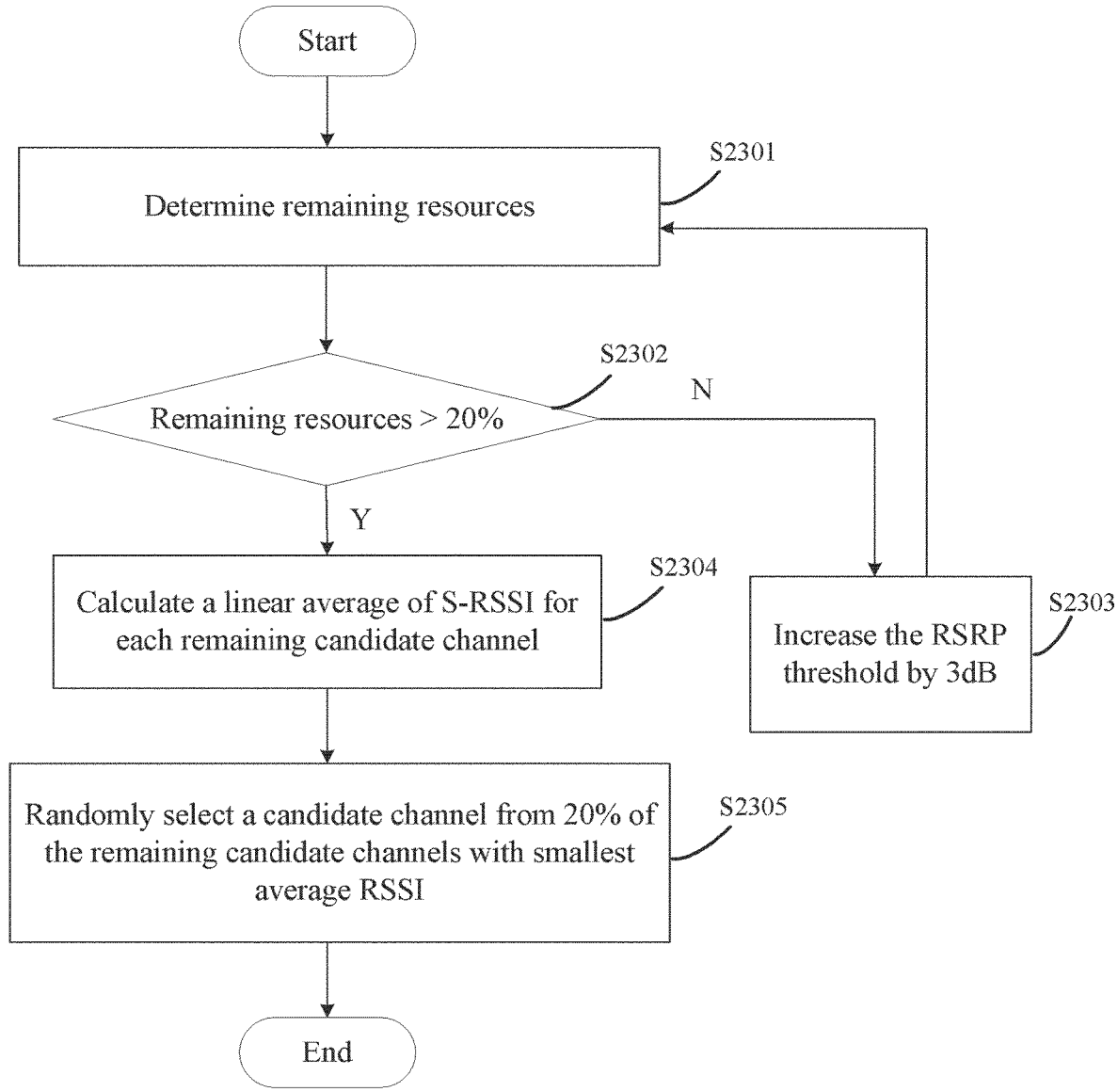
FIG. 23 shows a simplified procedure for resource selection based on sensing according to related 3GPP technical specifications.

FIG. 23 shows a simplified procedure for resource selection based on sensing according to related 3GPP technical specifications. When requested by higher layers in a subframe, the CD shall determine the set of resources to be reported to higher layers for PSSCH transmission according to the procedure in FIG. 23, which includes operations S2301 to S2305.

At S2301, the CD may determine remaining candidate channels for V2X transmission by excluding reserved or occupied candidate channels.

The principle of resource selection is to avoid conflict with re-occurrence of self-transmission and other CD transmission. Specifically, a candidate single-subframe resource (also referred to as a candidate channel hereinafter) for PSSCH transmission is defined as a set of L contiguous sub-channels (also referred to as subcarriers hereinafter). The CD shall assume that any set of contiguous sub-channels included in a corresponding PSSCH resource pool within the time interval [n+T$_1$, n+T$_2$] corresponds to one candidate single-subframe resource, where selections of T$_1$ and T$_2$ are up to CD implementations under T$_1$≤4 and 20≤T$_2$≤100. CD selection of T$_2$ shall fulfil the latency requirement. The total number of all the candidate channels is denoted by M$_{total}$.

A set S$_A$ is initialized to the union of all the candidate channels. The CD shall exclude any candidate channel reserved or occupied by other CDs or the CD itself from the set S$_A$. For example, the CD may decode Sidelink Control Information (SCI) received from the other CDs to determine the candidate channels that have been reserved by the other CDs and exclude the reserved candidate channels from the set S$_A$. In addition, the CD may measure a Reference Signal Received Power (RSRP) on a candidate channel and exclude the candidate channel from the set S$_A$ if the measured RSRP is higher than a RSRP threshold. In accordance with 3GPP TS 36.213, the value of the RSRP threshold is selected from a higher layer configured table according to prio_RX in the received SCI and prio_TX from higher layer. The resources to be excluded may also include resources occupied by the CD itself, which may be determined according to a subframe number and a resource reservation interval of the CD.

At S2302, the CD may determine whether the number of the remaining candidate channels is less than a predefined percentage (e.g., 20%) of the total number M$_{total}$ of the candidate channels. If the number of the remaining candidate channels is less than 20% of the total number M$_{total}$ of the candidate channels, the CD will increase the RSRP threshold by a predefined ratio (e.g., 3 dB) at S2303 and repeat the operation S2301 to determine the remaining candidate channels under the increased RSRP threshold.

If the number of the remaining candidate channels is greater than or equal to 20% of the total number M$_{total}$ of the candidate channels, at S2304, the CD may calculate a power metric for each remaining candidate channel as a linear average of S-RSSI measured on the L sub-channels.

Finally, at S2305, the CD may select 20% of the remaining candidate channels with smallest average RSSI as a final set of candidate channels available to the CD and then randomly select a candidate channel for V2X transmission from the final set of candidate channels.

In addition to the necessary resource selection as exemplified in FIG. 23, it is also desired to efficiently manage V2X sidelink processes to transmit more V2X services. As described above, there could be multiple periodic V2X services arriving at the CD, but 3GPP defines the maximum number of sidelink processes for transmitting periodic services based on sensing is 2. When more periodic services are to be transmitted, the CD needs to decide which services can be transmitted. Specifically, the CD may decide to combine a new periodic service with an existing periodic service or replace the existing periodic service by the new periodic service, based on predefined rules.

Figure 24:
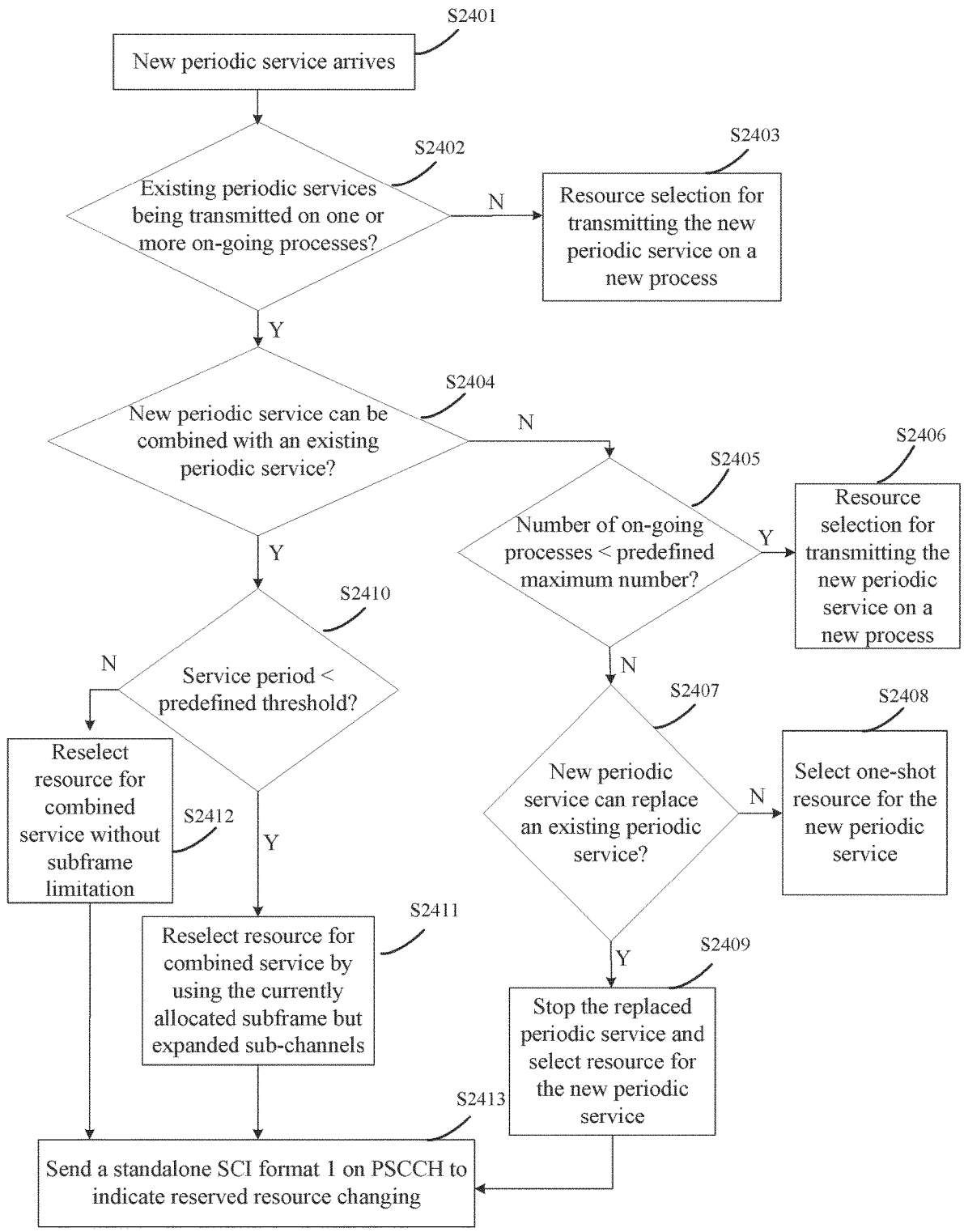
FIG. 24 shows a flow chart of a method for managing V2X sidelink processes for sensing-based transmission of periodic services in accordance with embodiments of the present disclosure.

FIG. 24 shows a flow chart of a method for managing V2X sidelink processes for sensing-based transmission of periodic services in accordance with embodiments of the present disclosure.

When a new periodic service arrives at a CD (S2401), the CD may detect whether there is one or more on-going processes for transmitting one or more existing periodic services on the CD (S2402). If no existing periodic service is detected, then the CD may perform normal resource selection for the new periodic service based on sensing as described in FIG. 23 and transmit the new periodic service on a new V2X process by using selected resources (S2403).

But if the CD detects that one or more existing periodic services are being transmitted on one or more on-going processes, the CD may combine the new periodic service with an existing periodic service to transmit more periodic services on the current V2X sidelink processes on the CD. Before combining the services, the CD may need to decide if the new periodic service is suitable to be combined with an existing periodic service based on a predefined combination rule (S2404).

In the V2X communication system, there could be multiple periodic V2X services to be transmitted on the CD, but 3GPP defines the maximum number of processes for transmitting periodic services based on sensing is 2. If the new periodic service can be combined with an existing periodic service on an on-going V2X process but is not combined, then the CD needs to assign a new V2X process for the new periodic service, which in turn impacts the transmission of later services or the CD can only find a one-shot resource to transmit the new periodic service if the number of the on-going V2X processes has already reached 2.

On the other hand, if the new periodic service is combined with the existing periodic services not properly, the services may not be able to be transmitted properly or the resources may be wasted. In view of this, a combination rule may be predefined to assist the proper combination of the services. For example, the predefined combination rule may include that the new periodic service has a service identification same as that of an existing periodic service; the new periodic service has a periodicity same as that of the existing periodic service; and delays of the new periodic service and the existing periodic service meet their respective Packet Delay Budget (PDB) requirements.

Figure 25A:
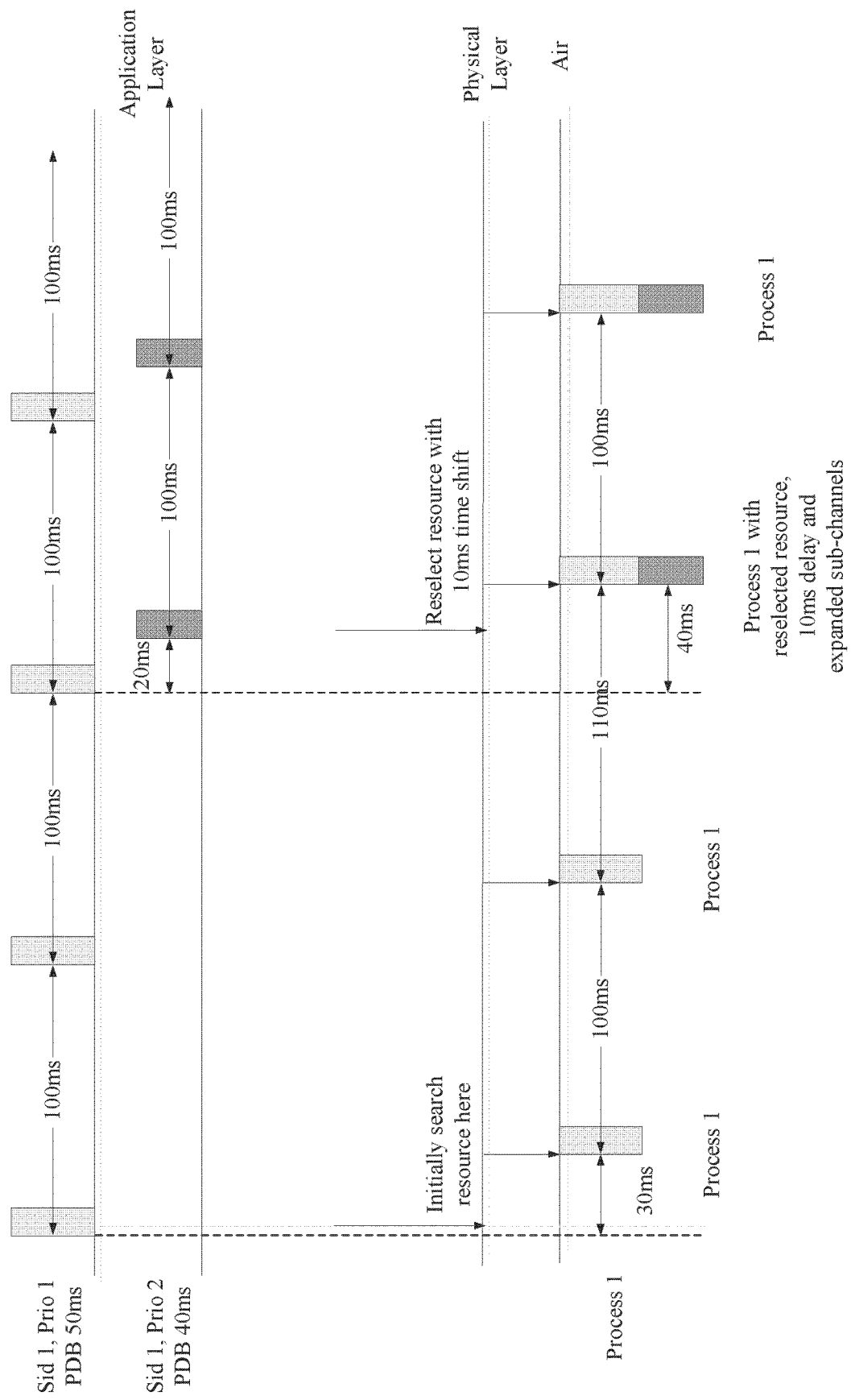
FIGS. 25a-25d show example scenarios of management of V2X sidelink processes in accordance with embodiments of the present disclosure.
Figure 25B:
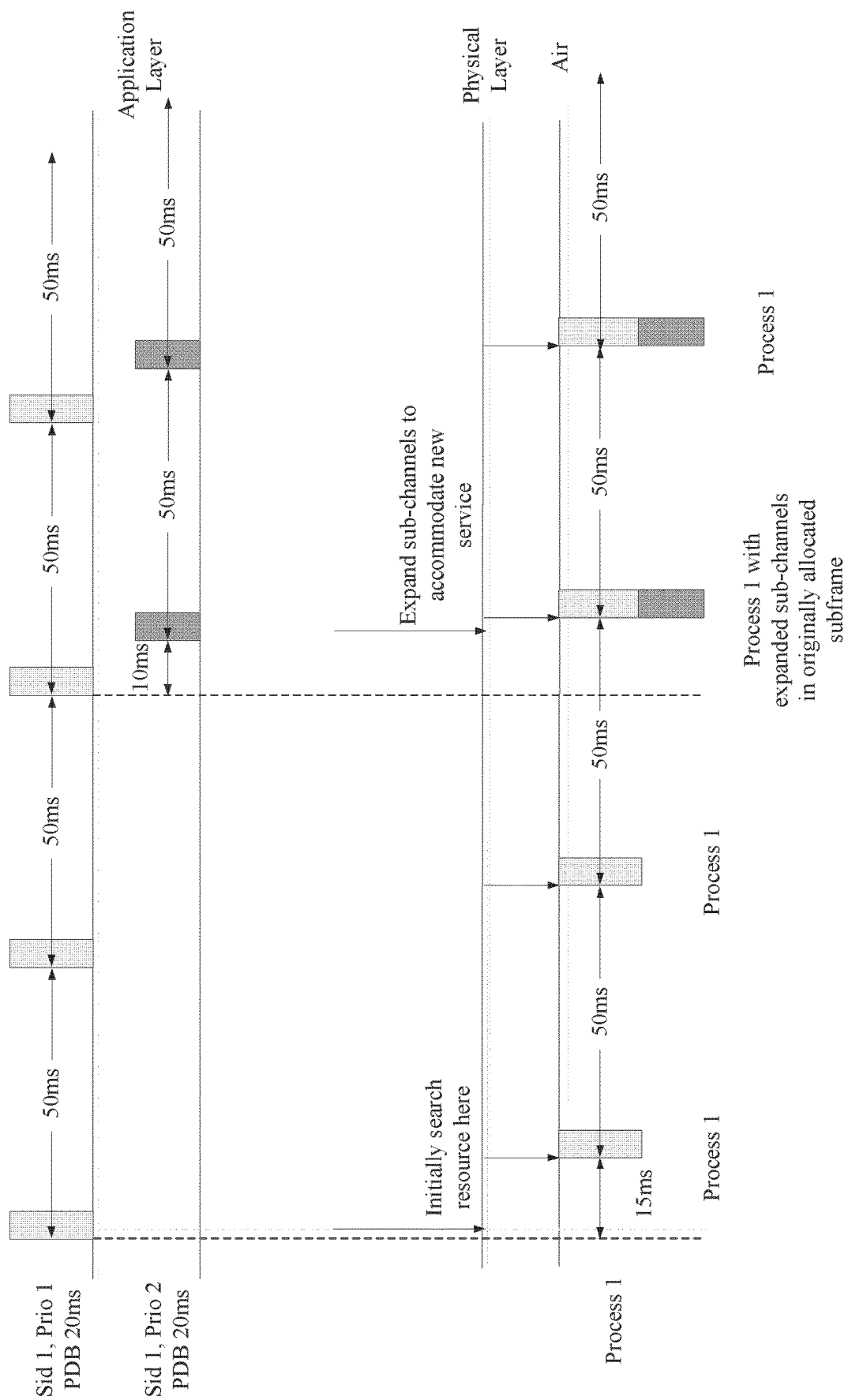

FIGS. 25*a* and 25*b* show example scenarios of management of V2X sidelink processes when a new periodic service is suitable to be combined with an existing periodic service in accordance with embodiments of the present disclosure.

In FIG. 25*a*, an existing periodic service with a service ID 1 (Sid1), a priority 1 (Prio1), a period of 100 ms and a PDB of 50 ms is being transmitted on an on-going process 1 on the CD. At this time, a new periodic service with a same service ID (Sid1), a priority 2 (Prio2), a same period of 100 ms and a PDB of 40 ms arrives at the CD. The delay of the new periodic service with respect to the existing periodic service is 20 ms. Since the new periodic service has the same service ID and the same period as those of the existing periodic service, the new periodic service can be combined with the existing periodic service as long as the delays of the new periodic service and the existing periodic service to be transmitted as a combined service meet their respective PDB requirements. Then in order to combine the services, the CD may perform resource reselection at the physical layer (e.g. at a modem of the CD) to find resources for transmitting the combined service. The resource reselection for the combined service may include searching expanded available sub-channels or a new available subframe. Here, a period threshold (e.g. 60 ms) is predefined to determine if the subframe should be limited to a currently allocated subframe during the resource reselection. If the period of the periodic services is longer than the period threshold, a new subframe may be selected to accommodate the combined service, i.e., the subframe may not be limited to the currently allocated subframe during the resource reselection. On the other hand, if the period of the periodic services is shorter than the period threshold, the CD can only use the currently allocated subframe and search expanded available sub-channels to accommodate the combined service during the resource reselection.

In the example of FIG. 25a, the periods of the new periodic service and the existing periodic service are both 100 ms, which is longer than the predefined threshold, so no subframe limitation will be applied during the resource reselection. For example, the modem of CD finds that the currently allocated subframe cannot accommodate the combined service, but can find a subframe with a delay of 10 ms available to transmit the combined service. In this case, the CD may transmit the combined service in a new subframe. As shown in the FIG. 25a, in the combined service, the largest delay of the existing periodic service is 40 ms, which is less than its required PDB of 50 ms, and the delay of the new periodic service is 20 ms, which is also less than its required PDB of 40 ms. Therefore, the new periodic service can be successfully combined with the existing periodic service and transmitted by using the reselected resource.

In the example of FIG. 25b, an existing periodic service with a service ID 1 (Sid1), a priority 1 (Prio1), a period of 50 ms and a PDB of 20 ms is being transmitted on an on-going process 1 on the CD. At this time, a new periodic service with a same service ID (Sid 1), a priority 2 (Prio2), a same period of 50 ms and a PDB of 20 ms arrives at the CD. The delay of the new periodic service with respect to the existing periodic service is 10 ms. Since the new periodic service has the same service ID and the same period as those of the existing periodic service, the new periodic service can be combined with the existing periodic service as long as the delays of the new periodic service and the existing periodic service to be transmitted as a combined service meet their respective PDB requirements. However, the periods of the new periodic service and the existing periodic service are both 50 ms, which is shorter than the predefined threshold, so the CD can only use the currently allocated subframe and search expanded available sub-channels to accommodate the combined service. For example, the modem of CD finds the expanded available sub-channels to transmit the combined service in the originally on-going subframe during the resource reselection. As shown in the FIG. 25b, in the combined service, both the delay of the existing periodic service and the delay of the new periodic service are 15 ms, which is less than their respective required PDB of 20 ms. Therefore, the new periodic service can be successfully combined with the existing periodic service and transmitted by using the reselected resource.

Turning back to FIG. 24, as discussed above, when it is decided that the new periodic service is suitable to be combined with an existing periodic service ("Y" at S2404), the CD may further determined whether the period of the services to be combined is shorter than the predefined period threshold (S2410). If the period of the services to be combined is not shorter than the predefined period threshold, the CD may perform the resource reselection for the combined service without subframe limitation (S2412). Otherwise, the CD can only perform the resource reselection for the combined service by searching expanded available sub-channels but not changing the currently allocated subframe (S2411).

On the other hand, when it is decided that the new periodic service is not suitable to be combined with the existing periodic services ("N" at S2404), the CD may proceed to a processing branch including S2405 to S2409.

The CD may first check if the number of the on-going processes has already reached a predefined maximum number (S2405). If the number of the on-going processes has not reached the predefined maximum number ("N" at S2405), that is, a new process may be assigned to transmit the new periodic service, the CD may perform normal resource selection for the new periodic service based on sensing as described in FIG. 23 and transmit the new periodic service on a new V2X process by using selected resources (S2406). Otherwise, if the number of the on-going processes has already reached a predefined maximum number ("Y" at S2405), the CD may determine whether the new periodic service is suitable to replace one of the existing periodic services based on a predefined replacement rule (S2407). The predefined replacement rule may include that the new periodic service has a priority higher than that of the existing periodic service; or the new periodic service has a period shorter than that of the existing periodic service.

If it is determined that the new periodic service is suitable to replace one of the existing periodic services based on a predefined replacement rule ("Y" at S2407), the CD may stop the transmission of the existing periodic service to be replaced by the new periodic service and select resources for the new periodic service (S2409). Otherwise, if it is determined that the new periodic service is not suitable to replace any of the existing periodic services based on a predefined replacement rule ("N" at S2407), e.g. the new periodic service has the longest period and lowest priority compared to all the existing periodic services, the CD will select one-shot resource to transmit the new periodic service without changing the transmission of the existing periodic services.

Figure 25C:
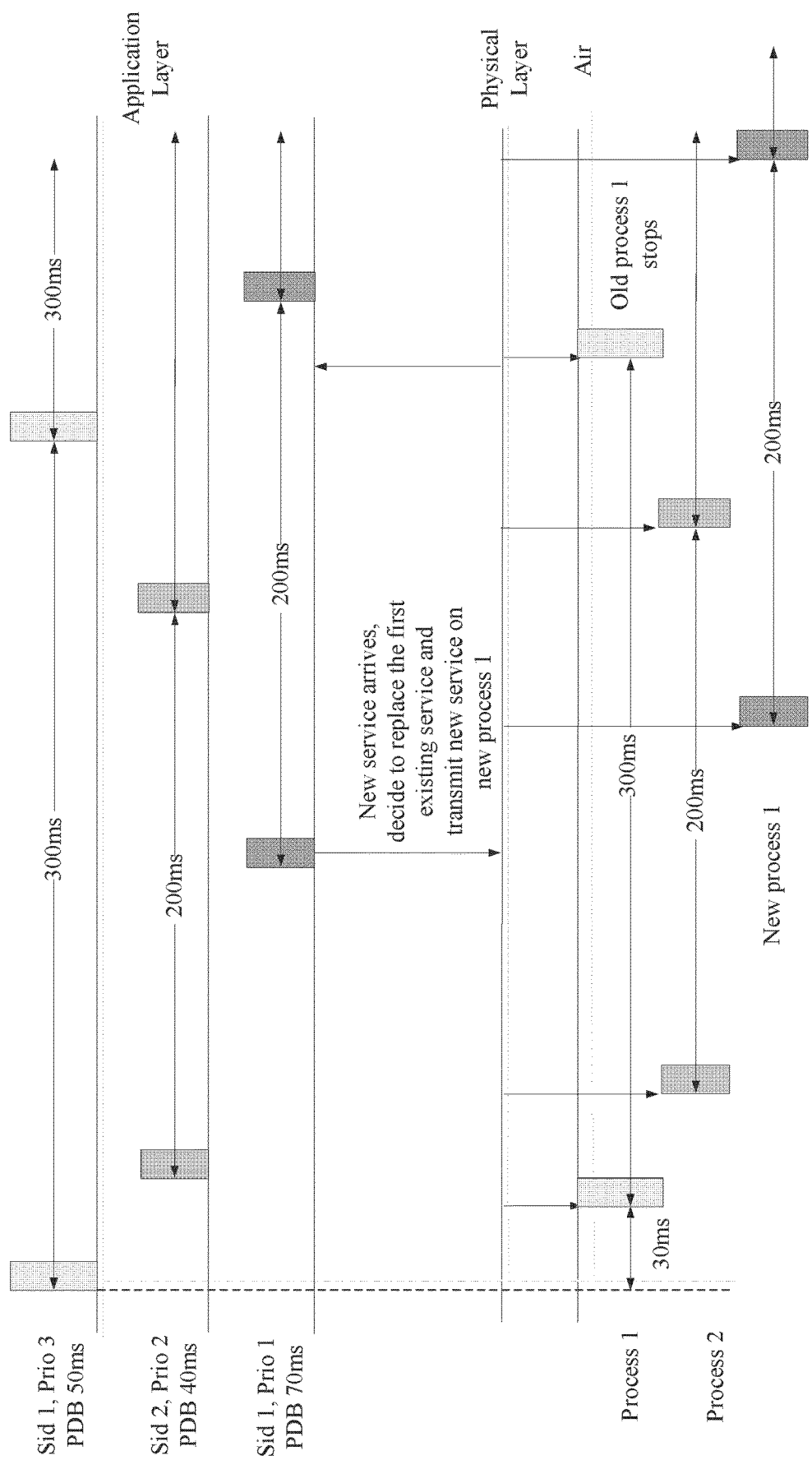
Figure 25D:
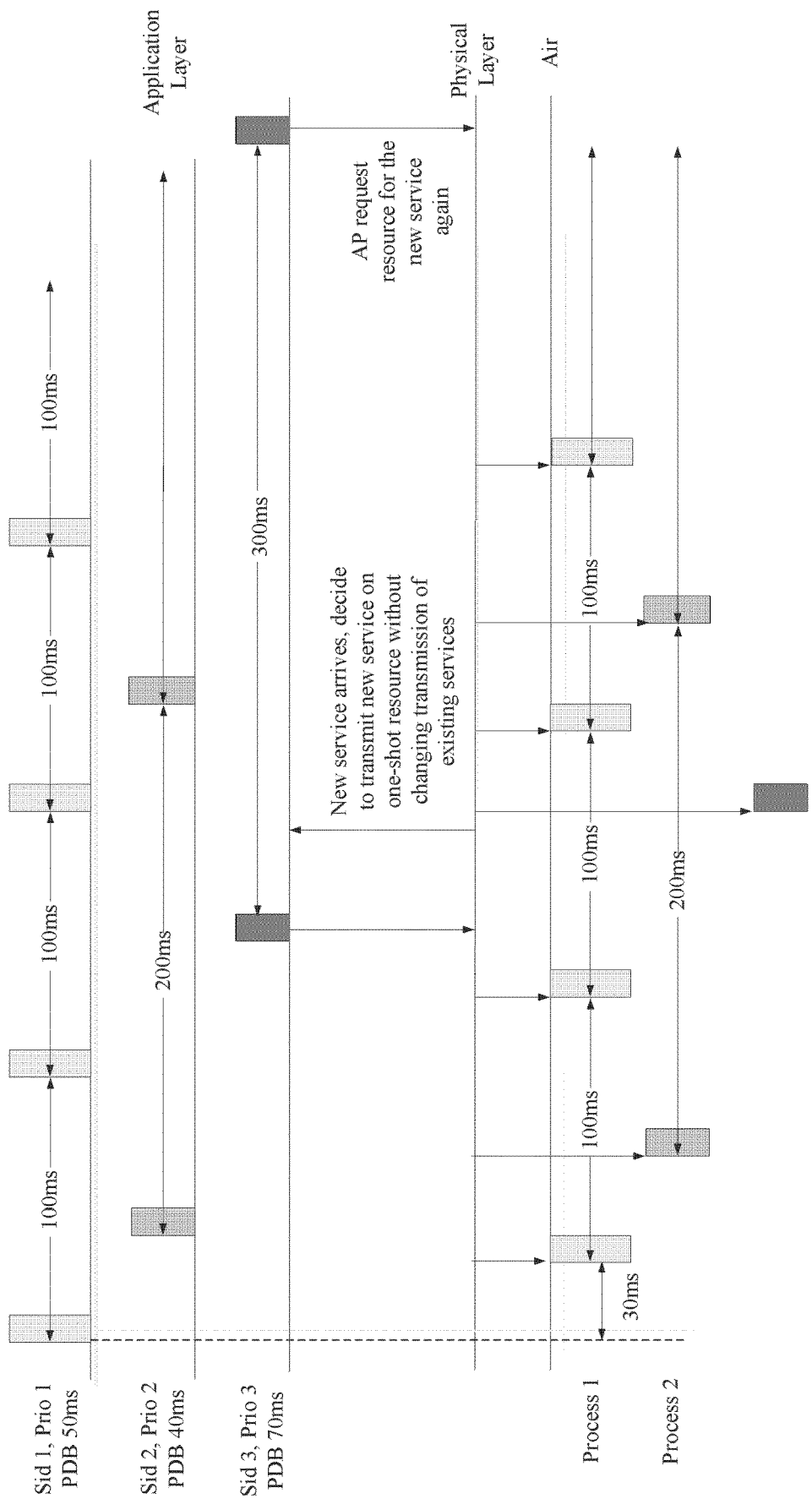

FIGS. 25c and 25d show example scenarios of management of V2X sidelink processes when a new periodic service is not suitable to be combined with existing periodic services in accordance with embodiments of the present disclosure.

In the example of FIG. 25c, there are already two existing periodic services being transmitted on two on-going V2X processes. The first existing periodic service has a service ID 1 (Sid1), a priority 3 (Prio3), a period of 300 ms and a PDB of 50 ms, and the second existing periodic service has a service ID 2 (Sid2), a priority 2 (Prio2), a period of 200 ms and a PDB of 40 ms. At this time, a new periodic service with a service ID 1 (Sid1), a priority 1 (Prio1), a period of 200 ms and a PDB of 70 ms arrives at the CD. Due to different periods or different service IDs, the new periodic service cannot be combined with any of the two existing periodic services. Meanwhile, the number of the on-going V2X processes has already reached the maximum number (e.g., 2), so the CD will determine whether to replace one of the existing periodic services with the new periodic service. In this example, since the new periodic service has a period shorter than that of the first existing periodic service, the new periodic service can replace the first existing periodic service according to the predefined replacement rule. As shown in the lower part of FIG. 25c, the old process 1 for transmitting the first existing periodic service stops, and instead of the first existing periodic service, the CD performs resource selection for the new periodic service and transmits the new periodic service on a new process 1.

In the example of FIG. 25d, there are already two existing periodic services being transmitted on two on-going V2X processes. The first existing periodic service has a service ID 1 (Sid1), a priority 1 (Prio1), a period of 100 ms and a PDB of 50 ms, and the second existing periodic service has a service ID 2 (Sid2), a priority 2 (Prio2), a period of 200 ms and a PDB of 40 ms. At this time, a new periodic service with a service ID 3 (Sid3), a priority 3 (Prio3), a period of 300 ms and a PDB of 70 ms arrives at the CD. Due to different periods or different service IDs, the new periodic service cannot be combined with any of the two existing periodic services. Meanwhile, the number of the on-going V2X processes has already reached the maximum number (e.g., 2), so the CD will determine whether to replace one of the existing periodic services with the new periodic service. In this example, since the new periodic service has the longest period and lowest priority compared to the two existing periodic services, the CD will select one-shot resource to transmit the new periodic service without changing the transmission of the existing periodic services, as shown in the lower part of FIG. 25d.

In the V2X communication system, generally after sensing and resource selection, the CD will transmit the control channel PSCCH carrying SCI format 1 together with the data channel PSSCH. Other CDs can use information contained in the SCI format 1 to predict transmission reoccurrence so as to assist their own resource selection.

As described above with reference to FIG. 24, during management of the V2X processes, a certain existing periodic service may be combined with a new periodic service or replaced by the new periodic service. When the CD reselects resources for a combined service or stops a replaced service, the resource reserved by the CD will change. In this case, if there is no mechanism to immediately broadcast resource changing information, other CDs are not aware of the change of the reserved resource until receiving a new SCI format 1 from the CD, and before that they may exclude resources that actually will not be used by the CD and choose conflicting resources.

In current 3GPP technical specifications, the SCI format 1 for transmitting control information is defined, including resource reservation information. However, the SCI is transmitted in a same subframe together with the data channel PSSCH, so it may be late for other CDs to learn if the resource reservation has changed.

According to the embodiments of the present disclosure, once the CD performs resource reselection for a combined service or stops a replaced service, it will send standalone SCI on the control channel PSCCH but without the data channel to broadcast information about its resource change to surrounding CDs (S2413). When receiving the SCI, the surrounding CDs can get accurate information about resource reservation and select their transmission resources with lower collision possibility.

The proposed SCI may have a same length as that of the SCI format 1 and may contain the following fields: a SCI usage flag field; a V2X logical subframe position for changing field; a frequency resource location for changing field; and a resource changing flag field. Specifically, the SCI usage flag field includes 1 bit: "0" indicating that the SCI is used as the legacy SCI format 1; and "1" indicating that the SCI is used to indicate resource reservation changing. When the SCI is used to indicate resource reservation changing (i.e. the SCI usage flag field has a value of "1"), the V2X logical subframe position for changing field includes 8 bits indicating an offset of the changed subframe to the currently allocated subframe; the frequency resource location for changing field includes $\lceil \log_2 N_{subchannel}^{SL}(N_{subchannel}^{SL}+1)/2 \rceil$ bits (maximally 8 bits) indicating the start and the length of the changed sub-channels; and the resource changing flag field includes 1 bit: "0" indicating that the resource will not be used and "1" indicating that the resource will start to be used. Here, $N_{subchannel}^{SL}$ means the total number of sub-channels in a configured TX resource pool.

Figure 26A:
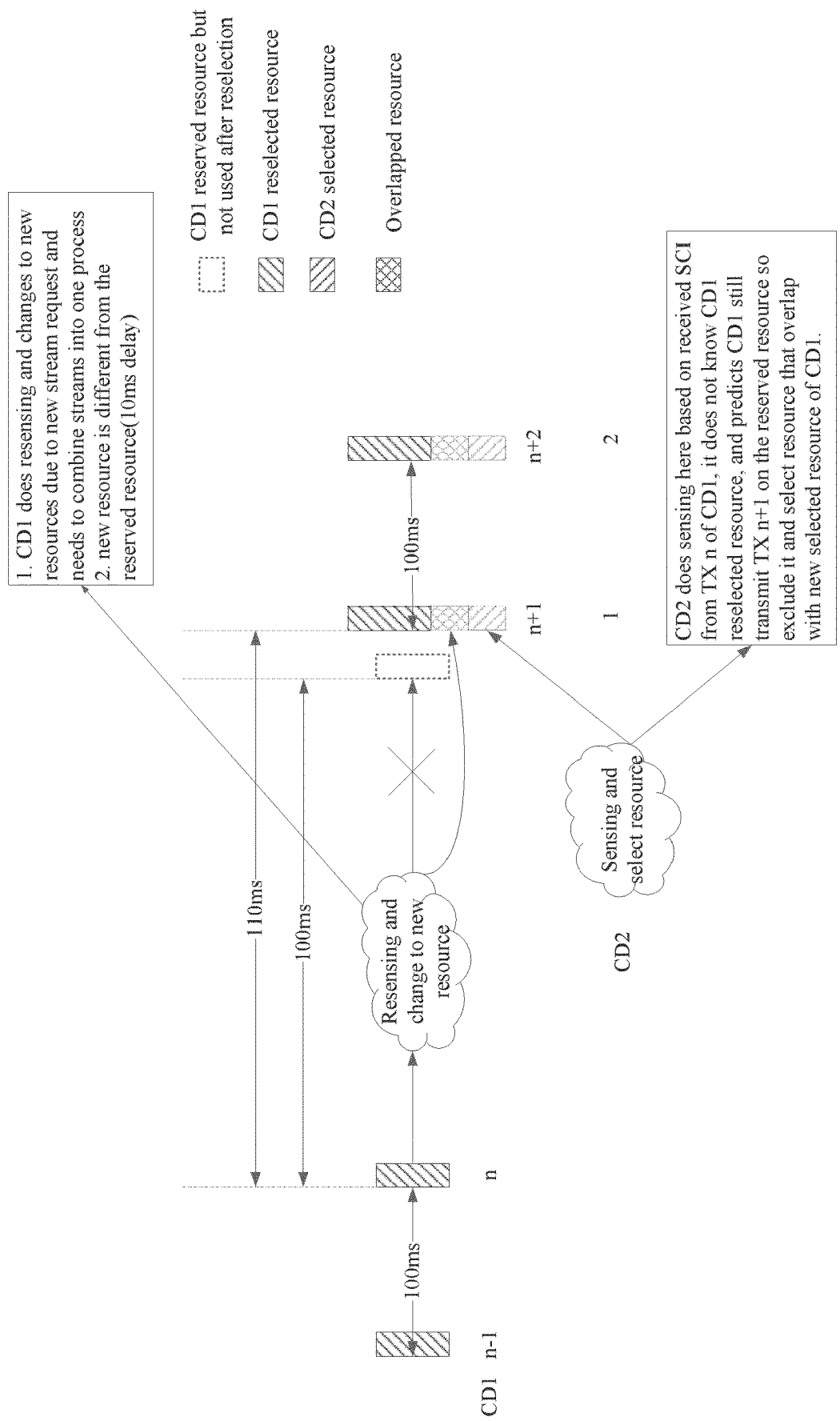
FIGS. 26a and 26b illustrate an advantageous effect of transmitting a standalone SCI on PSCCH as proposed in accordance with embodiments of the present disclosure.
Figure 26B:
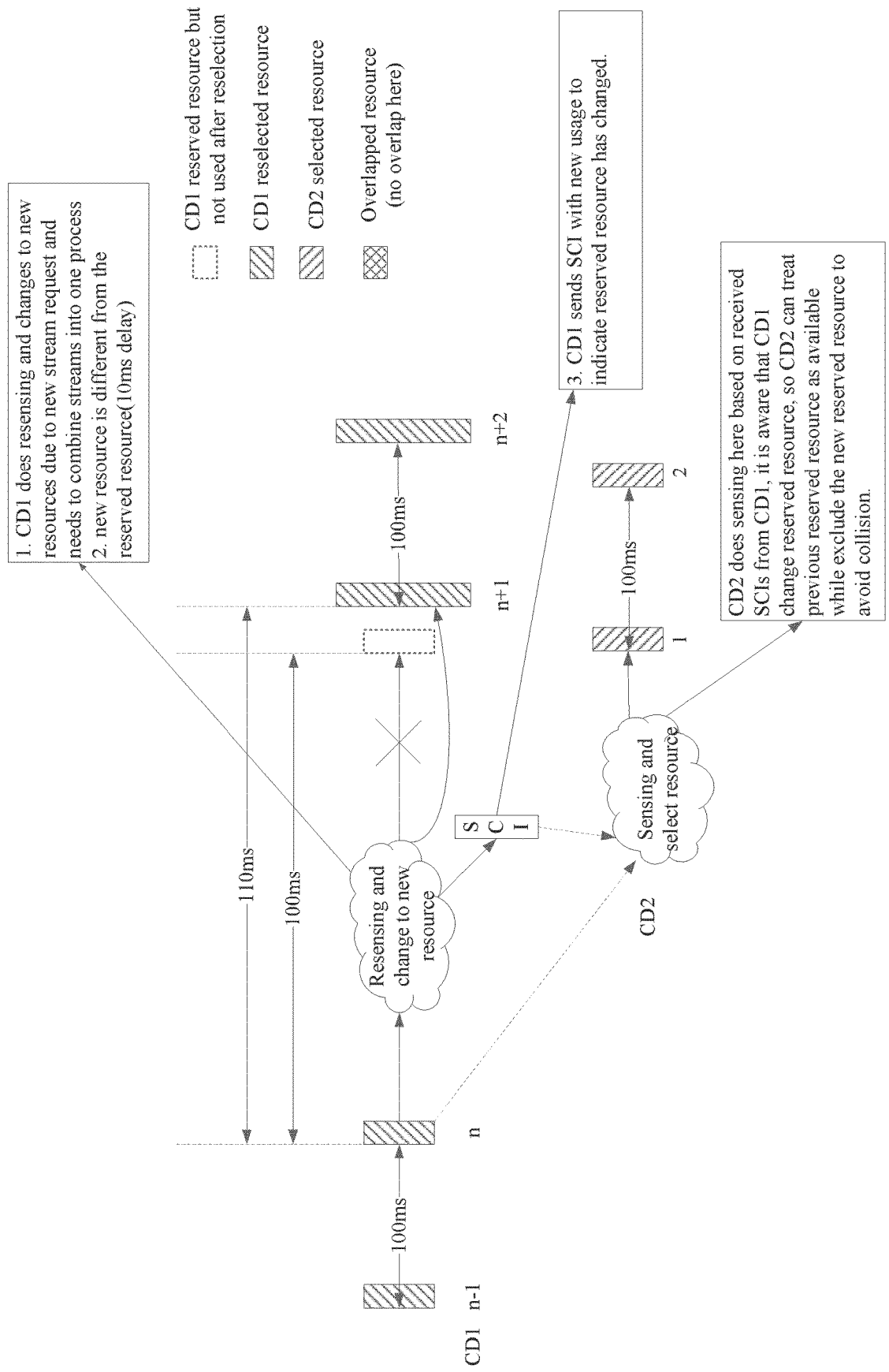

FIGS. 26a and 26b illustrate an advantageous effect of transmitting the standalone SCI on PSCCH as proposed in accordance with embodiments of the present disclosure.

As shown in FIG. 26a, CD1 performs resource reselection due to arrival of a new service stream and combines the new service stream with existing service streams into on-going processes. In this case, the reselected resource is different from the originally reserved resource, e.g. a reselected subframe has a 10 ms delay as compared to an originally reserved subframe. When another CD2 is going to select resources for its transmission, it will do sensing based on SCI received from a TX subframe n of CD1. At this time, the CD2 does not know the CD1 has reselected resource and the reserved resource has been changed. The CD2 predicts that the CD1 will still transmit a TX subframe n+1 on the reserved resource, so it excludes the reserved resource as predicted and selects resource that may overlap the reselected resource on CD1.

In contrast, as shown in FIG. 26b, the CD1 sends standalone SCI to indicate the change of the reserved resource once it performs resource reselection, and the other CD2 can receive the SCI immediately. In this case, the CD2 will do sensing based on the received SCI and thus be aware of the change of the reserved resource. So the CD2 can treat the previously reserved resource as available resource while excluding the new reserved resource to avoid collision.

Channel Estimation of V2X PSCCH

In V2X communication, a CD may use a sub-channel to communicate with other CDs or an access node. The sub-channel may include a PSCCH and a physical sidelink share channel (PSSCH). Two physical resource blocks (PRBs) may be used for the PSCCH in frequency domain. The number of PRBs used for the PSSCH may range from e.g., 3 PRBs to 96 PRBs, which is indicated by sidelink control information (SCI) from PSCCH. Thus PSCCH demodulation is the first step to finish V2X data communication.

Figure 27:
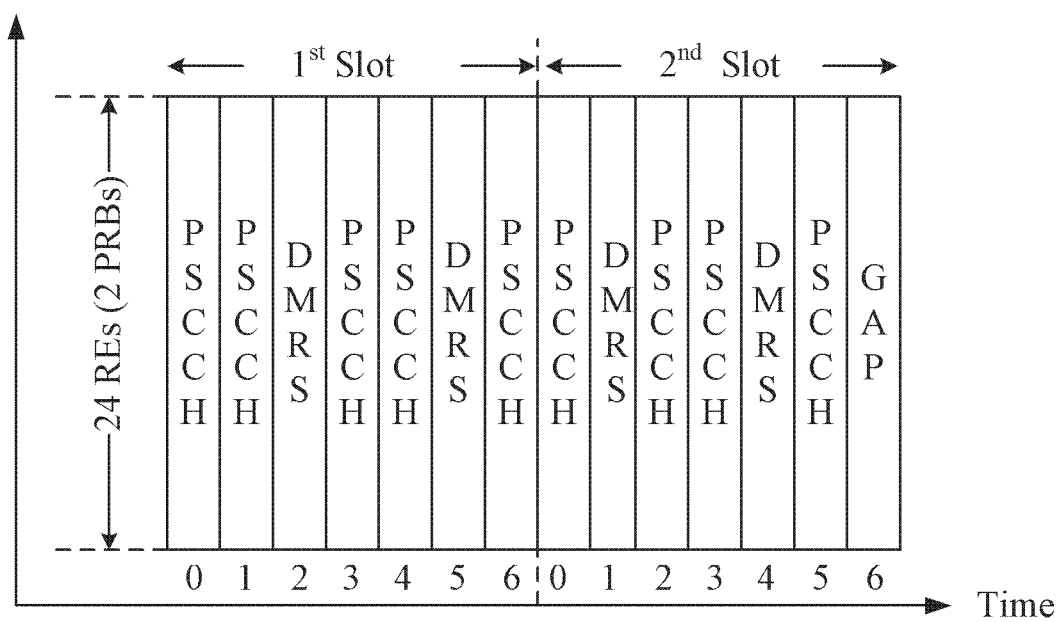
FIG. 27 shows a PSCCH frame structure in accordance with some embodiments.

FIG. 27 shows a PSCCH frame structure 2700 in accordance with some embodiments. In PSCCH demodulation, a demodulation reference signal (DMRS) for the PSCCH may be demodulated to implement correct demodulation and channel estimation of the PSCCH. PSCCH and corresponding DMRS are configured as shown in FIG. 27. In some embodiments, the PSCCH and DMRS may occupy 2 PRBs, i.e., 24 resource elements (REs). Demodulation of the DMRS may be used to perform channel estimation, and then the PSCCH may be demodulated with the result of the channel estimation.

In V2X communication, a CD may sense a plurality of resource units (e.g., 2 PRBs per resource unit as shown in FIG. 27) to detect which resource units are available for transmission of PSCCH. A resource unit may include a sub-channel herein. The CD may sort the sensed plurality of resource units in descending order of sensed energy corresponding to each of the plurality of resource units. The CD then may transmit the PSCCH via one of last N (a positive integer) resource units from the sorted resource units. For example, 3GPP permits CD to send a PSCCH via a sub-channel with lower energy value which is sorted within last 20% among the plurality of sub-channels. As a result, it is possible that two CDs may send PSCCHs on the same sub-channel, which causes a colliding scenario. To reduce colliding possibility, a random circular shift (CS) candidate may be used to perform phase-rotation for the DMRS. There may be several CS candidates. For example, four CS candidates 0, 3, 6 and 9 may be used for the DMRS.

The above description is directed to a transmitting CD. For a receiving CD, it may determine the CS candidate used by the transmitting CD for correct demodulation of the DMRS and further for correct demodulation of the PSCCH.

For the receiving CD, it may demodulate a plurality of sub-channels in one subframe. The number of sub-channels the CD may process in one subframe may depend on capability of the CD. In some embodiments, the CD may demodulate up to 20 sub-channels in one subframe. Therefore, complexity and efficiency of CS detection for each PSCCH on each sub-channel will be a key issue.

A common solution for CS detection is frequency-domain-only based solution. In this solution, the receiving CD may attempt to demodulate the DMRS in frequency domain with each of the CS candidates, that is, the receiving CD may detect the CS candidate used by the transmitting CD blindly. The number of attempts may be based on the number of CS candidates. In some embodiments, four CS candidates 0, 3, 6 and 9 may be used for the DMRS. In the embodiments, four attempts of demodulation with the four candidates CSs are performed to demodulate the DMRS and then four demodulation results may be obtained. For each of the four demodulation results, low pass filtering may be performed via a low pass filter (LPF) to obtain filtering results, each of which corresponds to respective CS candidate. After four times low pass filtering, power of each filtering result in frequency domain may be compared with each other and the CS candidate with the biggest power may be selected as the expected CS that is used by the transmitting CD.

There are several disadvantages in the above common solution. In one aspect, the solution above is only directed to frequency domain. To obtain better anti-noise performance, longer filter taps will be designed. However, complexity of calculation also increases with longer filter taps. Moreover, 4 times attempts could make such complexity 4 times increasing. For example, if the LPF is designed as 8 taps with 1 quarter pass band for low complexity, the amplitude of stop band is not low enough and more noise and interference will be counted in; if LPF is designed as 24 taps (full size of PSCCH and DMRS), the calculation complexity will increase to 4 times and result in longer calculation latency.

In another aspect, time offset estimation (TOE) performance is poor as in the common solution. As the PSCCH only occupies 2 PRBs, i.e., 24 REs, as shown in FIG. 27, tradeoff between anti-noise performance and power leakage caused by small size will be a problem. The common frequency-domain-only based solution could not get good performance by optimizing anti-noise performance and reducing power leakage. As a result, the TOE may be not accurate enough to perform further channel estimation as well as demodulation.

In yet another aspect, the frequency-domain-only based solution could not separate two colliding PSCCHs easily and effectively, which reduces success rate of decoding of PSCCH. However, successfully decoding PSCCH is very important to V2X to detect as many useful sub-channels (which correspond to CDs) as possible.

According to embodiments of the present disclosure, optimization in both of calculation complexity and performance may be enhanced.

Figure 28:
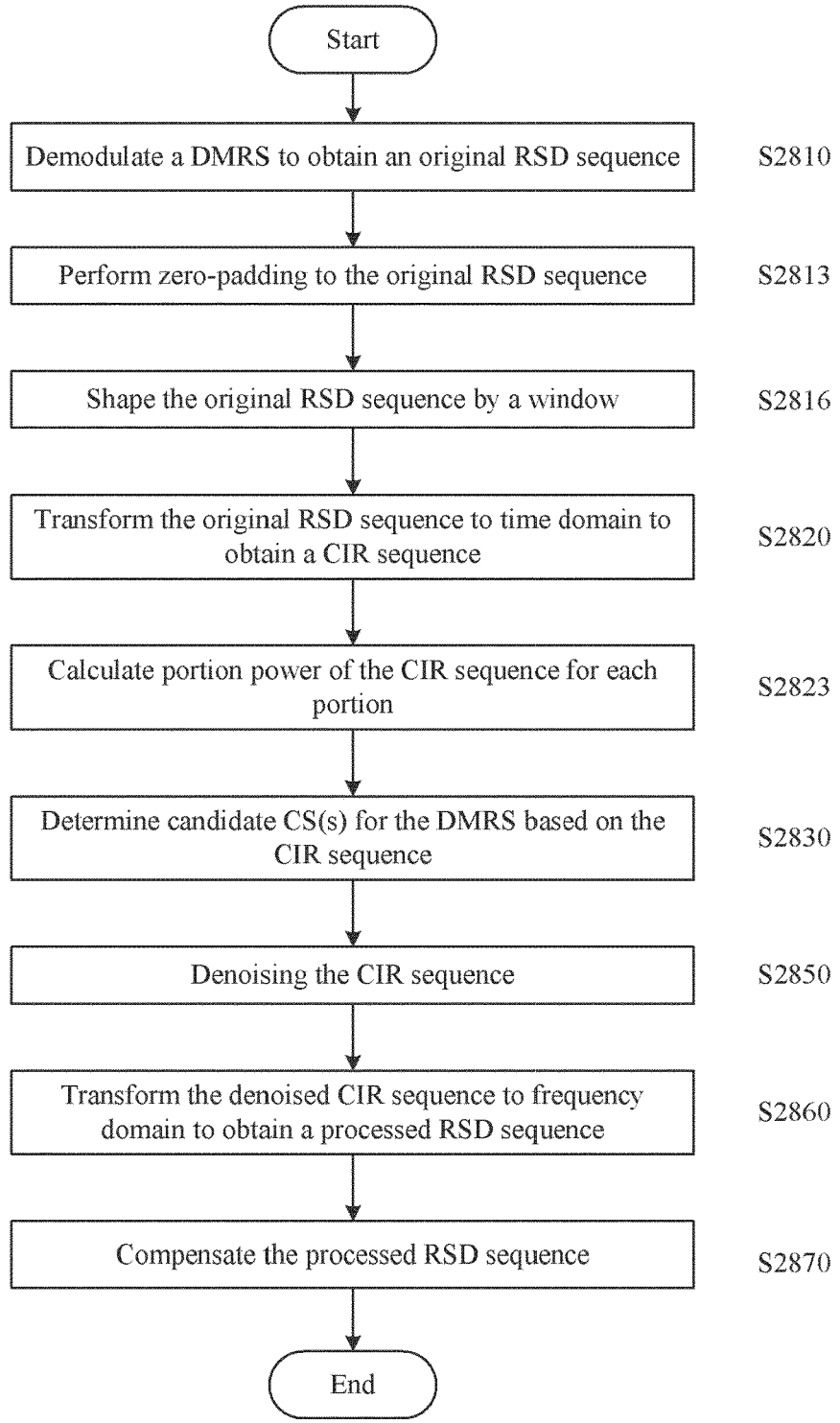
FIG. 28 is a flow chart showing a method for channel estimation of V2X PSCCH in accordance with some embodiments of the disclosure.

FIG. 28 is a flow chart showing a method 2800 for channel estimation of V2X PSCCH in accordance with some embodiments of the disclosure. The method 2800 of FIG. 28 may be used for a CD (e.g. CD 110) to determine a CS for a DMRS used by a transmitting CD (e.g., CD 121, CD 122 or CD 123).

CD 110 may, at S2810, demodulate a DMRS for a PSCCH in frequency domain through a constant sequence with a specific CS of a set of CS candidates, to obtain an original DMRS-demodulation (RSD) sequence.

In some embodiments, the constant sequence with a specific CS may include a Zadoff-Chu sequence which is phase-rotated with the specific CS. The specific CS may be selected from the set of CS candidates. In some embodiments, the set of CS candidates may include CSs 0, 3, 6 and 9. In some embodiments, CS 0 may be used as the specific CS with which the constant sequence may be phase-rotated. However, other CS candidates may also be selected as the specific CS. The embodiments are not limited in this respect.

The original RSD sequence may be expressed as RSD_original, (i=0, . . . , n), where n is a positive integer. The length of the original RSD sequence is n+1.

As the DMRS has been phase-rotated by one or two transmitting CDs (e.g. one or two of CD 121, CD 122 and CD 123) with one or both of a first CS candidate and a second CS candidate of the set of CS candidates, CD 110 needs to determine CS candidate(s) for the DMRS.

At S2820, CD 110 may transform the original RSD sequence from frequency domain to time domain to obtain a Channel Impulse Response (CIR) sequence $CIR_i$. In some embodiments, CD 110 may perform Inverse Fast Fourier Transform (IFFT) algorithm to the original RSD sequence to obtain the CIR sequence in time domain. In other embodiments, other algorithms may be used to transform the original RSD sequence from frequency domain to time domain. The embodiments are not limited in this respect.

In an optional embodiment, prior to transforming the original RSD sequence from frequency domain to time domain, CD 110 may, at S2813, perform zero-padding to the original RSD sequence to increase the length of the original RSD sequence. In some embodiments, several zeros may be added to both sides of the original RSD sequence. For example, the length of the original RSD sequence is 24, and then 8 zeros may be added to both sides to obtain a sequence length of which is 32. The number of zeros to be added to the original RSD sequence may be determined based on a tradeoff between calculation complexity and minimum frequency resolution for the IFFT.

In an optional embodiment, prior to transforming the original RSD sequence from frequency domain to time domain, CD 110 may, at S2816, shape the original RSD sequence by a window to concentrate energy of the original RSD sequence. In some embodiments, the window may include a Hanning window. In some embodiments, the window may include a Gaussian window. Other windows may also be used to shape the original RSD sequence. The embodiments are not limited in this respect.

The original RSD sequence is shaped by the window to obtain a windowed RSD sequence $RSD\_w_i$. In some embodiments, $RSD\_w_i = w_i * RSD\_original$, (i=0, . . . , m), where m is a positive integer. In an embodiment where zero-padding is performed before the shaping, m is greater than n, otherwise, m is equal to n. In some embodiments, $w_i$ may be a constant for respective element i (i=0, . . . , m).

After S2820, the CIR sequence $CIR_i$ is obtained in time domain. CD 110 may, at S2830, determine one or both of the first CS candidate and the second CS candidate for the DMRS based on the CIR sequence $CIR_i$ in time domain.

In time domain, the CIR sequence $CIR_i$ may be divided into a number of portions. The number of the portions in time domain may be equal to the number of the CS candidates within the set of CS candidates, and each CS candidate may correspond to respective portion in time domain.

In some embodiments, CD 110 may, at S2823, calculate portion power of the CIR sequence $CIR_i$ for each of the number of portions. CD 110 then may determine the one or both of the first CS candidate and the second CS candidate used for the DMRS based on the portion power of the CIR sequence $CIR_i$ for each of the number of portions in time domain.

In some embodiments, to calculate portion power of the CIR sequence $CIR_i$ for each of the number of portions, CD 110 may calculate element power of each element of the CIR sequence $CIR_i$; and accumulate the element power of each element of the CIR sequence $CIR_i$ that falls in respective portion to obtain the portion power for the respective portion.

For example, the element power of each element may be calculated as following Equation (1).

$$Pow_i = real(CIR_i)*real(CIR_i) + imag(CIR_i)*imag(CIR_i) \quad (6)$$

In some embodiments, CD 110, after obtaining the portion power for respective portion, may calculate a first ratio R1 of the highest portion power with the second highest portion power, calculate a second ratio R2 of the second highest portion power with average of remaining portion power, calculate a third ratio R3 of the first ratio R1 with the second ratio R2, and determine whether there is one CS candidate or two CS candidates used for the DMRS based on the third ratio R3.

In specifically, when the third ratio R3 is greater than a threshold, CD 110 may determine that only one CS candidate is used for the DMRS and the CS candidate is the one corresponding to the portion with the highest portion power. When the third ratio R3 is smaller than or equal to the threshold, CD 110 may determine that two CS candidates are used for the DMRS and the two CS candidates are the ones respectively corresponding to the portions with the highest portion power and the second highest portion power.

CD 110 may determine CS candidate(s) for the DMRS through some of the processes above, so that two PSCCHs transmitted by two CDs with two different CSs in the same sub-channel may be separated. Then CD 110 may use the determined CS candidate(s) to demodulate the DMRS correctly, without attempting each of CS candidates in the set of CS candidates.

The method 2800 is mainly directed to processes in time domain. Compared with the common frequency-domain-only based solution, the method 2800 may also improve anti-noise performance.

In some embodiments, CD 110 may, at S2850, denoise the CIR sequence $CIR_i$. In some embodiments, for example, CD 110 may, for each portion corresponding to the determined CS candidate(s), null (e.g. by zero-forcing) the other portions to obtain a denoised CIR sequence $CIR\_denoised_i$, so that noise is removed coarsely for respective CS candidate(s) to further enhance channel estimation performance.

In some embodiments, CD 110 may, at S2860, transform the denoised CIR sequence $CIR\_denoised_i$ from time domain to frequency domain to obtain a processed RSD sequence $RSD\_processed_i$. In some embodiments, CD 110 may perform Fast Fourier Transform (FFT) algorithm to the denoised CIR sequence $CIR\_denoised_i$ to obtain the processed RSD sequence $RSD\_processed_i$. In other embodiments, other algorithms may be used to transform the denoised CIR sequence $CIR\_denoised_i$ from frequency domain to time domain. The embodiments are not limited in this respect.

As can be seen, the processed RSD sequence $RSD\_processed_i$ has been noise-removed coarsely, so that channel estimation may be performed precisely.

In some embodiments, CD 110 may, at S2870, compensate the processed RSD sequence by dewindowing in order to recover channel information for demodulating and decoding respective PSCCH. For example, to dewindow, each element i of the processed RSD sequence $RSD\_processed_i$ may be multiplied with respective constant $dw_i$. The constant $dw_i$ may be an inverse of corresponding $w_i$.

Figure 29:
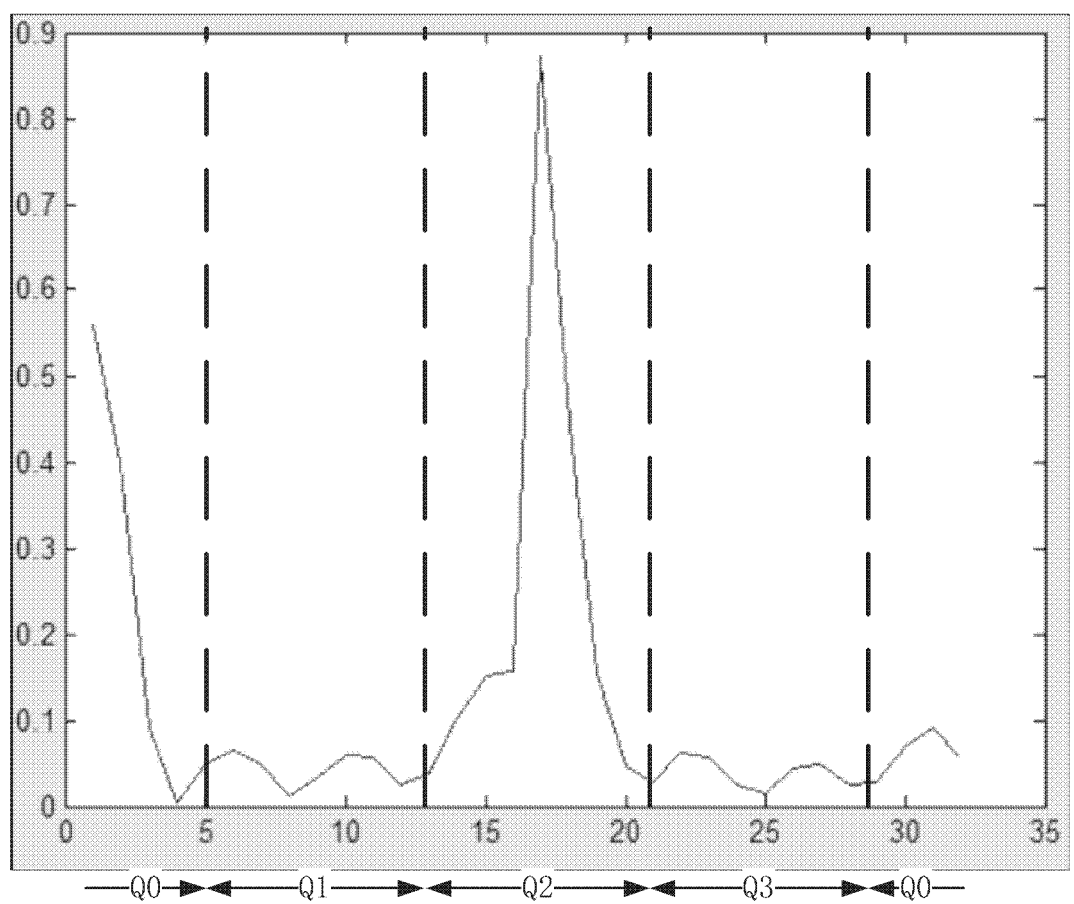
FIG. 29 shows an example of CS detection in accordance with some embodiments of the disclosure.
Figure 30:
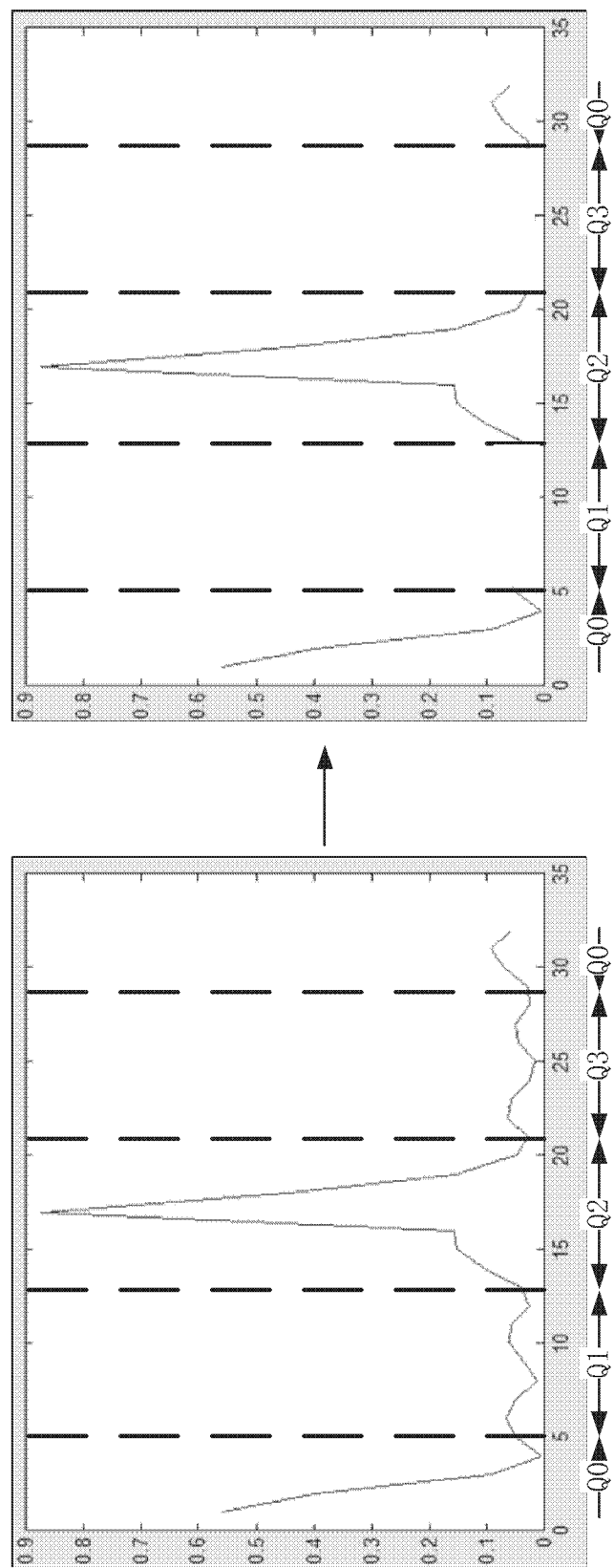
FIG. 30 shows an example of denoising for CIR sequence in accordance with some embodiments of the disclosure.
Figure 31:
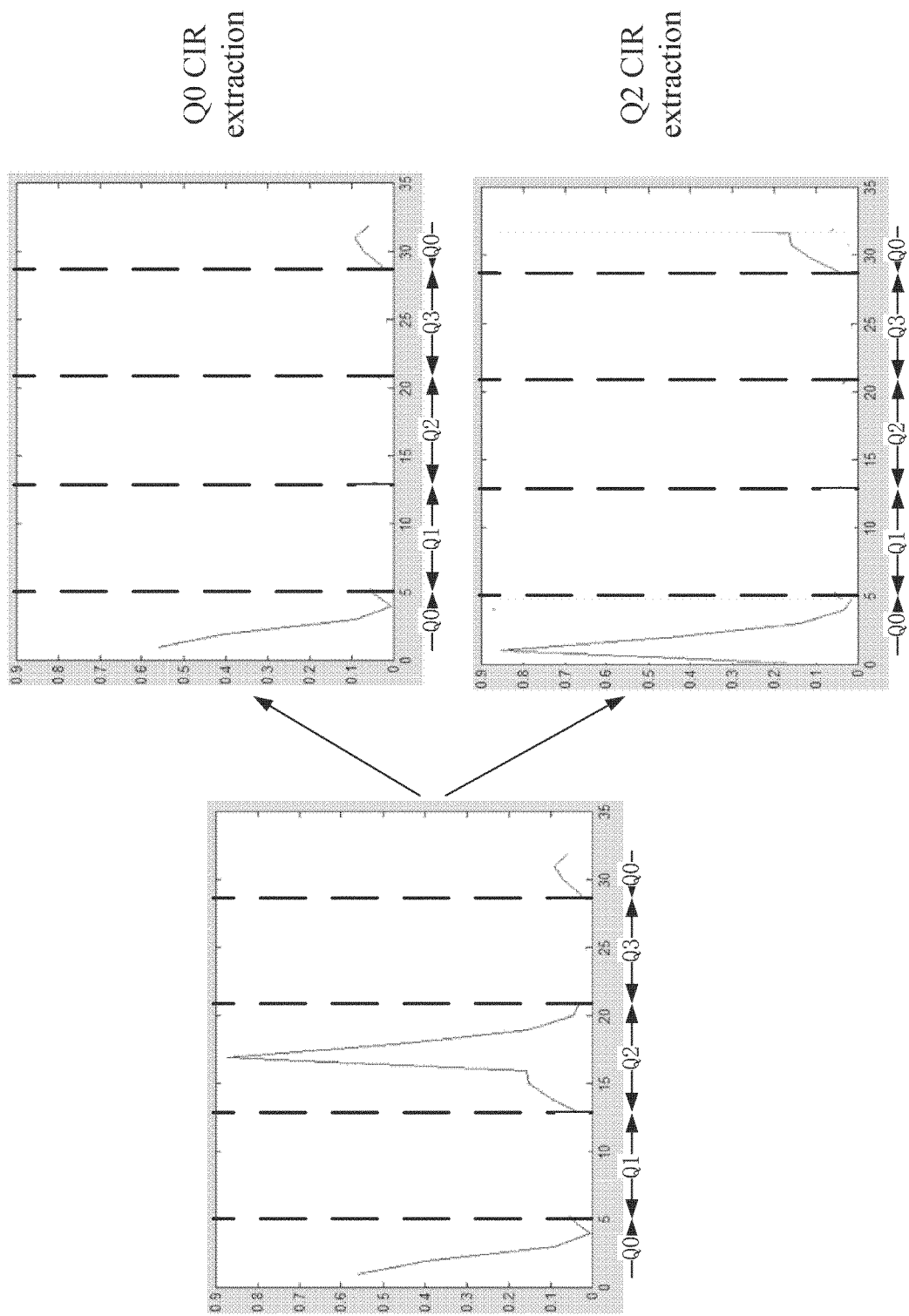
FIG. 31 shows an example of adjustment of portion location in accordance with some embodiments of the disclosure.

FIGS. 29-31 below show examples of a part of implementation of method 2800.

FIG. 29 shows an example of CS detection in accordance with some embodiments of the disclosure.

In FIG. 29, the horizontal axis represents elements of a CIR sequence in time domain, and the vertical axis represents element power of respective element. In the example of FIG. 29, the set of CS candidates may include four CS candidates, e.g., 0, 3, 6 and 9. Thus, there may be four portions in time domain. In this embodiment, the four portions may also be referred as to four quarters, i.e., Q0, Q1, Q2 and Q3, which are divided by dashed lines as shown in FIG. 29. Each of the four quarters corresponds a respective CS candidate. Q0 corresponds to CS candidate 0, Q1 corresponds to CS candidate 3, Q2 corresponds to CS candidate 6, and Q3 corresponds to CS candidate 9.

After transforming the original RSD sequence to time domain, the CIR sequence may be obtained. CD 110 may calculate element power of each element of the CIR sequence $CIR_i$ as Equation (6).

As shown in FIG. 29, Q0 include elements 0, 1, 2, 3, 4, 29, 30 and 31; Q1 include elements 5, 6, 7, 8, 9, 10, 11 and 12; Q2 include elements 13, 14, 15, 16, 17, 18, 19, 20; and Q3 include elements 21, 22, 23, 24, 25, 26, 27 and 28. CD 110 then may accumulate the element power of each element of the CIR sequence $CIR_i$ that falls in respective quarter to obtain the portion power for the respective quarter.

After obtaining the portion power for respective quarter, CD 110 may calculate a first ratio R1 of the highest portion power (the portion power of Q2, $P_{Q2}$) with the second highest portion power (the portion power of Q0, $P_{Q0}$), i.e., $R1=P_{Q2}/P_{Q0}$. CD 110 may calculate a second ratio R2 of the second highest portion power $P_{Q0}$ with average of remaining portion power (the portion power of Q1 ($P_{Q1}$) and the portion power of Q3 ($P_{Q3}$)), i.e., $R2=P_{Q0}/$average ($P_{Q1}+P_{Q3}$). CD 110 then may calculate a third ratio R3 of the first ratio R1 with the second ratio R2, i.e., R3=R1/R2, and determine whether there is one CS candidate or two CS candidates used for the DMRS based on the third ratio R3 and a threshold. The threshold may be determined based on Signal Noise Ratio (SNR) requirement.

Specifically, when the third ratio R3 is greater than the threshold, CD 110 may determine that only one CS candidate is used for the DMRS and the CS candidate is 6, which corresponds to Q2. When the third ratio R3 is smaller than or equal to the threshold, CD 110 may determine that two CS candidates are used for the DMRS and the two CS candidates are 6 and 0, which respectively correspond to Q2 and Q0.

FIG. 30 shows an example of denoising for CIR sequence in accordance with some embodiments of the disclosure.

Based on the embodiments in FIG. 29, in the case that R3 is smaller than or equal to the threshold, CD 110 then may determine that two CS candidates are used for the DMRS and the two CS candidates are 6 and 0, which respectively correspond to Q2 and Q0.

CD 110 may null Q0, Q1 and Q3 to extract a denoised CIR sequence that corresponds to Q2, so that noise is removed coarsely for the PSCCH corresponding to CS candidate 6 to further enhance channel estimation performance of the PSCCH. Similarly, CD 110 may null Q1, Q2 and Q3 to extract a denoised CIR sequence that corresponds to Q0, so that noise is removed coarsely for the PSCCH corresponding to CS candidate 0 to further enhance channel estimation performance of the PSCCH.

FIG. 31 shows an example of adjustment of portion location in accordance with some embodiments of the disclosure.

Based on the embodiments in FIG. 30, elements of each of Q2 and Q0 are extracted by nulling the other quarters. The elements of at least one of Q2 and Q0 need to be adjusted to a certain quarter, as the constant sequence, which is used to demodulate the DMRS by the transmitting CD, has been phase-rotated with one specific CS. The certain quarter is related to the specific CS. In an embodiment, for example, the specific CS is 0, then there is no need for the elements of Q0 to adjust portion location, as shown by "Q0 CIR extraction" in FIG. 31. However, the elements of Q2 need to be adjusted to Q0, which corresponds to the specific CS 0, for further process, as shown by "Q2 CIR extraction" in FIG. 31.

With the methods of channel estimation of V2X PSCCH in the present disclosure, CD 110 may separate two PSCCHs transmitted by two CDs with two different CSs in the same sub-channel by transforming from frequency domain to time domain. In addition, CD 110 may denoise the CIR sequence in time domain coarsely by nulling some portions to extract elements of an expected portion that corresponds to an expected CS candidate. As a result, both of channel estimation performance and TOE performance may be improved.

Selection of PSCCH Candidates

A sub-channel may serve as a resource unit for PSCCH. The number of sub-channels, which a CD may demodulate in one subframe, is limited. It may depend on capability of the CD. For example, the CD may demodulate up to 20 sub-channels in one subframe based on 3GPP standards. Thus, selection of PSCCH for further demodulating and decoding is important due to the limit capability in this respect.

In V2X communication, it is possible that two CDs may send respective PSCCHs on the same sub-channel, which may cause a colliding scenario. To reduce colliding possibility, a random candidate circular shift (CS) from a set of candidates CSs (e.g., 0/3/6/9) may be used by each CD to perform phase-rotation for the DMRS.

For a receiving CD, it may determine the CS candidate(s) used by the transmitting CD(s) for correct demodulation of the DMRS and further for correct demodulation of the PSCCH.

A common solution for CS detection is to detect the CS candidate(s) used by the transmitting CD(s) blindly. In usual, the CS with biggest power peak among all the CS candidates is most-likely determined to be the CS candidate used by the transmitting CD for its corresponding PSCCH. As a result, there may be only one PSCCH detected in a sub-channel as only the CS with biggest power peak is determined.

However, as mentioned above, there may be two CDs that use the same sub-channel to transmit respective PSCCHs with different CSs. The common solution may only determine one PSCCH, as a result, another valid PSCCH in the same sub-channel will be missed.

In addition, with the common solution, for each sub-channel, one PSCCH must be determined even though the PSCCH is non-existing. As a result, an invalid PSCCH will be selected for further process, thus calculation resource will be wasted.

Figure 32:
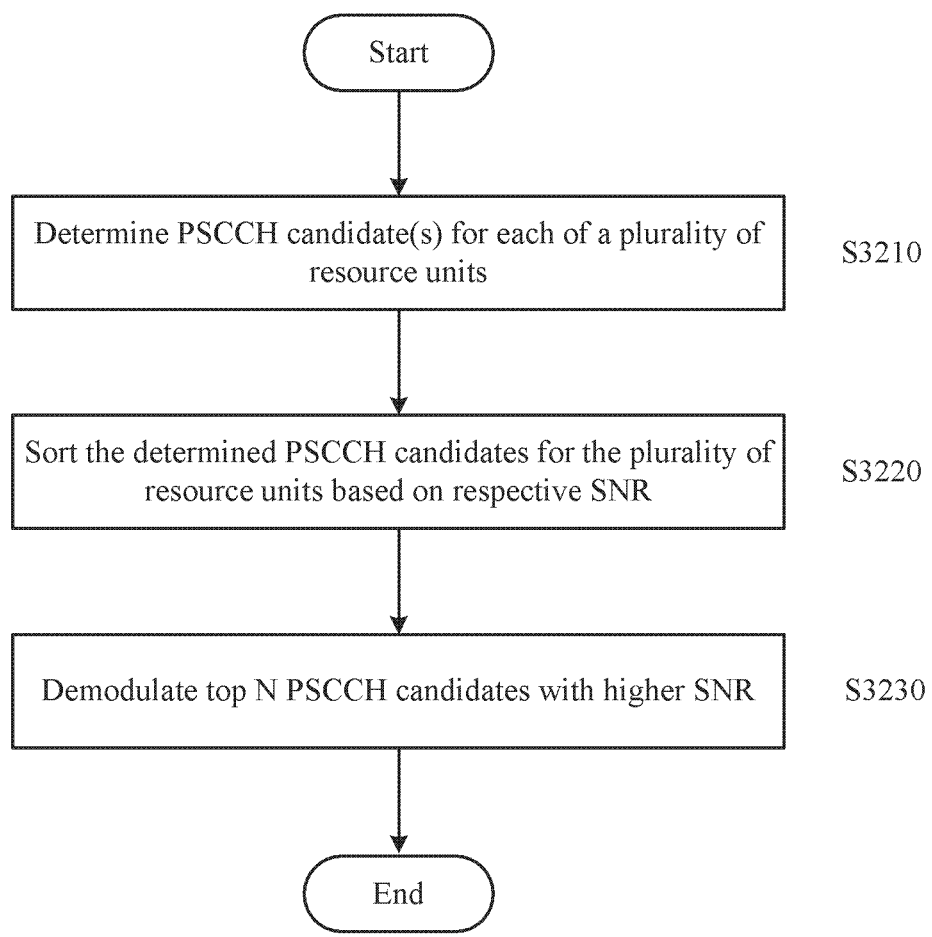
FIG. 32 is a flow chart showing a method for selection of PSCCH candidates in accordance with some embodiments of the disclosure.

FIG. 32 is a flow chart showing a method 3200 for selection of PSCCH candidates in accordance with some embodiments of the disclosure.

CD 110 may, at S3210, determine one or two PSCCH candidates for each of a plurality of resource units.

In some embodiments, CD 110 may determine one or two PSCCH candidates for each resource unit by determining the CS candidate(s) for the DMRS at S2830. In specifically, if only one CS candidate is determined for the DMRS for a resource unit, it is determined that only one PSCCH candidate corresponding to the CS candidate is selected for the resource unit. Alternatively, if two candidates CSs are determined for the DMRS for the resource unit, it is determined that two PSCCH candidates respectively corresponding to the two CS candidates are selected for the resource unit. The embodiments of the method 2800 may be applicable in the method 3200.

At S3220, CD 110 may sort the determined PSCCH candidates for the plurality of resource units in descending order of SNR corresponding to each of the PSCCH candidates. The sorting of the PSCCH candidates is to select PSCCH candidates with higher SNR, thus, CD 110 may also sort them in ascending order of SNR corresponding to each of the PSCCH candidates. The embodiments of the disclosure are not limited in this respect.

CD 110 may obtain portion power of the CIR sequence $CIR_i$ for each of the number of portions by calculation at S2823. Based the portion power of each of the portions, noise of the CIR sequence may be calculated.

In some embodiments, the noise of the CIR sequence may be calculated as average of element power among the portions other than the ones with the highest portion power and the second highest portion power, i.e., average of element power of each element of the CIR sequence in portions corresponding to the remaining portion power above. Thus, assuming the total number of the portions divided in time domain is W, the number of the portions, which are involved in the calculation of the noise of the CIR sequence may be W-2.

For example, based on the example of FIG. 29, the noise of the CIR sequence $N_{var}$ may be calculated as following Equation (7).

$$N_{var} = \frac{P_{Q1} + P_{Q3}}{16} \tag{7}$$

Here, 16 represents total number of elements in Q1 and Q3, as in FIG. 29, each quarter includes 8 elements In some embodiments, SNR for the portion(s) corresponding to the determined CS candidate(s) may be calculated based on respective portion power and the noise of the CIR sequence. In other words, SNR corresponding to the determined PSCCH candidate(s) for each of the plurality of the resource units may be calculated.

For example, based on the example of FIG. 29, the SNR of Q2 may be calculated as following Equation (8).

$$SNR_{Q2} = \frac{P_{Q2}}{8 * N_{var}} - 1 \tag{8}$$

In some embodiments, for each sub-channel, a CS corresponding the portion with the highest portion power may be selected. Thus, in the above example, SNR of Q2 is calculated. However, if a CS corresponding the portion with the second highest portion power is not selected due to comparison between R3 and the threshold, the SNR of the portion with the second highest portion power may not be calculated. In other words, only the SNR of the portion(s) corresponding to the CS candidate(s) determined at S2830 may be calculated.

After obtaining the SNR corresponding to the determined PSCCH candidate(s) for each of the plurality of the resource units, CD 110 may, at S3230, demodulate top N PSCCH candidates with higher SNR. N is a positive integer. The number of PSCCH candidates carried on respective resource units may be equal to or greater than the number of the resource units. For example, there may be 20 sub-channels. However, the number of PSCCH candidates detected from the 20 sub-channels may range from 20 to 40. CD 110 then may demodulate only top 20 PSCCH candidates with higher SNR.

As mentioned above, for each resource unit (e.g., a sub-channel), at least one CS candidate may be determined, and thus at least one PSCCH corresponding to the CS candidate may be selected as a PSCCH candidate for further sorting. However, a selected PSCCH candidate may not be demodulated if it is not within the top N based on its SNR, even when it is the only PSCCH for respective resource unit. As a result, such a PSCCH candidate may be regarded as invalid PSCCH. Alternatively, the selected PSCCH candidates that are within the top N after sorting may be regarded as valid PSCCHs and may be demodulated and decoded for channel information.

Figure 33:
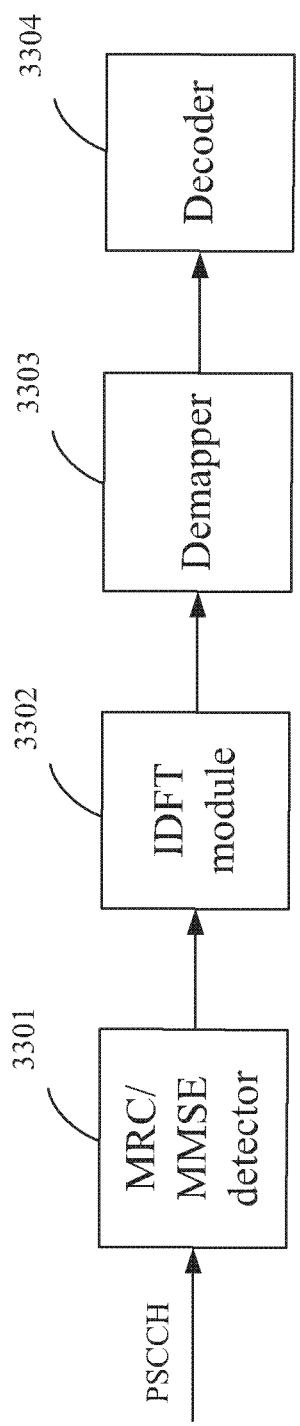
FIG. 33 shows an example of processing apparatus for PSCCH in accordance with some embodiments of the disclosure.

FIG. 33 shows an example of processing apparatus for PSCCH in accordance with some embodiments of the disclosure.

The processing apparatus may include a maximal ratio combination (MRC)/minimum mean square error (MMSE) detector 3301, an Inverse Discrete Fourier Transform (IDFT) module 3302, a demapper 3303 and a decoder 3304.

The top N valid PSCCH candidates may be processed by the processing apparatus. Among the N PSCCH candidates, if two PSCCH candidates are from the same resource unit (e.g., the same sub-channel), MMSE algorithm will be implemented in the MRC/MMSE detector 801 to cancel interference between each other to separate them for further processing; if only one PSCCH candidate comes from a resource unit, MRC algorithm will be implemented in the MRC/MMSE detector 3301. In some embodiments, a flag may be used to indicate whether there is one or two PSCCH candidates for each resource unit.

After the MRC/MMSE detector 3301, the valid PSCCHs may be inputted into the IDFT module 3302 to recover constellation samples, then they may be inputted into the demapper 3303 to get log-likehood-ratio (LLR), which may be sent to the decoder 3304 to obtain expected information.

In the methods for selection of PSCCH candidates in the present disclosure, two PSCCH candidates may be separated and thus valid PSCCHs will not be missed. Also, invalid PSCCHs may be dropped to avoid waste of calculation resource.

Selecting Reference ue Candidates in V2X Communication

In a V2X communication, when there is no base station or Global Navigation Satellite System (GNSS), or a signal received therefrom is too weak to detect, a CD which supports sidelink (SL) transmission needs to determine a reference CD and then synchronize to the reference CD in time and frequency, so as to avoid interfering with other CDs. When the CD has not yet synchronized with a reference CD, or when the CD has already synchronized with a reference CD but needs to monitor other potential reference CD candidates for possible reselection while a signal received from the current reference CD becomes too weak, detecting one or more reference CD candidates is needed.

In a V2X communication, a CD often needs to detect all reference CD candidates for the CD and then select a reference CD among all the reference CD candidates prior to synchronizing with the reference CD in time and frequency. Alternatively, after detecting all reference CD candidates for the CD, reference CD candidates among all the reference CD candidates which have better signal qualities can be chosen to form a set of preferable reference CD candidates. In this way, the CD can directly select a reference CD among the set of preferable reference CD candidates rather than among all the reference CD candidates, which may increase the efficiency of selecting a proper reference CD.

To determine a set of preferable reference CD candidates for use in selection of a reference CD, a constant threshold can often be applied for choosing members of the set among all the reference CD candidates, and the constant threshold is often directly based on correlation results for synchronization signals of all the reference CD candidates. By using a constant threshold to detect a set of preferable reference CD candidates, it is hardly to get a good trade-off between a misdetection rate and a false detection rate, and using a constant threshold will usually be bias to the misdetection rate (namely, with a lower misdetection rate) while more fake reference CD candidates may be detected as members of the set of preferable reference CD candidates. This might cause the CD to synchronize with an improper reference CD which might lead to an increased latency, or even worse might cause the CD to synchronize with a non-existing synchronization source which might lead to a failure in synchronizing. Therefore, there is a general need to reliably determine a set of preferable reference CD candidates without introducing fake reference CD candidates.

The present disclosure provides approaches to determine a set of preferable reference CD candidates reliably. In accordance with some embodiments of the disclosure, a metric value may be calculated for each of one or more reference CD candidates among all reference CD candidates for the CD based on Primary Sidelink Synchronization Signals (PSSSs) for all the reference CD candidates, and Secondary Sidelink Synchronization Signals (SSSSs) for the one or more reference CD candidates. In accordance with some embodiments of the disclosure, each metric value may be calculated based on corresponding correlation results, AGC gains, and frame times for the one or more reference CD candidates or all the reference CD candidates. Then a subset of reference CD candidates, namely a set of preferable reference CD candidates, may be determined from the one or more reference CD candidates based on the metric values for the one or more reference CD candidates for use in subsequent time and frequency synchronization. At least some embodiments of the disclosure allow for determining a set of preferable reference CD candidates reliably for use in determining a proper reference CD quickly, and allow for reducing the possibility of failing in synchronizing in a V2X communication.

Figure 34:
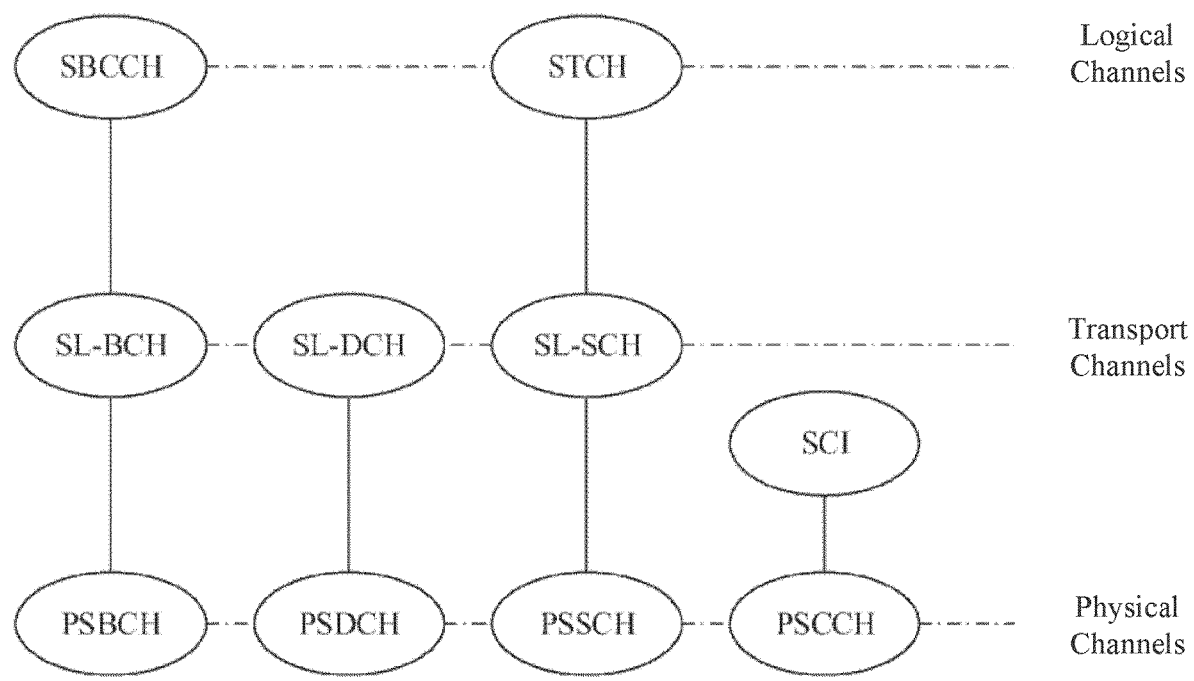
FIG. 34 shows channel mapping for physical, transport, and logical channels for a V2X communication in accordance with some embodiments of the disclosure.

FIG. 34 shows channel mapping for physical, transport, and logical channels for a V2X communication in accordance with some embodiments of the disclosure.

The physical channels for a V2X communication may include Physical Sidelink Broadcast Channel (PSBCH), Physical Sidelink Discovery Channel (PSDCH), Physical Sidelink Shared Channel (PSSCH), and Physical Sidelink Control Channel (PSCCH). The PSBCH carries the system and synchronization related information transmitted from a transmitting CD. The PSBCH is the channel responsible for the discovery phase of a V2X communication. The PSDCH carries the Proximity Service (ProSe) discovery message from the CD. The PSCCH carries the Sidelink Control Information (SCI) block which is responsible for carrying the control information for a CD for ProSe direct communication. The PSSCH carries data for a V2X communication.

The transport channels may include Sidelink Broadcast Channel (SL-BCH), Sidelink Discovery Channel (SL-DCH), and Sidelink Shared Channel (SL-SCH). The SL-BCH is mapped onto the PSBCH, the SL-DCH is mapped onto the PSDCH and the SL-SCH is mapped onto the PSSCH. The SL-BCH is a predefined transport format, as is the SL-DCH, which provides a pre-defined format for broadcast information. The SL-SCH provides support for the broadcast transmission.

The logical channels may include Sidelink Broadcast Control Channel (SBCCH) and Sidelink Traffic Channel (STCH). The SBCCH is mapped onto the SL-BCH and the STCH is mapped onto the SL-SCH. The STCH is a point to multipoint channel for transfer of user information from one CD to other CDs. This channel may only be used by ProSe capable CDs.

Figure 35:
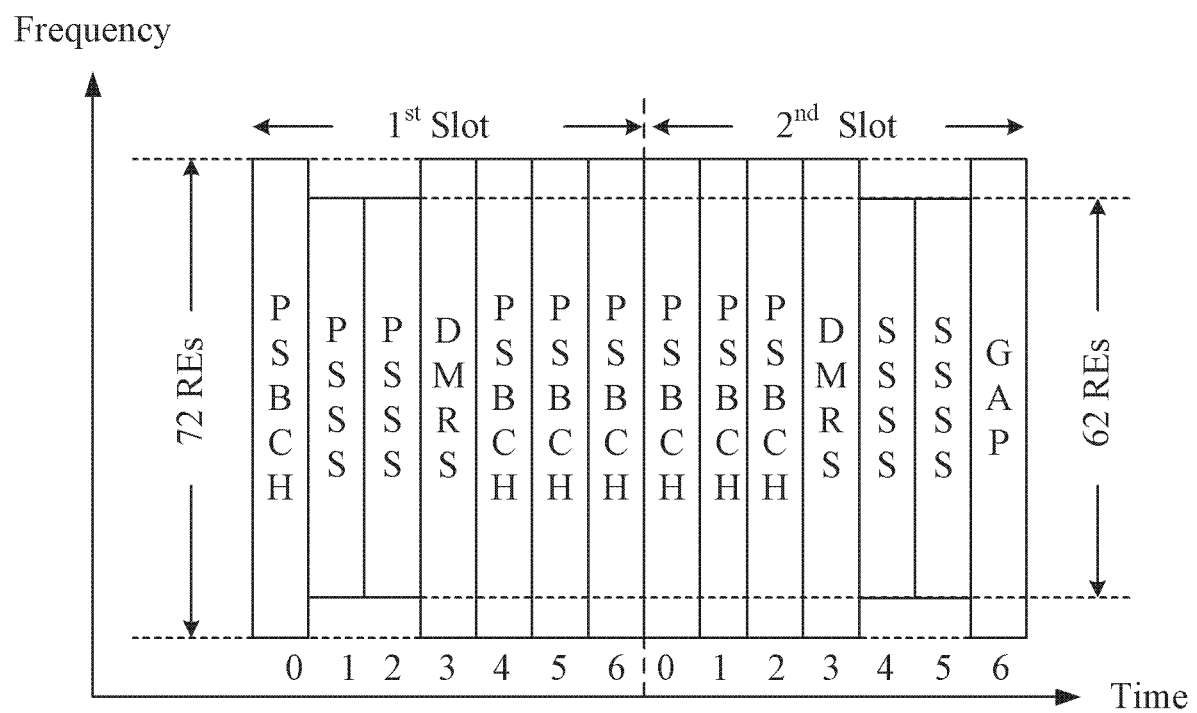
FIG. 35 shows an exemplary structure of a PSBCH subframe for synchronization in a V2X communication in accordance with some embodiments of the disclosure.

FIG. 35 shows an exemplary structure of a PSBCH subframe for synchronization in a V2X communication in accordance with some embodiments of the disclosure. The length of the subframe is 1 millisecond (ms) on the time axis, with each of the $1^{st}$ and $2^{nd}$ slots being 0.5 ms in duration and consisting of 7 symbols (each with numbers 0 through 6). The PSBCH and the Demodulation Reference Signal (DMRS) span 72 resource elements (REs), or subcarriers, of the frequency axis, while the Primary Sidelink Synchronization Signal (PSSS) and the Secondary Sidelink Synchronization Signal (SSSS) each span 62 REs. The PSBCH occupies symbols 0 and 4-6 of the $1^{st}$ slot and symbols 0-2 of the $2^{nd}$ slot. The PSSS occupies symbols 1-2 of the $1^{st}$ slot while the DMRS occupies symbol 3 of the $1^{st}$ slot and $2^{nd}$ slot. The SSSS occupies symbols 4-5 of the $2^{nd}$ slot, while symbol 6 of the $2^{nd}$ slot is reserved as a gap slot.

Figure 36:
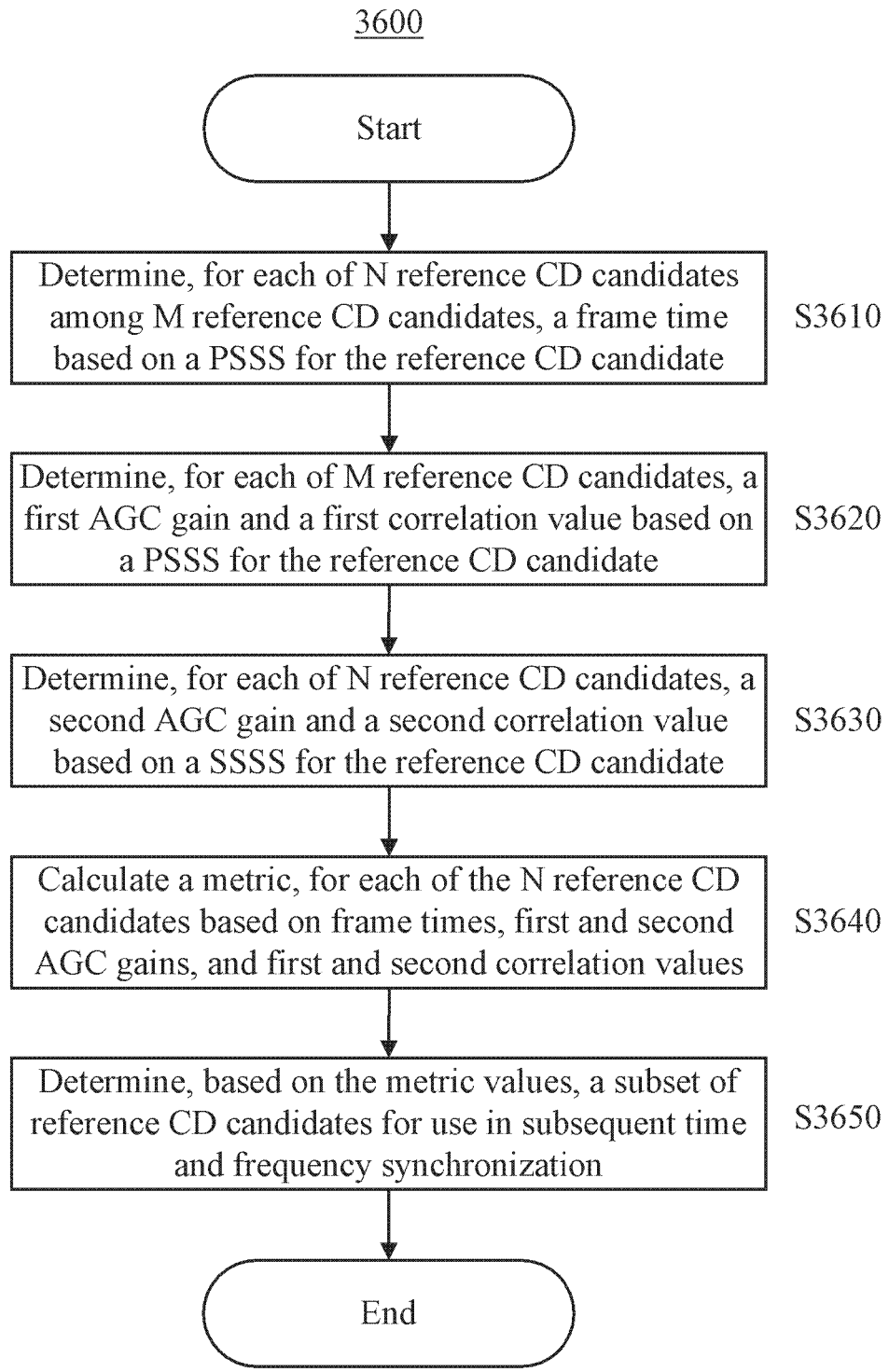
FIG. 36 is a flow chart showing a method performed by a CD for selecting reference CD candidates in a V2X communication in accordance with some embodiments of the disclosure.

As can be seen, the PSSS and SSSS are located on opposite positions in the subframe on the time axis, therefore the SSSS may be detected based on time information acquired from the PSSS. That is to say, in a V2X communication, a receiving CD (e.g. CD 110) detects timing information (e.g., a frame time) using the PSSS and then uses the timing information from the PSSS to detect the SSSS FIG. 36 is a flow chart 3600 showing a method performed by a CD for selecting reference CD candidates in a V2X communication in accordance with some embodiments of the disclosure. The operations of FIG. 36 may be used for a CD (e.g. CD 110) to select a set of preferable reference CD candidates in a V2X communication.

According to the exemplary method, at S3610-S3640, the CD 110 may calculate a metric value, for each of one or more reference CD candidates among all reference CD candidates for the CD, based on PSSS for all the reference CD candidates, and SSSS for the one or more reference CD candidates. In particular, at S3610, the CD 110 may determine, for each of the one or more reference CD candidates, a frame time based on a PSSS for the reference CD candidate. At S3620, the CD 110 may determine, for each of all the reference CD candidates, a first Automatic Gain Control (AGC) gain and a first correlation value based on a PSSS for the reference CD candidate. At S3630, the CD 110 may determine, for each of the one or more reference CD candidates, a second AGC gain and a second correlation value based on a SSSS for the reference CD candidate. At S3640, the CD 110 may calculate a metric value, for each of the one or more reference CD candidates, based on the frame times, the second AGC gains, and the second correlation values for the one or more reference CD candidates, and the first AGC gains, and the first correlation values for all the reference CD candidates.

In some embodiments, the metric value for a reference CD candidate may indicate quality (e.g., Signal to Interference plus Noise Ratio (SINR)) of a signal received from the reference CD candidate.

In some embodiments, the one or more reference CD candidates may be selected from all the reference CD candidates based on predetermined selection criteria. In an embodiment, the one or more reference CD candidates may be selected based on a time distance between the CD and each of all the reference CD candidates. For example, the CD 110 may calculate, for each of all the reference CD candidates, a time distance between the CD 110 and the reference CD candidate, and then the CD 110 may select the one or more reference CD candidates from all the reference CD candidates for the CD 110 based on the time distances for all the reference CD candidates. In an embodiment, the CD 110 may select one or more reference CD candidates corresponding to shorter time distances from all the reference CD candidates. In an embodiment, the number of the one or more reference CD candidates may be a predetermined number, wherein the larger the predetermined number is, the smaller the misdetection rate will be while the larger the false detection rate will be.

In some embodiments, as discussed previously, the PSSS and SSSS are located on opposite positions in the subframe in the time axis, therefore the SSSS may be detected based on time information acquired from the PSSS. Therefore, the CD 110 may detect a SSSS for each of the one or more reference CD candidates based on the frame time for the reference CD candidate.

In some embodiments, for each of the one or more reference CD candidates, the CD 110 may correlate the PSSS sequences received from the reference CD candidate with local PSSS sequences stored on the CD 110 to obtain PSSS correlation results. Then the CD 110 may process the PSSS correlation results to calculate the first correlation value, the frame time and the first AGC gain for the reference CD candidate. For example, the CD 110 may process the PSSS correlation peaks to calculate the first correlation value, the frame time and the first AGC gain for the reference CD candidate. In an embodiment, the frame time for the reference CD candidate may be determined based on a best correlation location of the PSSS correlation results.

In some embodiments, for each of reference CD candidates among all the reference CD candidates except the one or more reference CD candidates, the CD 110 may correlate the PSSS sequences received from the reference CD candidate with local PSSS sequences stored on the CD 110 to obtain PSSS correlation results. Then the CD 110 may process the PSSS correlation results to calculate the first correlation value, and the first AGC gain for the reference CD candidate. For example, the CD 110 may process the PSSS correlation non-peaks to calculate the first correlation value, and the first AGC gain for the reference CD candidate.

In some embodiments, for each of the one or more reference CD candidates, the CD 110 may correlate the SSSS sequences received from the reference CD candidate with local SSSS sequences stored on the CD 110 to obtain SSSS correlation results. Then the CD 110 may process the SSSS correlation results to calculate the second correlation value and the second AGC gain for the reference CD candidate.

In some embodiments, a metric value $M_i$ for the $i^{th}$ reference CD candidate of the one or more reference CD candidates among all the reference CD candidates may be calculated using equations (9) below.

$$M_i = 10\log_{10}\left(\frac{P_i}{I_i + N}\right), \text{ where } i \in [1\ldots N] \tag{9}$$

wherein N is the number of the one or more reference CD candidates, and $P_i$, $I_i$ and N may be calculated using equations (10)-(13) below respectively.

$$P_i = m_1 \frac{C_{psss,i}}{G_{psss,i}} + m_2 \frac{C_{ssss,i}}{G_{ssss,i}}, \text{ where } i \in [1\ldots N] \tag{10}$$

$$I_i = \sum_{k=1\ldots N_{pss}}^{k \neq i} w_{i,k} P_k, \text{ where } i \in [1\ldots N] \tag{11}$$

$$w_{i,j} = \begin{cases} 1 - \frac{|T_i - T_j|}{T}, & \text{where } |T_i - T_j| < T = 1\text{ms} \\ 0 & \text{otherwise} \end{cases} \tag{12}$$

$$\text{where } i \neq j, \text{ and } i, j \in [1\ldots N]$$

$$N = \frac{1}{M - N} \sum_{k=N+1}^{M} \frac{C_{psss,k}}{G_{psss,k}} \tag{13}$$

wherein M is the number of all the reference CD candidates, $T_i$ represents a frame time for the $i^{th}$ reference CD candidate, $T_j$ represents a frame time for the $j^{th}$ reference CD candidate, $C_{psss,i}$ represents a correlation value for PSSS for the $i^{th}$ reference CD candidate, $C_{psss,k}$ represents a correlation value for PSSS for the $k^{th}$ reference CD candidate, $C_{ssss,i}$ represents a correlation value for SSSS for the $i^{th}$ reference CD candidate, $G_{psss,i}$ represents a AGC gain for PSSS for the $i^{th}$ reference CD candidate, $G_{psss,k}$ represents a AGC gain for PSSS for the $k^{th}$ reference CD candidate, $G_{ssss,i}$ represents a AGC gain for SSSS for the $i^{th}$ reference CD candidate, $m_1 = 1/8$ and $m_2 = 7/8$. It is to be noted that, the values of $m_1$ and $m_2$ are only illustrative rather than limiting.

After calculating the metric values, at S3650, the CD 110 may determine, based on the metric values for the one or more reference CD candidates, a subset of reference CD candidates from the one or more reference CD candidates for use in subsequent time and frequency synchronization. The subset of reference CD candidates are a set of preferable reference CD candidates, and the CD 110 may select or determine a reference CD among the subset of reference CD candidates.

In some embodiments, if the metric value for one of the one or more reference CD candidates is larger than a first predetermined threshold, the one reference candidate may be determined as a member of the subset of reference CD candidates.

In some embodiments, if the number K of reference CD candidates corresponding to metric values larger than the first predetermined threshold is lower than a predetermined number L, the CD 110 may determine a number (L-K) of reference CD candidates corresponding to (L-K) highest metric values larger than a second predetermined threshold and lower than the first predetermined threshold as members of the subset of reference CD candidates.

In some embodiments, the CD 110 may directly discard, from the one or more reference CD candidates, reference CD candidates corresponding to metric values lower than the second predetermined threshold.

At least some embodiments of the disclosure allow for determining a set of preferable reference CD candidates reliably for use in determining a proper reference CD quickly, and allow for reducing the possibility of failing in synchronizing in a V2X communication.

Processing PSCCH in V2X Communication

In a V2X communication, a Cellular V2X (C-V2X) capable CD has to monitor V2X data from surrounding CDs or infrastructures, etc. to acquire surrounding traffic information. For supporting reception of V2X data via a sidelink (SL) or PC5 interface, the CD needs to monitor PSCCH candidates from one or more Reception Resource Pools (Rx RPs) for the CD according to a network semi-static configuration or a static pre-configuration, and upon detecting a valid PSCCH candidate which indicates that a Physical Sidelink Shared Channel (PSSCH) associated with the valid PSCCH candidate exists, the CD will decode the PSSCH for acquiring corresponding V2X data. Since the CD has no prior information about which PSCCH candidates are valid or not, it has to try to process all PSCCH candidates from all Rx RPs for ensuring reception of all available V2X data.

In a V2X communication, a maximum number of Rx RPs configured for a CD is 16 typically. Different Rx RPs may have different resource allocation ways to allocate resources used for PSCCHs and PSSCHs. A minimum granularity of resource allocation to PSSCHs is a sub-channel, and a size of a sub-channel may define the number of Physical Resource Blocks (PRBs) contained in the sub-channel in the frequency domain. For Rx RPs, there are two kinds of resource allocation ways as further described in detail below.

Figure 37A:
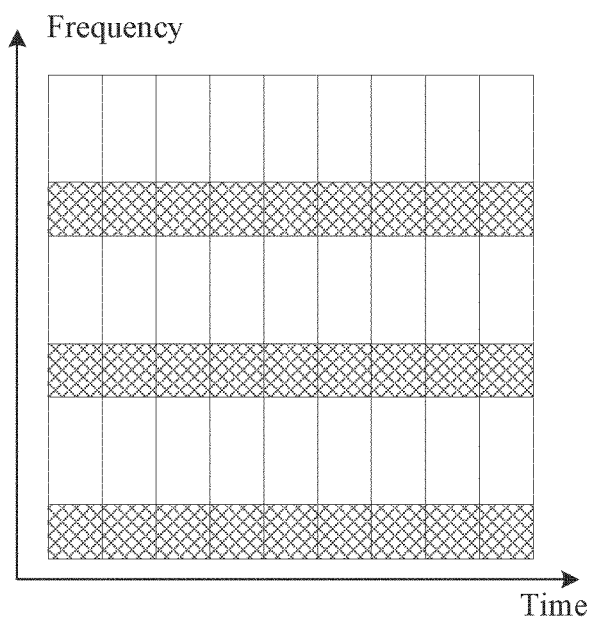
FIGS. 37a and 37b show two kinds of resource allocation ways for Reception Resource Pools (Rx RPs).

The first resource allocation way is PSCCH-PSSCH adjacent resource allocation, as shown in FIG. 37a. For the first resource allocation way, from the perspective of the frequency domain, a PSCCH and a PSSCH is adjacent. A PSCCH may occupy 2 PRBs in the frequency domain. A PSCCH for a certain CD may occupy a lower part of a sub-channel allocated for a corresponding PSSCH. A minimum size of a sub-channel is 5 PRBs, wherein one PSSCH may take several PRBs, and only 2 PRBs will be occupied by an associated PSCCH. A start PRB of a sub-channel may define a start PRB of a valid resource area allocated to a PSSCH and a PSCCH in the sub-channel.

Figure 37B:
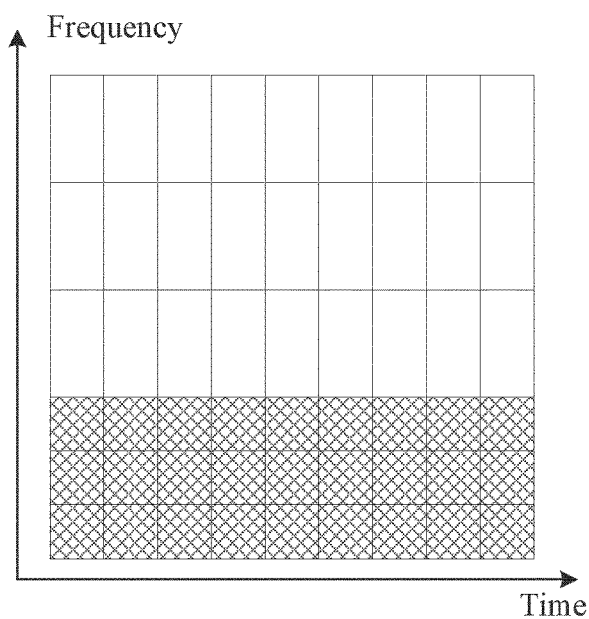

The second resource allocation way is PSCCH-PSSCH non-adjacent resource allocation, as shown in FIG. 37b. For the second resource allocation way, from the perspective of frequency domain, all PSCCHs (each of which may occupy 2 PRBs in the frequency domain) locate together and occupy a lower part of the frequency domain to form a PSCCH resource pool, and all PSSCHs locate together and occupy a higher part of the frequency domain to form a PSSCH resource pool. That is to say, PSCCHs have a separate frequency area, and they will not occupy resources in sub-channels allocated for PSSCHs. A start PRB of a PSCCH resource pool may define a start PRB of an area allocated for PSCCHs, and a start PRB of sub-channels in a PSSCH resource pool may define a start PRB of an area allocated for PSSCHs.

Considering different Rx RPs may have different configurations, for the worst case, up to 16 Rx RPs configured for a CD may introduce up to 96 PSCCH candidates. According to CD (e.g. UE) capability definition from 3GPP standards, during one subframe (1 ms), a CD may process (e.g. demodulate, decode, detect, etc.) up to 20 PSCCHs candidates. That is to say, for the worst case in which up to 96 PSCCH candidates are present, a CD has to take 5 ms to traverse all possible PSCCH candidates. Therefore, there is a general need to process (e.g. demodulate, decode, detect, etc.) PSCCH candidates efficiently without missing valid PSCCH candidates and corresponding V2X data.

The present disclosure provides approaches to process (e.g. demodulate, decode, detect, etc.) PSCCH candidates efficiently in a V2X communication. In accordance with some embodiments of the disclosure, an S-RSSI value for each of all the PSCCH candidates in a target subframe from one or more Rx RPs for the CD may be determined, then a first number N of PSCCH candidates corresponding to N highest S-RSSI values among all the PSCCH candidates may be processed, and a second number M of PSCCH candidates among unprocessed PSCCH candidates may be processed based on SCI received in a subframe prior to the target subframe. In accordance with some embodiments of the disclosure, whether a sum of N and M is less than twenty may be determined, and if the sum is less than twenty, a third number K of PSCCH candidates corresponding to K highest S-RSSI values among unprocessed PSCCH candidates may be processed, wherein K is equal to twenty minus the sum. In accordance with some embodiments of the disclosure, a scale product may be determined for each of unprocessed PSCCH candidates, wherein a scale product for one PSCCH candidate is an average of: a first scale product of two Demodulation Reference Signals (DMRSs) associated with the PSCCH candidate in a third symbol and a sixth symbol in a first slot of the target subframe; and a second scale product of two DMRSs associated with the PSCCH candidate in a second symbol and a fifth symbol in a second slot of the target subframe, and then a fourth number L of PSCCH candidates corresponding to L highest scale products among unprocessed PSCCH candidates may be processed. At least some embodiments of the disclosure allow for processing (e.g. demodulating, decoding, detecting, etc.) PSCCH candidates efficiently, and at least some embodiments of the disclosure allow for processing (e.g. demodulating, decoding, detecting, etc.) PSCCH candidates without missing PSCCH candidates with a lower S-RSSI value but a higher SINR value.

Figure 38:
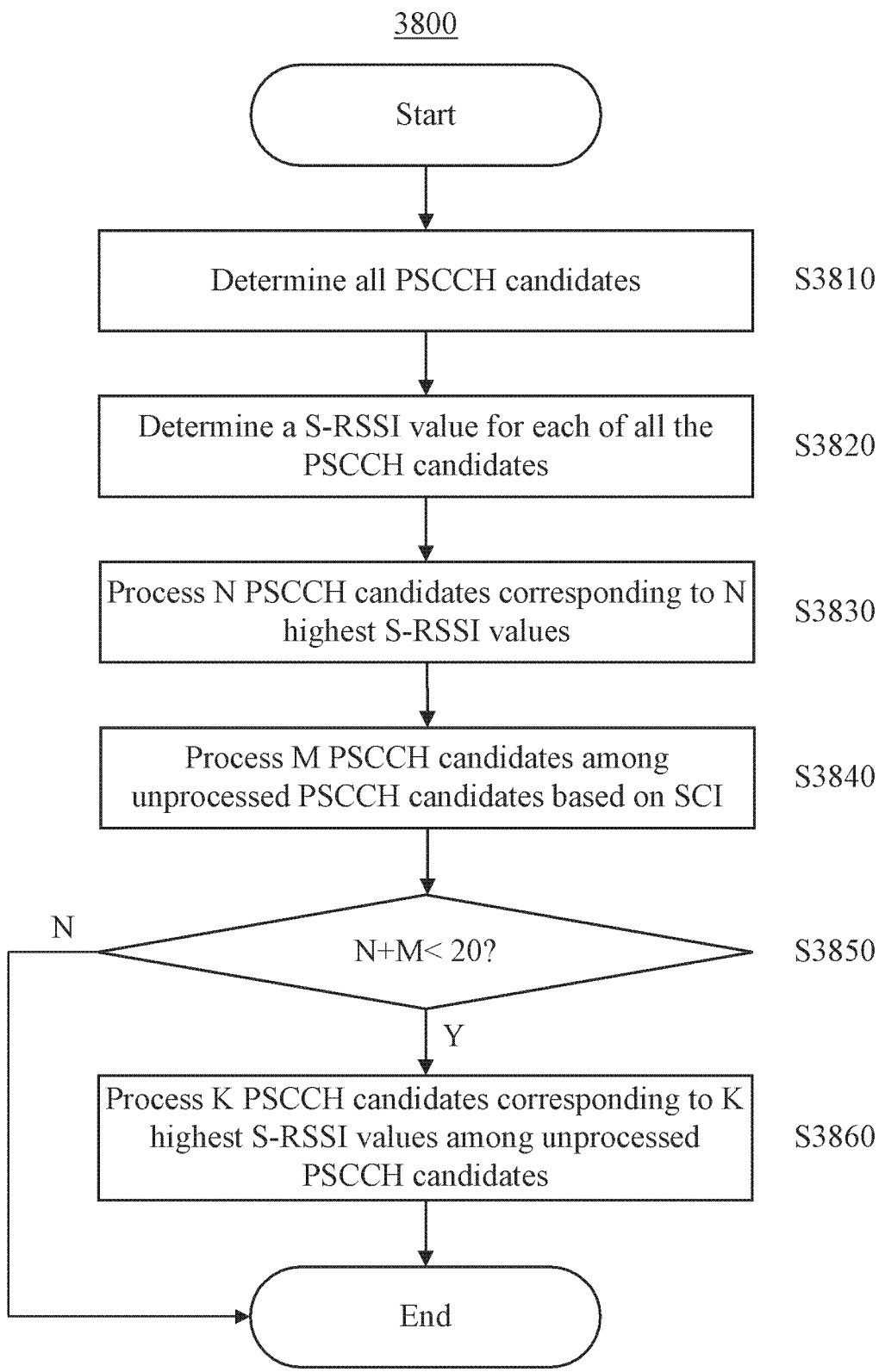
FIG. 38 is a flow chart showing a method performed by a CD for processing PSCCH candidates in a V2X communication in accordance with some embodiments of the disclosure.

FIG. 38 is a flow chart 3800 showing a method performed by a CD for processing (e.g. demodulating, decoding, detecting, etc.) PSCCH candidates in a V2X communication in accordance with some embodiments of the disclosure. The operations of FIG. 38 may be used for a CD (e.g. CD 110) to process (e.g. demodulate, decode, detect, etc.) PSCCH candidates.

At S3810, the CD 110 may determine all PSCCH candidates in a target subframe from one or more Rx RPs for the CD 110. As discussed previously, a maximum number of Rx RPs configured for the CD 110 may be 16. Considering different Rx RPs may have different configurations, up to 16 Rx RPs configured for the CD 110 may introduce up to 96 PSCCH candidates. At S3820, the CD 110 may determine an S-RSSI value for each of all the PSCCH candidates. Then the CD 110 may process a first number N of PSCCH candidates corresponding to N highest S-RSSI values among all the PSCCH candidates at S3830, wherein the N is a positive integer. In an embodiment, the N highest S-RSSI values may be greater than a first predetermined threshold.

At S3840, the CD 110 may process a second number M of PSCCH candidates among unprocessed PSCCH candidates based on SCI received in a subframe prior to the target subframe, wherein the M is a positive integer. In a V2X communication, SCI may be used to transport sidelink scheduling information. In an embodiment, the SCI may be in a form of SCI format 1, as defined in "3$^{rd}$ Generation Partnership Project; Technical Specification Group Radio Access Network; Evolved Universal Terrestrial Radio Access (E-UTRA); Multiplexing and channel coding (Release 15)" (3GPP TS 36.212 V15.1.0 (2018 March)). According to the 3GGP Technical Specification, the following information may be transmitted by means of the SCI format 1: priority, resource reservation, frequency resource location of initial transmission and retransmission, time gap between initial transmission and retransmission, modulation and coding scheme, retransmission index, and reserved information bits which are added until the size of SCI format 1 is equal to 32 bits, wherein the reserved bits are set to zero. A resource reservation field in SCI format 1 shall be set based on an indicated value X, wherein X is equal to a resource reservation interval provided by higher layers divided by 100, as defined in 3GPP TS 36.213. In an embodiment, resource reservation information carried in a resource reservation field in SCI format 1 may be used to indicate re-occurrence of PSCCHs. Based on re-occurrence information carried in SCI, the CD 110 may process a certain number of PSCCH candidates, which were valid candidates in a previous subframe and will re-occur in a current subframe as indicated by the re-occurrence information.

The CD 110 may then determine whether a sum of N and M is less than twenty (20) at S3850, and if the sum is less than twenty, the CD 110 may process at S3860 a third number K of PSCCH candidates corresponding to K highest S-RSSI values among unprocessed PSCCH candidates, wherein K is a positive integer equal to twenty minus the sum (K=20−(N+M)). In an embodiment, the K highest S-RSSI values may be greater than the first predetermined threshold. In another embodiment, the K highest S-RSSI values may be greater than a second predetermined threshold, wherein the second predetermined threshold may be less than the first predetermined threshold.

The exemplary method above allows for processing (e.g. demodulating, decoding, detecting, etc.) PSCCH candidates efficiently.

Figure 39:
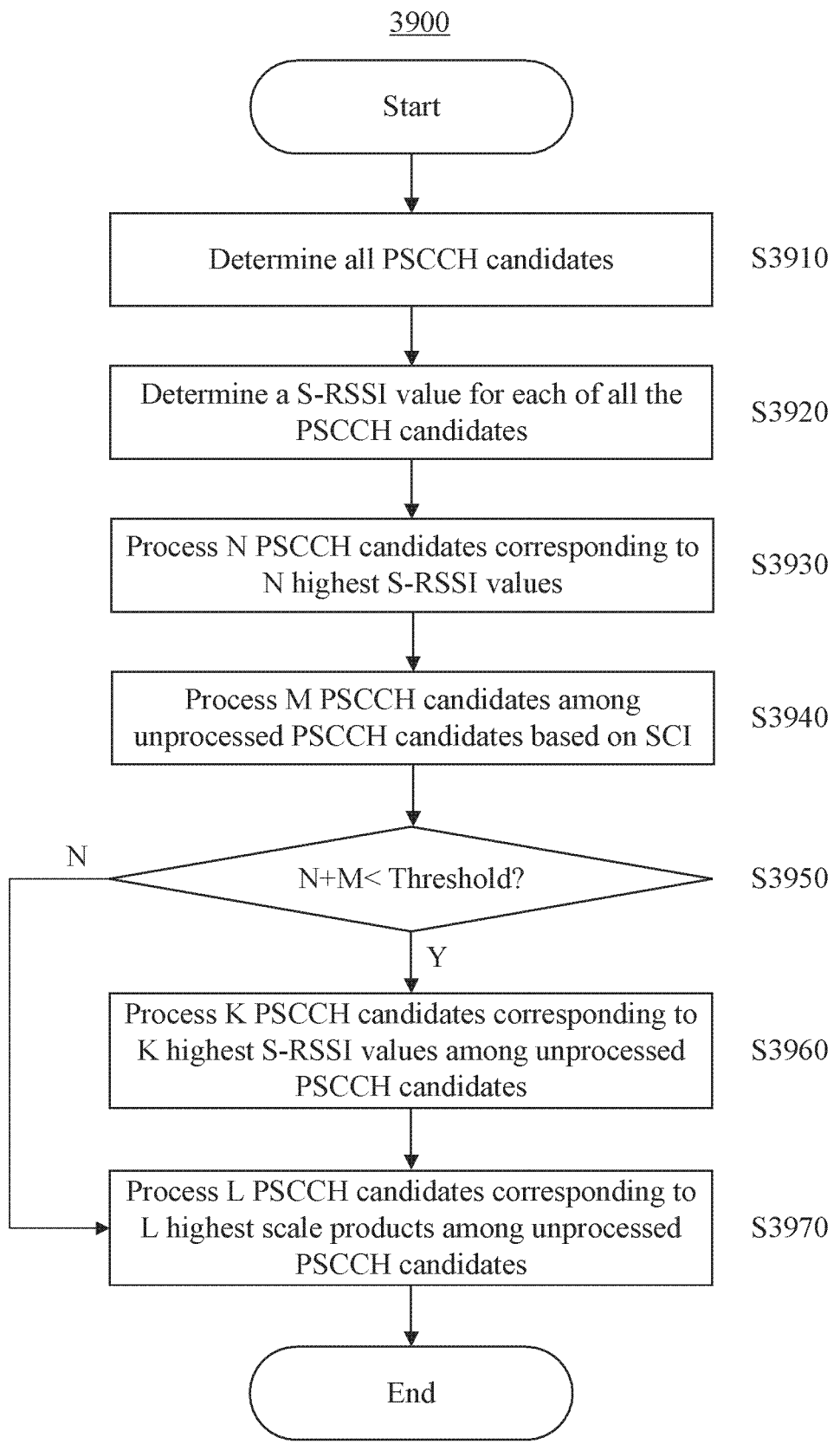
FIG. 39 is a flow chart showing another exemplary method performed by a CD for processing PSCCH candidates in a V2X communication in accordance with some embodiments of the disclosure.

FIG. 39 is a flow chart 3900 showing another exemplary method performed by a CD for processing (e.g. demodulating, decoding, detecting, etc.) PSCCH candidates in a V2X communication in accordance with some embodiments of the disclosure. The operations of FIG. 39 may be used for a CD (e.g. CD 110) to process (e.g. demodulate, decode, detect, etc.) PSCCH candidates.

At S3910, the CD 110 may determine all PSCCH candidates in a target subframe from one or more Rx RPs for the CD 110. As discussed previously, a maximum number of Rx RPs configured for the CD 110 may be 16. Considering different Rx RPs may have different configurations, up to 16 Rx RPs configured for the CD 110 may introduce up to 96 PSCCH candidates. At S3920, the CD 110 may determine an S-RSSI value for each of all the PSCCH candidates. Then the CD 110 may process a first number N of PSCCH candidates corresponding to N highest S-RSSI values among all the PSCCH candidates at S3930, where N is a positive integer. In an embodiment, the N highest S-RSSI values may be greater than a first predetermined threshold.

At S3940, the CD 110 may process a second number M of PSCCH candidates among unprocessed PSCCH candidates based on SCI received in a subframe prior to the target subframe, where M is a positive integer. In a V2X communication, SCI may be used to transport sidelink scheduling information. In an embodiment, the SCI may be in a form of SCI format 1, as defined in 3GPP TS 36.212. According to the 3GGP Technical Specification, the following information may be transmitted by means of the SCI format 1: priority, resource reservation, frequency resource location of initial transmission and retransmission, time gap between initial transmission and retransmission, modulation and coding scheme, retransmission index, and reserved information bits which are added until the size of SCI format 1 is equal to 32 bits, wherein the reserved bits are set to zero. A resource reservation field in SCI format 1 shall be set based on an indicated value X, wherein X is equal to a resource reservation interval provided by higher layers divided by 100, as defined in 3GPP TS 36.213. In an embodiment, resource reservation information carried in a resource reservation field in SCI format 1 may be used to indicate re-occurrence of PSCCHs. Based on re-occurrence information carried in SCI, the CD 110 may process a certain number of PSCCH candidates, which were valid candidates in a previous subframe and will re-occur in a current subframe as indicated by the re-occurrence information.

In an embodiment, a sum of N and M is less than a first predetermined number which is a positive integer less than twenty to ensure that the number (N+M) of processed PSCCH candidates does not exceed twenty.

At S3950, the CD 110 may determine whether a sum of N and M is less than a second predetermined number (e.g., 15) which is less than the first predetermined number, and if the sum is less than the second predetermined number, the CD 110 may process at S3960 a third number K of PSCCH candidates corresponding to K highest S-RSSI values among unprocessed PSCCH candidates, wherein K is a positive integer equal to the second predetermined number minus the sum. In an embodiment, the K highest S-RSSI values may be greater than the first predetermined threshold. In another embodiment, the K highest S-RSSI values may be greater than a second predetermined threshold, wherein the second predetermined threshold may be less than the first predetermined threshold.

At S3970, the CD 110 may then process a fourth number L of PSCCH candidates corresponding to L highest scale products among unprocessed PSCCH candidates. For a valid PSCCH candidate, a scale product of neighbor DMRSs associated with the valid PSCCH candidate may indicate a high value, therefore PSCCH candidates corresponding to higher scale products are likely to be valid.

Figure 40:
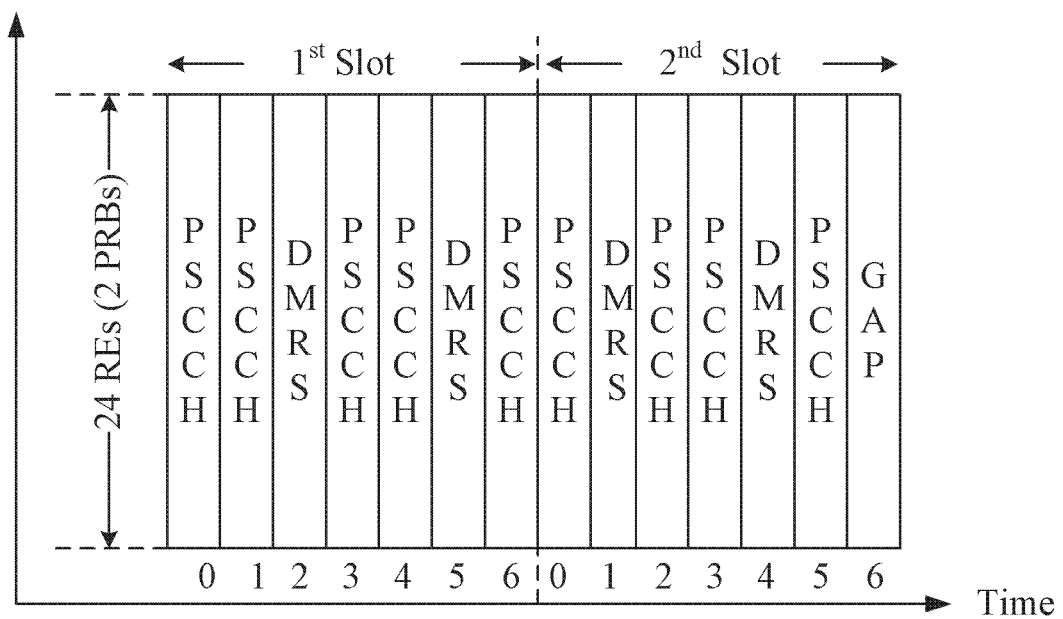
FIG. 40 shows an exemplary resource allocation in a subframe structure.

In an embodiment, the CD 110 may determine a scale product for each of unprocessed PSCCH candidates, wherein a scale product for one PSCCH candidate is an average of: a first scale product of a DMRS associated with the PSCCH candidate in a third symbol in a first slot (corresponding to symbol 2 in the $1^{st}$ slot in the time domain as shown in FIG. 40, which shows a subframe structure 4000) of the target subframe and a DMRS associated with the PSCCH candidate in a sixth symbol (corresponding to symbol 5 in the $1^{st}$ slot as shown in FIG. 40) in the first slot; and a second scale product of a DMRS associated with the PSCCH candidate in a second symbol in a second slot (corresponding to symbol 1 in the in the $2^{rd}$ slot as shown in FIG. 40) of the target subframe and a DMRS associated with the PSCCH candidate in a fifth symbol in the second slot (corresponding to symbol 4 in the $2^{rd}$ slot as shown in FIG. 40). In an embodiment, for each of the L PSCCH candidates, a ratio of a corresponding scale product to a corresponding S-RSSI value is above a third predetermined threshold. In an embodiment, a sum of N, M, K and L is equal to twenty.

By making use of a scale product of DMRSs, the present disclosure allow for processing (e.g. demodulating, decoding, detecting, etc.) PSCCH candidates without missing PSCCH candidates with a lower S-RSSI value but a higher SINR value.

Processing PSCCH and Pssch in V2X Communication

As described above, since a CD in a V2X communication has no prior information about which PSCCH candidates are valid or not, it has to try to process all PSCCH candidates from all Rx RPs for ensuring reception of all available V2X data. Therefore, some high emergency or high priority V2X data may not be received by the CD in time. In addition, since the CD has no prior information about priority of V2X data from other CDs, and if the CD processes PSCCH candidates with its own pattern according to a network semi-static configuration or a static pre-configuration, some high emergency or high priority V2X data may be missed.

Also as described above, for Rx RPs, there are two kinds of resource allocation ways as described with reference to FIGS. 37*a* and 37*b*. Considering different Rx RPs may have different configurations, for the worst case in which up to 96 PSCCH candidates are present, a receiving CD in a V2X communication has to take 5 ms to traverse all possible PSCCH candidates. Therefore, some high emergency or high priority V2X data may not be received by the CD in time.

In addition, since a receiving CD in a V2X communication has no prior information about priority of V2X data from other transmitting CDs, and if the receiving CD processes PSCCH candidates with its own pattern according to a network semi-static configuration or a static pre-configuration, some high emergency or high priority V2X data may be missed.

Therefore, there is a general need to process (e.g. modulate, encode, demodulate, decode, detect, etc.) a PSCCH and a PSSCH for ensuring reception of high emergency or high priority V2X data by a receiving CD in time.

The present disclosure provides approaches to process (e.g. modulate, encode, demodulate, decode, detect, etc.) a PSCCH and a PSSCH in a V2X communication. In accordance with some embodiments of the disclosure, whether a priority value for data to be transmitted in a subframe is above a predetermined threshold may be determined by a transmitting CD. If the priority value is above the predetermined threshold, multiple sets of resources in the frequency domain for a PSCCH and a PSSCH associated with the data in the subframe may be determined, wherein each set of resources are used to transmit the PSCCH and PSSCH for one time. Then the PSCCH and PSSCH may be transmitted by the transmitting CD for multiple times in the multiple sets of resources. In accordance with some embodiments of the disclosure, if the priority value is above the predetermined threshold, a transmit power on each of symbols in the subframe for a Demodulation Reference Signal (DMRS) associated with the PSCCH may be increased by a predetermined value. At least some embodiments of the disclosure allow for increasing a diversity gain and decreasing probabilities of colliding with transmissions by other transmitting CDs, and thus allow for receiving the high emergency or high priority V2X data by a receiving CD in time. At least some embodiments of the disclosure allow for increasing an S-RSSI value for a PSCCH associated with high emergency or high priority V2X data, and thus allow for increasing probabilities to detect the high emergency or high priority V2X data by a receiving CD.

Figure 41:
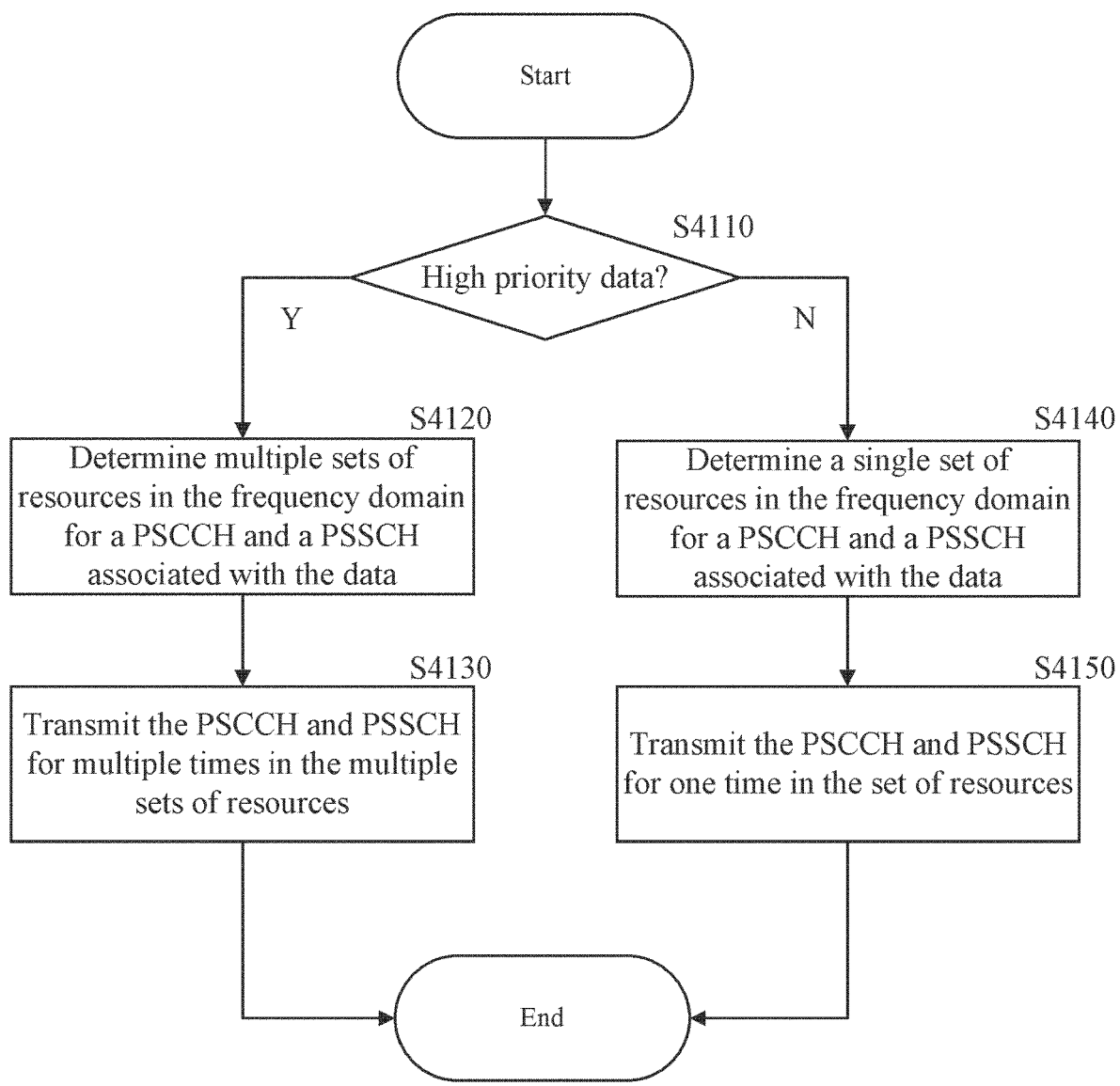
FIG. 41 is a flow chart showing a method performed by a CD for processing a PSCCH and a PSSCH in a V2X communication in accordance with some embodiments of the disclosure.

FIG. 41 is a flow chart 4100 showing a method performed by a CD for processing (e.g. modulating, encoding, etc.) a PSCCH and a PSSCH in a V2X communication in accordance with some embodiments of the disclosure. The operations of FIG. 41 may be used for a transmitting CD (e.g. CD 110) to process (e.g. modulate, encode, etc.) a PSCCH and a PSSCH for V2X data in a V2X communication.

At S4110, the CD 110 may determine whether a priority value for data to be transmitted in a subframe is above a predetermined threshold. In an embodiment, each data to be transmitted in a V2X communication may have a corresponding priority value carried in a priority field of the data. For example, a priority value in a priority field of data may be in a range from 0 to 5, depending on a degree of emergency or priority for the data. In an embodiment, a priority value of 0 or 1 for V2X data may indicate that the V2X data is of low emergency or priority, a priority value of 2 or 3 for V2X data may indicate that the V2X data is of medium emergency or priority, and a priority value of 4 or 5 for V2X data may indicate that the V2X data is of high emergency or priority.

Figure 42A:
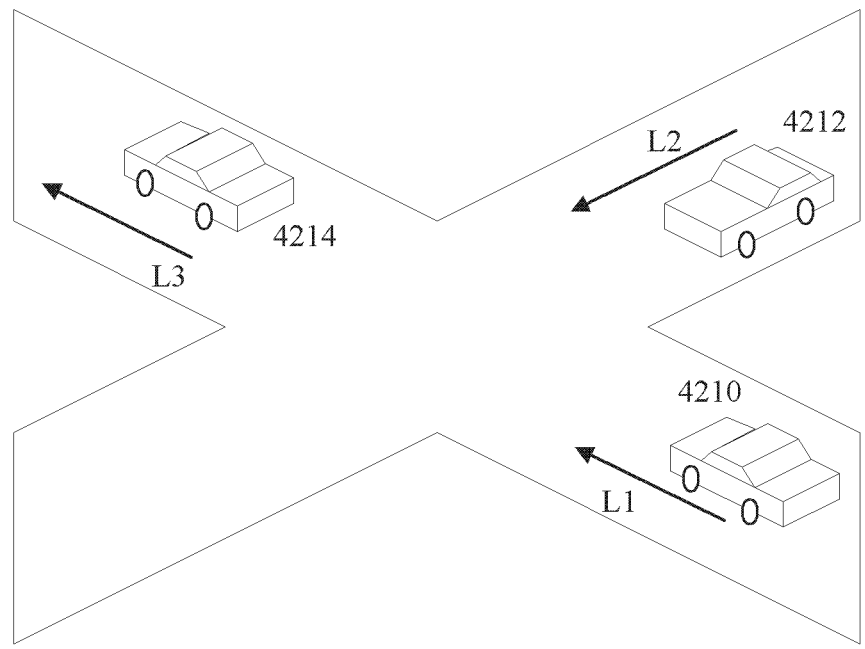
FIGS. 42a and 42b show example scenarios in which high emergency or priority V2X data is to be transmitted in a V2X communication.

For ease of illustration of high emergency or priority data in a V2X communication, as an example, FIG. 42a shows an example scenario 4201 in which high emergency or priority V2X data is to be transmitted in a V2X communication. In FIG. 42a, an ambulance 4210 is driving in a first direction indicated by an arrow L1, and will reach and pass an intersection in front of the ambulance 4210 soon. Around the ambulance 4210, a vehicle 4212 driving in a second direction indicated by an arrow L2 will reach and pass the intersection soon too, and a vehicle 4214 driving in a third direction indicated by an arrow L3 is driving in front of the intersection. Here the third direction is same as the first direction, namely, the vehicle 4214 is driving in front of the intersection in the same direction as the ambulance 4210. In order to ensure that the ambulance 4210 can pass the intersection quickly and safely and continue to move forward quickly thereafter, a transmitting CD in the ambulance 4210 may transmit an emergency vehicle notification to other CDs in surrounding vehicles 4212 and 4214 to inform vehicles 4212 and 4214 to avoid an emergency vehicle (namely, the ambulance 4210). This enables vehicles 4212 and 4214 to acquire location, speed and direction information, etc. of the emergency vehicle to assist safety operations such as allowing the path in front of the ambulance 4210 to get free quickly. In this example, the emergency vehicle notification is high emergency or priority data in the V2X communication.

Figure 42B:
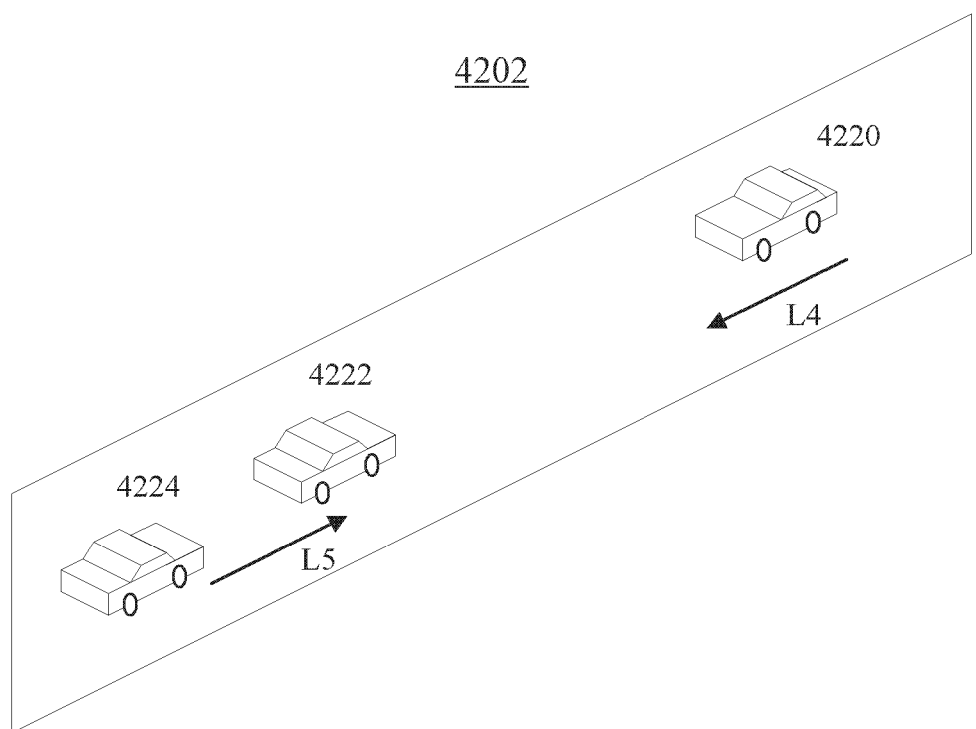

As another example, FIG. 42b shows an example scenario 4202 in which high emergency or priority V2X data is to be transmitted in a V2X communication. In FIG. 42b, a vehicle 4220 is driving on a road in a fourth direction indicated by an arrow L4, which is opposite to a normal driving direction of the road. In order to avoid collision with other vehicles on the road (e.g., vehicles 4222 and 4224 driving on the road in a fifth direction indicated by an arrow L5, which is the normal driving direction of the road), a transmitting CD in the vehicle 4220 may transmit a warning notification to other CDs in surrounding vehicles 4222 and 4224 to inform vehicles 4222 and 4224 to avoid a vehicle driving in a wrong direction (namely, the vehicle 4220). In this example, the warning notification is high emergency or priority data in the V2X communication.

If it is determined that the priority value is above the predetermined threshold at S4110, the CD 110 may determine at S4120 multiple sets of resources in the frequency domain for a PSCCH and a PSSCH associated with the data in the subframe, wherein each set of resources are used to transmit the PSCCH and PSSCH for one time. In an embodiment, the multiple sets of resources are not overlapped in the frequency domain with each other. In an embodiment, if the priority value is above the predetermined threshold, a transmit power on each of symbols in the subframe for DMRSs associated with the PSCCH may be increased by a predetermined value. In an embodiment, if the transmit power on one of the symbols is above a predetermined maximum transmit power for the CD, the transmit power on the symbol may be adjusted based on an adjustment factor, wherein the adjustment factor is a ratio of the predetermined maximum transmit power to the transmit power on the symbol. For example, an adjustment factor α for a transmit power may be applied to each of symbols for all DMRSs associated with the PSCCH, as shown in equations (14) and (15) below.

$$\alpha = \frac{\min(P_{max}, P_{Tx})}{P_{Tx}} \quad (14)$$

$$\overline{P_{Tx}} = \alpha P_{Tx} \quad (15)$$

where $P_{max}$ is the predetermined maximum transmit power for the CD, $P_{Tx}$ is a calculated total transmit power on a symbol for a DMRS, and $\overline{P_{Tx}}$ is an adjusted transmit power on the symbol for the DMRS.

At S4130, the CD 110 may transmit the PSCCH and PSSCH for multiple times in the multiple sets of resources.

If it is determined that the priority value is not above the predetermined threshold at S4110, the CD 110 may determine at S4140 a single set of resources in the frequency domain for a PSCCH and a PSSCH associated with the data in the subframe, and may transmit at S4150 the PSCCH and PSSCH for one time in the set of resources.

By allocating multiple sets of resources in the frequency domain for a PSCCH and a PSSCH associated with high emergency or priority V2X data to be transmitted by a transmitting CD in the subframe, embodiments of the disclosure allow for increasing a diversity gain and decreasing probabilities of colliding with transmissions by other transmitting CDs, and thus allows for receiving the high emergency or high priority V2X data by a receiving CD in time. By increasing a transmit power on each of symbols in the subframe for DMRSs associated with a PSCCH associated with high emergency or high priority V2X data, the disclosure allows for increasing an S-RSSI value for the PSCCH, and thus allows for increasing probabilities to detect the high emergency or high priority V2X data by a receiving CD.

Figure 43:
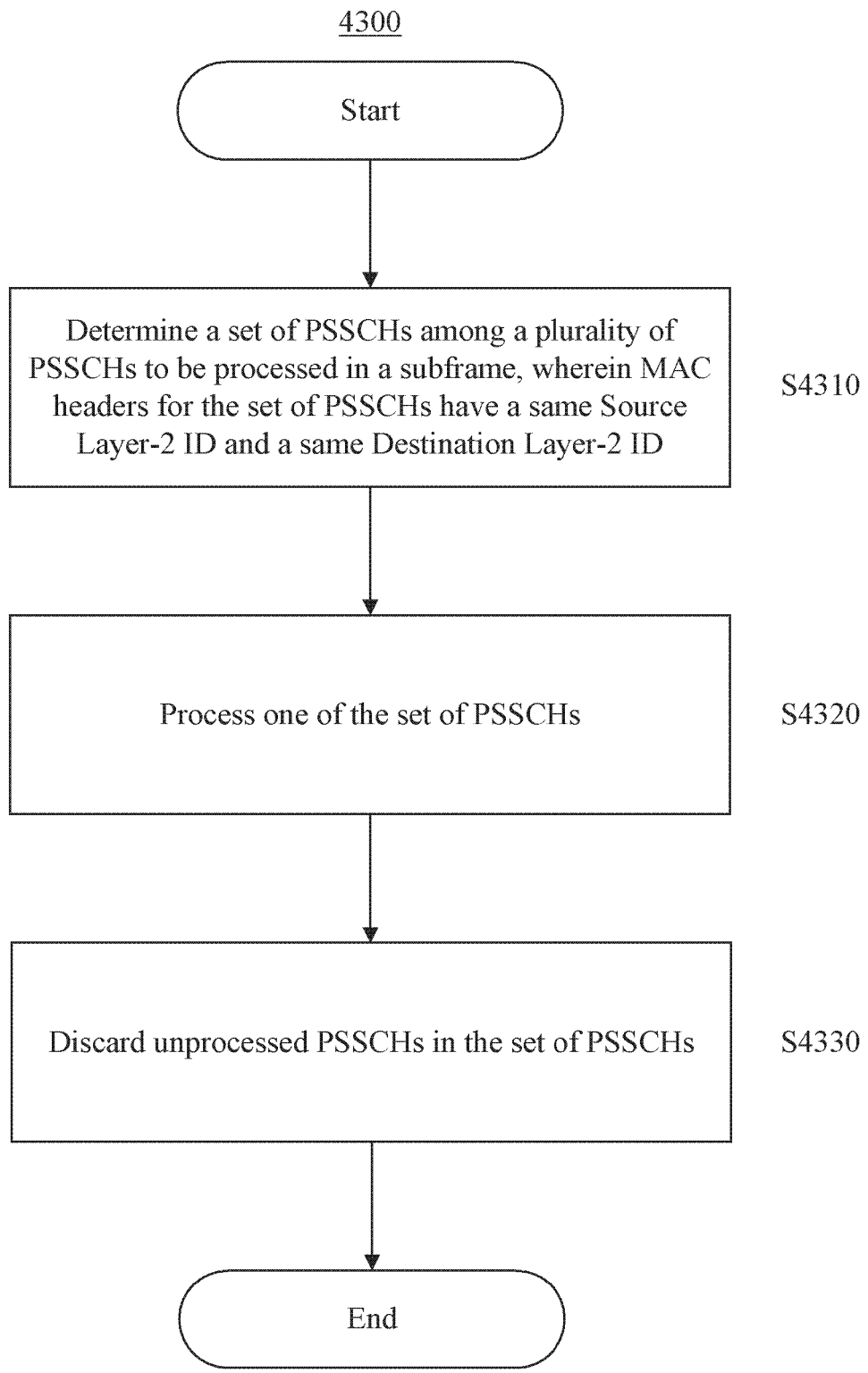
FIG. 43 is a flow chart showing a method performed by a CD for processing a PSCCH and a PSSCH in a V2X communication in accordance with some embodiments of the disclosure.

FIG. 43 is a flow chart 4300 showing a method performed by a CD for processing (e.g. demodulating, decoding, detecting, etc.) a PSCCH and a PSSCH in a V2X communication in accordance with some embodiments of the disclosure. The operations of FIG. 43 may be used for a receiving CD (e.g. CD 110) to process (e.g. modulate, encode, etc.) a PSCCH and a PSSCH for V2X data in a V2X communication.

At S4310, the CD 110 may determine a set of PSSCHs among a plurality of PSSCHs to be processed in a subframe, wherein Medium Access Control (MAC) headers for the set of PSSCHs have a same Source Layer-2 ID and a same Destination Layer-2 ID. As defined in "3$^{rd}$ Generation Partnership Project; Technical Specification Group Radio Access Network; Evolved Universal Terrestrial Radio Access (E-UTRA); Medium Access Control (MAC) protocol specification (Release 15)" (3GPP TS 36.321 V15.1.0 (2018 March)), the Source Layer-2 ID field of a MAC header for a PSSCH carries the identity of the source, and the Destination Layer-2 ID is set to an identifier provided by upper layers. If a set of PSSCHs have a same Source Layer-2 ID and a same Destination Layer-2 ID, it is indicated that V2X data associated with the set of PSSCH are the same with each other. The CD 110 may then process at S4320 one of the set of PSSCHs, and discard at S4330 unprocessed PSSCHs in the set of PSSCHs, so as to avoid repeated reception of the same data.

In an embodiment, the CD 110 may process a plurality of PSCCHs received in the subframe, and may determine the plurality of PSSCHs to be processed based on the plurality of PSCCHs.

In an embodiment, the CD 110 may determine all PSCCH candidates in the subframe from one or more Rx RPs for the CD 110. A maximum number of Rx RPs configured for the CD 110 may be 16. Considering different Rx RPs may have different configurations, up to 16 Rx RPs configured for the CD 110 may introduce up to 96 PSCCH candidates. The CD 110 may determine an S-RSSI value for each of all the PSCCH candidates. Then the CD 110 may process a first number N of PSCCH candidates corresponding to N highest S-RSSI values among all the PSCCH candidates, wherein the N is a positive integer. In an embodiment, the N highest S-RSSI values may be greater than a first predetermined threshold. The CD 110 may process a second number M of PSCCH candidates among unprocessed PSCCH candidates based on SCI received in a subframe prior to the subframe, wherein the M is a positive integer. In a V2X communication, SCI may be used to transport sidelink scheduling information. In an embodiment, the SCI may be in a form of SCI format 1, as defined in 3GPP TS 36.212. According to the above 3GGP Technical Specification, the following information may be transmitted by means of the SCI format 1: priority, resource reservation, frequency resource location of initial transmission and retransmission, time gap between initial transmission and retransmission, modulation and coding scheme, retransmission index, and reserved information bits which are added until the size of SCI format 1 is equal to 32 bits, wherein the reserved bits are set to zero. A resource reservation field in SCI format 1 shall be set based on an indicated value X, wherein X is equal to a resource reservation interval provided by higher layers divided by 100, as defined in 3GPP TS 36.213. In an embodiment, resource reservation information carried in a resource reservation field in SCI format 1 may be used to indicate re-occurrence of PSCCHs. Based on re-occurrence information carried in SCI, the CD 110 may process a certain number of PSCCH candidates, which were valid candidates in a previous subframe and will re-occur in a current subframe as indicated by the re-occurrence information.

In an embodiment, the CD 110 may then determine whether a sum of N and M is less than twenty, and if the sum is less than twenty, the CD 110 may process a third number K of PSCCH candidates corresponding to K highest S-RSSI values among unprocessed PSCCH candidates, wherein K is a positive integer which equals to twenty minus the sum. In an embodiment, the K highest S-RSSI values may be greater than the first predetermined threshold. In another embodiment, the K highest S-RSSI values may be greater than a second predetermined threshold, wherein the second predetermined threshold may be less than the first predetermined threshold.

System Architecture and Hardware

Figure 44:
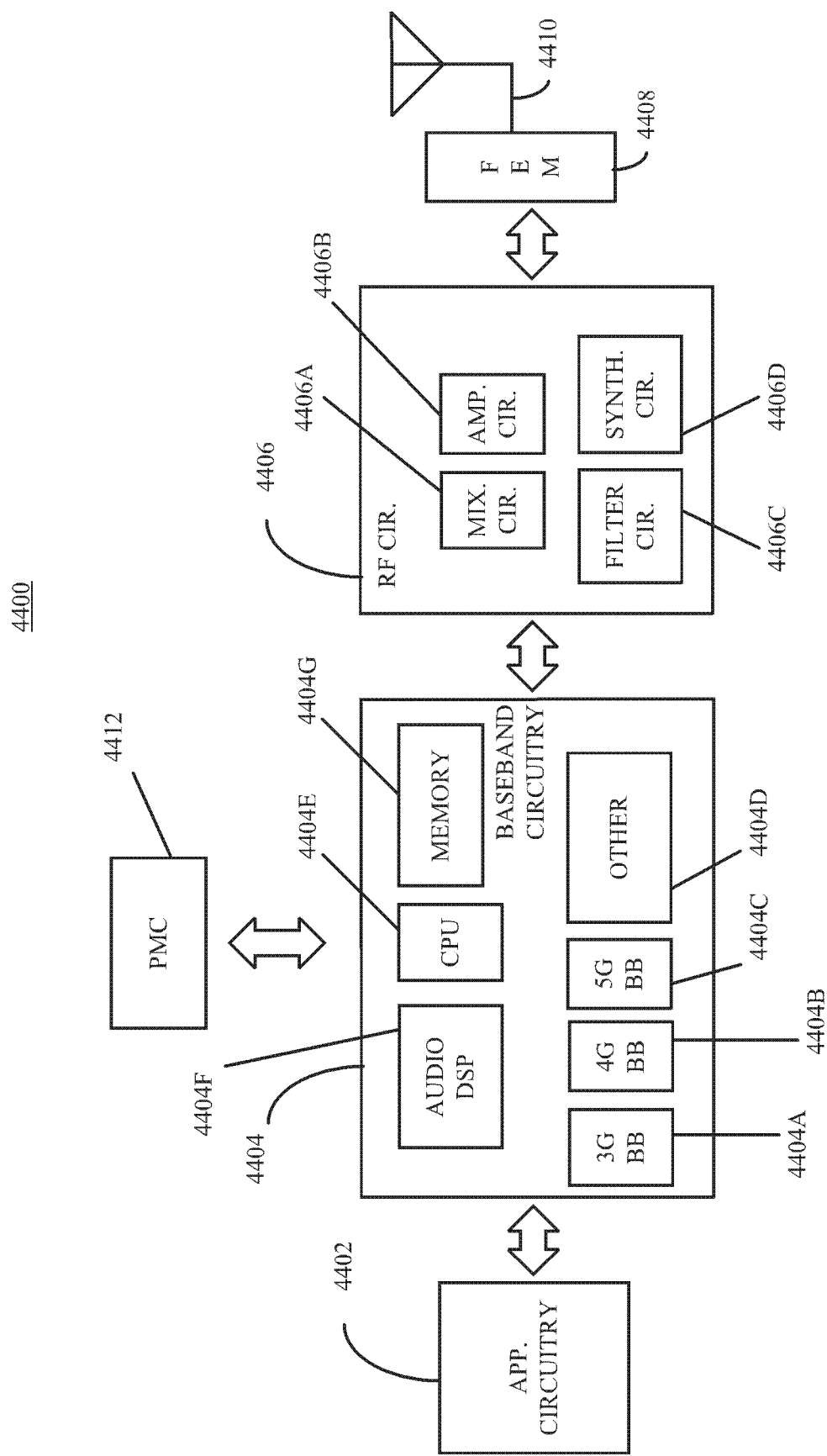
FIG. 44 illustrates example components of a device in accordance with some embodiments of the disclosure.

FIG. 44 illustrates example components of a device 4400 in accordance with some embodiments. In some embodiments, the device 4400 may include application circuitry 4402, baseband circuitry 4404, Radio Frequency (RF) circuitry 4406, front-end module (FEM) circuitry 4408, one or more antennas 4410, and power management circuitry (PMC) 4412 coupled together at least as shown. The components of the illustrated device 4400 may be included in a CD or an access network (AN). In some embodiments, the device 4400 may include less elements (e.g., an AN may not utilize application circuitry 4402, and instead include a processor/controller to process IP data received from an EPC). In some embodiments, the device 4400 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 4402 may include one or more application processors. For example, the application circuitry 4402 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 4400. In some embodiments, processors of application circuitry 4402 may process IP data packets received from an EPC.

The baseband circuitry 4404 may include circuitry such as, but not limited to, one or more single-core or multi-core processors. The baseband circuitry 4404 may include one or more baseband processors or control logic to process baseband signals received from a receive signal path of the RF circuitry 4406 and to generate baseband signals for a transmit signal path of the RF circuitry 4406. Baseband processing circuitry 4404 may interface with the application circuitry 4402 for generation and processing of the baseband signals and for controlling operations of the RF circuitry 4406. For example, in some embodiments, the baseband circuitry 4404 may include a third generation (3G) baseband processor 4404A, a fourth generation (4G) baseband processor 4404B, a fifth generation (5G) baseband processor 4404C, or other baseband processor(s) 4404D for other existing generations, generations in development or to be developed in the future (e.g., second generation (2G), sixth generation (6G), etc.). The baseband circuitry 4404 (e.g., one or more of baseband processors 4404A-D) may handle various radio control functions that enable communication with one or more radio networks via the RF circuitry 4406. In other embodiments, some or all of the functionality of baseband processors 4404A-D may be included in modules stored in the memory 4404G and executed via a Central Processing Unit (CPU) 4404E. The radio control functions may include, but are not limited to, signal modulation/demodulation, encoding/decoding, radio frequency shifting, etc. In some embodiments, modulation/demodulation circuitry of the baseband circuitry 4404 may include Fast-Fourier Transform (FFT), precoding, or constellation mapping/demapping functionality. In some embodiments, encoding/decoding circuitry of the baseband circuitry 4404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 4404 may include one or more audio digital signal processor(s) (DSP) 4404F. The audio DSP(s) 4404F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 4404 and the application circuitry 4402 may be implemented together such as, for example, on a system on a chip (SOC).

In some embodiments, the baseband circuitry 4404 may provide for communication compatible with one or more radio technologies. For example, in some embodiments, the baseband circuitry 4404 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 4404 is configured to support radio communications of more than one wireless protocol may be referred to as multi-mode baseband circuitry.

RF circuitry 4406 may enable communication with wireless networks using modulated electromagnetic radiation through a non-solid medium. In various embodiments, the RF circuitry 4406 may include switches, filters, amplifiers, etc. to facilitate the communication with the wireless network. RF circuitry 4406 may include a receive signal path which may include circuitry to down-convert RF signals received from the FEM circuitry 4408 and provide baseband signals to the baseband circuitry 4404. RF circuitry 4406 may also include a transmit signal path which may include circuitry to up-convert baseband signals provided by the baseband circuitry 4404 and provide RF output signals to the FEM circuitry 4408 for transmission.

In some embodiments, the receive signal path of the RF circuitry 4406 may include mixer circuitry 4406a, amplifier circuitry 4406b and filter circuitry 4406c. In some embodiments, the transmit signal path of the RF circuitry 4406 may include filter circuitry 4406c and mixer circuitry 4406a. RF circuitry 4406 may also include synthesizer circuitry 4406d for synthesizing a frequency for use by the mixer circuitry 4406a of the receive signal path and the transmit signal path. In some embodiments, the mixer circuitry 4406a of the receive signal path may be configured to down-convert RF signals received from the FEM circuitry 4408 based on the synthesized frequency provided by synthesizer circuitry 4406d. The amplifier circuitry 4406b may be configured to amplify the down-converted signals and the filter circuitry 4406c may be a low-pass filter (LPF) or band-pass filter (BPF) configured to remove unwanted signals from the down-converted signals to generate output baseband signals. Output baseband signals may be provided to the baseband circuitry 4404 for further processing. In some embodiments, the output baseband signals may be zero-frequency baseband signals, although this is not a requirement. In some embodiments, mixer circuitry 4406a of the receive signal path may comprise passive mixers, although the scope of the embodiments is not limited in this respect.

In some embodiments, the mixer circuitry 4406a of the transmit signal path may be configured to up-convert input baseband signals based on the synthesized frequency provided by the synthesizer circuitry 4406d to generate RF output signals for the FEM circuitry 4408. The baseband signals may be provided by the baseband circuitry 4404 and may be filtered by filter circuitry 4406c.

In some embodiments, the mixer circuitry 4406a of the receive signal path and the mixer circuitry 4406a of the transmit signal path may include two or more mixers and may be arranged for quadrature downconversion and upconversion, respectively. In some embodiments, the mixer circuitry 4406a of the receive signal path and the mixer circuitry 4406a of the transmit signal path may include two or more mixers and may be arranged for image rejection (e.g., Hartley image rejection). In some embodiments, the mixer circuitry 4406a of the receive signal path and the mixer circuitry 4406a may be arranged for direct downconversion and direct upconversion, respectively. In some embodiments, the mixer circuitry 4406a of the receive signal path and the mixer circuitry 4406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 4406 may include analog-to-digital converter (ADC) and digital-to-analog converter (DAC) circuitry and the baseband circuitry 4404 may include a digital baseband interface to communicate with the RF circuitry 4406.

In some dual-mode embodiments, a separate radio IC circuitry may be provided for processing signals for each spectrum, although the scope of the embodiments is not limited in this respect.

In some embodiments, the synthesizer circuitry 4406d may be a fractional-N synthesizer or a fractional N/N+1 synthesizer, although the scope of the embodiments is not limited in this respect as other types of frequency synthesizers may be suitable. For example, synthesizer circuitry 4406d may be a delta-sigma synthesizer, a frequency multiplier, or a synthesizer comprising a phase-locked loop with a frequency divider.

The synthesizer circuitry 4406d may be configured to synthesize an output frequency for use by the mixer circuitry 4406a of the RF circuitry 4406 based on a frequency input and a divider control input. In some embodiments, the synthesizer circuitry 4406d may be a fractional N/N+1 synthesizer.

In some embodiments, frequency input may be provided by a voltage controlled oscillator (VCO), although that is not a requirement. Divider control input may be provided by either the baseband circuitry 4404 or the applications processor 4402 depending on the desired output frequency. In some embodiments, a divider control input (e.g., N) may be determined from a look-up table based on a channel indicated by the applications processor 4402.

Synthesizer circuitry 4406d of the RF circuitry 4406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 4406d may be configured to generate a carrier frequency as the output frequency, while in other embodiments, the output frequency may be a multiple of the carrier frequency (e.g., twice the carrier frequency, four times the carrier frequency)

and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 4406 may include an IQ/polar converter.

FEM circuitry 4408 may include a receive signal path which may include circuitry configured to operate on RF signals received from one or more antennas 4410, amplify the received signals and provide the amplified versions of the received signals to the RF circuitry 4406 for further processing. FEM circuitry 4408 may also include a transmit signal path which may include circuitry configured to amplify signals for transmission provided by the RF circuitry 4406 for transmission by one or more of the one or more antennas 4410. In various embodiments, the amplification through the transmit or receive signal paths may be done solely in the RF circuitry 4406, solely in the FEM 4408, or in both the RF circuitry 4406 and the FEM 4408.

In some embodiments, the FEM circuitry 4408 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 4406). The transmit signal path of the FEM circuitry 4408 may include a power amplifier (PA) to amplify input RF signals (e.g., provided by RF circuitry 4406), and one or more filters to generate RF signals for subsequent transmission (e.g., by one or more of the one or more antennas 4410).

In some embodiments, the PMC 4412 may manage power provided to the baseband circuitry 4404. In particular, the PMC 4412 may control power-source selection, voltage scaling, battery charging, or DC-to-DC conversion. The PMC 4412 may often be included when the device 4400 is capable of being powered by a battery, for example, when the device is included in a UE. The PMC 4412 may increase the power conversion efficiency while providing desirable implementation size and heat dissipation characteristics.

While FIG. 44 shows the PMC 4412 coupled only with the baseband circuitry 4404. However, in other embodiments, the PMC 4412 may be additionally or alternatively coupled with, and perform similar power management operations for, other components such as, but not limited to, application circuitry 4402, RF circuitry 4406, or FEM 4408.

In some embodiments, the PMC 4412 may control, or otherwise be part of, various power saving mechanisms of the device 4400. For example, if the device 4400 is in an RRC_Connected state, where it is still connected to the RAN node as it expects to receive traffic shortly, then it may enter a state known as Discontinuous Reception Mode (DRX) after a period of inactivity. During this state, the device 4400 may power down for brief intervals of time and thus save power.

If there is no data traffic activity for an extended period of time, then the device 4400 may transition off to an RRC_Idle state, where it disconnects from the network and does not perform operations such as channel quality feedback, handover, etc. The device 4400 goes into a very low power state and it performs paging where again it periodically wakes up to listen to the network and then powers down again. The device 4400 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 4402 and processors of the baseband circuitry 4404 may be used to execute elements of one or more instances of a protocol stack. For example, processors of the baseband circuitry 4404, alone or in combination, may be used execute Layer 3, Layer 2, or Layer 1 functionality, while processors of the application circuitry 4404 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer. As referred to herein, Layer 2 may comprise a medium access control (MAC) layer, a radio link control (RLC) layer, and a packet data convergence protocol (PDCP) layer. As referred to herein, Layer 1 may comprise a physical (PHY) layer of a CD/RAN node.

Figure 45:
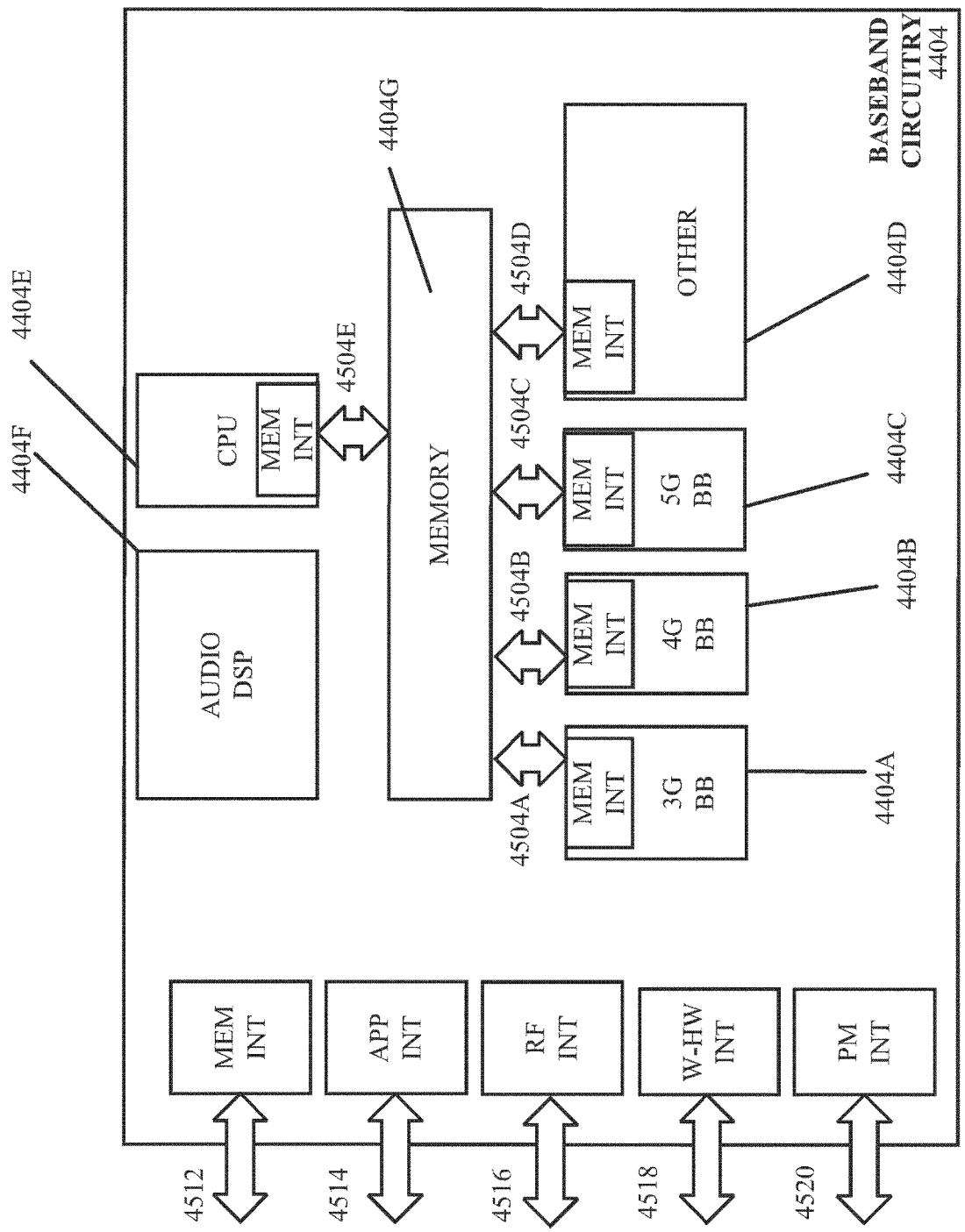
FIG. 45 illustrates example interfaces of baseband circuitry in accordance with some embodiments.

FIG. 45 illustrates example interfaces of baseband circuitry in accordance with some embodiments. As discussed above, the baseband circuitry 4404 of FIG. 44 may comprise processors 4404A-4404E and a memory 4404G utilized by said processors. Each of the processors 4404A-4404E may include a memory interface, 4504A-4504E, respectively, to send/receive data to/from the memory 4404G.

The baseband circuitry 4404 may further include one or more interfaces to communicatively couple to other circuitries/devices, such as a memory interface 4512 (e.g., an interface to send/receive data to/from memory external to the baseband circuitry 4404), an application circuitry interface 4514 (e.g., an interface to send/receive data to/from the application circuitry 4402 of FIG. 44), an RF circuitry interface 4516 (e.g., an interface to send/receive data to/from RF circuitry 4406 of FIG. 44), a wireless hardware connectivity interface 4518 (e.g., an interface to send/receive data to/from Near Field Communication (NFC) components, Bluetooth® components (e.g., Bluetooth® Low Energy), Wi-Fi® components, and other communication components), and a power management interface 4520 (e.g., an interface to send/receive power or control signals to/from the PMC 4412.

Figure 46:
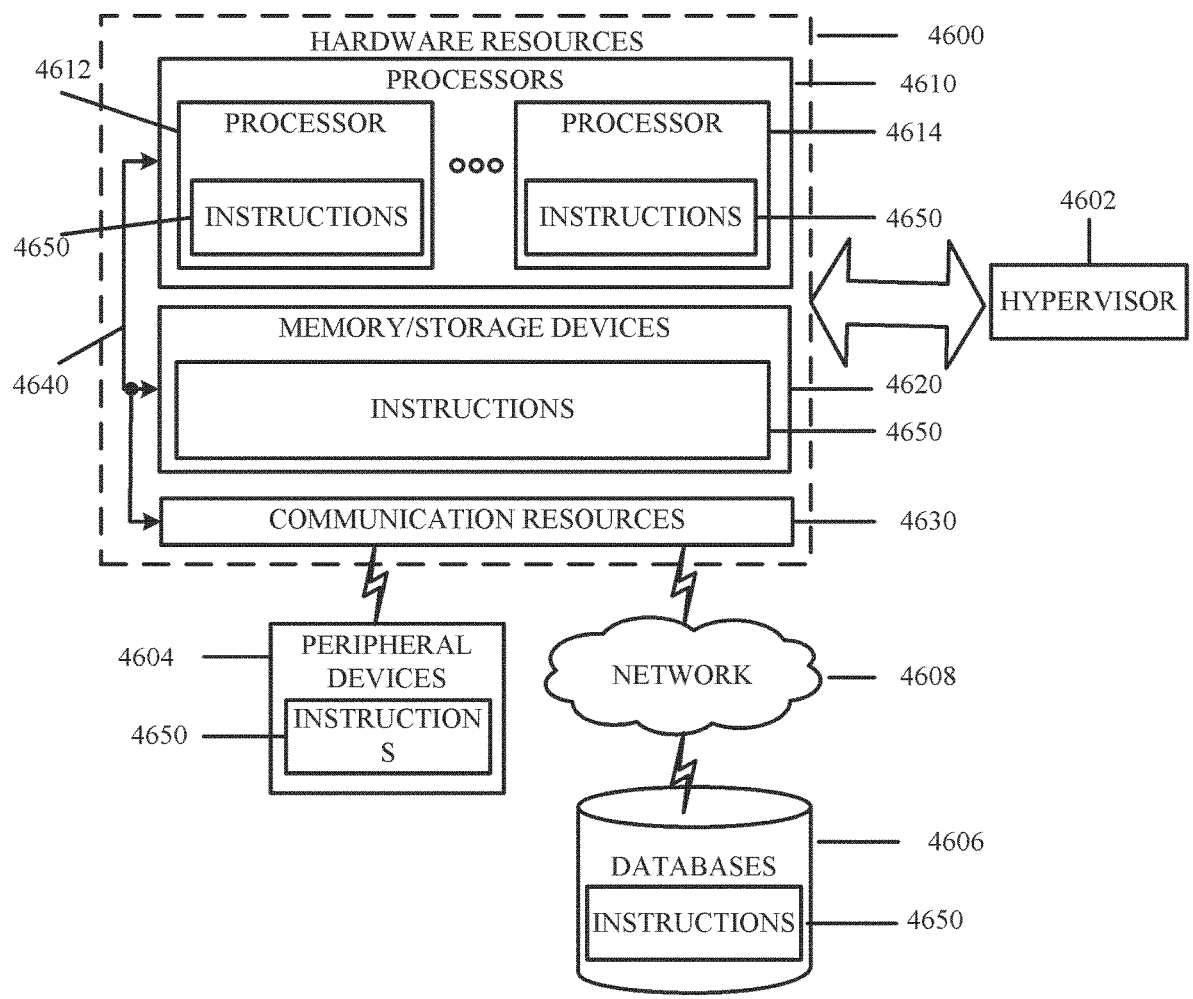
FIG. 46 is a block diagram illustrating components, according to some example embodiments, able to read instructions from a machine-readable or computer-readable medium and perform any one or more of the methodologies discussed herein.

FIG. 46 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 46 shows a diagrammatic representation of hardware resources 4600 including one or more processors (or processor cores) 4610, one or more memory/storage devices 4620, and one or more communication resources 4630, each of which may be communicatively coupled via a bus 4640. For embodiments where node virtualization (e.g., NFV) is utilized, a hypervisor 4602 may be executed to provide an execution environment for one or more network slices/sub-slices to utilize the hardware resources 4600.

The processors 4610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 4612 and a processor 4614.

The memory/storage devices 4620 may include main memory, disk storage, or any suitable combination thereof. The memory/storage devices 4620 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 4630 may include interconnection or network interface components or other suitable devices to communicate with one or more peripheral devices 4604 or one or more databases 4606 via a network 4608. For example, the communication resources 4630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 4650 may comprise software, a program, an application, an applet, an app, or other executable code for causing at least any of the processors 4610 to perform any one or more of the methodologies discussed herein. The instructions 4650 may reside, completely or partially, within at least one of the processors 4610 (e.g., within the processor's cache memory), the memory/storage devices 4620, or any suitable combination thereof. Furthermore, any portion of the instructions 4650 may be transferred to the hardware resources 4600 from any combination of the peripheral devices 4604 or the databases 4606. Accordingly, the memory of processors 4610, the memory/storage devices 4620, the peripheral devices 4604, and the databases 4606 are examples of computer-readable and machine-readable media.

Figure 47A:
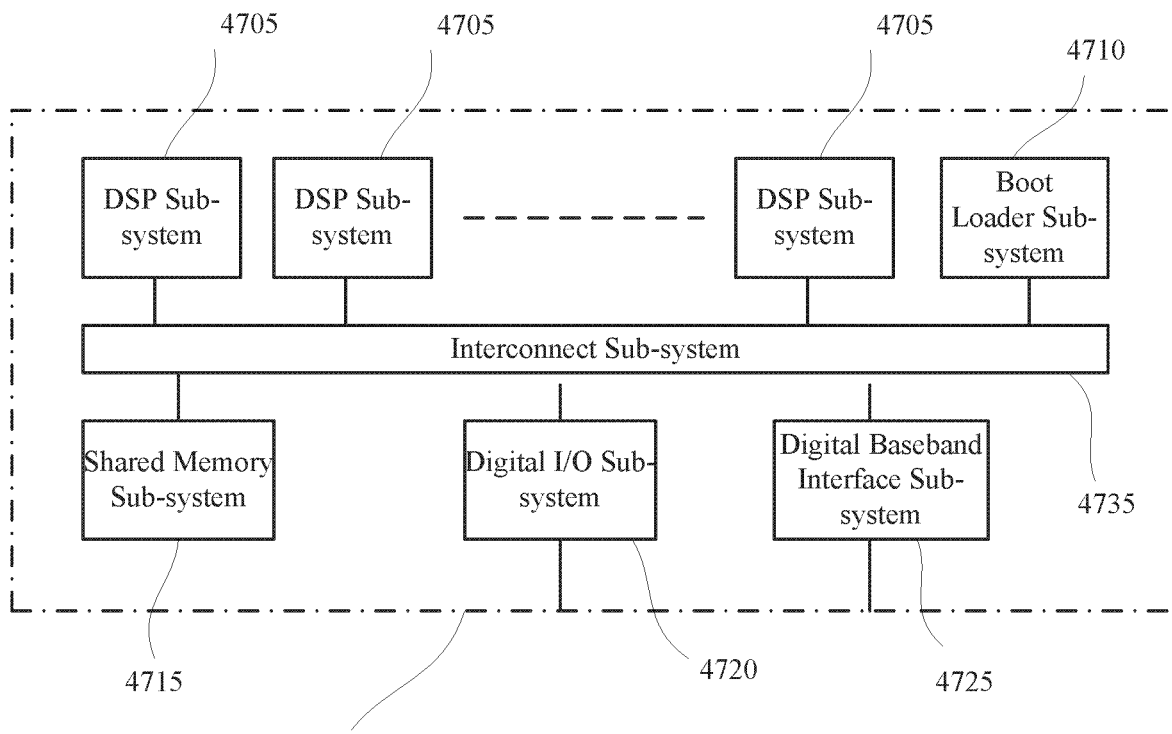
FIGS. 47a and 47b illustrate a digital baseband subsystem and a baseband processing subsystem in accordance with some embodiments of the disclosure.
Figure 47B:
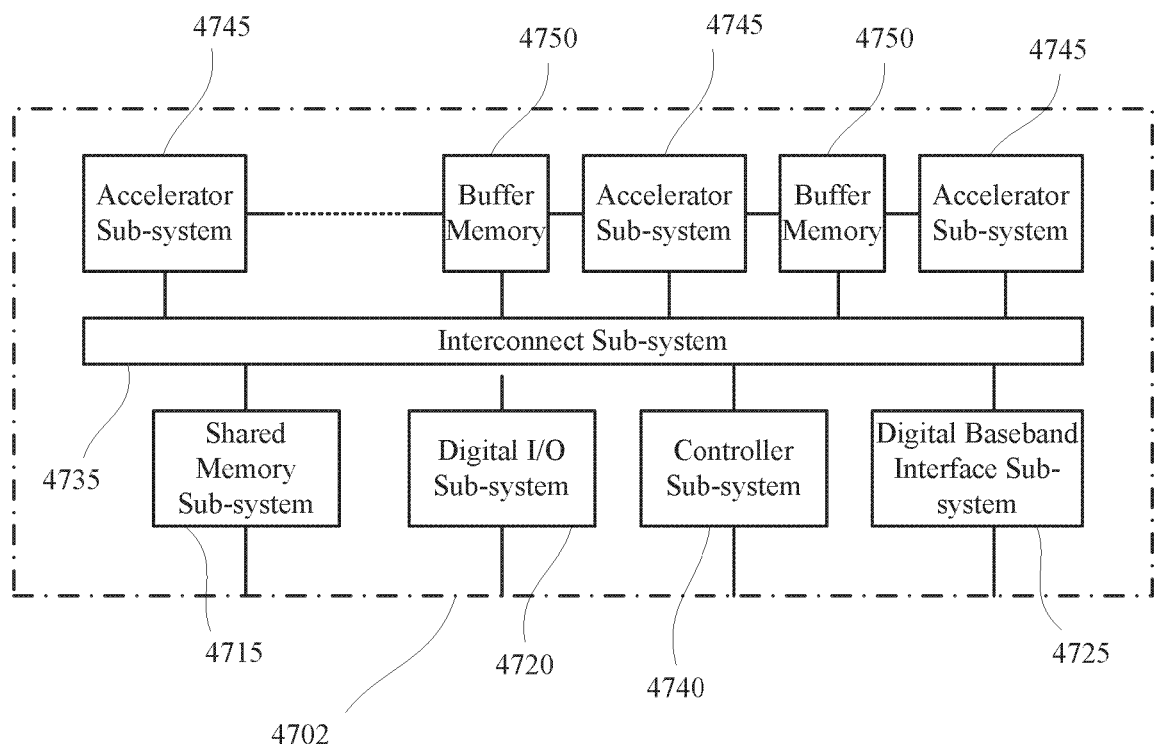

FIG. 47a illustrates an example of a digital baseband subsystem 4701, and FIG. 47b illustrates another example of a baseband processing subsystem 4702. In some examples, both of them may be implemented in the same baseband circuit.

In an example aspect of FIG. 47a, baseband processing subsystem 4701 may include one or more of each of DSP sub-systems 4705, interconnect sub-system 4735, boot loader sub-system 4710, shared memory sub-system 4715, digital I/O sub-system 4720, digital baseband interface sub-system 4725 and audio sub-system (not shown). In an example aspect of FIG. 47b, baseband processing subsystem 4702 may include one or more of each of accelerator subsystem 4745, buffer memory 4750, interconnect sub-system 4735, audio sub-system (not shown), shared memory sub-system 4715, digital I/O subsystem 4720, controller sub-system 4740 and digital baseband interface sub-system 4725.

In an aspect, boot loader sub-system 4710 may include digital logic circuitry configured to perform configuration of the program memory and running state associated with each of the one or more DSP sub-systems 4705. Configuration of the program memory of each of the one or more DSP sub-systems 4705 may include loading executable program code from storage external to baseband processing subsystem. Configuration of the running state associated with each of the one or more DSP sub-systems 4705 may include one or more of the steps of: setting the state of at least one DSP core which may be incorporated into each of the one or more DSP sub-systems to a state in which it is not running, and setting the state of at least one DSP core which may be incorporated into each of the one or more DSP sub-systems into a state in which it begins executing program code starting from a predefined memory location.

In an aspect, shared memory sub-system 4715 may include one or more of read-only memory (ROM), static random access memory (SRAM), embedded dynamic random access memory (eDRAM) and non-volatile random access memory (NVRAM).

In an aspect, digital I/O subsystem 4720 may include one or more of serial interfaces such as I$^2$C, SPI or other 1, 2 or 3-wire serial interfaces, parallel interfaces such as general-purpose input-output (GPIO), register access interfaces and direct memory access (DMA). In an aspect, a register access interface implemented in digital I/O subsystem 4720 may permit a microprocessor core external to baseband processing subsystem to read and/or write one or more of control and data registers and memory. In an aspect, DMA logic circuitry implemented in digital I/O subsystem 4720 may permit transfer of contiguous blocks of data between memory locations including memory locations internal and external to baseband processing subsystem.

In an aspect, digital baseband interface sub-system 4725 may provide for the transfer of digital baseband samples between baseband processing subsystem and mixed signal baseband or radio-frequency circuitry external to baseband processing subsystem. In an aspect, digital baseband samples transferred by digital baseband interface sub-system 4725 may include in-phase and quadrature (I/Q) samples.

In an aspect, controller sub-system 4740 may include one or more of each of control and status registers and control state machines. In an aspect, control and status registers may be accessed via a register interface and may provide for one or more of: starting and stopping operation of control state machines, resetting control state machines to a default state, configuring optional processing features, configuring the generation of interrupts and reporting the status of operations. In an aspect, each of the one or more control state machines may control the sequence of operation of each of the one or more accelerator sub-systems 4745.

Figure 48:
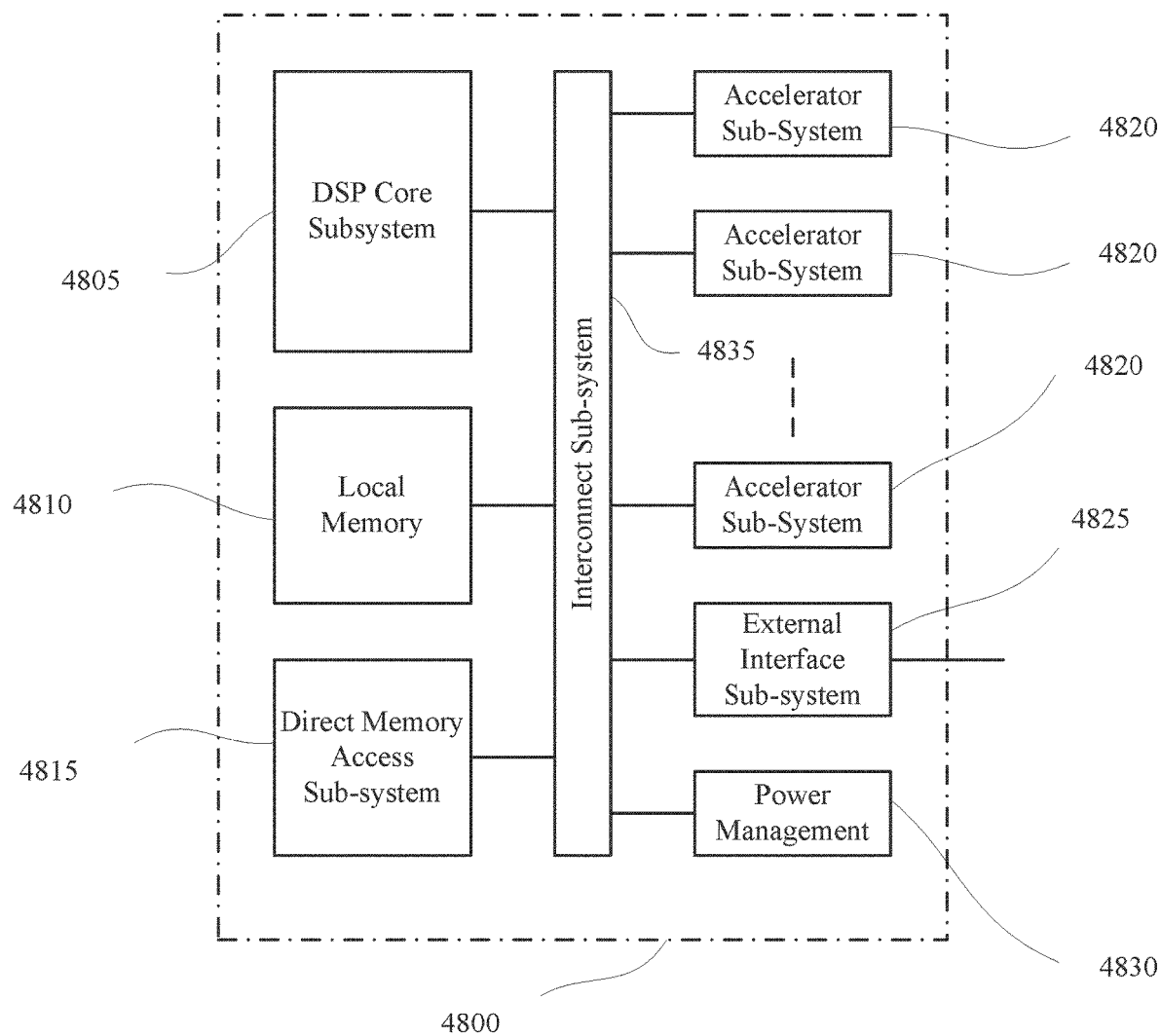
FIG. 48 illustrates a digital signal processor (DSP) subsystem in accordance with some embodiments of the disclosure.

FIG. 48 illustrates a digital signal processor (DSP) subsystem 4800 in accordance with some embodiments of the disclosure. In an aspect, DSP sub-system 4800 may include one or more of each of DSP core sub-system 4805, local memory 4810, direct memory access sub-system 4815, accelerator sub-system 4820, external interface sub-system 4825, power management unit 4830 and interconnect sub-system 4835.

In an aspect, local memory 4810 may include one or more of each of read-only memory, static random access memory or embedded dynamic random access memory. In an aspect, direct memory access sub-system 4815 may provide registers and control state machine circuitry adapted to transfer blocks of data between memory locations including memory locations internal and external to DSP sub-system 4800.

In an aspect, external interface sub-system 4825 may provide for access by a microprocessor system external to DSP sub-system 4800 to one or more of memory, control registers and status registers which may be implemented in DSP sub-system 4800. In an aspect, external interface sub-system 4825 may provide for transfer of data between local memory 4810 and storage external to DSP sub-system 4800 under the control of one or more of DMA sub-system 4815 and DSP core sub-system 4805.

Figure 49:
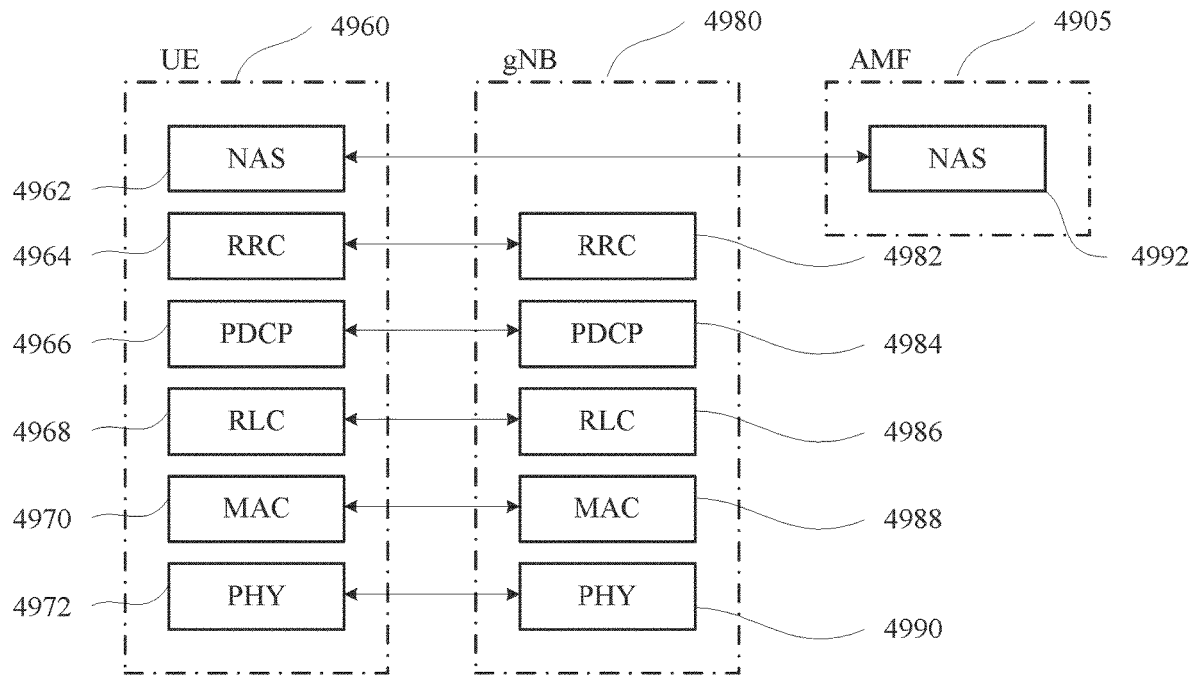
FIG. 49 illustrates protocol entities that may be implemented in wireless communication devices in accordance with some embodiments of the disclosure.

FIG. 49 illustrates protocol entities that may be implemented in wireless communication devices, including one or more of a user equipment (UE) 4960, a basestation, which may be termed an evolved node B (eNB), or new radio node B (gNB) 4980, and a network function, which may be termed a mobility management entity (IME), or an access and mobility management function (AMF) 4905, in accordance with some embodiments of the disclosure.

According to some aspects, gNB 4980 may be implemented as one or more of a dedicated physical device such as a macro-cell, a femto-cell or other suitable device, or in an alternative aspect, may be implemented as one or more software entities running on server computers as part of a virtual network termed a cloud radio access network (CRAN).

According to some aspects, one or more protocol entities that may be implemented in one or more of UE 4960, gNB 4980 and AMF 4905, may be described as implementing all or part of a protocol stack in which the layers are considered to be ordered from lowest to highest in the order PHY, MAC, RLC, PDCP, RRC and NAS. According to some aspects, one or more protocol entities that may be implemented in one or more of UE 4960, gNB 4980 and AMF 4905, may communicate with a respective peer protocol entity that may be implemented on another device, using the services of respective lower layer protocol entities to perform such communication.

According to some aspects, UE PHY 4972 and peer entity gNB PHY 4990 may communicate using signals transmitted and received via a wireless medium. According to some aspects, UE MAC 4970 and peer entity gNB MAC 4988 may communicate using the services provided respectively by UE PHY 4972 and gNB PHY 4990. According to some aspects, UE RLC 4968 and peer entity gNB RLC 4986 may communicate using the services provided respectively by UE MAC 4970 and gNB MAC 4988. According to some aspects, UE PDCP 4966 and peer entity gNB PDCP 4984 may communicate using the services provided respectively by UE RLC 4968 and 5GNB RLC 4986. According to some aspects, UE RRC 4964 and gNB RRC 4982 may communicate using the services provided respectively by UE PDCP 4966 and gNB PDCP 4984. According to some aspects, UE NAS 4962 and AMF NAS 4992 may communicate using the services provided respectively by UE RRC 4964 and gNB RRC 4982.

Figure 50:
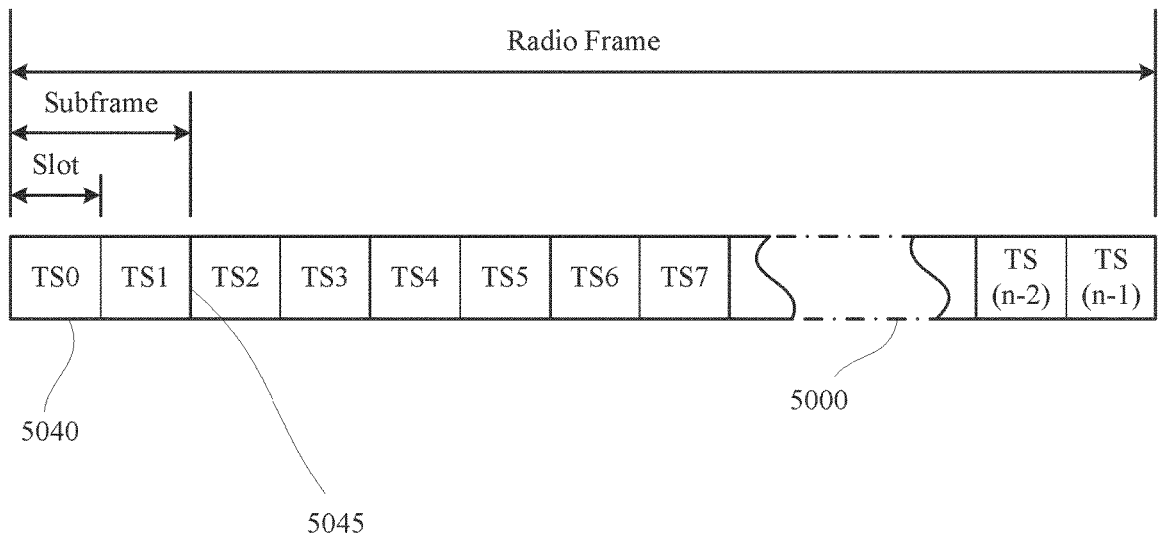
FIG. 50 illustrates a radio frame structure in accordance with some embodiments of the disclosure.

A further example of a radio frame structure that may be used in some aspects is shown in FIG. 50. In this example, radio frame 5000 has a duration of 10 ms. Radio frame 5000 is divided into slots each of duration 0.5 ms, and numbered from 0 to 19. Additionally, each pair of adjacent slots numbered 2i and 2i+1 is referred to as a subframe, where i is an integer.

In some aspects using the radio frame format of FIG. 50, each subframe may include a combination of one or more of downlink control information, downlink data information, uplink control information and uplink data information. The combination of information types and direction may be selected independently for each subframe.

EXAMPLES

The following paragraphs describe non-limiting examples of various embodiments.

Example 1 includes an apparatus to be employed in communication device in a vehicle to everything (V2X) system, comprising: a memory for storing computer-readable instructions; and processing circuitry, configured to process the instructions stored in the memory to: obtain a first path loss between the communication device and a base station, wherein the communication device is coupled to the base station; calculate a second path loss based on one or more sidelink reference signal received power (S-RSRP) indicators received by the communication device, wherein the S-RSRP indicators are received from one or more other communication devices within a communication range of the communication device; and determine a transmit (Tx) power of the communication device based on the first path loss and the second path loss.

Example 2 includes the apparatus of example 1, wherein the processing circuitry is to determine the Tx power of the communication device by: calculating a basic Tx power of the communication device based on a semi-static network configuration and a Tx resource allocation for the communication device by higher layers, and the eNodeB based path loss; obtain an adjustment value for adjusting the basic Tx power of the communication device based on the first path loss and the second path loss; and determine the Tx power of the communication device based on the adjustment value and the basic Tx power of the communication device.

Example 3 includes the apparatus of examples 1 or 2, wherein the processing circuitry is further to: determine the S-RSRP transmitted by each of the other communication devices.

Example 4 includes the apparatus of any of examples 1-3, wherein the processing circuitry is to calculate the second path loss based on a minimum of the one or more S-RSRPs (MinS-RSRP) and a maximal Tx power (MaxTxpower) allowed for a communication device in the V2X system.

Example 5 includes the apparatus of example 4, wherein the second path loss equals a difference between the MaxTxpower and the MinS-RSRP Example 6 includes the apparatus of example 2, wherein the processing circuitry is to obtain the adjustment value for adjusting the Tx power of the communication device based on:

$$\text{adjustment value} = \min(-(\text{first path loss} - \text{second path loss}), 0).$$

Example 7 includes the apparatus of example 6, wherein the processing circuitry is to determine the Tx power of the communication device by adding the adjustment value to the basic Tx power of the communication device.

Example 8 includes the apparatus of any of examples 1-7, wherein the communication device comprises a transceiver, and the processing circuitry is further to apply the determined Tx power of the communication device to the transceiver for subsequent transmissions.

Example 9 includes a machine-readable storage medium, having instructions stored thereon, which when executed by a processor of communication device in a vehicle to everything (V2X) system, cause the following operations to be performed, comprising: obtaining a base station based path loss between the communication device and a base station to which the communication device is coupled; calculating a sidelink reference signal received power (S-RSRP) based path loss based on one or more S-RSRP indicators transmitted by one or more other communication devices detectable by the communication device; and determining a transmit (Tx) power of the communication device based on the base station based path loss and the S-RSRP based path loss.

Example 10 includes the machine-readable storage medium of example 9, wherein the operation of determining the Tx power of the communication device comprising: calculating a basic Tx power of the communication device based on a semi-static network configuration and a Tx resource allocation for the communication device by higher layers, and the base station based path loss; obtaining an adjustment value for adjusting the basic Tx power of the communication device based on the base station based path loss and the S-RSRP based path loss; and determining the Tx power of the communication device based on the adjustment value and the basic Tx power of the communication device.

Example 11 includes the machine-readable storage medium of examples 9 or 10, wherein the operations further comprising: determining the S-RSRP transmitted by each of the other communication devices.

Example 12 includes the machine-readable storage medium of any of examples 9-11, wherein calculating the S-RSRP based path loss comprising calculating the S-RSRP based path loss based on a minimum of the one or more S-RSRPs (MinS-RSRP) and a maximal Tx power (MaxTxpower) allowed for a communication device in the V2X system.

Example 13 includes the machine-readable storage medium of example 12, wherein the S-RSRP based path loss equals a difference between the MaxTxpower and the MinS-RSRP.

Example 14 includes the machine-readable storage medium of example 10, wherein obtaining the adjustment value for adjusting the Tx power comprising obtaining the adjustment value based on:

adjustment value=min(-(base station based path loss-S-RSRP based path loss),0)

Example 15 includes the machine-readable storage medium of example 14, wherein determining the Tx power of the communication device comprising adding the adjustment value to the Tx power of the communication device.

Example 16 includes the machine-readable storage medium of any of examples 9-15, wherein the operations further comprising: applying the determined Tx power of the communication device for subsequent transmissions.

Example 17 includes a method for adjusting transmit (Tx) power of communication device in a vehicle to everything (V2X) system, comprising: calculating a basic Tx power of the communication device based on a semi-static network configuration and a Tx resource allocation for the communication device by higher layers, and an eNodeB based path loss; obtaining an adjustment value for adjusting the basic Tx power of the communication device based on the eNodeB based path loss and the S-RSRP based path loss; and determining the Tx power of the communication device based on the adjustment value and the basic Tx power of the communication device.

Example 18 includes the method of example 17, wherein calculating the S-RSRP based path loss comprises calculating the S-RSRP based path loss based on a minimum of the one or more S-RSRP (MinS-RSRP) and a maximal Tx power (MaxTxpower) allowed for a communication device in the V2X system.

Example 19 includes the method of examples 17 or 18, the method further comprising: estimating the S-RSRP transmitted by each of the other communication devices.

Example 20 includes the method of any of examples 17-19, wherein calculating the S-RSRP based path loss comprises calculating the S-RSRP based path loss based on a minimum of the one or more S-RSRP (MinS-RSRP) and a maximal Tx power (MaxTxpower) allowed for a communication device in the V2X system.

Example 21 includes the method of example 20, wherein calculating the S-RSRP based path loss comprises calculating the S-RSRP based path loss by subtracting the MinS-RSRP from the MaxTxpower.

Example 22 includes the method of any of example 18, wherein obtaining the adjustment value for adjusting the Tx power comprises: if the eNodeB based path loss is larger than the S-RSRP based path loss, setting the adjustment value as -(eNodeB based path loss-S-RSRP based path loss); or otherwise setting the adjustment value as zero.

Example 23 includes the method of example 22, wherein determining the Tx power of the communication device comprises adding the adjustment value to the basic Tx power of the communication device.

Example 24 includes the method of any of examples 17-23, the method further comprising: applying the determined Tx power of the communication device for subsequent transmissions.

Example 25 includes an apparatus to be employed in communication device in a vehicle to everything (V2X) system, comprising: means for obtaining information on an evolved node B (eNodeB) based path loss between the communication device and an eNodeB to which the communication device is connected; means for calculating a sidelink reference signal received power (S-RSRP) based path loss based on information on one or more S-RSRP transmitted by one or more communication devices detectable by the communication device; and means for determining the Tx power of the communication device based on the eNodeB based path loss and the S-RSRP based path loss.

Example 26 includes the apparatus of example 25, wherein the means for determining the Tx power of the communication device comprising: means for calculating a basic Tx power of the communication device based on a semi-static network configuration and a Tx resource allocation for the communication device by higher layers, and the eNodeB based path loss; means for obtaining an adjustment value for adjusting the basic Tx power of the communication device based on the eNodeB based path loss and the S-RSRP based path loss; and means for determining the Tx power of the communication device based on the adjustment value and the basic Tx power of the communication device.

Example 27 includes the apparatus of examples 25 or 26, the apparatus further comprising: means for estimating the S-RSRP transmitted by each of the other communication devices.

Example 28 includes the apparatus of any of examples 25-27, wherein the means for calculating the S-RSRP based path loss is configured to calculate the S-RSRP based path loss based on a minimum of the one or more S-RSRP (MinS-RSRP) and a maximal Tx power (MaxTxpower) allowed for a communication device in the V2X system.

Example 29 includes the apparatus of example 28, wherein the means for calculating the S-RSRP based path loss is further configured to calculate the S-RSRP based path loss by subtracting the MinS-RSRP from the MaxTxpower.

Example 30 includes the apparatus of example 26, wherein the means for obtaining the adjustment value for adjusting the Tx power comprises means for: if the eNodeB based path loss is larger than the S-RSRP based path loss, setting the adjustment value as -(eNodeB based path loss-S-RSRP based path loss); or otherwise setting the adjustment value as zero.

Example 31 includes the apparatus of example 30, wherein the means for determining the Tx power of the communication device comprises means for adding the adjustment value to the basic Tx power of the communication device.

Example 32 includes the apparatus of any of examples 25-31, the apparatus further comprising: means for applying the determined Tx power of the communication device for subsequent transmissions.

Example 33 includes an apparatus for communication device in a vehicle to everything (V2X) communication system, including circuitry configured to: measure a Reference Signal Received Power (RSRP) on each candidate channel received by the communication device; obtain remaining candidate channels available to the communication device by excluding candidate channels having a measured RSRP above a predefined RSRP threshold and candidate channels reserved by other communication devices surrounding the communication device from all candidate channels; determine whether a number of the remaining candidate channels is less than a predefined percentage of a total number of all the candidate channels; and determine a first set of candidate channels each of which includes a predetermined number L of continuous subcarriers available to the communication device when it is determined that the number of the remaining candidate channels is less than the predefined percentage of the total number of all the candidate channels, wherein each of the first set of candidate channels includes L1 subcarriers overlapping with the excluded candidate channels, where L1 is an integer ranging from 1 to a predefined integer M larger than 1.

Example 34 includes the apparatus of example 33, wherein the integer M is predefined depending on a Modulation and Coding Scheme (MCS) or an available bandwidth associated with the communication device.

Example 35 includes the apparatus of example 33, wherein when it is determined that the number of the remaining candidate channels is less than the predefined percentage of the total number of all the candidate channels, the circuitry is further configured to: measure a RSRP and a Signal to Interference plus Noise Ratio (SINR) on a reference candidate channel including the predetermined number L of continuous subcarriers to be selected by the communication device via increasing the predefined RSRP threshold by a predefined ratio; and for each of the first set of candidate channels, measure a RSRP and a SINR on the candidate channel; determine whether a ratio of the RSRP to the SINR on the candidate channel is larger than a ratio of the RSRP to the SINR on the reference candidate channel; and add the candidate channel into a list of candidate channels initially set as an empty list, when it is determined that the ratio of the RSRP to the SINR on the candidate channel is larger than the ratio of the RSRP to the SINR on the reference candidate channel.

Example 36 includes the apparatus of example 35, wherein when it is determined that the number of the remaining candidate channels is less than the predefined percentage of the total number of all the candidate channels, the circuitry is further configured to: determine whether the list of candidate channels is the empty list; select a candidate channel for the communication device from the list of candidate channels when it is determined that the list of candidate channels is not the empty list; and increase the predefined RSRP threshold by the predefined ratio when it is determined that the list of candidate channels is the empty list.

Example 37 includes the apparatus of example 36, wherein the selected candidate channel corresponds to a minimum ratio of the RSRP to the SINR among the list of candidate channels.

Example 38 includes the apparatus of example 33, wherein when it is determined that the number of the remaining candidate channels is less than the predefined percentage of the total number of all the candidate channels, the circuitry is further configured to: measure a RSRP and a Signal to Interference plus Noise Ratio (SINR) on a reference candidate channel including the predetermined number L of continuous subcarriers to be selected by the communication device via increasing the predefined RSRP threshold by a predefined ratio; divide the first set of candidate channels into M subsets of candidate channels based on a number of overlapping subcarriers included in each candidate channel, wherein each of a first subset of candidate channels includes one overlapping subcarrier and each of an M-th subset of candidate channels includes M overlapping subcarriers; perform a judgment process for the first subset of candidate channels, for each candidate channel, the judgment process including: measuring a RSRP and a SINR on the candidate channel, determining whether a ratio of the RSRP to the SINR on the candidate channel is larger than a ratio of the RSRP to the SINR on the reference candidate channel, and adding the candidate channel into a list of candidate channels initially set as an empty list, when it is determined that the ratio of the RSRP to the SINR on the candidate channel is larger than the ratio of the RSRP to the SINR on the reference candidate channel; determine whether the list of candidate channels is the empty list; when it is determined that the list of candidate channels is the empty list, continue to perform the judgment process for a next subset of candidate channels in sequence until it is determined that the list of candidate channels is not the empty list or the judgment process has been performed for all the M subsets of candidate channels; when it is determined that the list of candidate channels is not the empty list, select a candidate channel for the communication device from the list of candidate channels and stop the judgment process; and increase the predefined RSRP threshold by the predefined ratio when it is determined that the list of candidate channels is still the empty list after the judgment process has been performed for all the M subsets of candidate channels.

Example 39 includes the apparatus of example 38, wherein the selected candidate channel corresponds to a minimum ratio of the RSRP to the SINR among the list of candidate channels.

Example 40 includes the apparatus of example 33, wherein the candidate channels reserved by the other communication devices are determined by decoding Sidelink Control Information (SCI) received from the other communication devices.

Example 41 includes the apparatus of example 33, wherein when it is determined that the number of the remaining candidate channels is not less than the predefined percentage of the total number of all the candidate channels, the circuitry is further configured to determine a second set of candidate channels each of which including the predetermined number L of continuous subcarriers having no overlap with the excluded candidate channels.

Example 42 includes the apparatus of example 41, wherein when it is determined that the number of the remaining candidate channels is not less than the predefined percentage of the total number of all the candidate channels, the circuitry is further configured to randomly select a candidate channel for the communication device from the second set of candidate channels.

Example 43 includes the apparatus of example 41, wherein when it is determined that the number of the remaining candidate channels is not less than the predefined percentage of the total number of all the candidate channels, the circuitry is further configured to: measure an average Sidelink Received Signal Strength Indicator (S-RSSI) value for each of the second set of candidate channels; and randomly select a candidate channel for the communication device from a predefined number K of candidate channels corresponding to smallest K average S-RSSI values.

Example 44 includes the apparatus of any of examples 33 to 43, wherein the predefined percentage is 20%.

Example 45 includes the apparatus of any of examples 35 to 38, wherein the predefined ratio is 3 dB.

Example 46 includes a method performed at a communication device in a vehicle to everything (V2X) communication system, including: measuring a Reference Signal Received Power (RSRP) on each candidate channel received by the communication device; obtaining remaining candidate channels available to the communication device by excluding candidate channels having a measured RSRP above a predefined RSRP threshold and candidate channels reserved by other communication devices surrounding the communication device from all candidate channels; determining whether a number of the remaining candidate channels is less than a predefined percentage of a total number of all the candidate channels; and determining a first set of candidate channels each of which includes a predetermined number L of continuous subcarriers available to the communication device when it is determined that the number of the remaining candidate channels is less than the predefined percentage of the total number of all the candidate channels, wherein each of the first set of candidate channels includes L1 subcarriers overlapping with the excluded candidate channels, where L1 is an integer ranging from 1 to a predefined integer M larger than 1.

Example 47 includes the method of example 46, wherein the integer M is predefined depending on a Modulation and Coding Scheme (MCS) or an available bandwidth associated with the communication device.

Example 48 includes the method of example 46, wherein when it is determined that the number of the remaining candidate channels is less than the predefined percentage of the total number of all the candidate channels, the method further includes: measuring a RSRP and a Signal to Interference plus Noise Ratio (SINR) on a reference candidate channel including the predetermined number L of continuous subcarriers to be selected by the communication device via increasing the predefined RSRP threshold by a predefined ratio; and for each of the first set of candidate channels, measuring a RSRP and a SINR on the candidate channel; determining whether a ratio of the RSRP to the SINR on the candidate channel is larger than a ratio of the RSRP to the SINR on the reference candidate channel; and adding the candidate channel into a list of candidate channels initially set as an empty list, when it is determined that the ratio of the RSRP to the SINR on the candidate channel is larger than the ratio of the RSRP to the SINR on the reference candidate channel.

Example 49 includes the method of example 48, wherein when it is determined that the number of the remaining candidate channels is less than the predefined percentage of the total number of all the candidate channels, the method further includes: determining whether the list of candidate channels is the empty list; selecting a candidate channel for the communication device from the list of candidate channels when it is determined that the list of candidate channels is not the empty list; and increasing the predefined RSRP threshold by the predefined ratio when it is determined that the list of candidate channels is the empty list.

Example 50 includes the method of example 49, wherein the selected candidate channel corresponds to a minimum ratio of the RSRP to the SINR among the list of candidate channels.

Example 51 includes the method of example 46, wherein when it is determined that the number of the remaining candidate channels is less than the predefined percentage of the total number of all the candidate channels, the method further includes: measuring a RSRP and a Signal to Interference plus Noise Ratio (SINR) on a reference candidate channel including the predetermined number L of continuous subcarriers to be selected by the communication device via increasing the predefined RSRP threshold by a predefined ratio; dividing the first set of candidate channels into M subsets of candidate channels based on a number of overlapping subcarriers included in each candidate channel, wherein each of a first subset of candidate channels includes one overlapping subcarrier and each of an M-th subset of candidate channels includes M overlapping subcarriers; performing a judgment process for the first subset of candidate channels, for each candidate channel, the judgment process including: measuring a RSRP and a SINR on the candidate channel, determining whether a ratio of the RSRP to the SINR on the candidate channel is larger than a ratio of the RSRP to the SINR on the reference candidate channel, and adding the candidate channel into a list of candidate channels initially set as an empty list, when it is determined that the ratio of the RSRP to the SINR on the candidate channel is larger than the ratio of the RSRP to the SINR on the reference candidate channel; and determining whether the list of candidate channels is the empty list; when it is determined that the list of candidate channels is the empty list, continuing to perform the judgment process for a next subset of candidate channels in sequence until it is determined that the list of candidate channels is not the empty list or the judgment process has been performed for all the M subsets of candidate channels; when it is determined that the list of candidate channels is not the empty list, selecting a candidate channel for the communication device from the list of candidate channels and stopping the judgment process; and increasing the predefined RSRP threshold by the predefined ratio when it is determined that the list of candidate channels is still the empty list after the judgment process has been performed for all the M subsets of candidate channels.

Example 52 includes the method of example 51, wherein the selected candidate channel corresponds to a minimum ratio of the RSRP to the SINR among the list of candidate channels.

Example 53 includes the method of example 46, wherein the candidate channels reserved by the other communication devices are determined by decoding Sidelink Control Information (SCI) received from the other communication devices.

Example 54 includes the method of example 46, wherein when it is determined that the number of the remaining candidate channels is not less than the predefined percentage of the total number of all the candidate channels, the method further includes: determining a second set of candidate channels each of which including the predetermined number L of continuous subcarriers having no overlap with the excluded candidate channels.

Example 55 includes the method of example 54, wherein when it is determined that the number of the remaining candidate channels is not less than the predefined percentage of the total number of all the candidate channels, the method further includes: randomly selecting a candidate channel for the communication device from the second set of candidate channels.

Example 56 includes the method of example 54, wherein when it is determined that the number of the remaining candidate channels is not less than the predefined percentage of the total number of all the candidate channels, the method further includes: measuring an average Sidelink Received Signal Strength Indicator (S-RSSI) value for each of the second set of candidate channels; and randomly selecting a candidate channel for the communication device from a predefined number K of candidate channels corresponding to smallest K average S-RSSI values.

Example 57 includes the method of any of examples 46 to 56, wherein the predefined percentage is 20%.

Example 58 includes the method of any of examples 49 to 52, wherein the predefined ratio is 3 dB.

Example 59 includes a non-transitory computer-readable medium having instructions stored thereon, wherein the instructions, when executed by one or more processor(s) of communication device (CD) in a vehicle to everything (V2X) communication system, cause the processor(s) to perform the method of any of examples 46-58.

Example 60 includes an apparatus for communication device (CD) in a vehicle to everything (V2X) communication system, including means for performing the actions of the method of any of examples 46-58.

Example 61 includes an apparatus for communication device (CD) in a vehicle to everything (V2X) communication system, including circuitry configured to: decode one or more subframes received on each of a number of Physical Sidelink Control Chanel (PSCCH) candidates from other communication devices surrounding the communication device, wherein each of the one or more subframes includes a predefined set of normal symbols and at least one blank symbol; measure a normal Sidelink Received Signal Strength Indicator (S-RSSI) value for each of the number of PSCCH candidates on a normal measurement window including the predefined set of normal symbols of a current subframe on the communication device; measure an assistance S-RSSI value for each of the number of PSCCH candidates on an assistance measurement window including the at least one blank symbol of the current subframe or the at least one blank symbol of a preceding subframe adjacent to the current subframe; and determine a predefined number N of PSCCH candidates from the number of PSCCH candidates by sorting normal S-RSSI values and assistance S-RSSI values as measured for the number of PSCCH candidates available to the communication device, where N is an integer larger than 0.

Example 62 includes the apparatus of example 61, wherein the circuitry is further configured to: monitor timings of the other communication devices surrounding the communication device; and determine the assistance measurement window based on a comparison between a timing of the communication device and the timings of the other communication devices.

Example 63 includes the apparatus of example 61 or 62, wherein the determination of the predefined number N of PSCCH candidates includes: determining a predefined number (N−M) of the PSCCH candidates by sorting the measured normal S-RSSI values; and determining a remaining number M of the PSCCH candidates by sorting the measured assistance S-RSSI values, where M is a predefined integer smaller than N and larger than 0.

Example 64 includes the apparatus of example 61, wherein the at least one blank symbol is an ending symbol of each of the one or more subframes.

Example 65 includes the apparatus of example 64, wherein the assistance measurement window includes a pre-assistance measurement window including the ending symbol of a preceding subframe adjacent to the current subframe and a post-assistance measurement window including the ending symbol of the current subframe.

Example 66 includes the apparatus of example 65, wherein the circuitry is further configured to: monitor timings of the other communication devices surrounding the communication device; and divide the other communication devices into a first group of the other communication devices having the timings ahead of a timing of the communication device, a second group of the other communication devices having the timings behind the timing of the communication device and a third group of the other communication devices having the timings same as the timing of the communication device, wherein the determination of the predefined number N of PSCCH candidates includes: determining a first number of PSCCH candidates received from the first group of the other communication devices by sorting the normal S-RSSI values measured on the normal measurement window and the assistance S-RSSI values measured on the pre-assistance measurement window; determining a second number of PSCCH candidates received from the second group of the other communication devices by sorting the normal S-RSSI values measured on the normal measurement window and the assistance S-RSSI values measured on the post-assistance measurement window; and determining a third number of PSCCH candidates from the third group of the other communication devices by sorting the normal S-RSSI values measured on the normal measurement window, wherein a sum of the first number, the second number and the third number is the predefined number N.

Example 67 includes a method performed at communication device (CD) in a vehicle to everything (V2X) communication system, including: decoding one or more subframes received on each of a number of Physical Sidelink Control Chanel (PSCCH) candidates from other communication devices surrounding the communication device, wherein each of the one or more subframes includes a predefined set of normal symbols and at least one blank symbol; measuring a normal Sidelink Received Signal Strength Indicator (S-RSSI) value for each of the number of PSCCH candidates on a normal measurement window including the predefined set of normal symbols of a current subframe on the communication device; measuring an assistance S-RSSI value for each of the number of PSCCH candidates on an assistance measurement window including the at least one blank symbol of the current subframe or the at least one blank symbol of a preceding subframe adjacent to the current subframe; and determining a predefined number N of PSCCH candidates from the number of PSCCH candidates by sorting normal S-RSSI values and assistance S-RSSI values as measured for the number of PSCCH candidates available to the communication device, where N is an integer larger than 0.

Example 68 includes the method of example 67, further including: monitoring timings of the other communication devices surrounding the communication device; and determining the assistance measurement window based on a comparison between a timing of the communication device and the timings of the other communication devices.

Example 69 includes the method of example 67 or 68, wherein the determining the predefined number N of PSCCH candidates includes: determining a predefined number (N−M) of the PSCCH candidates by sorting the measured normal S-RSSI values; and determining a remaining number M of the PSCCH candidates by sorting the measured assistance S-RSSI values, where M is a predefined integer smaller than N and larger than 0.

Example 70 includes the method of example 67, wherein the at least one blank symbol is an ending symbol of each of the one or more subframes.

Example 71 includes the method of example 70, wherein the assistance measurement window includes a pre-assistance measurement window including the ending symbol of a preceding subframe adjacent to the current subframe and a post-assistance measurement window including the ending symbol of the current subframe.

Example 72 includes the method of example 71, further including: monitoring timings of the other communication devices surrounding the communication device; and dividing the other communication devices into a first group of the other communication devices having the timings ahead of a timing of the communication device, a second group of the other communication devices having the timings behind the timing of the communication device and a third group of the other communication devices having the timings same as the timing of the communication device, wherein the determining the predefined number N of PSCCH candidates includes: determining a first number of PSCCH candidates received from the first group of the other communication devices by sorting the normal S-RSSI values measured on the normal measurement window and the assistance S-RSSI values measured on the pre-assistance measurement window; determining a second number of PSCCH candidates received from the second group of the other communication devices by sorting the normal S-RSSI values measured on the normal measurement window and the assistance S-RSSI values measured on the post-assistance measurement window; and determining a third number of PSCCH candidates from the third group of the other communication devices by sorting the normal S-RSSI values measured on the normal measurement window, wherein a sum of the first number, the second number and the third number is the predefined number N.

Example 73 includes a non-transitory computer-readable medium having instructions stored thereon, wherein the instructions, when executed by one or more processor(s) of communication device (CD) in a vehicle to everything (V2X) communication system, cause the processor(s) to perform the method of any of examples 67-72.

Example 74 includes an apparatus for communication device (CD) in a vehicle to everything (V2X) communication system, including means for performing the actions of the method of any of examples 67-72.

Example 75 includes an apparatus for communication device (CD) operating in a receiving mode in a vehicle to everything (V2X) communication system, including circuitry configured to: detect whether a last symbol in a subframe received at the communication device is a blank symbol; and demodulate the subframe including the last symbol when it is detected that the last symbol is not the blank symbol.

Example 76 includes the apparatus of example 75, wherein the circuitry is further configured to detect whether the last symbol in the subframe received at the communication device is the blank symbol by measuring a received power on frequency resources allocated to the communication device during the last symbol; and determining that the last symbol is not the blank symbol if the received power as measured is greater than a predetermined power threshold.

Example 77 includes the apparatus of example 75, wherein the last symbol is configured with a cyclic prefix, and the circuitry is further configured to detect whether the last symbol in the subframe received at the communication device is the blank symbol by obtaining an autocorrelation strength by calculating an autocorrelation function between the cyclic prefix and the last symbol; and determining that the last symbol is not the blank symbol if the autocorrelation strength is greater than a predetermined autocorrelation threshold.

Example 78 includes the apparatus of example 75, wherein the last symbol is configured with a cyclic prefix, and the circuitry is further configured to detect whether the last symbol in the subframe received at the communication device is the blank symbol by: zero-forcing strength of signals on all received frequency resources other than the frequency resources allocated to the communication device during the last symbol to get a processed last symbol in a frequency domain; transforming the processed last symbol back to a time domain; obtaining an autocorrelation strength by calculating an autocorrelation function between the cyclic prefix and the transformed last symbol in the time domain; and determining that the last symbol is not the blank symbol if the autocorrelation strength is greater than a predetermined autocorrelation threshold.

Example 79 includes the apparatus of example 75, wherein the circuitry is further configured to: determine whether the communication device is scheduled to switch from the receiving mode to a transmitting mode for a next subframe; and decode the subframe including the last symbol when it is determined that the communication device is not scheduled to switch from the receiving mode to the transmitting mode for the next subframe.

Example 80 includes the apparatus of example 79, wherein the circuitry is further configured to: terminate receiving the subframe in advance by a symbol duration corresponding to the last symbol of the subframe and configure the communication device to switch from the receiving mode to the transmitting mode within the symbol duration, when it is determined that the communication device is scheduled to switch from the receiving mode to the transmitting mode for the next subframe.

Example 81 includes the apparatus of any of examples 75 to 80, wherein a first symbol in the subframe is configured for Automatic Gain Control (AGC), and when an initial gain for the first symbol meets a demodulation threshold requirement, the circuitry is further configured to: determine whether a differential gain between the initial gain for the first symbol and an updated gain for following symbols is less than a predefined differential threshold; and demodulate the subframe including the first symbol when it is determined that the differential gain between the initial gain for the first symbol and the updated gain for the following symbols is less than the predetermined differential threshold.

Example 82 includes the apparatus of any of examples 75 to 80, wherein a first symbol in the subframe is configured for Automatic Gain Control (AGC), and when an initial gain for the first symbol does not meet a demodulation threshold requirement, the circuitry is further configured to demodulate the subframe excluding the first symbol.

Example 83 includes the apparatus of example 81, wherein the circuitry is further configured to demodulate the subframe excluding the first symbol when it is determined that the differential gain between the initial gain for the first symbol and the updated gain for the following symbols is not less than the predetermined differential threshold.

Example 84 includes an apparatus for communication device (CD) operating in a receiving mode in a vehicle to everything (V2X) communication system, including circuitry configured to: demodulate a received subframe including a first symbol and a last symbol and generate soft-bits for the first symbol and soft-bits for the last symbol; measure a detection metric associated with the last symbol; determine a last symbol detection confidence index proportional to the measured detection metric; and generate scaled soft-bits for the last symbol by multiplying the soft-bits for the last symbol with a scaling factor determined based on the last symbol detection confidence index.

Example 85 includes the apparatus of example 84, wherein the detection metric includes a received power on frequency resources allocated to the communication device during the last symbol.

Example 86 includes the apparatus of example 84, wherein the last symbol is configured with a cyclic prefix and the detection metric includes an autocorrelation strength obtained by calculating an autocorrelation function between the cyclic prefix and the last symbol.

Example 87 includes the apparatus of example 84, wherein the last symbol is configured with a cyclic prefix and the detection metric includes an autocorrelation strength obtained by: zero-forcing strength of signals on all received frequency resources other than the frequency resources allocated to the communication device during the last symbol to get a processed last symbol in a frequency domain; transforming the processed last symbol back to a time domain; and calculating an autocorrelation function between the cyclic prefix and the transformed last symbol in the time domain.

Example 88 includes the apparatus of example 84, wherein the circuitry is further configured to: determine whether the communication device is scheduled to switch from the receiving mode to a transmitting mode for a next subframe; and decode the subframe including the last symbol when it is determined that the communication device is not scheduled to switch from the receiving mode to the transmitting mode for the next subframe.

Example 89 includes the apparatus of example 88, wherein the circuitry is further configured to: terminate receiving the subframe in advance by a symbol duration corresponding to the last symbol of the subframe and configure the communication device to switch from the receiving mode to the transmitting mode within the symbol duration, when it is determined that the communication device is scheduled to switch from the receiving mode to the transmitting mode for the next subframe.

Example 90 includes the apparatus of example 88, wherein the circuitry is further configured to: terminate receiving the subframe in advance by at least a part of a symbol duration corresponding to the last symbol of the subframe and configure the communication device to switch from the receiving mode to the transmitting mode within the part of the symbol duration, when it is determined that the communication device is scheduled to switch from the receiving mode to the transmitting mode for the next subframe.

Example 91 includes the apparatus of any of examples 84 to 90, wherein a first symbol in the subframe is configured for Automatic Gain Control (AGC), and when an initial gain for the first symbol meets a demodulation threshold requirement, the circuitry is further configured to: calculate a differential gain between the initial gain for the first symbol and an updated gain for following symbols; determine a first symbol acceptability index inversely proportional to the differential gain; and generate scaled soft-bits for the first symbol by multiplying the soft-bits for the first symbol with a scaling factor determined based on the first symbol acceptability index.

Example 92 includes the apparatus of any of example 84 to 90, wherein a first symbol in the subframe is configured for Automatic Gain Control (AGC), and when an initial gain for the first symbol does not meet a demodulation threshold requirement, the circuitry is further configured to generate scaled soft-bits for the first symbol by multiplying the soft-bits for the first symbol with 0.

Example 93 includes an apparatus for communication device (CD) operating in a transmitting mode in a vehicle to everything (V2X) communication system, including circuitry configured to: determine whether the communication device is scheduled to switch from the transmitting mode to a receiving mode for a next subframe; and transmit a subframe including a last symbol with a requested transmission power when it is determined that the communication device is not scheduled to switch from the transmitting mode to the receiving mode for the next subframe.

Example 94 includes the apparatus of example 93, wherein the circuitry is further configured to: set a transmission power for a symbol duration corresponding to the last symbol of the subframe to a minimized transmission power and configure the communication device to switch from the transmitting mode to the receiving mode within the symbol duration, when it is determined that the communication device is scheduled to switch from the transmitting mode to the receiving mode for the next subframe.

Example 95 includes the apparatus of example 93, wherein the circuitry is further configured to: set a transmission power for at least a part of a symbol duration corresponding to the last symbol of the subframe to a minimized transmission power and configure the communication device to switch from the transmitting mode to the receiving mode within the part of the symbol duration, when it is determined that the communication device is scheduled to switch from the transmitting mode to the receiving mode for the next subframe.

Example 96 includes a method performed at communication device (CD) operating in a receiving mode in a vehicle to everything (V2X) communication system, including: detecting whether a last symbol in a subframe received at the communication device is a blank symbol; and demodulating the subframe including the last symbol when it is detected that the last symbol is not the blank symbol.

Example 97 includes the method of example 96, wherein the detecting whether the last symbol in the subframe received at the communication device is the blank symbol includes: measuring a received power on frequency resources allocated to the communication device during the last symbol; and determining that the last symbol is not the blank symbol if the received power as measured is greater than a predetermined power threshold.

Example 98 includes the method of example 96, wherein the last symbol is configured with a cyclic prefix, and the detecting whether the last symbol in the subframe received at the communication device is the blank symbol includes: obtaining an autocorrelation strength by calculating an autocorrelation function between the cyclic prefix and the last symbol; and determining that the last symbol is not the blank symbol if the autocorrelation strength is greater than a predetermined autocorrelation threshold.

Example 99 includes the method of example 96, wherein the last symbol is configured with a cyclic prefix, and the detecting whether the last symbol in the subframe received at the communication device is the blank symbol includes: zero-forcing strength of signals on all received frequency resources other than the frequency resources allocated to the communication device during the last symbol to get a processed last symbol in a frequency domain; transforming the processed last symbol back to a time domain; obtaining an autocorrelation strength by calculating an autocorrelation function between the cyclic prefix and the transformed last symbol in the time domain; and determining that the last symbol is not the blank symbol if the autocorrelation strength is greater than a predetermined autocorrelation threshold.

Example 100 includes the method of example 96, further including: determining whether the communication device is scheduled to switch from the receiving mode to a transmitting mode for a next subframe; and decoding the subframe including the last symbol when it is determined that the communication device is not scheduled to switch from the receiving mode to the transmitting mode for the next subframe.

Example 101 includes the method of example 100, further including: terminating receiving the subframe in advance by a symbol duration corresponding to the last symbol of the subframe and configuring the communication device to switch from the receiving mode to the transmitting mode within the symbol duration, when it is determined that the communication device is scheduled to switch from the receiving mode to the transmitting mode for the next subframe.

Example 102 includes the method of any of examples 96 to 101, wherein a first symbol in the subframe is configured for Automatic Gain Control (AGC), and when an initial gain for the first symbol meets a demodulation threshold requirement, the method further includes: determining whether a differential gain between the initial gain for the first symbol and an updated gain for following symbols is less than a predefined differential threshold; and demodulating the subframe including the first symbol when it is determined that the differential gain between the initial gain for the first symbol and the updated gain of the following symbols is less than the predetermined differential threshold.

Example 103 includes the method of any of examples 96 to 101, wherein a first symbol in the subframe is configured for Automatic Gain Control (AGC), and when an initial gain for the first symbol does not meet a demodulation threshold requirement, the method further includes: demodulating the subframe excluding the first symbol.

Example 104 includes the method of example 102, further including: demodulating the subframe excluding the first symbol when it is determined that the differential gain between the initial gain for the first symbol and the updated gain for the following symbols is not less than the predetermined differential threshold.

Example 105 includes a method performed at communication device (CD) operating in a receiving mode in a vehicle to everything (V2X) communication system, including: demodulating a received subframe including a first symbol and a last symbol and generate soft-bits for the first symbol and soft-bits for the last symbol; measuring a detection metric associated with the last symbol; determining a last symbol detection confidence index proportional to the measured detection metric; and generating scaled soft-bits for the last symbol by multiplying the soft-bits for the last symbol with a scaling factor determined based on the last symbol detection confidence index.

Example 106 includes the method of example 105, wherein the detection metric includes a received power on frequency resources allocated to the communication device during the last symbol.

Example 107 includes the method of example 105, wherein the last symbol is configured with a cyclic prefix and the detection metric includes an autocorrelation strength obtained by calculating an autocorrelation function between the cyclic prefix and the last symbol.

Example 108 includes the method of example 105, wherein the last symbol is configured with a cyclic prefix and the detection metric includes an autocorrelation strength obtained by: zero-forcing strength of signals on all received frequency resources other than the frequency resources allocated to the communication device during the last symbol to get a processed last symbol in a frequency domain; transforming the processed last symbol back to a time domain; and calculating an autocorrelation function between the cyclic prefix and the transformed last symbol in the time domain.

Example 109 includes the method of example 105, further including: determining whether the communication device is scheduled to switch from the receiving mode to a transmitting mode for a next subframe; and decoding the subframe including the last symbol when it is determined that the communication device is not scheduled to switch from the receiving mode to the transmitting mode for the next subframe.

Example 110 includes the method of example 109, further including: terminating receiving the subframe in advance by a symbol duration corresponding to the last symbol of the subframe and configuring the communication device to switch from the receiving mode to the transmitting mode within the symbol duration, when it is determined that the communication device is scheduled to switch from the receiving mode to the transmitting mode for the next subframe.

Example 111 includes the method of example 109, further including: terminating receiving the subframe in advance by at least a part of a symbol duration corresponding to the last symbol of the subframe and configuring the communication device to switch from the receiving mode to the transmitting mode within the part of the symbol duration, when it is determined that the communication device is scheduled to switch from the receiving mode to the transmitting mode for the next subframe.

Example 112 includes the method of any of examples 105 to 111, wherein a first symbol in the subframe is configured for Automatic Gain Control (AGC), and when an initial gain for the first symbol meets a demodulation threshold requirement, the method further includes: calculating a differential gain between the initial gain for the first symbol and an updated gain for following symbols; determining a first symbol acceptability index inversely proportional to the differential gain; and generating scaled soft-bits for the first symbol by multiplying the soft-bits for the first symbol with a scaling factor determined based on the first symbol acceptability index.

Example 113 includes the method of any of examples 105 to 111, wherein a first symbol in the subframe is configured for Automatic Gain Control (AGC), and when an initial gain for the first symbol does not meet a demodulation threshold requirement, the method further includes: generating scaled soft-bits for the first symbol by multiplying the soft-bits for the first symbol with 0.

Example 114 includes a method for communication device (CD) operating in a transmitting mode in a vehicle to everything (V2X) communication system, including: determining whether the communication device is scheduled to switch from the transmitting mode to a receiving mode for a next subframe; and transmitting a subframe including a last symbol with a requested transmission power when it is determined that the communication device is not scheduled to switch from the transmitting mode to the receiving mode for the next subframe.

Example 115 includes the method of example 114, further including: setting a transmission power for a symbol duration corresponding to the last symbol of the subframe to a minimized transmission power and configuring the communication device to switch from the transmitting mode to the receiving mode within the symbol duration, when it is determined that the communication device is scheduled to switch from the transmitting mode to the receiving mode for the next subframe.

Example 116 includes the method of example 114, further including: setting a transmission power for at least a part of a symbol duration corresponding to the last symbol of the subframe to a minimized transmission power and configuring the communication device to switch from the transmitting mode to the receiving mode within the part of the symbol duration, when it is determined that the communication device is scheduled to switch from the transmitting mode to the receiving mode for the next subframe.

Example 117 includes a non-transitory computer-readable medium having instructions stored thereon, the instructions when executed by one or more processor(s) causing the processor(s) to perform the method of any of examples 96-116.

Example 118 includes an apparatus for communication device (CD), including means for performing the actions of the method of any of examples 96-116.

Example 119 includes an apparatus for communication device (CD) in a vehicle to everything (V2X) communication system, including circuitry configured to: detect whether there is one or more on-going processes for transmitting one or more existing periodic services on the communication device when a new periodic service arrives, wherein when the one or more on-going processes are detected, the circuitry is further configured to: determine whether the new periodic service is suitable to be combined with an existing periodic service by checking if a predefined combination rule is satisfied by the new periodic service and the existing periodic service; and perform a resource reselection for transmitting a combined service on an on-going process when determining that the new periodic service is suitable to be combined with the existing periodic service, wherein the combined service is obtained by combining the new periodic service and the existing periodic service.

Example 120 includes the apparatus of example 119, wherein when determining that the new periodic service is not suitable to be combined with the existing periodic service, the circuitry is further configured to: determine whether a number of the one or more on-going processes reaches a predefined maximum number; determine whether the new periodic service is suitable to replace an existing periodic service by checking if a predefined replacement rule is satisfied by the new periodic service and the existing periodic service, when determining that the number of the one or more on-going processes reaches the predefined maximum number; and replace the existing periodic service by the new periodic service and stop transmission of the replaced existing periodic service, when determining that the new periodic service is suitable to replace the existing periodic service.

Example 121 includes the apparatus of example 119, wherein when the one or more on-going processes are not detected, the circuitry is further configured to perform a resource selection for transmitting the new periodic service on a new process.

Example 122 includes the apparatus of example 120, wherein when determining that the new periodic service is not suitable to be combined with the existing periodic service and the number of the one or more on-going processes does not reach the predefined maximum number, the circuitry is further configured to perform a resource selection for transmitting the new periodic service on a new process.

Example 123 includes the apparatus of example 120, wherein when determining that the new periodic service is not suitable to be combined with the existing periodic service, the number of the one or more on-going processes reaches the predefined maximum number, and the new periodic service is not suitable to replace the existing periodic service, the circuitry is further configured to perform a resource selection for selecting a one-shot resource to transmit the new periodic service.

Example 124 includes the apparatus of example 119, wherein the predefined combination rule includes: the new periodic service has a service identification same as that of the existing periodic service; the new periodic service has a period same as that of the existing periodic service; and delays of the new periodic service and the existing periodic service meet their respective Packet Delay Budget (PDB) requirements.

Example 125 includes the apparatus of example 120, wherein the predefined replacement rule includes: the new periodic service has a priority higher than that of the existing periodic service; or the new periodic service has a period shorter than that of the existing periodic service.

Example 126 includes the apparatus of example 119, wherein when determining that the new periodic service is suitable to be combined with the existing periodic service, the circuitry is further configured to: determine whether a period of the new periodic service is shorter than a predefined period threshold; perform the resource reselection by reselecting expanded sub-channels but not changing a currently allocated subframe for transmitting the combined service, when determining that the period is shorter than the predefined period threshold; and perform the resource reselection by reselecting a subframe or expanded sub-channels, when determining that the period is not shorter than the predefined period threshold.

Example 127 includes the apparatus of example 119, wherein the circuitry is further configured to: transmit standalone Sidelink Control Information on a Physical Sidelink Control Channel (PSCCH) to broadcast information about resource reservation changing at the communication device to surrounding communication devices, once the communication device performs the resource reselection.

Example 128 includes the apparatus of example 120, wherein the circuitry is further configured to: transmit standalone Sidelink Control Information on a Physical Sidelink Control Channel (PSCCH) to broadcast information about resource reservation changing at the communication device to surrounding communication devices, once the communication device performs the resource reselection or stops the transmission of the replaced existing periodic service.

Example 129 includes the apparatus of any of examples 121 to 123, wherein the circuitry is further configured to: transmit standalone Sidelink Control Information on a Physical Sidelink Control Channel (PSCCH) to broadcast information about resource reservation changing at the communication device to surrounding communication devices, once the communication device performs the resource reselection or the resource selection.

Example 130 includes the apparatus of any of examples 127 to 129, wherein the SCI includes at least following fields: a SCI usage flag field; a V2X logical subframe position for changing field; a frequency resource location for changing field; and a resource changing flag field.

Example 131 includes a method performed at communication device (CD) in a vehicle to everything (V2X) communication system, including: detecting whether there is one or more on-going processes for transmitting one or more existing periodic services on the communication device when a new periodic service arrives, wherein when the one or more on-going processes are detected, the method further includes: determining whether the new periodic service is suitable to be combined with an existing periodic service by checking if a predefined combination rule is satisfied by the new periodic service and the existing periodic service; and performing a resource reselection for transmitting a combined service on an on-going process when determining that the new periodic service is suitable to be combined with the existing periodic service, wherein the combined service is obtained by combining the new periodic service and the existing periodic service.

Example 132 includes the method of example 131, wherein when determining that the new periodic service is not suitable to be combined with the existing periodic service, the method further includes: determining whether a number of the one or more on-going processes reaches a predefined maximum number; determining whether the new periodic service is suitable to replace an existing periodic service by checking if a predefined replacement rule is satisfied by the new periodic service and the existing periodic service, when determining that the number of the one or more on-going processes reaches the predefined maximum number; and replacing the existing periodic service by the new periodic service and stopping transmission of the replaced existing periodic service, when determining that the new periodic service is suitable to replace the existing periodic service.

Example 133 includes the method of example 131, wherein when the one or more on-going processes are not detected, the method further includes: performing a resource selection for transmitting the new periodic service on a new process.

Example 134 includes the method of example 132, wherein when determining that the new periodic service is not suitable to be combined with the existing periodic service and the number of the one or more on-going processes does not reach the predefined maximum number, the method further includes: performing a resource selection for transmitting the new periodic service on a new process.

Example 135 includes the method of example 132, wherein when determining that the new periodic service is not suitable to be combined with the existing periodic service, the number of the one or more on-going processes reaches the predefined maximum number, and the new periodic service is not suitable to replace the existing periodic service, the method further includes: performing a resource selection for selecting a one-shot resource to transmit the new periodic service.

Example 136 includes the method of example 131, wherein the predefined combination rule includes: the new periodic service has a service identification same as that of the existing periodic service; the new periodic service has a period same as that of the existing periodic service; and delays of the new periodic service and the existing periodic service meet their respective Packet Delay Budget (PDB) requirements.

Example 137 includes the method of example 132, wherein the predefined replacement rule includes: the new periodic service has a priority higher than that of the existing periodic service; or the new periodic service has a period shorter than that of the existing periodic service.

Example 138 includes the method of example 131, wherein when determining that the new periodic service is suitable to be combined with the existing periodic service, the method further includes: determining whether a period of the new periodic service is shorter than a predefined period threshold; performing the resource reselection by reselecting expanded sub-channels but not changing a currently allocated subframe for transmitting the combined service, when determining that the period is shorter than the predefined period threshold; and performing the resource reselection by reselecting a subframe or expanded sub-channels, when determining that the period is not shorter than the predefined period threshold.

Example 139 includes the method of example 131, wherein the method further includes: transmitting standalone Sidelink Control Information on a Physical Sidelink Control Channel (PSCCH) to broadcast information about resource reservation changing at the communication device to surrounding communication devices, once the communication device performs the resource reselection.

Example 140 includes the method of example 132, wherein the method further includes: transmitting standalone Sidelink Control Information on a Physical Sidelink Control Channel (PSCCH) to broadcast information about resource reservation changing at the communication device to surrounding communication devices, once the communication device performs the resource reselection or stops the transmission of the replaced existing periodic service.

Example 141 includes the method of any of examples 133 to 135, wherein the method further includes: transmitting standalone Sidelink Control Information on a Physical Sidelink Control Channel (PSCCH) to broadcast information about resource reservation changing at the communication device to surrounding communication devices, once the communication device performs the resource reselection or the resource selection.

Example 142 includes the method of any of examples 139 to 141, wherein the SCI includes at least following fields: a SCI usage flag field; a V2X logical subframe position for changing field; a frequency resource location for changing field; and a resource changing flag field.

Example 143 includes a non-transitory computer-readable medium having instructions stored thereon, wherein the instructions, when executed by one or more processor(s) of communication device (CD) in a vehicle to everything (V2X) communication system, cause the processor(s) to perform the method of any of claims 131-142.

Example 144 includes an apparatus for communication device (CD) in a vehicle to everything (V2X) communication system, including means for performing the actions of the method of any of examples 131-142.

Example 145 include an apparatus for a communication device, comprising: circuitry configured to: demodulate, in frequency domain, a Demodulation Reference Signal (DMRS) for a Physical Sidelink Control Channel (PSCCH) through a constant sequence with a specific Circular Shift (CS) of a set of CS candidates, to obtain an original DMRS-demodulation (RSD) sequence, wherein the DMRS has been phase-rotated by one or two transmitting communication devices with one or both of a first CS candidate and a second CS candidate of the set of CS candidates; transform the original RSD sequence from frequency domain to time domain to obtain a Channel Impulse Response (CIR) sequence; and determine one or both of the first CS candidate and the second CS candidate for the DMRS based on the CIR sequence in time domain; and a memory to store the determined one or both of the first CS candidate and the second CS candidate for the DMRS.

Example 146 includes the apparatus of Example 145, wherein the circuitry is configured to: perform zero-padding to the original RSD sequence.

Example 147 includes the apparatus of Example 145 or 146, wherein the circuitry is configured to: shape the original RSD sequence by a window to concentrate energy of the original RSD sequence.

Example 148 includes the apparatus of Example 147, wherein the window comprises one of a Hanning window and a Gaussian window.

Example 149 includes the apparatus of any of Examples 145 to 148, wherein the circuitry is configured to: perform Inverse Fast Fourier Transform (IFFT) algorithm to the original RSD sequence to obtain the CIR sequence in time domain.

Example 150 includes the apparatus of any of Examples 145 to 149, wherein the circuitry is configured to: calculate portion power of the CIR sequence for each of a number of portions in time domain; and determine the one or both of the first CS candidate and the second CS candidate used for the DMRS based on the portion power of the CIR sequence for each of the number of portions in time domain.

Example 151 includes the apparatus of Example 150, wherein the circuitry is configured to: calculate element power of each element of the CIR sequence; and accumulate the element power of each element of the CIR sequence that falls in respective portion in time domain to obtain the portion power for the respective portion.

Example 152 includes the apparatus of Example 150, wherein the number of the portions in time domain is equal to the number of the CS candidates within the set of CS candidates, and wherein each CS candidate corresponds to respective portion in time domain.

Example 153 includes the apparatus of Example 152, wherein the circuitry is configured to: calculate a first ratio of the highest portion power with the second highest portion power; calculate a second ratio of the second highest portion power with average of remaining portion power; calculate a third ratio of the first ratio with the second ratio; determine, when the third ratio is greater than a threshold, that only one of the first CS candidate and the second CS candidate is used for the DMRS and the only one of the first CS candidate and the second CS candidate is the CS candidate corresponding to the portion in time domain with the highest portion power; and determine, when the third ratio is smaller than or equal to the threshold, that both of the first CS candidate and the second CS candidate are used for the DMRS and the first CS candidate and the second CS candidate are the CS candidates corresponding to the portions in time domain with the highest portion power and the second highest portion power respectively.

Example 154 includes the apparatus of Example 153, wherein the circuitry is configured to: null, for each portion corresponding to the determined one or both of the first CS candidate and the second CS candidate, the other portions to obtain a denoised CIR sequence.

Example 155 includes the apparatus of Example 154, wherein the circuitry is configured to: transform the denoised CIR sequence from time domain to frequency domain to obtain a processed RSD sequence.

Example 156 includes the apparatus of Example 155, wherein the circuitry is configured to: compensate the processed RSD sequence by dewindowing to demodulate and decode respective PSCCH.

Example 157 includes the apparatus of Example 153, wherein the circuitry is configured to: calculate average of element power of each element of the CIR sequence in portions corresponding to the remaining portion power as noise of the CIR sequence.

Example 158 includes the apparatus of Example 157, wherein the circuitry is configured to: calculate, based on the portion power for each portion corresponding to the determined one or both of the first CS candidate and the second CS candidate and the noise of the CIR sequence, Signal Noise Ratio (SNR) for the portion.

Example 159 includes the apparatus of any of Example 145 to 158, wherein the set of CS candidates comprise 0, 3, 6, and 9.

Example 160 includes the apparatus of Example 159, wherein the specific CS comprises 0.

Example 161 include a method performed by a communication device, comprising: demodulating, in frequency domain, a Demodulation Reference Signal (DMRS) for a Physical Sidelink Control Channel (PSCCH) through a constant sequence with a specific Circular Shift (CS) of a set of CS candidates, to obtain an original DMRS-demodulation (RSD) sequence, wherein the DMRS has been phase-rotated by one or two transmitting communication devices with one or both of a first CS candidate and a second CS candidate of the set of CS candidates; transforming the original RSD sequence from frequency domain to time domain to obtain a Channel Impulse Response (CIR) sequence; and determining one or both of the first CS candidate and the second CS candidate for the DMRS based on the CIR sequence in time domain.

Example 162 include the method of Example 161, further comprising: performing zero-padding to the original RSD sequence.

Example 163 include the method of Example 161 or 162, further comprising: shaping the original RSD sequence by a window to concentrate energy of the original RSD sequence.

Example 164 include the method of Example 163, wherein the window comprises one of a Hanning window and a Gaussian window.

Example 165 include the method of any of Examples 161 to 164, wherein transforming the original RSD sequence from frequency domain to time domain to obtain a Channel Impulse Response (CIR) sequence comprises: performing Inverse Fast Fourier Transform (IFFT) algorithm to the original RSD sequence to obtain the CIR sequence in time domain.

Example 166 include the method of any of Examples 161 to 165, wherein determining one or both of the first CS candidate and the second CS candidate for the DMRS based on the CIR sequence in time domain comprises: calculating portion power of the CIR sequence for each of a number of portions in time domain; and determining the one or both of the first CS candidate and the second CS candidate used for the DMRS based on the portion power of the CIR sequence for each of the number of portions in time domain.

Example 167 include the method of Example 166, wherein calculating portion power of the CIR sequence for each of a number of portions in time domain comprises: calculating element power of each element of the CIR sequence; and accumulating the element power of each element of the CIR sequence that falls in respective portion in time domain to obtain the portion power for the respective portion.

Example 168 include the method of Example 166, wherein the number of the portions in time domain is equal to the number of the CS candidates within the set of CS candidates, and wherein each CS candidate corresponds to respective portion in time domain.

Example 169 include the method of Example 168, wherein determining one or both of the first CS candidate and the second CS candidate for the DMRS based on the CIR sequence in time domain comprises: calculating a first ratio of the highest portion power with the second highest portion power; calculating a second ratio of the second highest portion power with average of remaining portion power; calculating a third ratio of the first ratio with the second ratio; determining, when the third ratio is greater than a threshold, that only one of the first CS candidate and the second CS candidate is used for the DMRS and the only one of the first CS candidate and the second CS candidate is the CS candidate corresponding to the portion in time domain with the highest portion power; and determining, when the third ratio is smaller than or equal to the threshold, that both of the first CS candidate and the second CS candidate are used for the DMRS and the first CS candidate and the second CS candidate are the CS candidates corresponding to the portions in time domain with the highest portion power and the second highest portion power respectively.

Example 170 include the method of Example 169, further comprising: nulling, for each portion corresponding to the determined one or both of the first CS candidate and the second CS candidate, the other portions to obtain a denoised CIR sequence.

Example 171 include the method of Example 170, further comprising: transforming the denoised CIR sequence from time domain to frequency domain to obtain a processed RSD sequence.

Example 172 include the method of Example 171, further comprising: compensating the processed RSD sequence by dewindowing to demodulate and decode respective PSCCH.

Example 173 include the method of Example 169, further comprising: calculating average of element power of each element of the CIR sequence in portions corresponding to the remaining portion power as noise of the CIR sequence.

Example 174 include the method of Example 173, further comprising: calculating, based on the portion power for each portion corresponding to the determined one or both of the first CS candidate and the second CS candidate and the noise of the CIR sequence, Signal Noise Ratio (SNR) for the portion.

Example 175 include the method of any of Examples 161 to 174, wherein the set of CS candidates comprise 0, 3, 6, and 9.

Example 176 include the method of Example 175, wherein the specific CS comprises 0.

Example 177 include a non-transitory computer-readable medium having instructions stored thereon, the instructions when executed by one or more processor(s) causing the processor(s) to perform the method of any of Examples 161-176.

Example 178 include an apparatus for communication device, comprising means for performing the actions of the method of any of Examples 161-176.

Example 179 include an apparatus for a communication device, comprising: circuitry configured to: determine one or two Physical Sidelink Control Channel (PSCCH) candidates for each of a plurality of resource units; sort the determined PSCCH candidates for the plurality of resource units in descending order of Signal Noise Ratio (SNR) corresponding to each of the PSCCH candidates; and demodulate top N PSCCH candidates from the sorted PSCCH candidates, wherein N is a positive integer; and a memory to store the SNR corresponding to each of the PSCCH candidates.

Example 180 include the apparatus of Example 179, wherein the circuitry is configured to: demodulate, in frequency domain, a Demodulation Reference Signal (DMRS) for the one or two PSCCH candidates for a resource unit through a constant sequence with a specific Circular Shift (CS) of a set of CS candidates to obtain an original DMRS-demodulation (RSD) sequence, wherein the DMRS has been phase-rotated by one or two transmitting communication devices with one or both of a first CS candidate and a second CS candidate of the set of CS candidates; transform the original RSD sequence from frequency domain to time domain to obtain a Channel Impulse Response (CIR) sequence; and determine, based on the CIR sequence in time domain, one or both of the first CS candidate and the second CS candidate for the DMRS, to determine the one or two PSCCH candidates for the resource unit.

Example 181 include the apparatus of Example 180, wherein the circuitry is configured to: perform zero-padding to the original RSD sequence.

Example 182 include the apparatus of Example 180 or 181, wherein the circuitry is configured to: shape the original RSD sequence by a window to concentrate energy of the original RSD sequence.

Example 183 include the apparatus of Example 182, wherein the window comprises one of a Hanning window and a Gaussian window.

Example 184 include the apparatus of any of Examples 180 to 183, wherein the circuitry is configured to: perform Inverse Fast Fourier Transform (IFFT) algorithm to the RSD sequence to obtain the CIR sequence in time domain.

Example 185 include the apparatus of any of Examples 180 to 184, wherein the circuitry is configured to: calculate portion power of the CIR sequence for each of a number of portions in time domain; and determine the one or both of the first CS candidate and the second CS candidate used for the DMRS based on the portion power of the CIR sequence for each of the number of portions in time domain.

Example 186 include the apparatus of Example 185, wherein the circuitry is configured to: calculate element power of each element of the CIR sequence; and accumulate the element power of each element of the CIR sequence that falls in respective portion in time domain to obtain the portion power for the respective portion.

Example 187 include the apparatus of Example 185, wherein the number of the portions in time domain is equal to the number of the CS candidates within the set of CS candidates, and wherein each CS candidate corresponds to respective portion in time domain.

Example 188 include the apparatus of Example 187, wherein the circuitry is configured to: calculate a first ratio of the highest portion power with the second highest portion power; calculate a second ratio of the second highest portion power with average of remaining portion power; calculate a third ratio of the first ratio with the second ratio; determine, when the third ratio is greater than a threshold, that only one of the first CS candidate and the second CS candidate is used for the DMRS and the only one of the first CS candidate and the second CS candidate is the CS candidate corresponding to the portion in time domain with the highest portion power; and determine, when the third ratio is smaller than or equal to the threshold, that both of the first CS candidate and the second CS candidate are used for the DMRS and the first CS candidate and the second CS candidate are the CS candidates corresponding to the portions in time domain with the highest portion power and the second highest portion power respectively.

Example 189 include the apparatus of Example 188, wherein the circuitry is configured to: null, for each portion corresponding to the determined one or both of the first CS candidate and the second CS candidate, the other portions to obtain a denoised CIR sequence.

Example 190 include the apparatus of Example 189, wherein the circuitry is configured to: transform the denoised CIR sequence from time domain to frequency domain to obtain a processed RSD sequence.

Example 191 include the apparatus of Example 190, wherein the circuitry is configured to: compensate the processed RSD sequence by dewindowing.

Example 192 include the apparatus of Example 188, wherein the circuitry is configured to: calculate average of element power of each element of the CIR sequence in portions corresponding to the remaining portion power as noise of the CIR sequence.

Example 193 include the apparatus of Example 192, wherein the circuitry is configured to: calculate, based on the portion power for each portion corresponding to the determined one or both of the first CS candidate and the second CS candidate and the noise of the CIR sequence, SNR for the portion, wherein the SNR for the portion serves as SNR corresponding to respective PSCCH candidate with one of the first CS candidate and the second CS candidate.

Example 194 include the apparatus of any of Examples 179 to 193, wherein the circuitry is configured to: determine there are two PSCCH candidates for a resource units of the plurality of resource units; and demodulate the two PSCCH candidates through Minimum Mean Square Error (MMSE) algorithm.

Example 195 include the apparatus of any of Examples 179 to 193, wherein the circuitry is configured to: determine there is only one PSCCH candidates for a resource units of the plurality of resource units; and demodulate the PSCCH candidates through Maximal Ratio Combination (MRC) algorithm.

Example 196 include the apparatus of any of Examples 180 to 195, wherein the set of CS candidates comprise 0, 3, 6, and 9.

Example 197 include the apparatus of Example 196, wherein the specific CS comprises 0.

Example 198 include a method performed by a communication device, comprising: determining one or two Physical Sidelink Control Channel (PSCCH) candidates for each of a plurality of resource units; sorting the determined PSCCH candidates for the plurality of resource units in descending order of Signal Noise Ratio (SNR) corresponding to each of the PSCCH candidates; and demodulating top N PSCCH candidates from the sorted PSCCH candidates, wherein N is a positive integer.

Example 199 include the method of Example 198, wherein determining one or two Physical Sidelink Control Channel (PSCCH) candidates for each of a plurality of resource units comprises: demodulating, in frequency domain, a Demodulation Reference Signal (DMRS) for the one or two PSCCH candidates for a resource unit through a constant sequence with a specific Circular Shift (CS) of a set of CS candidates to obtain an original DMRS-demodulation (RSD) sequence, wherein the DMRS has been phase-rotated by one or two transmitting communication devices with one or both of a first CS candidate and a second CS candidate of the set of CS candidates; transforming the original RSD sequence from frequency domain to time domain to obtain a Channel Impulse Response (CIR) sequence; and determining, based on the CIR sequence in time domain, one or both of the first CS candidate and the second CS candidate for the DMRS, to determine the one or two PSCCH candidates for the resource unit.

Example 200 include the method of Example 199, further comprising: performing zero-padding to the original RSD sequence.

Example 201 include the method of Example 199 or 200, further comprising: shaping the original RSD sequence by a window to concentrate energy of the original RSD sequence.

Example 202 include the method of Example 201, wherein the window comprises one of a Hanning window and a Gaussian window.

Example 203 include the method of any of Examples 199 to 202, wherein transforming the original RSD sequence from frequency domain to time domain to obtain a Channel Impulse Response (CIR) sequence comprises: performing Inverse Fast Fourier Transform (IFFT) algorithm to the RSD sequence to obtain the CIR sequence in time domain.

Example 204 include the method of any of Examples 199 to 203, wherein determining one or both of the first CS candidate and the second CS candidate for the DMRS comprises: calculating portion power of the CIR sequence for each of a number of portions in time domain; and determining the one or both of the first CS candidate and the second CS candidate used for the DMRS based on the portion power of the CIR sequence for each of the number of portions in time domain.

Example 205 include the method of Example 204, wherein calculating portion power of the CIR sequence for each of a number of portions in time domain comprises: calculating element power of each element of the CIR sequence; and accumulating the element power of each element of the CIR sequence that falls in respective portion in time domain to obtain the portion power for the respective portion.

Example 206 include the method of Example 204, wherein the number of the portions in time domain is equal to the number of the CS candidates within the set of CS candidates, and wherein each CS candidate corresponds to respective portion in time domain.

Example 207 include the method of Example 206, wherein determining one or both of the first CS candidate and the second CS candidate for the DMRS comprises: calculating a first ratio of the highest portion power with the second highest portion power; calculating a second ratio of the second highest portion power with average of remaining portion power; calculating a third ratio of the first ratio with the second ratio; determining, when the third ratio is greater than a threshold, that only one of the first CS candidate and the second CS candidate is used for the DMRS and the only one of the first CS candidate and the second CS candidate is the CS candidate corresponding to the portion in time domain with the highest portion power; and determining, when the third ratio is smaller than or equal to the threshold, that both of the first CS candidate and the second CS candidate are used for the DMRS and the first CS candidate and the second CS candidate are the CS candidates corresponding to the portions in time domain with the highest portion power and the second highest portion power respectively.

Example 208 include the method of Example 207, further comprising: nulling, for each portion corresponding to the determined one or both of the first CS candidate and the second CS candidate, the other portions to obtain a denoised CIR sequence.

Example 209 include the method of Example 208, further comprising: transforming the denoised CIR sequence from time domain to frequency domain to obtain a processed RSD sequence.

Example 210 include the method of Example 209, further comprising: compensating the processed RSD sequence by dewindowing.

Example 211 include the method of Example 207, further comprising: calculating average of element power of each element of the CIR sequence in portions corresponding to the remaining portion power as noise of the CIR sequence.

Example 212 include the method of Example 211, further comprising: calculating, based on the portion power for each portion corresponding to the determined one or both of the first CS candidate and the second CS candidate and the noise of the CIR sequence, SNR for the portion, wherein the SNR for the portion serves as SNR corresponding to respective PSCCH candidate with one of the first CS candidate and the second CS candidate.

Example 213 include the method of any of Examples 198 to 212, further comprising: determining there are two PSCCH candidates for a resource units of the plurality of resource units; and demodulating the two PSCCH candidates through Minimum Mean Square Error (MMSE) algorithm.

Example 214 include the method of any of Examples 198 to 212, further comprising: determining there is only one PSCCH candidates for a resource units of the plurality of resource units; and demodulating the PSCCH candidates through Maximal Ratio Combination (MRC) algorithm.

Example 215 include the method of any of Examples 199 to 214, wherein the set of CS candidates comprise 0, 3, 6, and 9.

Example 216 include the method of Example 215, wherein the specific CS comprises 0.

Example 217 include a non-transitory computer-readable medium having instructions stored thereon, the instructions when executed by one or more processor(s) causing the processor(s) to perform the method of any of Examples 198-216.

Example 218 include an apparatus for communication device, comprising means for performing the actions of the method of any of Examples 198-216.

Example 219 includes an apparatus for a communication device, including a memory for storing computer-readable instructions; and processing circuitry, for executing the instructions stored in the memory to: calculate a metric value, for each of one or more reference communication device candidates among all reference communication device candidates for the communication device, based on Primary Sidelink Synchronization Signals (PSSSs) for all the reference communication device candidates, and Secondary Sidelink Synchronization Signals (SSSSs) for the one or more reference communication device candidates; and determine, based on the metric values for the one or more reference communication device candidates, a subset of reference communication device candidates from the one or more reference communication device candidates for use in subsequent time and frequency synchronization.

Example 220 includes the apparatus of Example 219, wherein the metric value for a reference communication device candidate indicates quality of a signal received from the reference communication device candidate.

Example 221 includes the apparatus of Example 219, wherein the processing circuitry is to: calculate, for each of all the reference communication device candidates, a time distance between the communication device and the reference communication device candidate; and select the one or more reference communication device candidates from all the reference communication device candidates for the communication device based on the time distances for all the reference communication device candidates.

Example 222 includes the apparatus of Example 219, wherein the processing circuitry is to: when the metric value for one of the one or more reference communication device candidates is larger than a first predetermined threshold, determine the one reference candidate as a member of the subset.

Example 223 includes the apparatus of Example 222, wherein the processing circuitry is to: when the number K of reference communication device candidates corresponding to metric values larger than the first predetermined threshold is lower than a predetermined number L, determine a number (L−K) of reference communication device candidates corresponding to (L−K) highest metric values larger than a second predetermined threshold and lower than the first predetermined threshold as members of the subset.

Example 224 includes the apparatus of Example 223, wherein the processing circuitry is to: discard, from the one or more reference communication device candidates, reference communication device candidates corresponding to metric values lower than the second predetermined threshold.

Example 225 includes the apparatus of Example 219, wherein the processing circuitry is to: determine, for each of the one or more reference communication device candidates, a frame time based on a PSSS for the reference communication device candidate; determine, for each of all the reference communication device candidates, a first Automatic Gain Control (AGC) gain and a first correlation value based on a PSSS for the reference communication device candidate; determine, for each of the one or more reference communication device candidates, a second AGC gain and a second correlation value based on a SSSS for the reference communication device candidate; and calculate a metric value, for each of the one or more reference communication device candidates, based on: the frame times, the second AGC gains, and the second correlation values for the one or more reference communication device candidates; and the first AGC gains, and the first correlation values for all the reference communication device candidates.

Example 226 includes the apparatus of Example 225, wherein a SSSS for each of the one or more reference communication device candidates is acquired based on the frame time for the reference communication device candidate.

Example 227 includes a method performed at a communication device, including: calculating a metric value, for each of one or more reference communication device candidates among all reference communication device candidates for the communication device, based on Primary Sidelink Synchronization Signals (PSSSs) for all the reference communication device candidates, and Secondary Sidelink Synchronization Signals (SSSSs) for the one or more reference communication device candidates; and determining, based on the metric values for the one or more reference communication device candidates, a subset of reference communication device candidates from the one or more reference communication device candidates for use in subsequent time and frequency synchronization.

Example 228 includes the method of Example 227, wherein the metric value for a reference communication device candidate indicates quality of a signal received from the reference communication device candidate.

Example 229 includes the method of Example 227, wherein the method further includes: calculating, for each of all the reference communication device candidates, a time distance between the communication device and the reference communication device candidate; and selecting the one or more reference communication device candidates from all the reference communication device candidates for the communication device based on the time distances for all the reference communication device candidates.

Example 230 includes the method of Example 227, wherein the method further includes: when the metric value for one of the one or more reference communication device candidates is larger than a first predetermined threshold, determining the one reference candidate as a member of the subset.

Example 231 includes the method of Example 230, wherein the method further includes: when the number K of reference communication device candidates corresponding to metric values larger than the first predetermined threshold is lower than a predetermined number L, determining a number (L−K) of reference communication device candidates corresponding to (L−K) highest metric values larger than a second predetermined threshold and lower than the first predetermined threshold as members of the subset.

Example 232 includes the method of Example 231, wherein the method further includes: discarding, from the one or more reference communication device candidates, reference communication device candidates corresponding to metric values lower than the second predetermined threshold.

Example 233 includes the method of Example 227, wherein calculating a metric value includes: determining, for each of the one or more reference communication device candidates, a frame time based on a PSSS for the reference communication device candidate; determining, for each of all the reference communication device candidates, a first Automatic Gain Control (AGC) gain and a first correlation value based on a PSSS for the reference communication device candidate; determining, for each of the one or more reference communication device candidates, a second AGC gain and a second correlation value based on a SSSS for the reference communication device candidate; and calculating a metric value, for each of the one or more reference communication device candidates, based on: the frame times, the second AGC gains, and the second correlation values for the one or more reference communication device candidates; and the first AGC gains, and the first correlation values for all the reference communication device candidates.

Example 234 includes the method of Example 233, wherein a SSSS for each of the one or more reference communication device candidates is acquired based on the frame time for the reference communication device candidate.

Example 235 includes a non-transitory computer-readable medium having instructions stored thereon, the instructions when executed by one or more processor(s) causing the processor(s) to perform the method of any of Examples 227-234.

Example 236 includes an apparatus for a communication device, including means for performing the actions of the method of any of Examples 227-234.

Example 237 includes an apparatus for a communication device, including circuitry configured to: determine all Physical Sidelink Control Channel (PSCCH) candidates in a target subframe from one or more Reception Resource Pools (Rx RPs) for the communication device; determine a Sidelink Received Signal Strength Indicator (S-RSSI) value for each of all the PSCCH candidates; process a first number N of PSCCH candidates corresponding to N highest S-RSSI values among all the PSCCH candidates; and process a second number M of PSCCH candidates among unprocessed PSCCH candidates based on Sidelink Control Information (SCI) received in a subframe prior to the target subframe.

Example 238 includes the apparatus of Example 237, wherein the N highest S-RSSI values are above a first predetermined threshold.

Example 239 includes the apparatus of Example 237, wherein the circuitry is further configured to: determine whether a sum of N and M is less than twenty; and if the sum is less than twenty, process a third number K of PSCCH candidates corresponding to K highest S-RSSI values among unprocessed PSCCH candidates, wherein K is equal to twenty minus the sum.

Example 240 includes the apparatus of Example 239, wherein the K highest S-RSSI values are above a second predetermined threshold.

Example 241 includes the apparatus of Example 237, wherein the circuitry is further configured to: determine a scale product for each of unprocessed PSCCH candidates, wherein a scale product for one PSCCH candidate is an average of: a first scale product of two Demodulation Reference Signals (DMRSs) associated with the PSCCH candidate in a third symbol and a sixth symbol in a first slot of the target subframe; and a second scale product of two DMRSs associated with the PSCCH candidate in a second symbol and a fifth symbol in a second slot of the target subframe; and process a fourth number L of PSCCH candidates corresponding to L highest scale products among unprocessed PSCCH candidates.

Example 242 includes the apparatus of Example 241, wherein a sum of N and M is less than a predetermined number, and a sum of N, M and L is equal to twenty.

Example 243 includes the apparatus of Example 241, wherein for each of the L PSCCH candidates, a ratio of a corresponding scale product to a corresponding S-RSSI value is above a third predetermined threshold.

Example 244 includes a method performed at a communication device, including: determining all Physical Sidelink Control Channel (PSCCH) candidates in a target subframe from one or more Reception Resource Pools (Rx RPs) for the communication device; determining a Sidelink Received Signal Strength Indicator (S-RSSI) value for each of all the PSCCH candidates; processing a first number N of PSCCH candidates corresponding to N highest S-RSSI values among all the PSCCH candidates; and processing a second number M of PSCCH candidates among unprocessed PSCCH candidates based on Sidelink Control Information (SCI) received in a subframe prior to the target subframe.

Example 245 includes the method of Example 244, wherein the N highest S-RSSI values are above a first predetermined threshold.

Example 246 includes the method of Example 244, wherein the method further includes: determining whether a sum of N and M is less than twenty; and if the sum is less than twenty, processing a third number K of PSCCH candidates corresponding to K highest S-RSSI values among unprocessed PSCCH candidates, wherein K is equal to twenty minus the sum.

Example 247 includes the method of Example 246, wherein the K highest S-RSSI values are above a second predetermined threshold.

Example 248 includes the method of Example 244, wherein the method further includes: determining a scale product for each of unprocessed PSCCH candidates, wherein a scale product for one PSCCH candidate is an average of: a first scale product of two Demodulation Reference Signals (DMRSs) associated with the PSCCH candidate in a third symbol and a sixth symbol in a first slot of the target subframe; and a second scale product of two DMRSs associated with the PSCCH candidate in a second symbol and a fifth symbol in a second slot of the target subframe; and processing a fourth number L of PSCCH candidates corresponding to L highest scale products among unprocessed PSCCH candidates.

Example 249 includes the method of Example 248, wherein a sum of N and M is less than a predetermined number, and a sum of N, M and L is equal to twenty.

Example 250 includes the method of Example 248, wherein for each of the L PSCCH candidates, a ratio of a corresponding scale product to a corresponding S-RSSI value is above a third predetermined threshold.

Example 251 includes a non-transitory computer-readable medium having instructions stored thereon, the instructions when executed by one or more processor(s) causing the processor(s) to perform the method of any of Examples 244-250.

Example 252 includes an apparatus for a communication device, including means for performing the actions of the method of any of Examples 244-250.

Example 253 includes an apparatus for a communication device, including circuitry configured to: determine whether a priority value for data to be transmitted in a subframe is above a predetermined threshold; and if the priority value is above the predetermined threshold: determine multiple sets of resources in the frequency domain for a Physical Sidelink Control Channel (PSCCH) and a Physical Sidelink Shared Channel (PSSCH) associated with the data in the subframe, wherein each set of resources are used to transmit the PSCCH and PSSCH for one time; and transmit the PSCCH and PSSCH for multiple times in the multiple sets of resources.

Example 254 includes the apparatus of Example 253, wherein the circuitry is further configured to: if the priority value is not above the predetermined threshold: determine a single set of resources in the frequency domain for a PSCCH and a PSSCH associated with the data in the subframe; and transmit the PSCCH and PSSCH for one time in the set of resources.

Example 255 includes the apparatus of Example 253, wherein the circuitry is further configured to: if the priority value is above the predetermined threshold, increase a transmit power on each of symbols in the subframe for Demodulation Reference Signals (DMRSs) associated with the PSCCH by a predetermined value.

Example 256 includes the apparatus of Example 255, wherein the circuitry is further configured to: if the transmit power on one of the symbols is above a predetermined maximum transmit power for the communication device, adjust the transmit power on the symbol based on an adjustment factor, wherein the adjustment factor is a ratio of the predetermined maximum transmit power to the transmit power on the symbol.

Example 257 includes the apparatus of Example 253, wherein the multiple sets of resources are not overlapped in the frequency domain with each other.

Example 258 includes an apparatus for a communication device, including circuitry configured to: determine a set of Physical Sidelink Shared Channels (PSSCHs) among a plurality of PSSCHs to be processed in a subframe, wherein Medium Access Control (MAC) headers for the set of PSSCHs have a same Source Layer-2 ID and a same Destination Layer-2 ID; process one of the set of PSSCHs; and discard unprocessed PSSCHs in the set of PSSCHs.

Example 259 includes the apparatus of Example 258, wherein the circuitry is further configured to: process a plurality of Physical Sidelink Control Channels (PSCCHs) received in the subframe; and determine the plurality of PSSCHs to be processed based on the plurality of PSCCHs.

Example 260 includes the apparatus of Example 259, wherein the circuitry is further configured to: determine all Physical Sidelink Control Channel (PSCCH) candidates in the subframe from one or more Reception Resource Pools (Rx RPs) for the communication device; determine a Sidelink Received Signal Strength Indicator (S-RSSI) value for each of all the PSCCH candidates; process a first number N of PSCCH candidates corresponding to N highest S-RSSI values among all the PSCCH candidates; and process a second number M of PSCCH candidates among unprocessed PSCCH candidates based on Sidelink Control Information (SCI) received in a subframe prior to the subframe.

Example 261 includes the apparatus of Example 260, wherein the N highest S-RSSI values are above a first predetermined threshold Example 262 includes the apparatus of Example 260, wherein the circuitry is further configured to: determine whether a sum of N and M is less than twenty; and if the sum is less than twenty, process a third number K of PSCCH candidates corresponding to K highest S-RSSI values among unprocessed PSCCH candidates, wherein K is equal to twenty minus the sum.

Example 263 includes the apparatus of Example 262, wherein the K highest S-RSSI values are above a second predetermined threshold.

Example 264 includes a method performed at a communication device, including: determining whether a priority value for data to be transmitted in a subframe is above a predetermined threshold; and if the priority value is above the predetermined threshold: determining multiple sets of resources in the frequency domain for a Physical Sidelink Control Channel (PSCCH) and a Physical Sidelink Shared Channel (PSSCH) associated with the data in the subframe, wherein each set of resources are used to transmit the PSCCH and PSSCH for one time; and transmitting the PSCCH and PSSCH for multiple times in the multiple sets of resources.

Example 265 includes the method of Example 264, wherein the method further includes: if the priority value is not above the predetermined threshold: determining a single set of resources in the frequency domain for a PSCCH and a PSSCH associated with the data in the subframe; and transmitting the PSCCH and PSSCH for one time in the set of resources.

Example 266 includes the method of Example 264, wherein the method further includes: if the priority value is above the predetermined threshold, increasing a transmit power on each of symbols in the subframe for Demodulation Reference Signals (DMRSs) associated with the PSCCH by a predetermined value.

Example 267 includes the method of Example 266, wherein the method further includes: if the transmit power on one of the symbols is above a predetermined maximum transmit power for the communication device, adjusting the transmit power on the symbol based on an adjustment factor, wherein the adjustment factor is a ratio of the predetermined maximum transmit power to the transmit power on the symbol.

Example 268 includes the method of Example 264, wherein the multiple sets of resources are not overlapped in the frequency domain with each other.

Example 269 includes a method performed at a communication device, including: determining a set of Physical Sidelink Shared Channels (PSSCHs) among a plurality of PSSCHs to be processed in a subframe, wherein Medium Access Control (MAC) headers for the set of PSSCHs have a same Source Layer-2 ID and a same Destination Layer-2 ID; processing one of the set of PSSCHs; and discarding unprocessed PSSCHs in the set of PSSCHs.

Example 270 includes the method of Example 269, wherein the method further includes: processing a plurality of Physical Sidelink Control Channels (PSCCHs) received in the subframe; and determining the plurality of PSSCHs to be processed based on the plurality of PSCCHs.

Example 271 includes the method of Example 270, wherein the processing a plurality of PSCCHs further includes: determining all Physical Sidelink Control Channel (PSCCH) candidates in the subframe from one or more Reception Resource Pools (Rx RPs) for the communication device; determining a Sidelink Received Signal Strength Indicator (S-RSSI) value for each of all the PSCCH candidates; processing a first number N of PSCCH candidates corresponding to N highest S-RSSI values among all the PSCCH candidates; and processing a second number M of PSCCH candidates among unprocessed PSCCH candidates based on Sidelink Control Information (SCI) received in a subframe prior to the subframe.

Example 272 includes the method of Example 271, wherein the N highest S-RSSI values are above a first predetermined threshold.

Example 273 includes the method of Example 271, wherein the processing a plurality of PSCCHs further includes: determining whether a sum of N and M is less than twenty; and if the sum is less than twenty, processing a third number K of PSCCH candidates corresponding to K highest S-RSSI values among unprocessed PSCCH candidates, wherein K is equal to twenty minus the sum.

Example 274 includes the method of Example 273, wherein the K highest S-RSSI values are above a second predetermined threshold.

Example 275 includes a non-transitory computer-readable medium having instructions stored thereon, the instructions when executed by one or more processor(s) causing the processor(s) to perform the method of any of Examples 264-274.

Example 276 includes an apparatus for a communication device, including means for performing the actions of the method of any of Examples 264-274.

Example 277 includes a communication device as shown and described in the description.

Example 278 includes a method performed at a communication device as shown and described in the description.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the appended claims and the equivalents thereof.

What is claimed is:

1. A communication device, comprising:
a memory, for storing computer-readable instructions; and
processing circuitry, configured to process the instructions stored in the memory to:
obtain a first path loss between the communication device and a base station, wherein the communication device is coupled to the base station;
calculate a second path loss based on one or more sidelink reference signal received powers (S-RSRPs), wherein the S-RSRPs are calculated based on one or more reference signals received by the communications device from one or more additional communication devices within a communication range of the communication device; and
determine a transmit (Tx) power of the communication device based on the first path loss and the second path loss, wherein determining the Tx power of the communication device comprises:
calculating a first Tx power of the communication device based on a semi-static network configuration and a Tx resource allocation for the communication device, and the first path loss,
adjusting the first Tx power based on at least the second path loss, and
determining the Tx power of the communication device based on the adjusted first Tx power of the communication device.

2. The apparatus of claim 1, wherein the processing circuitry is further configured to:
calculate the one or more S-RSRPs based on the one or more reference signals.

3. The apparatus of claim 1, wherein the processing circuitry is configured to calculate the second path loss based on a minimum of the one or more S-RSRPs (MinS-RSRP) and a maximal Tx power (MaxTxpower) allowed for a communication device in a vehicle-to-everything (V2X) system.

4. The apparatus of claim 3, wherein the second path loss equals a difference between the MaxTxpower and the MinS-RSRP.

5. The apparatus of claim 1, wherein the processing circuitry is configured to adjust the first Tx power by an adjustment value, and wherein the adjustment value is determined based on an equation:

$$\text{adjustment value} = \min(-(\text{first path loss} - \text{second path loss}), 0).$$

6. The apparatus of claim 5, wherein the processing circuitry is configured to determine the Tx power of the communication device by adding the adjustment value to the first Tx power of the communication device.

7. The apparatus of claim 1, wherein the communication device comprises a transceiver, and the processing circuitry is further configured to apply the determined Tx power of the communication device to the transceiver for subsequent transmissions.

8. A non-transitory machine-readable storage medium, having instructions stored thereon, which when executed by a processor of a communication device in a vehicle to everything (V2X) system, cause operations to be performed, the operations comprising:
  obtaining a first path loss between the communication device and a base station to which the communication device is coupled;
  calculating a second path loss based on one or more sidelink reference signal received powers (S-RSRPs), wherein S-RSRPs are calculated based on one or more reference signals received by the communications device from one or more additional communication devices detectable by the communication device; and
  determining a transmit (Tx) power of the communication device based on the first path loss and the second path loss, wherein determining the Tx power of the communication device comprises:
    calculating a first Tx power of the communication device based on a semi-static network configuration and a Tx resource allocation for the communication device, and the first path loss,
    adjusting the first Tx power based on at least the second path loss, and
    determining the Tx power of the communication device based on the adjusted first Tx power of the communication device.

9. The non-transitory machine-readable storage medium of claim 8, wherein the operations further comprise:
  calculating the one or more S-RSRPs based on the one or more reference signals.

10. The non-transitory machine-readable storage medium of claim 8, wherein calculating the second path loss comprises calculating the second path loss based on a minimum of the one or more S-RSRPs (MinS-RSRP) and a maximal Tx power (MaxTxpower) allowed for a communication device in the V2X system.

11. The non-transitory machine-readable storage medium of claim 10, wherein the second path loss equals a difference between the MaxTxpower and the MinS-RSRP.

12. The non-transitory machine-readable storage medium of claim 8, wherein the first Tx power is adjust by an adjustment value, and wherein the adjustment value is determine based on an equation:

adjustment value=min(−(first path loss−second path loss),0).

13. The non-transitory machine-readable storage medium of claim 12, wherein determining the Tx power of the communication device comprises adding the adjustment value to the first Tx power of the communication device.

14. The non-transitory machine-readable storage medium of claim 8, wherein the operations further comprise:
  applying the determined Tx power of the communication device for subsequent transmissions.

15. An apparatus to be employed in a communication device in a vehicle to everything (V2X) system, the apparatus comprising:
  means for obtaining information on a first path loss between the communication device and a base station to which the communication device is connected;
  means for calculating a second path loss based on information on one or more sidelink reference signal received powers (S-RSRPs), wherein S-RSRPs are calculated based on one or more reference signals received by the communications device from one or more additional communication devices detectable by the communication device; and
  means for determining the Tx power of the communication device based on the first path loss and the second path loss, wherein determining the Tx power of the communication device comprises:
    calculating a first Tx power of the communication device based on a semi-static network configuration and a Tx resource allocation for the communication device, and the first path loss,
    adjusting the first Tx power based on at least the second path loss, and
    determining the Tx power of the communication device based on the adjusted first Tx power of the communication device.

16. The apparatus of claim 15, further comprising:
  means for calculating the one or more S-RSRPs based on the one or more reference signals.

17. The apparatus of claim 15, wherein the means for calculating the second path loss is configured to calculate the second path loss based on a minimum of the one or more S-RSRPs (MinS-RSRP) and a maximal Tx power (MaxTxpower) allowed for a communication device in the V2X system.

* * * * *